(12) United States Patent
Tashiro et al.

(10) Patent No.: US 7,369,212 B2
(45) Date of Patent: May 6, 2008

(54) LIQUID CRYSTAL DISPLAY AND METHOD OF FABRICATING THE SAME

(75) Inventors: Kunihiro Tashiro, Kawasaki (JP); Takuya Yoshimi, Kawasaki (JP); Yoshio Koike, Kawasaki (JP); Satoru Imai, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/397,274

(22) Filed: Apr. 4, 2006

(65) Prior Publication Data

US 2006/0176439 A1  Aug. 10, 2006

Related U.S. Application Data

(62) Division of application No. 10/151,504, filed on May 20, 2002, now Pat. No. 7,199,855, which is a division of application No. 09/577,032, filed on May 23, 2000.

(30) Foreign Application Priority Data

| May 24, 1999 | (JP) | ................................... 11-142628 |
| Sep. 17, 1999 | (JP) | ................................... 11-263845 |
| Nov. 30, 1999 | (JP) | ................................... 11-340826 |
| Mar. 24, 2000 | (JP) | ................................... 2000-084397 |

(51) Int. Cl.
*G02F 1/1339* (2006.01)

(52) U.S. Cl. ........................ 349/190; 349/106; 349/110

(58) Field of Classification Search ................ 349/190, 349/153, 106, 110, 187
See application file for complete search history.

(56) References Cited

U.S. PATENT DOCUMENTS

| 4,640,583 A | 2/1987 | Hoshikawa et al. |
| 5,106,441 A | 4/1992 | Brosig et al. |
| 5,263,888 A | 11/1993 | Ishihara et al. |
| 5,326,420 A | 7/1994 | Vinouze et al. |
| 5,621,553 A | 4/1997 | Nishiguchi et al. |
| 5,731,860 A | 3/1998 | Harada et al. |
| 5,739,880 A | 4/1998 | Suzuki et al. |
| 5,844,645 A | 12/1998 | Kashimoto |
| 5,910,829 A | 6/1999 | Shimada et al. |
| 5,946,070 A | 8/1999 | Kohama et al. |
| 5,959,712 A * | 9/1999 | Morii et al. ................. 349/190 |
| 6,067,142 A | 5/2000 | Anderson et al. |
| 6,124,917 A | 9/2000 | Fujioka et al. |

(Continued)

FOREIGN PATENT DOCUMENTS

JP  63-179323  7/1988

(Continued)

*Primary Examiner*—Thoi V. Duong
(74) *Attorney, Agent, or Firm*—Greer, Burns & Crain, Ltd

(57) ABSTRACT

A liquid crystal display comprises a sealing material made of a photo-curing type material which seals liquid crystal sandwiched between substrates, a shading film 8 having a shading area which overlays a red-colored layer transmitting red light, a green-colored layer transmitting green light and a blue-colored layer transmitting blue light. Only the blue-colored layer is formed in an area of the shading film contacting with the sealing material, and the photo-curing type material of the sealing material is structured to have a light reactive area for a wavelength of blue color band.

3 Claims, 80 Drawing Sheets

U.S. PATENT DOCUMENTS

| | | |
|---|---|---|
| 6,179,679 B1 | 1/2001 | Von Gutfeld et al. |
| 6,219,126 B1 | 4/2001 | Von Gutfeld |
| 6,222,603 B1 | 4/2001 | Sakai et al. |
| 6,226,067 B1 | 5/2001 | Nishiguchi et al. |
| 6,233,031 B1 | 5/2001 | Ishitaka |
| 6,323,924 B1 | 11/2001 | Matsuoka et al. |
| 6,384,882 B1 | 5/2002 | Nagayama et al. |
| 6,391,137 B1 | 5/2002 | Matsushima |
| 6,465,268 B2 | 10/2002 | Hirakata et al. |

FOREIGN PATENT DOCUMENTS

| | | |
|---|---|---|
| JP | 2000-66163 | 3/1990 |
| JP | 3-36525 | 2/1991 |
| JP | 05-333351 | 12/1993 |
| JP | 2001-209060 | 12/1993 |
| JP | 06-194615 | 7/1994 |
| JP | 06-202124 | 7/1994 |
| JP | 07-168195 | 4/1995 |
| JP | H7-18192 | 7/1995 |
| JP | H7-168192 | 7/1995 |
| JP | 09-061829 | 3/1997 |
| JP | 09-090383 | 4/1997 |
| JP | 10-026763 | 1/1998 |
| JP | 11-015007 | 1/1999 |
| JP | H11-24086 | 1/1999 |
| JP | H11-38424 | 2/1999 |
| JP | 11-119230 | 3/1999 |

* cited by examiner

FIG. 24
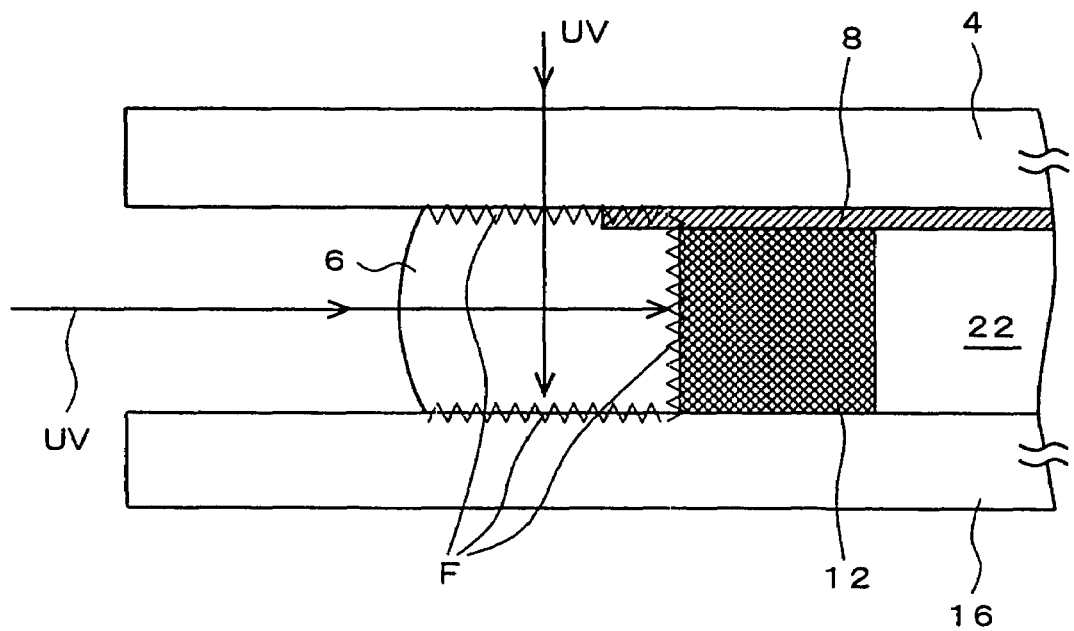
FIG. 25a
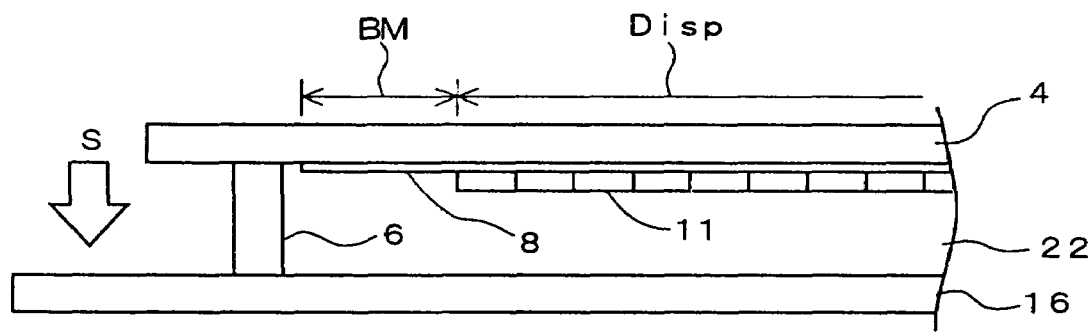

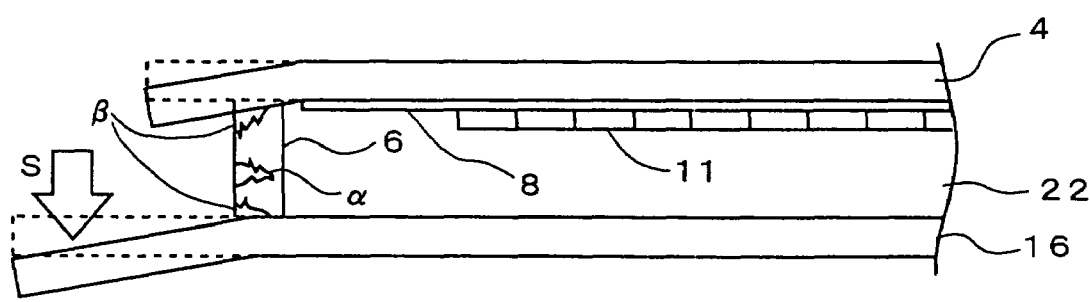

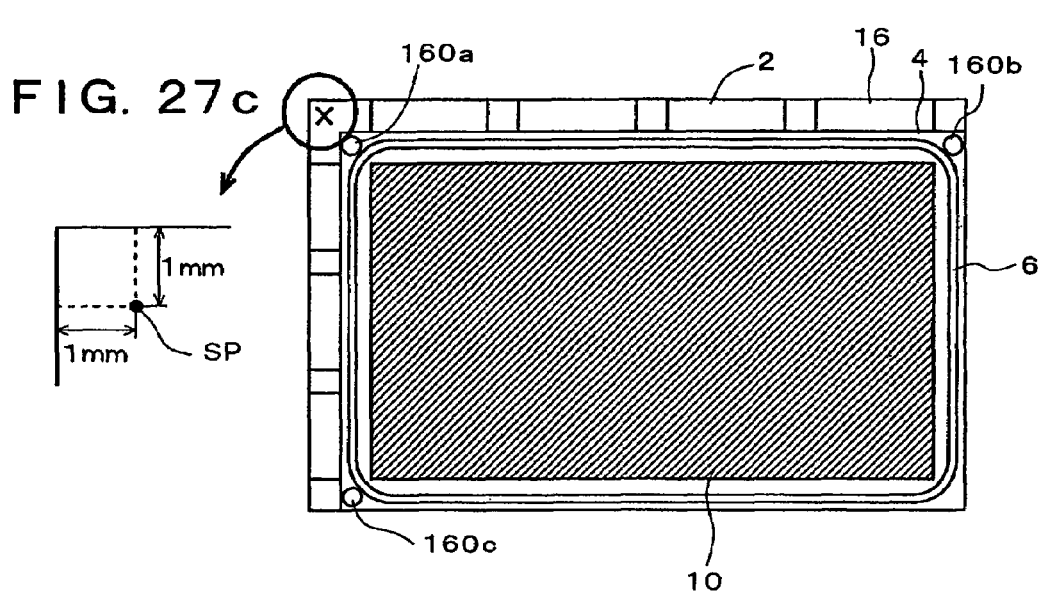
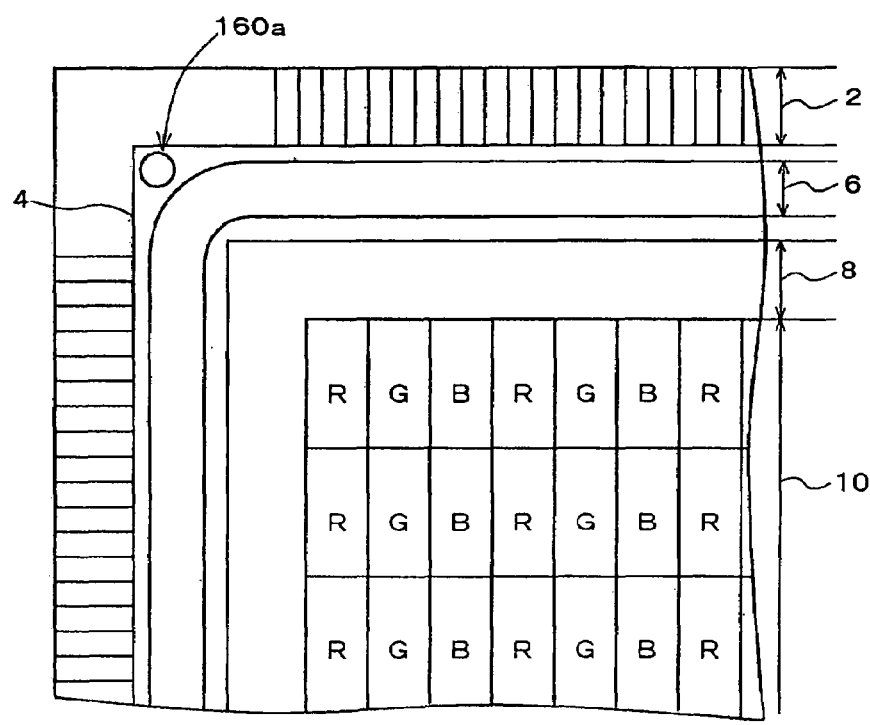

F I G. 56a
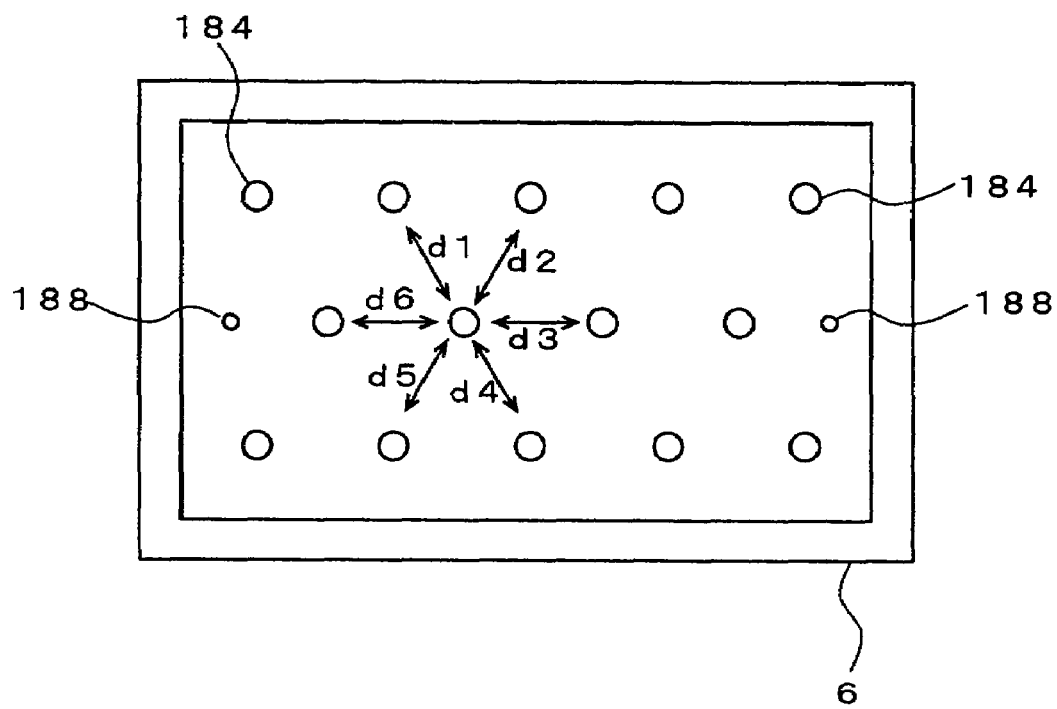
F I G. 56b
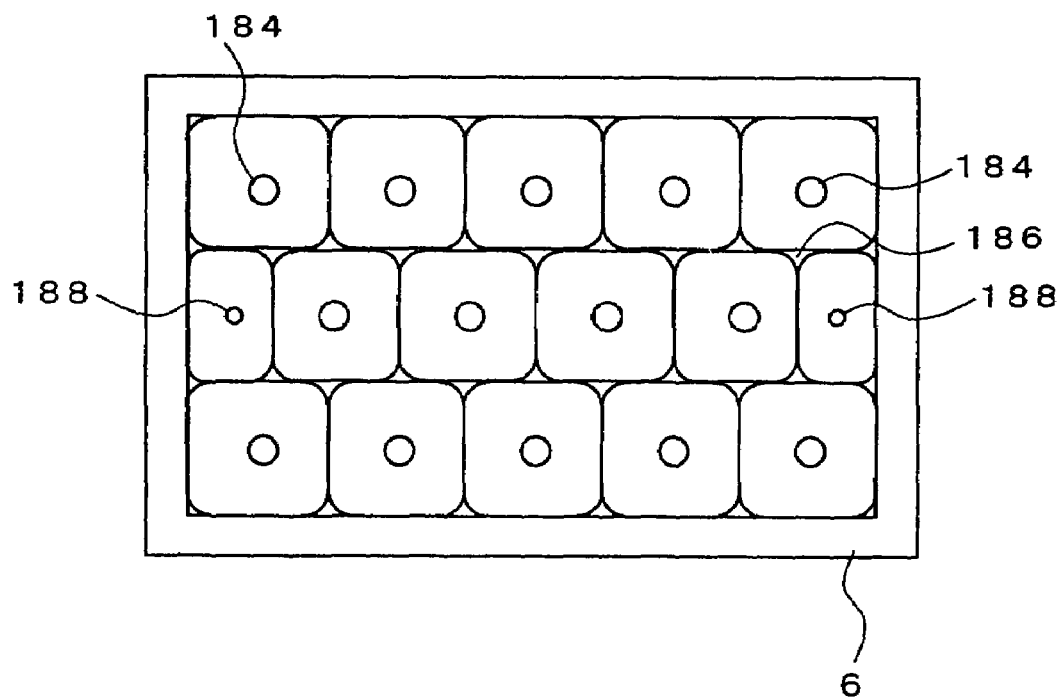

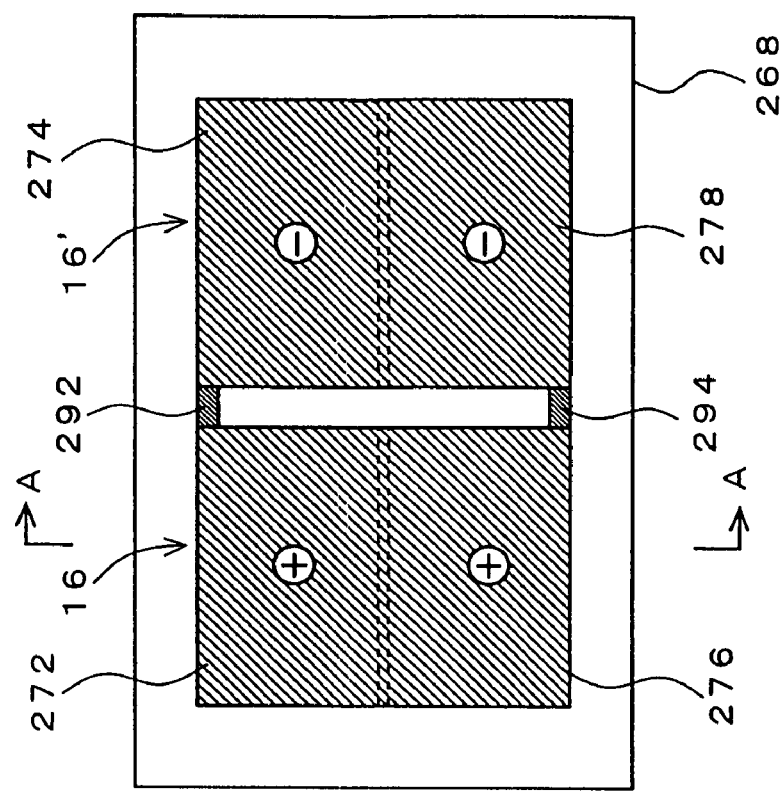
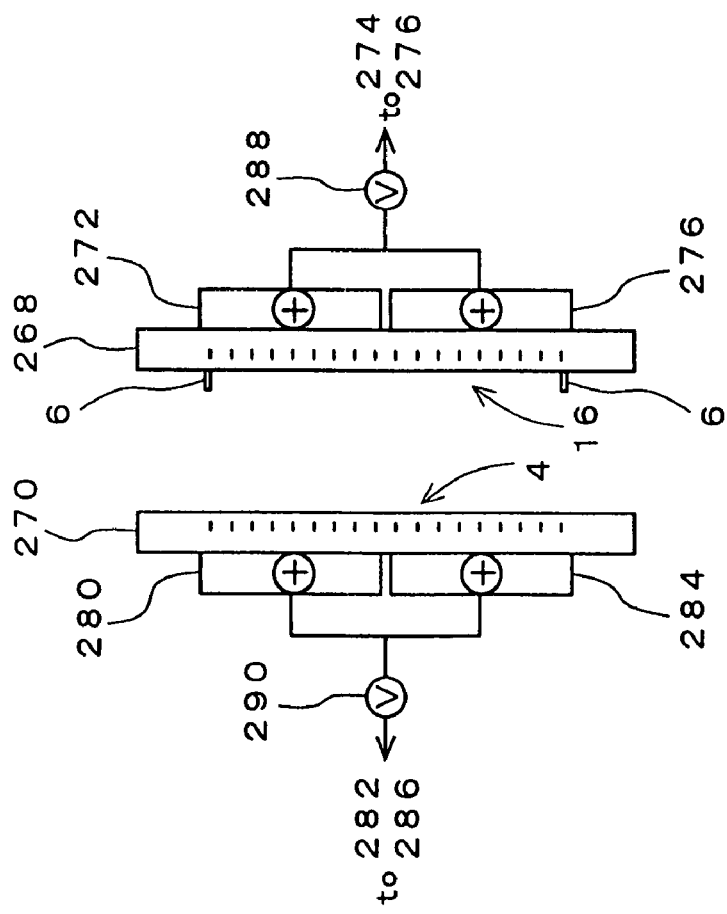

FIG. 77a
FIG. 77b
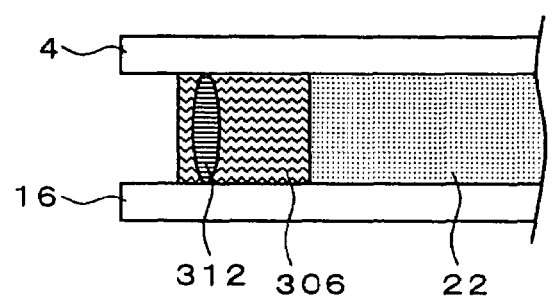
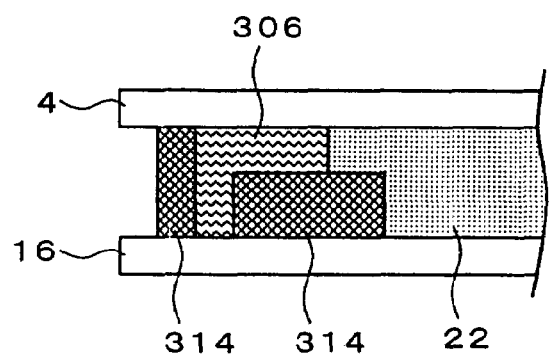
FIG. 78
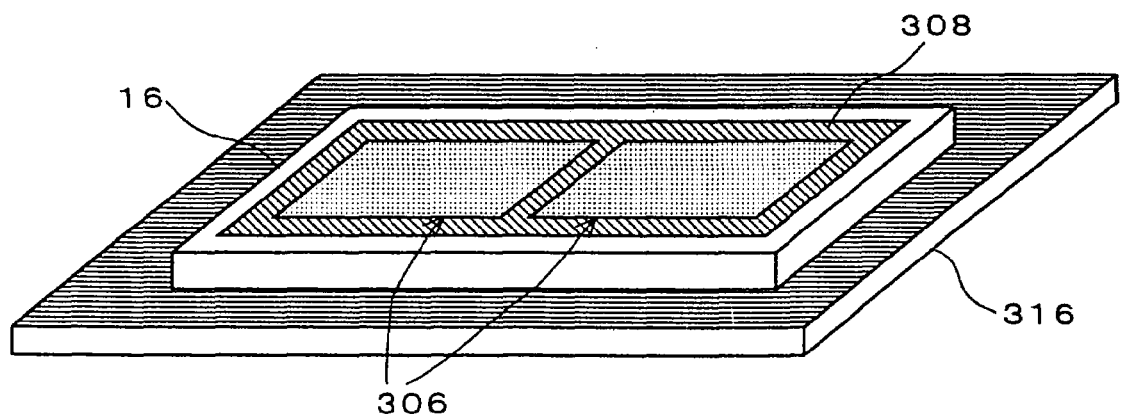

1 scale: 1 μm 1 scale: 1 μm 1 scale: 1 μm 1 scale: 1 μm 1 scale: 1 μm

LIQUID CRYSTAL DISPLAY AND METHOD OF FABRICATING THE SAME

This is a divisional of application Ser. No. 10/1151,504, filed May 20, 2002 now U.S. Pat. No. 7,199,855, which is a divisional of application Ser. No. 09/577,032, filed May 23, 2000.

BACKGROUND OF THE INVENTION

1. Field of the Invention

The present invention relates to a liquid crystal display (LCD) and a fabrication method thereof. Particularly, the present invention relates to the liquid crystal display in which liquid crystal is sealed between two panels by using an instilling method and the fabrication thereof.

2. Description of the Related Art

A liquid crystal display panel of a conventional liquid crystal display is described with reference to FIG. 104. FIG. 104 shows a part of an upper surface of an active matrix-type liquid crystal display panel using a TFT (thin film transistor) as a switching element viewed from a color filter substrate side. As shown in FIG. 104, on a liquid crystal display panel 1100, a plurality of pixel areas 1114 arranged in a matrix shape are formed on an array substrate 1116 side, and a TFT 1112 is formed in each pixel area 1114. A display area 1110 is structured by the plurality of the pixel areas 1114. It will be noted that although a detailed illustration is omitted, a gate electrode of a TFT 1112 in each pixel area 1114 is connected to a gate wiring and a drain electrode is connected to a data wiring respectively. Further, a source electrode of the TFT 1112 is connected to a pixel electrode formed in the pixel area 1114. A plurality of the data wirings and the gate wirings are connected to a terminal portion 1102 formed in the external periphery of the array substrate 1116 so that the plurality of the data wirings and the gate wirings are connected to a driving circuit (not shown in the diagram) provided externally.

A color filter (CF) substrate 1104 formed smaller than the array substrate 1116 by approximately the area of the terminal portion 1102 is provided facing the array substrate 1116 while sealing liquid crystal at a predetermined cell gap. On the CF substrate 1104, a common electrode (not shown in the diagram) is formed and at the same time, BM (black matrix: shading film) 1080, 1180 and the like using color filters (shown by letters R(red), G(green) and B(blue) in the diagram), a Cr (chrome) film or the like are formed. Since a BM 1118 demarcates the plurality of the pixel area 1114 in the display area 1110 and earns contrast, the BM 1118 is used for preventing a light leakage from occurring by shading the TFT 1112. Further, a BM picture-frame portion 1108 is provided for shading undesired light from outside the display area 1110.

The array substrate 1116 and the CF substrate 1104 are attached by a sealing material 1106 made of photo-curing type resin.

Incidentally, a fabrication process of the liquid crystal display is roughly classified into an array process in which a wiring pattern, a switching element (in a case of active matrix type) and the like are formed, a cell process in which an alignment layer treatment is performed, spacers are arranged and liquid crystal is sealed between opposing glass substrates, and a module process in which an installation of a driver IC, attachment of a back light and the like are performed. In a liquid crystal injection process performed in the cell process among the above processes, a method (vacuum injection method) is used, for example, in which the array substrate 1116 forming the TFT 1112 and the opposite color filter substrate (opposite substrate) 1104 are attached with a use of the sealing material 1106, the sealing material is cured, then liquid crystal and the substrates are placed in a vacuum chamber, an injection opening opened in the sealing material is immersed in liquid crystal, the inside of the chamber is returned to the atmospheric pressure, thereby sealing the liquid crystal between the substrates.

On the other hand, in recent years, an instilling method is drawing attention, in which, for example, a constant amount of liquid crystal is dropped on the substrate surface inside the frame of the sealing material 1106 formed inside a frame shape in the periphery of the array substrate, the array substrate 1116 and the CF substrate 1104 are attached in a vacuum and sealing of liquid crystal is performed.

A fabrication process of the liquid crystal display panel according to the instilling method is briefly described with reference to FIGS. 108a through 108c. First, as shown in FIG. 108a, for example, liquid crystal 1206 is dropped from a liquid crystal instilling equipment which is not shown in the diagram at a plurality of positions on an array substrate 1204 forming switching elements such as TFT and the like. Next, a common electrode and a color filter are formed in a display area, and an opposite substrate 1200 coated with a UV sealing material 1202 to be cured by ultraviolet (UV) irradiation in the external periphery of a display area is aligned and attached to the array substrate 1204. This process is performed in a vacuum. Then, when the attached substrates are returned to the atmospheric pressure as shown in FIG. 108b, the liquid crystal 1206 between the attached array substrate 1204 and the opposite substrate 1200 is spread due to the atmospheric pressure. Next, as shown in FIG. 108c, while a UV light source 1208 travels in a travel direction 1211 along the area the sealing material 1202 is coated, UV light is irradiated to the sealing material 1202 and the sealing material 1202 is cured.

In comparison to the vacuum injection method widely used for panel fabrication in the past, this instilling method has possibilities to reduce costs of fabricating a panel and to improve mass productivity owing to first, substantial reduction in the amount of liquid crystal to be used and second, reduction in time to inject liquid crystal and the like, therefore application of this instilling method is strongly desired in the panel fabrication process.

For example, in the Japanese Lain-open Patent Application No. 63-179323, a method is recorded in which an accurately measured required amount of liquid crystal is mounted on a substrate surface inside a sealing material provided on one substrate, the opposite other substrate is overlaid so that the substrate contacts with an upper surface of the sealing material before the liquid crystal spreads on the first substrate surface and reaches an end face of the peripheral sealing material, then both substrates are pressed in a decompressed environment, and the sealing material is cured.

However, in the above method, although basic processes of instillation to follow is shown, a specific description relative to a fabrication technology is insufficient and in reality, technical problems remain in practical application of the process. The instilling process, in comparison to the liquid crystal injection process performed in the past, enables to simply fabricate a liquid crystal panel at low cost but at the same time has technical difficulties as shown below resulting in delay in adopting the instilling method in a fabrication method of a liquid crystal display.

(1) Curing Defects of Sealing Material:

If uncured components of the sealing materials 1106 and 1202 make contact with liquid crystal for a long period of time or are exposed in high temperature while contacting with liquid crystal, the liquid crystal is contaminated. Therefore, photo-curing-type resin which is rapidly cured by ultraviolet light irradiation is used for the sealing materials 1106 and 1202 when the instilling method is used.

Incidentally, the width of a picture-frame portion in the periphery of a panel is becoming narrow due to recent enlargement of the liquid crystal panel 1100 and the like. Therefore, the sealing material 1106 formed in a frame shape in the periphery of a substrate is formed in many cases in the very close proximity to the end of an external periphery of the BM picture-frame portion shown in FIG. 104. Accordingly, when the array substrate 1116 and the CF substrate 1104 are pressed and the area (hatched area in FIG. 104) where the sealing material 1106 and the BM picture-frame portion 1108 make contact is generated, the area of the sealing material 1106 where the BM picture-frame portion 1108 contacts is shaded and not irradiated by light resulting in generating a curing defect area in the said area.

(2) Seal Peeling:

FIGS. 105a and 105b show liquid crystal instillations in the cell process of a liquid crystal panel in the past. FIG. 105a shows a state when liquid crystal (shown by a mark ◯) 1144 is dropped in equal intervals (in this example, matrix shape of three rows and four columns) in a similar shape to the frame shape of the sealing material 1106 on an upper surface of the array substrate inside the sealing material 1106. With respect to a dropping position of each liquid crystal 1144, the distance to a dropping position of an adjacent liquid crystal 1144 has a relation, as shown in the diagram, which is d2=d4=d6=d8>d1=d3=d5=d7. FIG. 105b shows a state in which the liquid crystal 1144 spreads after the array substrate and the CF substrate are attached. As shown in FIG. 105b, while the sealing material 1106 is formed in a rectangular frame shape, fluid drops of the dropped liquid crystal 1144 spread in a circular shape 1146 on the substrate surface. In a conventional dropping method, since fluid drops interfere with one another, approximately 20 minutes of time is required to sufficiently lessen a space 1145 and complete spreading liquid crystal.

Thus, in the conventional method, a long period of time is required to spread liquid crystal to corner portions of the sealing material 1106 and a waiting period for curing the sealing material is long. Accordingly, due to a difference in pressures between the inside and outside of both substrates, possibilities of occurring peeling of corner portions of the sealing material during the waiting period and generating liquid crystal leakage are high.

(3) Substrate Deformation and Display Irregularities:

Substrate holding in liquid crystal instillation in the conventional process is performed by using vacuum chucks, electrostatic chucks or a mechanical retainer. In the substrate holding by vacuum chucks, a substrate is mounted on an attracting surface on a parallel surface plate and is fixed by vacuum-absorbing a back surface of a substrate. By this holding method, for example, an array substrate is held and an adequate amount of liquid crystal is dropped on an array substrate surface inside the frame shape of a sealing material by a dispenser and the like. Then, a CF substrate is positioned in the vacuum environment and entered into a process to be attached with an array substrate. However, since vacuum chucks do not function when a degree of vacuum increases to a certain point when the substrates are held by vacuum chucks, the degree of vacuum at the time of attaching substrates can not be sufficiently increased. Therefore, sufficient pressure for attaching both substrates can not be coated and evenly attaching both substrates is difficult.

Further, in a mechanical holding, since stress is applied only to the holding side portion of a substrate, deformations such as a curvature, deflection and the like occur in a substrate, and both substrates can not be held in parallel when attaching substrates after liquid crystal instillation. If the attachment is performed when both substrates are deformed, a displacement becomes large and problems of reduction in opening ratio of each electrode and light leakage from a shaded portion occur.

FIGS. 106a and 106b are diagrams describing substrate attachment by electrostatic chucks. FIG. 106a shows a plan view of an electrostatically attracted glass substrate 700 of the array substrate 1116 in two-piece structure as an example. FIG. 106b shows a cross section cut by a line A-A in FIG. 106a when the array substrate 1116 and the CF substrate 1104 are to be attached.

As shown in FIGS. 106a and 106b, the areas to become two pieces of array substrate 1116 on the glass substrate 700 are electrically isolated from each other. Electrostatic chucks for electrically attracting the glass substrate 700 has four electrodes 740, 750, 760 and 770 on a parallel surface plate. The electrodes 740 and 750 among the four electrodes 740 through 770 structure positive electrodes and the electrodes 760 and 770 structure negative electrodes. One surface of the array substrate 1116 is electrostatically attracted by the positive electrode 740 and the negative electrode 760 and the other surface of the array substrate 1116 is electrostatically attracted by the positive electrode 750 and the negative 770. Space 680 is provided in a boundary between the positive electrode 740 and the negative electrode 760 and in a boundary between the positive electrode 750 and the negative electrode 770. Although an illustration by a plan view is omitted, the electrostatic chucks on a glass substrate 720 forming the CF substrate 1104 has a similar structure to the electrostatic chucks attracting the glass substrate 700.

By mounting the glass substrate forming a conductive film on the electrostatic chucks in such structure, applying voltage between the electrode and the conductive film and generating the coulomb's force between the glass and the conductive film, the glass substrate can be attracted. In the case of FIGS. 106a and 106b, the conductive film on the glass substrate 700 includes the pixel electrodes, gate wirings, data wirings and the like formed on the array substrate 1116 area. Further, the conductive film on the glass substrate 720 forming the CF substrate area includes the common electrode and the like.

In order to attach substrates while holding the glass substrates 700 and 720 by such electrostatic chucks, the positive poles 740 and 750 are contacted to one of the two substantially equally divided areas of the array substrate 1116, the negative poles 760 and 770 are contacted to the remaining area, a predetermined voltage is applied between the positive and negative poles and the glass substrate 700 is electrostatically attracted. At this time, as shown in FIG. 106b, a surface corresponding to the positive poles 740 and 750 in the array substrate 1116 area of the glass substrate 700 is charged with negative (−) electricity and a surface corresponding to the negative poles 760 and 770 are charged with positive (+) electricity. Thus, on the conductive film of the array substrate 1116 corresponding to the air gap 680 of the boundary between the positive and negative poles, a boundary between a positive electric charge and a negative electric charge is formed.

Incidentally, an alignment film is formed on an upper portion of the conductive film of the array substrate 1116 and liquid crystal is dropped on the alignment film by instillation. Therefore, if the array substrate 1116 area is electrostatically attracted according to the above method, impure ion in liquid crystal is selectively attracted on the alignment film at both sides of the boundary dividing the surface of the array substrate 1116 area into substantially two equal parts. Accordingly, the above method has a problem of generating display irregularities in which when a formed liquid crystal panel is displayed, the brightness in the two surfaces sandwiching the said boundary varies.

Further, when the glass substrate 700 forming the array substrate 1116 and the glass substrate 720 forming the CF substrate 1104 are attached while being held by electrostatic attraction, if voltage in reversed polarity of positive or negative is applied on the opposing surfaces of both glass substrates 700 and 720 as shown in FIG. 106*b*, the coulomb's force is operated to each of the opposing substrates resulting in reduction of the substrate holding strength due to electrostatic attraction. Thus, possibilities of causing a substrate deformation or contacting the substrates with each other and causing electrostatic destruction exist.

Furthermore, a method in which substrates are held by electrostatic chucks of which the substrate holding strength is not affected by the degree of vacuum also has a problem in which a glow discharge occurs in the course of decompressing the atmospheric pressure for attaching substrates and may generate damage to a circuit or a TFT element on a substrate. Also, a phenomenon may occur in which an operation of the electrostatic chucks becomes unstable due to the air remained between the electrostatic chucks and the substrates, and the substrates break off from the electrostatic chucks in the course of the substrate attachment process.

(4) Variations in Cell Gap:

In order to evenly spread liquid crystal inside both substrates in the instillation process, liquid crystal is required to be dropped at multiple points on a substrate surface by dispenser or the like. However, since the amount of liquid crystal to be dropped per one substrate surface is minute, when dropping positions are scattered into multiple points, an extremely small amount of liquid crystal must be accurately dropped. Nevertheless, the amount of liquid crystal to be dropped varies due to variations in viscosity or volume of liquid crystal affected by changes in the environment such as temperature variations at the time of instillation or variations in quality of a dispenser. As a result, variations in cell gap between both substrates occur.

FIGS. 107*a* to 107*c* are cross sections cut vertical to a liquid crystal panel surface and shows an example of variations in cell gap. FIG. 107*a* shows a state in which a desired cell gap is obtained by an ideal liquid crystal instillation. In FIGS. 107*a* to 107*c*, the array substrate 1116 and the CF substrate 1104 are attached by the sealing material 1106 and a predetermined cell gap is secured by beads 1150 as spacers. However, if the amount of dropped liquid crystal increases, as shown in FIG. 107*b*, the sealing material 1106 can not be pressed to an intended gap due to excessive liquid crystal resulting in a problem in which display irregularities occur in the peripheral portion of a panel (periphery of picture-frame portion). When the amount of dropped liquid crystal is further increased, as shown in FIG. 107*c*, a phenomenon in which a center portion of a panel is expanded due to the sealing material 1106 causing a press defect occurs resulting in display irregularities on a whole surface.

(5) Degradation of Liquid Crystal:

Further, in a liquid crystal display fabricated by using the instilling method, a problem is generated in which display irregularities occur at the edge of a seal where a sealing material and liquid crystal contact. One of the causes is described with reference to FIG. 109. FIG. 109 shows a partial cross section of the end portion of a liquid crystal display panel. An array substrate 1200 and an opposite substrate 1204 face each other through the aid of a sealing material 1202. A pixel electrode and a bus line (in FIG. 109, these are collectively referred by a code 1212) are formed on the array substrate 1200 surface facing the opposite substrate 1204, an alignment film 1214 is formed on the surface 1212, a common electrode and a color filter (in FIG. 109, these are collectively referred by a code 1216) are formed on the opposite substrate 1204 surface facing the array substrate 1200, and an alignment film 1218 is formed on the surface 1216. A predetermined cell gap is kept and the liquid crystal 1206 is sealed between the opposing electrodes. As shown in the diagram, the liquid crystal 1206 at the end portion of a panel contacts with the sealing material 1202.

If UV irradiation is performed toward the sealing material 1202 for curing the sealing material in such a structure, UV light is slightly dispersed and a liquid crystal 1220 in a hatched area shown in the diagram adjacent to the sealing material 1202 is also irradiated. However, usually, if a liquid crystal material is irradiated by UV light, characteristics of liquid crystal are degraded, and specifically, resistivity tends to be reduced and high voltage retention ratio required in TFT-LCD and the like can not be kept. Therefore, operating voltage of a liquid crystal cell is different in comparison with a portion which is not irradiated by UV, display irregularities at half-tone display become prominent.

Further, since an area where the sealing material 1202 before UV irradiation and the liquid crystal 1206 make contact is large in an instilling method, the possibility of contaminating a liquid crystal material due to uncured sealing material is high. In order to suppress this liquid crystal contamination, a UV sealing material is required to be rapidly cured by instantly performing UV irradiation. However, there is a problem in which if a UV light high in strength is irradiated in order to reduce irradiation time, damage caused by the light leakage to the liquid crystal material also becomes large.

As described above, photo-curing resin or heat-curing resin is used for a sealing material in the instilling method. As preceding technologies relative to photo-curing a sealing material, a technique in which ultraviolet light is irradiated through a mask having a predetermined pattern transmitting light to attached substrates (Japanese Laid-open Patent Application No. 09-61829), a technique in which an upper and lower substrates are arranged facing each other so that a shaded portion is not overlapped with a position a seal is arranged (Japanese Laid-open Patent Application No. 09-90383), a technique in which a panel is pressed by a pressure difference between the pressure at the time of attachment of substrates and the atmospheric pressure or the pressure in a vacuum chamber after the attachment (Japanese Laid-open Patent Application No. 10-26763) and the like are known.

However, even if these techniques are used, the photo-curing process in the instilling method holds problems described below.

First, photo-degradation of liquid crystal can be cited. Although ultraviolet-light-curing resin is used for photo-curing resin because of the preservation ability and the adhesive strength as previously described, when ultraviolet light is irradiated to liquid crystal, photolysis reaction makes progress and an ion impurity is generated. This ion impurity causes display defects such as irregularities due to a reduction in voltage retention ratio or in image persistence. For this reason, a use of a mask having a predetermined pattern transmitting light as disclosed in the above document (Japanese Laid-open Patent Application No. 09-61829) is conceivable. However, this method of using a mask has a problem in which since a mask is required for each seal pattern and the number of processes is increased by a mask alignment process, the goal of the instilling method of liquid crystal such as reducing a fabrication cost of a panel and improving mass productivity may be rather prevented than accomplished.

Secondly, enlargement of an outside dimension of a panel can be cited. Usually a terminal made of many metal films is formed in a non-display area on the array substrate side. In order to arrange an upper and lower substrates facing each other so that a shading portion of the substrates do not overlap with a position a sealing material is arranged as described in the above document (Japanese Laid-open Patent Application No. 09-90383), essentially, a seal is required to be formed outside the picture frame of a black matrix, thereby resulting in enlargement of an outside dimension of a panel.

Thirdly, there is a problem of displacement. Since curing of a seal is instantly performed in photo-curing, the stress due to a waviness and curvature which are natural characteristics of a substrate tend to stay. If a heat treatment is performed in this state, the stress is released and a displacement of a substrate occurs.

Fourthly, there is a problem of press defect. In instillation, a whole substrate is pressurized by a pressure difference between the pressure at the time of attaching substrates and the atmospheric pressure or the pressure in a vacuum chamber after the attachment as described in the above document (Japanese Laid-open Patent Application No. 10-26763) to spread liquid crystal. Immediately after pressurization, since liquid crystal does not yet reach a sealing material, the sealing material is instantly pushed and pressed to the thickness of a spacer inserted between substrates. However, since the inside of the panel is thicker than a predetermined thickness, the sealing material is subsequently pushed back. Although the thickness of the panel gradually approaches the predetermined thickness and the sealing material is again pressed to the thickness of a spacer by extending shelf time, liquid crystal is contaminated from uncured sealing material in the time the liquid crystal is left. Therefore, as a matter of fact, curing is required to be performed in the least amount of time. Due to this balance, sufficient shelf time can not be taken and insufficient shelf time becomes a cause of generating press defect.

In the above vacuum injection method or instilling method, in order to cure a sealing material in a short period of time, photo-curing resin or photo plus heat-curing resin is used for a seal. However, in the instilling method, there is a possibility in which a sealing material contacts with liquid crystal when the sealing material is uncured. If a sealing material component elutes into liquid crystal or ultraviolet light is irradiated to adjacent liquid crystal when a sealing material is cured and liquid crystal is resolved by photolysis, the voltage retention ratio of liquid crystal at the edge of a seal is reduced, thereby occurring display irregularities.

In order to deal with this problem, for example, in the Japanese Laid-open Patent Application No. 06-194615, a liquid crystal display in which a column-shape spacer is arranged outside the pixel area on either one of a pair of substrates and a frame-shape spacer (frame-shape structure) is arranged along the fringe periphery of the said substrate is disclosed. These spacers are simultaneously formed in a photolithography process and are used to fabricate a liquid crystal panel using an instilling method.

FIG. 110a shows a part of an upper surface of a conventional active-matrix type liquid crystal panel 1100 different from the one using a TFT as a switching element shown in FIG. 104 viewed from a CF (color filter) substrate side. FIG. 110b shows a partial cross section cut at a line A-A of FIG. 110a. A plurality of pixel areas 1114 arranged in a matrix shape are formed on an array substrate 1116 side of the liquid crystal display panel 1100 and a TFT (not shown in the diagram) is formed in each pixel area 1114. A picture display area 1110 is formed by a plurality of pixel areas 1114.

A CF substrate 1104 is formed smaller than the array substrate 1116 by approximately the width of a terminal portion 1102 and arranged facing the array substrate 1116 while sealing a liquid crystal at a predetermined cell gap. The array substrate 1116 and the CF substrate 1104 are attached by a main seal 1106 made of photo-curing type resin. A width 1106' shown by double dotted lines indicates the width of the main seal 1106 at the time of coating. A frame-shape structure 1111 separating the main seal 1106 and the liquid crystal 22 is formed in the area between the main seal 1106 and the display area 1110. The liquid crystal 22 is sealed in the area surrounded by the frame-shape structure 1111 between the array substrate 1116 and the CF substrate 1104.

A common electrode (not shown in the diagram) and color filters (indicated by letters R(red), G(green), B(blue) in the diagram) are provided on the CF substrate 1104. A BM picture frame 1108 and a BM deciding the space between pixel areas are also formed on the CF substrate 1104. An external peripheral end of the frame-shape structure 1111 is arranged inside an external peripheral end of the BM picture frame viewed from a direction vertical to the surface of the substrate 1116. Therefore, a peripheral end portion inside the main seal 1106 overlaps with a peripheral end portion outside the BM picture frame 1108 and an area 1107 is formed. Thus, UV light is shaded by the BM picture frame 1108 and a curing defect of the main seal 1106 is generated in the area 1107.

Further, as shown in FIG. 111, if the frame-shape spacer 1111 equivalent to a cell gap alone is provided in the fringe periphery of the CF substrate 1104 when liquid crystal more than the amount to fill the frame-shape spacer 1111 at instillation is dropped, excess liquid crystal flows over the frame-shape spacer 1111, uncured sealing material 1106 and the liquid crystal 22 make contact, thereby dispersing contaminant. Furthermore, as shown in FIG. 112, if a cell gap is thick, the liquid crystal 22 easily flows over the frame-shape spacer 1111 before the liquid crystal 22 is completely spread. FIG. 112 shows a state in which a surface of the array substrate 1116 is viewed from the CF substrate 1104 side. When the liquid crystal 22 is dropped at a plurality of liquid crystal dropping points by using a liquid crystal instilling method, and the substrates 1116 and 1104 are attached, a boundary 1123 of the liquid crystal 22 at the time of attachment is gradually spread. Before the liquid crystal 22 is completely spread, an uninjected portion of liquid crystal 1121 is formed, and even if there is no excess liquid crystal, since the cell gap is higher than the height of the frame-shape spacer 1111, the liquid crystal boundary 1123 flows over the frame-shape spacer 1111 and, for example, at a position 1122, contacts with uncured main seal 1106. Also, as shown in FIG. 113, since the atmospheric pressure evenly operates on the whole substrate surface when the substrates are returned in an atmosphere after attachment, the center of the substrate becomes depressed with respect to the main seal 1116 in which the resistance is larger. As a result, the frame-shape spacer 1111 is lifted up and the liquid crystal 22 contacts with the main seal 1106.

In addition to the problems described above, the conventional instilling method further holds problems identified below.

(6) Seal Peeling Due to a Curing Defect:

A black matrix (BM: shading film) is usually formed in the fringe periphery portion (picture frame) of a liquid crystal display substrate. Unless a frame-shape spacer is strategically arranged, when a sealing material is spread after substrates are attached, a part of the sealing material overlaps with the end of a BM picture frame and UV light is obstructed, thereby resulting in curing defects. Since adhesive strength is weak in the portion of a curing defect, external stress is concentrated and peeling of a sealing material is induced. If a position of a sealing material is sufficiently apart from the end of a BM picture frame, such defects do not occur. However, by so doing, the picture-frame area is enlarged and the glass substrate surface can not be efficiently utilized.

(7) Excess Liquid Crystal Flowing Over a Frame-Shape Spacer:

If a column-shape spacer equivalent to a cell gap alone is provided in a fringe periphery of a substrate, when liquid crystal more than the amount to fill the frame-shape spacer is dropped at the time of instillation, an excess liquid crystal flows over the frame-shape spacer, uncured sealing material and liquid crystal contact, thereby dispersing contaminant. Further, when there are variations in a dropping amount from a dropping dispenser even if the dropping of liquid crystal is controlled, or when liquid crystal reaches the frame-shape spacer before liquid crystal fully fills inside the frame, since a cell gap is thick before liquid crystal is completely spread, liquid crystal easily flows over the frame-shape spacer.

(8) Irregularities Due to a Dropping Mark:

A liquid crystal display fabricated by an instilling method has a problem in which a "dropping mark" in the area liquid crystal is dropped is seen as an irregularity. FIGS. 114a through 114c show an example of the "dropping mark". FIG. 114c shows a liquid crystal instillation in a state in which a dropped liquid crystal 136 is adhered on an alignment film 134 on a substrate 132. In display irregularities due to "dropping marks", there are irregularities 130 as shown in FIG. 114a in which boundaries of the dropped areas are visible and surface irregularities 131 as shown in FIG. 114b in which the brightness of the whole dropped areas is different from the brightness of the periphery. After dropped liquid crystal and an alignment film contacts, an instilled panel is positioned and attached, and then liquid crystal is spread in a vacuum.

The cause of the "dropping mark" is considered to be a contact between liquid crystal and an alignment film in the atmospheric pressure. Further, a degree of the "dropping mark" is found to be different depending on a liquid crystal material for dropping and a material for an alignment film. If a liquid crystal material has strong polarity and a material for liquid crystal and a material used for an alignment film material are inferior in electrical characteristics (i.e. low voltage retention ratio, high ion density, large residual DC voltage), the "dropping mark" tends to be more visibly generated. Specifically, although in a liquid crystal panel in which alignment control of liquid crystal of MVA-(multi-domain vertical alignment) mode can be realized, N-type (negative dielectric anisotropy: $\Delta\epsilon<0$) liquid crystal material and a vertical alignment film are required, material selection for these materials is limited in comparison with P-type liquid crystal material and a horizontal alignment film, and there are only few materials among the existing materials which satisfy requirements of electrical characteristics. Therefore, liquid crystal even more reliable is required to be used for a liquid crystal material which contacts with an alignment film in the atmospheric pressure and a different fabrication method from before is required.

(9) Other Problems:

Furthermore, an instilling method has a problem in which administration to prevent substrates failed at instillation due to troubles in the process and substrates failed to create a cell gap adjacent to a main seal from advancing to subsequent processes is difficult. Specifically, since the birefringence of liquid crystal viewed from the front surface of a panel when voltage is not applies is equal to 0 in an MVA-mode liquid crystal panel, a liquid crystal layer is seen as the same as an air layer and grasping a state of liquid crystal instillation with certainty is difficult. Therefore, easily and steadily performing an inspection of display irregularities of a liquid crystal panel fabricated according to an instilling method is desired.

Also, in order to reduce contamination of liquid crystal due to a contact between liquid crystal and uncured sealing material, a use of a sealing material of high viscosity can be considered. However, a gap is difficult to create by a sealing material of high viscosity and a cell gap at the edge of a seal becomes thicker then a cell gap at the center of a display, thereby resulting in generating a problem of display irregularities.

Further, upon performing an instilling method, due to variations in the environment during the period up to when a sealing material is cured by UV irradiation after attaching substrates in a vacuum and subsequently returning the attached substrates in an atmosphere, changes in a condition of substrates at the time of UV irradiation, and a lack of stability in positioning substrates when a gap is created or the like, a displacement in attaching or a displacement from substrate distortion is generated, or a gap defect is generated, thereby resulting in a problem in which producing a stable product is difficult.

SUMMARY OF THE INVENTION

An object of the present invention is to provide a liquid crystal display and a fabrication method thereof wherein liquid distillation can surely be performed in a cell process.

The object is achieved by a liquid crystal display which comprises a sealing material made of a photo-curing type material sealing liquid crystal sandwiched between two substrates, a shading area overlaying a red-colored layer to transmit color light, a green-colored layer to transmit green light and blue-colored layer transmitting blue light, wherein only the blue-colored layer is formed in the shading area contacting with the sealing material and the photo-curing type material for the sealing material has a light reactive area for a wavelength of blue-color band.

BRIEF DESCRIPTION OF THE DRAWINGS:

FIG. 24 is a diagram showing Example 8 in the liquid crystal display and the fabrication method of the liquid crystal display according to the sixth embodiment of the present invention.

FIGS. 25a and 25b are diagrams describing a problem in the past in a seventh embodiment of the present invention.

FIGS. 27a through 27c are diagrams showing Example 1 in a liquid crystal display and a fabrication method thereof according to the seventh embodiment of the present invention.

FIGS. 56a and 56b are diagrams showing an instillation of liquid crystal in a cell process of a liquid crystal panel according to a twelfth embodiment of the present invention.

FIGS. 68a and 68b are diagrams describing substrate attachment with a use of electrostatic chucks in a liquid crystal display according to a sixteenth embodiment of the present invention.

FIGS. 77a and 77b are diagrams briefly describing the fabrication method of the liquid crystal display according to the nineteenth embodiment of the present invention.

FIG. 78 is a diagram briefly describing the fabrication method of the liquid crystal display according to the nineteenth embodiment of the present invention.

Figure 1A:
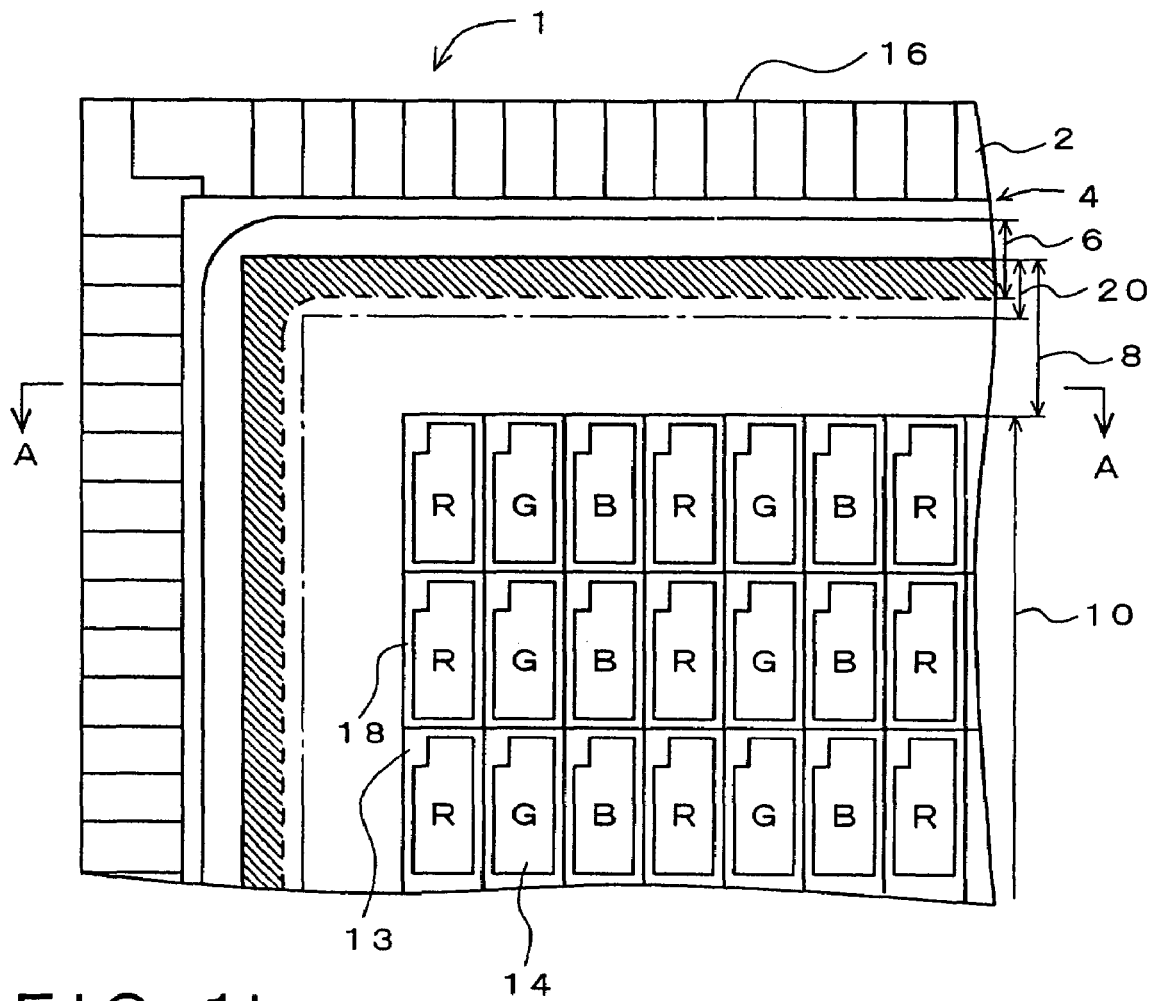
FIGS. 1a and 1b are diagrams showing a schematic structure of a liquid crystal display panel according to a first embodiment of the present invention.
Figure 1B:
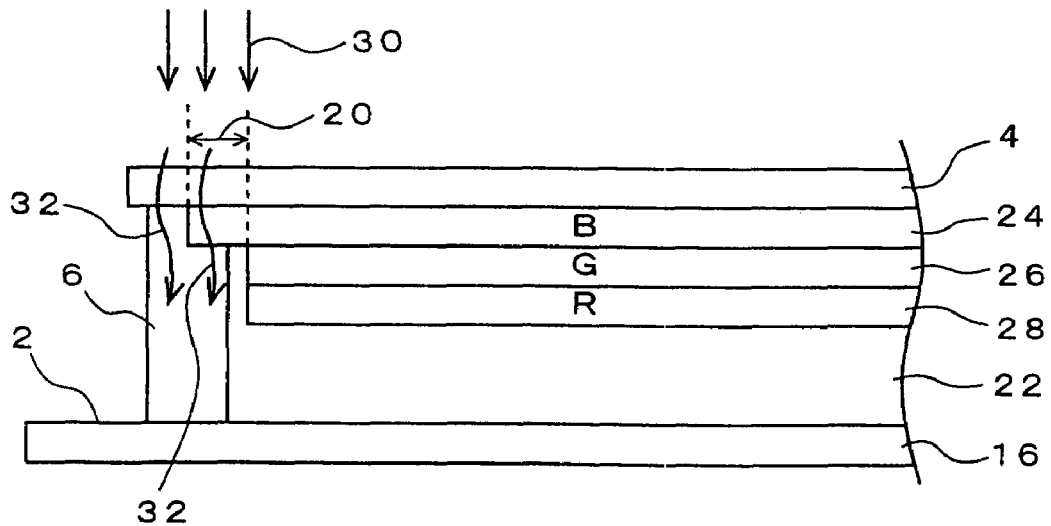

DESCRIPTION OF THE PREFERRED EMBODIMENTS:

A liquid crystal display and a fabrication method thereof according to a first embodiment of the present invention is described with reference to FIG. 1a through FIG. 3. In this embodiment, the liquid crystal display and the fabrication method of the liquid crystal display reducing curing defects of a sealing material and steadily performing instillation of liquid crystal in a cell process are described. First, a schematic structure of a liquid crystal panel of the liquid crystal display according to this embodiment is described with reference to FIGS. 1a and 1b. FIG. 1a shows a part of an upper surface of an active matrix type liquid crystal panel 1 using a TFT as a switching element viewed from a CF substrate side. FIG. 1b shows a partial cross section cut at a line A-A of FIG. 1a. A plurality of pixel areas 14 arranged in a matrix shape are formed on an array substrate 16 side of the liquid crystal panel 1 and a TFT 13 is formed in each of the pixel area 14. Further, as shown in FIGS. 1a and 1b, a picture display area 10 is structured by the plurality of the pixel areas 14. Although detailed diagrams are omitted, a gate electrode of the TFT 13 of each pixel area 14 is connected to a gate wiring and a drain electrode is connected to a data wiring respectively. Furthermore, a source electrode of the TFT 13 is connected to a pixel electrode formed in the pixel area 14. A plurality of the data wirings and the gate wirings are connected to a terminal portion 2 formed in an external periphery of the array substrate 16 to be connected to a driving circuit (not shown in the diagram) provided outside.

A CF substrate 4 formed smaller than the array substrate 16 by approximately the width of the terminal portion 2 seals liquid crystal at a predetermined cell gap and is arranged opposing the array substrate 16. The array substrate 16 and the CF substrate 4 are attached by a sealing material 6 made of a photo-curing type resin. The photo-curing type resin of the sealing material 6 to be described in detail later has light reactive area for the light with the wavelength of a blue-color band. A liquid crystal 22 is sealed in the area surrounded by the sealing material 6 between the array substrate 16 and the CF substrate 4.

Figure 2:
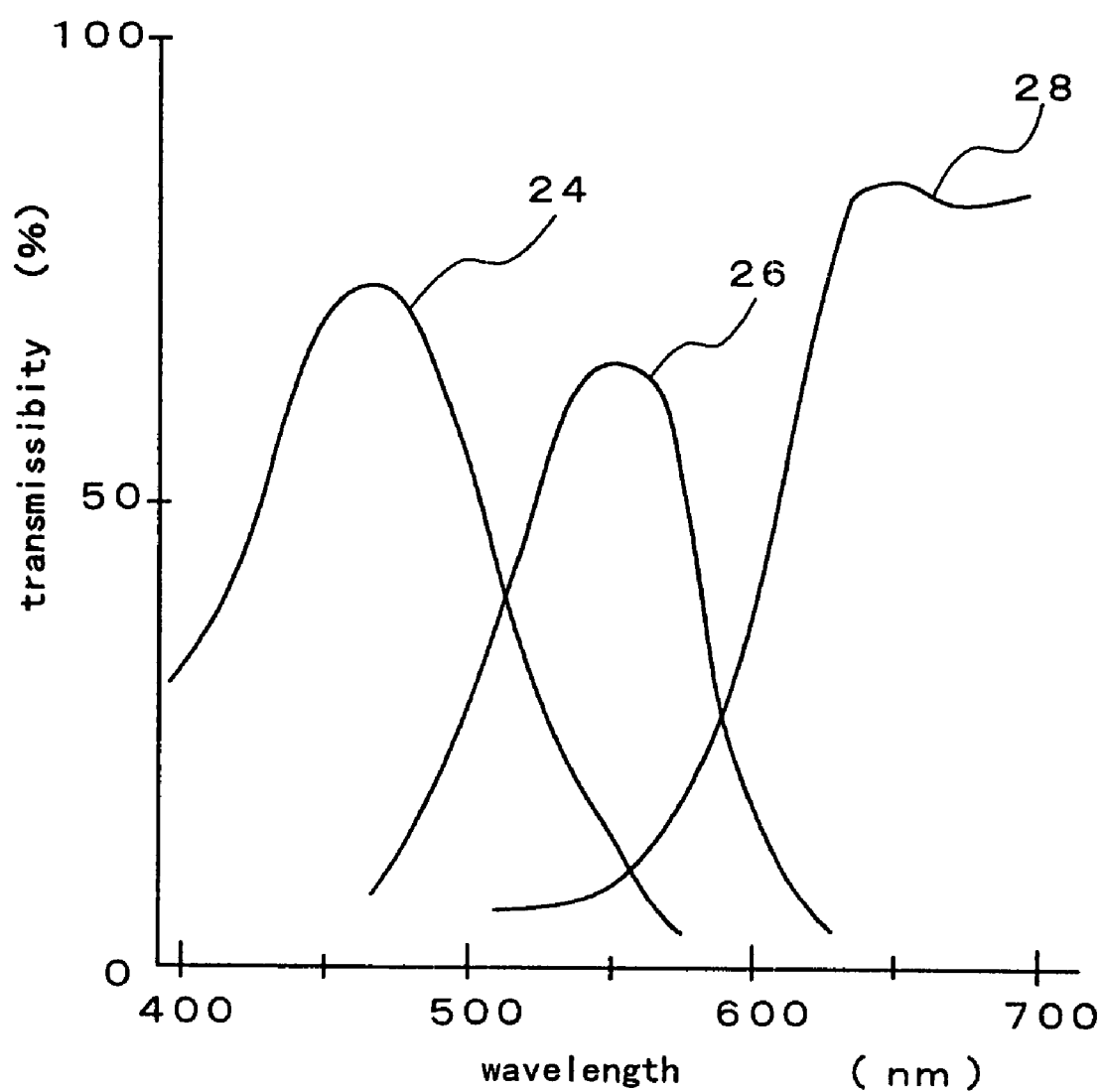
FIG. 2 is a diagram showing a light transmission spectrum of a red-colored layer 28, green-colored layer 26 and blue-colored layer 24 when a film thickness is equal to 1.3 nm.

Color filters (shown by the letters R(red), G (green), B (blue) in the diagram) along with a common electrode (not shown in the diagram) are arranged on the CF substrate 4. Further, BM's 8 and 18 laminating a color filter forming material and having a shading function are formed on the CF substrate 4. The BM 18 is used to earn contrast by deciding the plurality of the pixel areas 14 in the display area 10 and to prevent the light leakage current from generating by shading the TFT 13. Furthermore, a BM picture-frame portion 8 is arranged to shade undesired light from outside the display area 10. The BM Picture-frame portion 8, as shown in FIG. 1b, is formed by laminating (by overlaying color-plates) sequentially from the CF substrate 4, for example, a blue-colored layer 24 made of resin dispersing blue-color pigment, a green-colored layer 26 made of resin dispersing green-color pigment and a red-colored layer 28 made of resin dispersing red-color pigment. FIG. 2 shows the photo-transmission spectrum of the red-colored layer 28, the green-colored layer 26 and the blue-colored layer 24 when the film thickness is approximately 1.3 nm and the lateral axis indicates the wavelength and the vertical axis indicates the transmissivity. As shown in FIG. 2, the peak wavelength of the photo-transmission spectrum for the red-colored layer 28 is equal to 650±10 nm, the peak wavelength of the photo-transmission spectrum for the green-colored layer 26 is equal to 540±10 nm and the peak wavelength of the photo-transmission spectrum for the blue-colored layer 24 is equal to 460±10 nm. By laminating the colored layers 24, 26 and 28, the three primary colors are overlaid and a shading layer which does not pass the light is formed. The BM 18 is also formed by overlaying color-plates which is similar to FIG. 1b.

Further, as shown in FIG. 1b, an area 20 in which only the blue-colored layer 24 is formed to make contact with the sealing material 6 and the green-colored layer 26 and the red-colored layer 28 are not formed is arranged in the contacting area of sealing material 6 in the periphery of the BM picture-frame portion 8.

Thus, this embodiment is the liquid crystal display 1 providing the sealing material 6 made of the photo-curing type material to seal the liquid crystal 22 sandwiched between the two substrates 4 and 16 and shading films 8 and 18 having shading areas overlaying the red-colored layer 28, the green-colored layer 26 and the blue-colored layer 24, and has distinctive characteristics that only the blue-colored layer 24 transmitting blue-color light is formed at the shading film 8 area contacting the sealing material 6 and the photo-curing type material for the sealing material 6 is, for example, a resin material having the light reactive area for the light with the wavelength of the blue-color band. Further, the red-colored layer 28, the green-colored layer 26 and the blue-colored layer 24 forming the shading areas of the shading films 8 and 18 have a distinctive characteristic in using the color filter forming material for each color.

Operational effects by the liquid crystal display according to this embodiment, having the structure described above and the fabrication method of the display are described next. It will be noted that since the fabrication method of the liquid crystal display according to this embodiment has distinctive characteristics in reducing curing defects of sealing material and steadily performing instillation of liquid crystal in the cell process, other processes such as the array process forming a wiring pattern, switching element and the like on the glass substrate, the cell processes of the alignment layer treatment, arrangement of a spacer and the like, or the module processes attaching a driver IC, installing a back lighting and the like are similar to the conventional method and the description is omitted.

Figure 3:
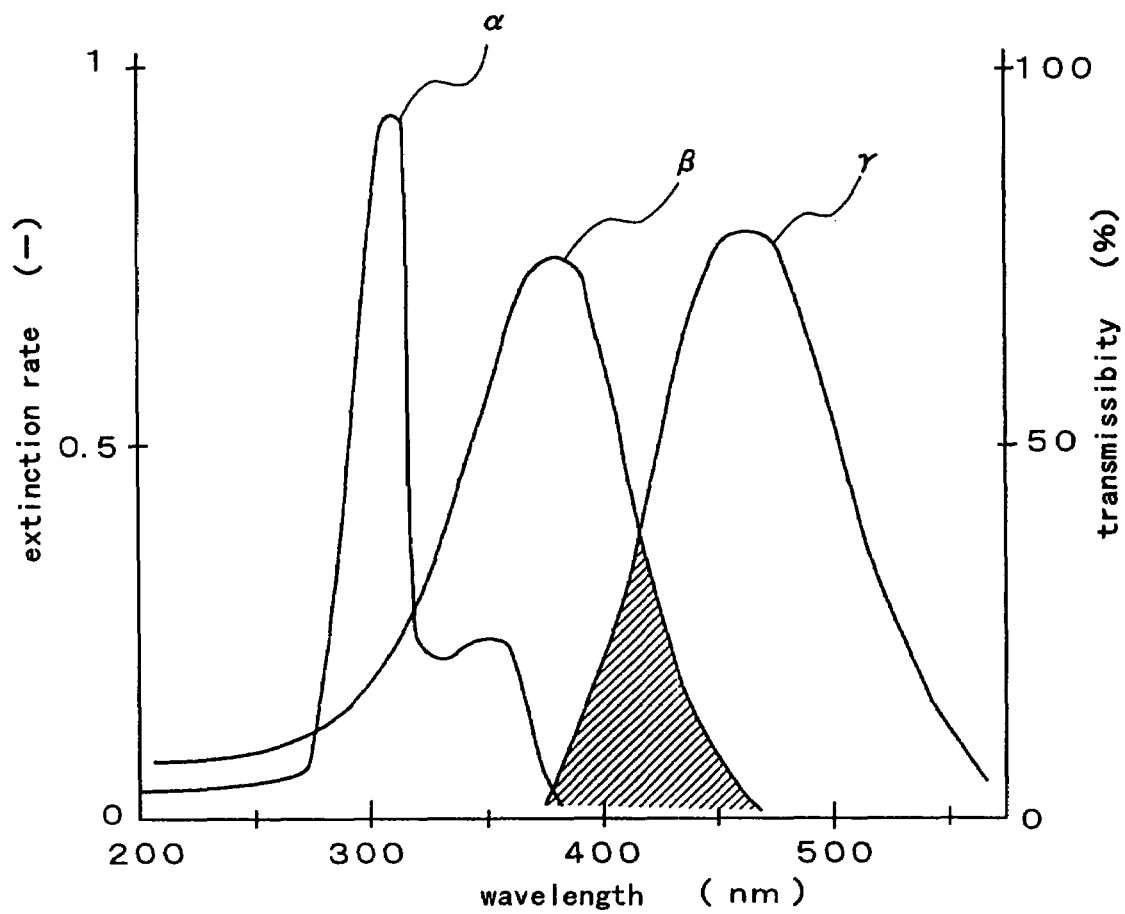
FIG. 3 is a diagram showing a photo-absorption spectrum (β) of a photo-curing-type resin of a sealing material 6 according to the first embodiment of the present invention and a blue-color transmission spectrum (γ) of the blue-colored layer 24 and further showing a photo-absorption spectrum (α) of a conventional photo-curing-type resin for comparison.

FIG. 3 shows the photo-absorption spectrum ($\beta$) of the photo-curing type resin for the sealing material 6 according to this embodiment and the blue-color transmission spectrum ($\gamma$) of the blue-colored layer 24 and further shows the photo-absorption spectrum ($\alpha$) of the conventional photo-curing type resin for comparison. The lateral axis indicates the wavelength (unit: nm), the vertical axis on the left indicates the extinction rate (unit: none) to compare the photo-absorption spectrum ($\beta$) of the photo-curing type resin according to this embodiment and the photo-absorption spectrum ($\alpha$) of the conventional photo-curing type resin. The vertical axis on the right indicates the transmissivity (unit: %) for the blue-color transmission spectrum ($\gamma$) of the blue-colored layer 24. As shown in FIG. 3, the peak wavelength of the extinction rate for the photo-curing type resin according to this embodiment is shifted to the blue-color transmission spectrum ($\gamma$) side in comparison with that of the conventional resin. Further, the half-width of the spectrum is wider in comparison with that of the conventional resin and a gentle curve from the peak extends to a relatively wide wavelength band. Accordingly, the photo-absorption spectrum ($\beta$) of the photo-curing type resin according to this embodiment and the blue-color transmission spectrum ($\gamma$) of the blue-colored layer 24 have an overlapping wavelength band as shown by hatching in FIG. 3.

Thus, even if the sealing material 6 made of the photo-curing type resin according to this embodiment contacts with the BM picture-frame portion 8 at the area 20, the light in the blue-color band transmitting the blue-colored layer 24 is irradiated in the curing process by irradiation, and thereby the subject area can sufficiently be cured without generating curing defects. It will be noted that the reason for using the blue-colored layer 24 is because the transmission spectrum for blue-color light is most on the short wavelength side as already shown in FIG. 2 and is close to the absorption spectrum for a general photo-curing type resin in the transmission spectrum of each color of the color filters.

Light reactive area of the photo-curing type resin vary depending on the kind of photo-initiator to be added. In this embodiment, the photo-initiator having the absorption area on longer wavelength side than the past is added to have the wavelength band overlap with the transmission spectrum of the blue-color resin.

By using this photo-curing type resin, the frame-shape sealing material 6 is formed on the array substrate 16 to have the relative position shown in FIGS. 1*a* and 1*b*. After performing the instillation of liquid crystal, the CF substrate is attached to the array substrate 16. At this time, the blue-colored layer 24 of the BM picture-frame portion 8 and at least a part of the sealing material 6 overlap in the area 20. The sealing material curing is performed at this state by irradiating light 30 from upper portion of the surface of the CF substrate 4.

By arranging only the blue-colored layer 24 in the area 20 of the BM picture-frame portion 8 and using the photo curing type resin having the light reactive area in the transmission wavelength for the blue-color resin as the forming material of the sealing material 6 in this manner, even if the sealing material 6 contacts with the BM picture-frame portion 8, a light 32 transmitted from the area 20 in the blue-color wavelength band irradiates the sealing material 6 so that the sealing material 6 is cured. As shown in FIG. 2, since the transmission wavelength of the blue-color resin is in the range of approximately 380-550 nm with the peak in the adjacent of 460 nm, if the photo-curing type resin having the light reactive area in this range is used as the sealing material 6, curing can be steadily performed even if the sealing material 6 is formed in the BM area 20. Accordingly uncured component of the sealing material 6 does not make contact with liquid crystal for a long period of time, thereby preventing from liquid crystal contamination. As a result, while display irregularities due to curing defects occur all around the edge of seal in the past, a high-quality picture without generating display irregularities can be obtained by the liquid crystal display 1 according to this embodiment.

As described above, the fabrication method of the liquid crystal display according to this embodiment seals the liquid crystal 22 by attaching the two substrates 4 and 16 using the sealing material 6 made of the photo-curing type material and in the fabrication method of the liquid crystal display fixing the two substrates 4 and 16 by curing the sealing material 6 by irradiating the light 30, uses the photo-curing type resin having the light reactive area to the light with the wavelength of the blue-color band as the photo-curing type material and forms only the blue-colored layer 24 to transmit the light of the blue-color band in the area 20 of the BM picture-frame portion 8 contacting the sealing material 6 when attaching the two substrates 4 and 16. Further, the blue-colored layer 24 is simultaneously formed when a blue-color color filter to be formed in the pixel is formed. Thus, by forming only the blue-colored layer 24 in the area 20, the light 32 in the blue-color band can be incident upon the sealing material 6 contacting the area 20. Therefore, the sealing material 6 using the photo-curing type resin having the light reactive area to the light with the wavelength of the blue-color band can be cured.

Figure 4A:
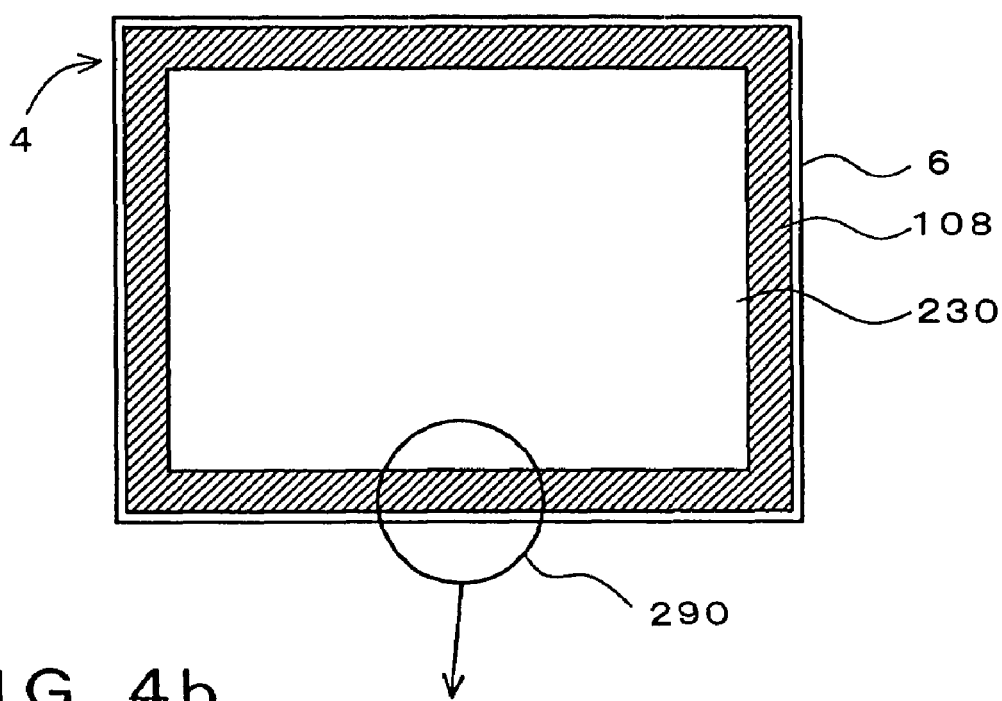
FIGS. 4a and 4b are diagrams describing an overlap of the sealing material of a liquid crystal display according to a second embodiment of the present invention and a BM picture-frame portion.
Figure 4B:
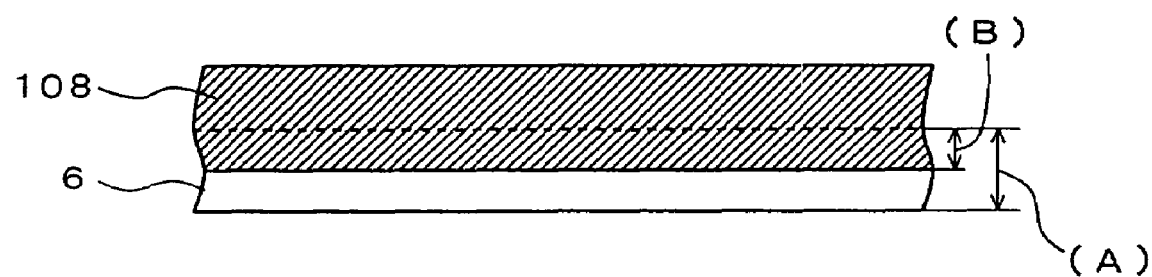

Next, a liquid crystal display and a fabrication method thereof according to a second embodiment of the present invention is described with reference to Table 1 through Table 3 and FIG. 4*a* through FIG. 7. It will be noted that the structuring elements having the same operational functions as the first embodiment are referred by the same codes and the descriptions are omitted. FIG. 4*a* shows a state of the liquid crystal display according to this embodiment viewed from the opposite substrate 4 side. FIG. 4*b* is an enlarged cross sectional view of a circled area 290 of FIG. 4*a*. Although description is omitted in the first embodiment, as shown in FIGS. 4*a* and 4*b*, usually a black matrix (BM) picture-frame portion 108 for shading is formed in the periphery of a display area where a color filter (CF) 230 of the opposing substrates is formed. This embodiment has a distinctive characteristic in coating the sealing material 6 so that a part of the internal periphery side of the sealing material 6 formed in the external periphery of the display area of the opposite substrate 4 overlaps the BM picture-frame portion 108. Specifically, the sealing material 6 is coated on the opposite substrate 4 so that the width (A) of the sealing material 6 after pressing is equal to approximately 1.0 mm in width and at the same time the end portion of the sealing material 6 enters toward inside the BM picture-frame portion 108 by a distance of (B)=0.2 mm from the end portion of the BM picture-frame portion 108. The sealing material 6 is cured by vertically irradiating UV light from upper portion of the surface of the opposite substrate 4.

The ultraviolet transmissivity of the color plate for the color filter (CF) is described with reference to Table 1. The CF shown in Table 1 is a combination of each CF of the three primary colors red (R), green (G) and blue (B). When a xenon mercury lamp is used as the UV light source to cure the sealing material, the peaks of the bright line specifically degrading liquid crystal by the UV light which transmits and is incident upon the glass substrate are a line j (313 nm) and a line i (365 nm) as shown in Table 1. The color plate for the color filter hardly transmits (transmissivity 1-2%) the line j and the line i, and the BM does not transmit either the line j nor the line i as well.

TABLE 1

A table showing the transmissivity of ultraviolet through color plate for color filter

| Peak of Bright Line | 250 nm | 313 nm (j) | 365 nm (i) |
|---|---|---|---|
| Glass | 35% | 79% | 86% |
| CF | 0% | 0% | 1.5% |

Next, a comparison of electric characteristics of liquid crystal when ultraviolet is irradiated with and without the color filter is shown in Table 2. In Table 2, the code "–>" indicates variation before and after the UV irradiation. It will be noted that the irradiating direction of the UV light is the direction vertical to the substrate surface. When the ultraviolet is irradiated from upper part of an evaluation cell, while the degradation of the electric characteristics of liquid crystal "without CF (color filter)" is prominent, "with CF" has little effects.

TABLE 2

A table showing the electric characteristics of Liquid crystal with and without CF

|  | Ion Density (pc/cm$^2$) | Voltage retention ratio (%) |
| --- | --- | --- |
| Without CF | 20 -> 463 | 98.9 -> 88.2 |
| With CF | 18 -> 35 | 98.9 -> 98.9 |

Therefore, if the color filter is used as a shading mask against the UV light, damages to the liquid crystal can be suppressed and other shading mask for each pattern to form the sealing material 6 is not required to prepare. Further, since the end portion of the sealing material 6 overlaps in the BM picture-frame portion 108, the liquid crystal 22 does not expose between the end portion of the sealing material 6 and the end portion of the BM picture-frame portion 108 and thereby the liquid crystal is not directly irradiated by the ultraviolet and the degradation of the liquid crystal can be prevented. Accordingly, a high-quality picture display without display irregularities can be performed. Furthermore, enlarging an outside dimension of a panel at instillation can be suppressed.

Figure 5A:
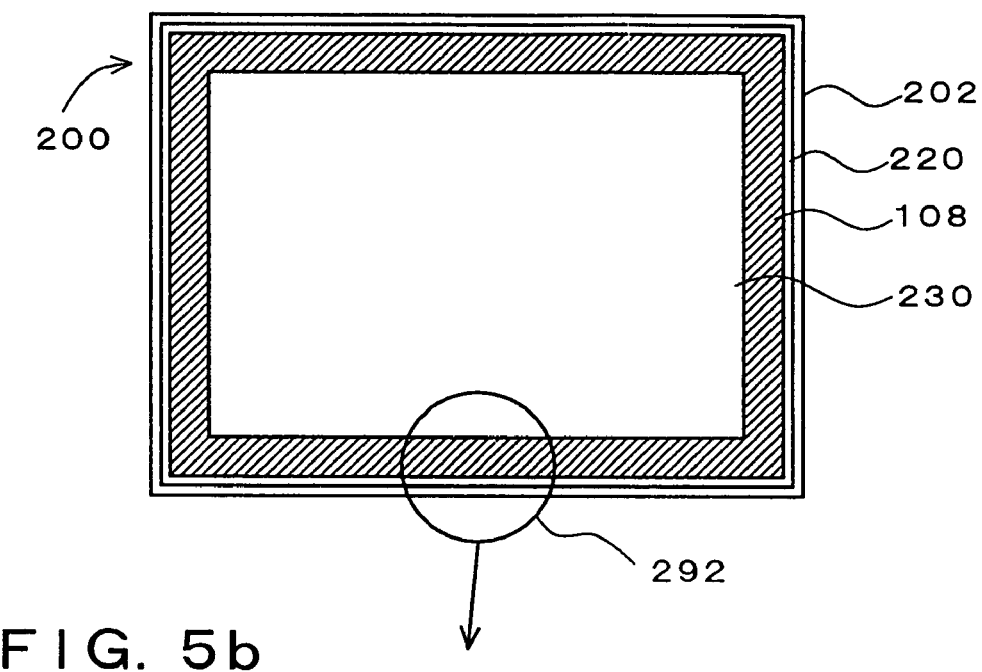
FIGS. 5a and 5b are diagrams showing a comparison example with respect to the liquid crystal display shown in FIGS. 4a and 4b in the second embodiment of the present invention.
Figure 5B:
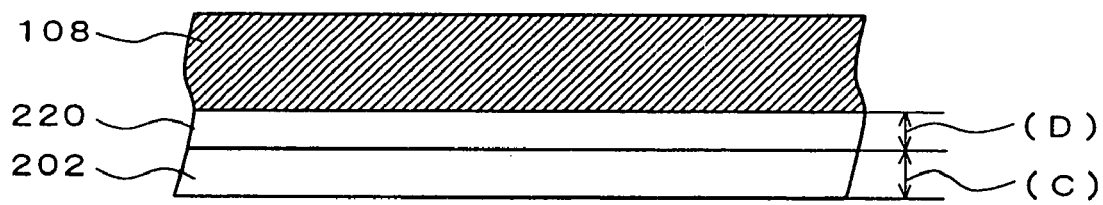

On the other hand, the conventional liquid crystal display is shown in FIGS. 5a and 5b as a comparative example. FIG. 5a shows a state of the conventional liquid crystal display viewed from an opposite substrate 200 side. FIG. 5b is an enlarged cross sectional view of a circled area 292 of FIG. 5a. In this comparative example, a space 220 is formed between the internal periphery side of a sealing material 202 formed in the external periphery of the display area of the opposite substrate 200 and the BM picture-frame portion 108 and the liquid crystal inside is in a state to be seen through the glass substrate. Specifically, the sealing material 202 is coated on the opposite substrate 200 so that the width (C) of the sealing material 202 after pressing is equal to approximately 1.0 mm and the distance (D) between the end portion of the sealing material 202 and the end portion of the BM picture-frame portion 108 is equal to 0.5 mm. The sealing material 202 is cured by irradiating the UV light vertically from upper part of the substrate surface of the opposite substrate 200. As a result, since the liquid crystal layer exposes when irradiating the UV in this comparative example, display irregularities due to degradation of liquid crystal occur all around the edge of seal. Further, the distance (D) between the end portion of the sealing material 202 and the end portion of the BM picture-frame portion 108 becomes an obstacle to reduce the outside dimension of the panel.

Although in the above embodiment, the distance (B) overlapping the sealing material 6 and the BM picture-frame portion 108 is equal to 0.2 mm, the overlapping distance can be lengthened to approximately (B)=0.5 mm. Usually, when overlapping of the sealing material 6 and the BM picture-frame portion 108 is large, the end portion of the sealing material 6 is non-photo-curable. Since when the light initiator is irradiated and cloven activated species spread, the sealing material 6 can be cured if an overlapping distance is moderately fair even if there is a shading portion. Further, if a metal film exists on the lower surface of the sealing material 6, the light transmitted through the photo-curing resin performs a multiple reflections on the metal film, thereby effectively utilizing the energy from the UV light. This is similar to the first embodiment. Furthermore, if the UV light can directly reach the sealing material 6 in the area where UV light is incident diagonally and overlapped, the overlapping distance (B) can be equal to approximately 0.5 mm.

A comparison between the seal shading distance and the curability is shown in Table 3. This is the result when an acrylic type resin is used for a photo-curing resin, a cell is made by instillation and a part of the sealing material 6 is shaded, and then the UV light is irradiated from the vertical direction to and from the diagonal direction of 45° in angle from the surface of the opposite substrate 4. The comparison of curability is performed by observing the alignment of the edge of the seal and measuring the electric characteristics of the liquid crystal after annealing. According to the result of measuring, the shading distance (B) possible for curing when irradiated only from the vertical direction is equal to approximately 0.2 mm. As described in the first embodiment, if a light reflection layer (metal film) is on the array substrate 16, the UV light having transmitted through the sealing material 6 is reflected on the light reflection layer and again used for curing the sealing material 6 so that the shading distance (B) possible for curing is equal to approximately 0.3 mm. Further, when the light reflection layer is on the array substrate 16 and at the same time the UV light is incident from diagonal 45° angle, the shading distance (B) possible for curing is equal to approximately 0.5 mm. In table 3, when alignment irregularities occur or the reduction of the voltage retention ratio is more than 1%, photo-curing is considered unsatisfactory and indicated by X and satisfactory photo-curing is indicated by O.

TABLE 3

A table showing the relation between the seal shading distance and curability

| Shading Distance | Under the Seal | Irradiation Direction | Curability |
| --- | --- | --- | --- |
| 0.0 mm | Glass | Vertical | ◯ |
| 0.2 mm | Glass | Vertical | ◯ |
| 0.3 mm | Glass | Vertical | X |
| 0.3 mm | Metal Film | Vertical | ◯ |
| 0.5 mm | Metal Film | Vertical | X |
| 0.5 mm | Metal Film | Diagonal 45° | ◯ |

Figure 6:
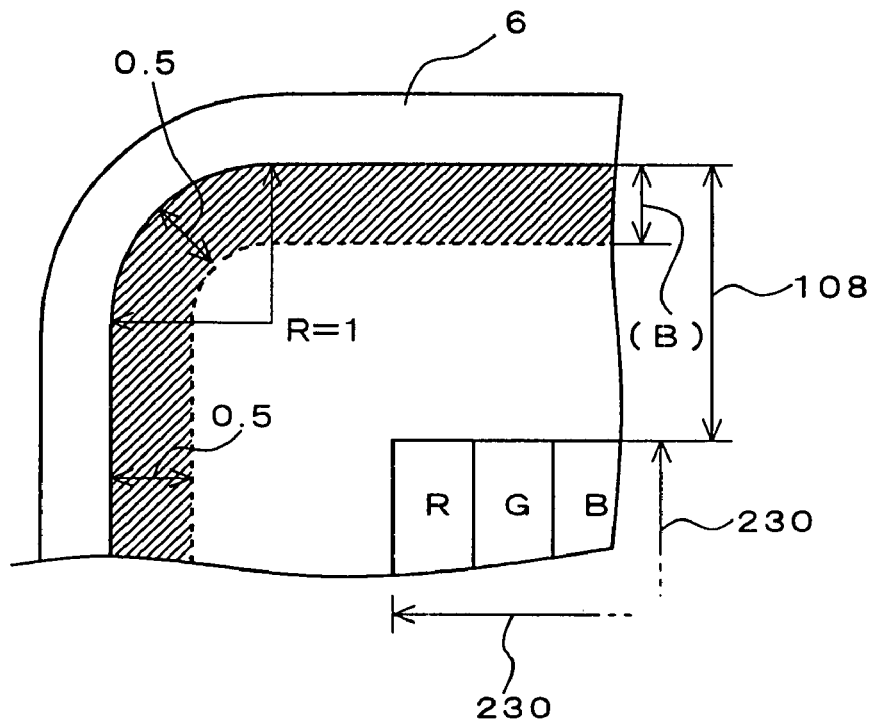
FIG. 6 is a diagram describing a relation between the sealing material for corner portions of a liquid crystal display according to the second embodiment of the present invention and a BM picture-frame portion.

Next, an improved structure related to the overlapping distance (B) of the sealing material 6 and the BM picture-frame portion 108 is described with reference to FIG. 6. FIG. 6 shows a state of the upper left portion of the panel viewed from the opposite substrate 4 side. As shown in FIG. 6, the sealing material 6 is usually formed curving in an arc shape at corner portions of the panel. Thus, in this example, corner portions of the BM picture-frame portion 108 are also curved into the arc shape along the curves of the sealing material 6. Specifically, the sealing material 6 having a width of 1 mm is curved into the arc shape at corner portions of the panel and accordingly the end portions of the BM picture-frame portion 108 overlapping with the sealing material 6 by 0.5 mm in width is also formed curving into the arc shape with a radius of 1 mm.

Figure 7:
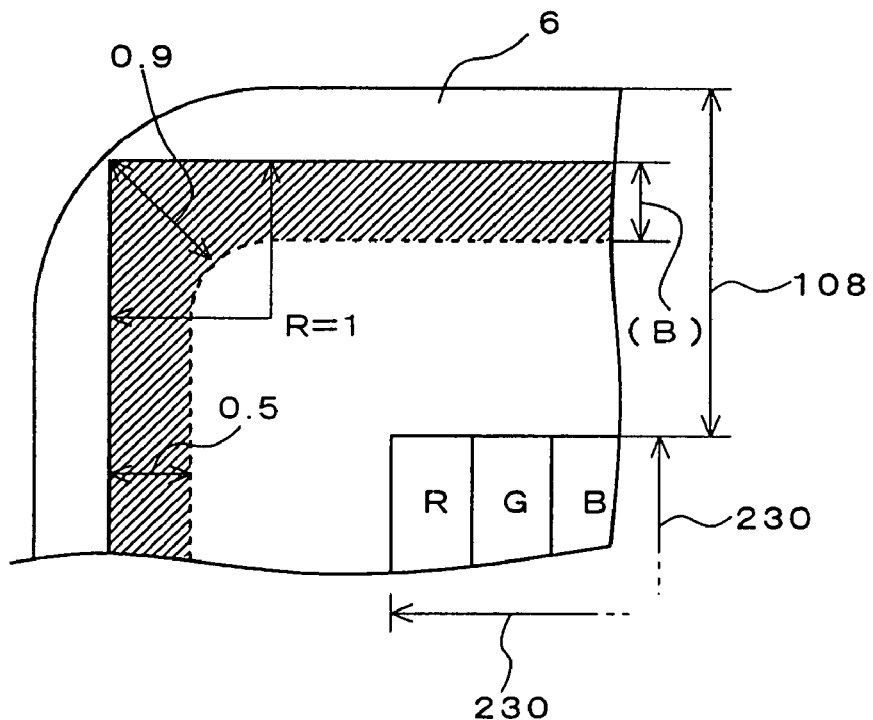
FIG. 7 is a diagram showing a comparison example with respect to the liquid crystal display shown in FIG. 6 in the second embodiment of the present invention.

FIG. 7 is shown as a comparative example to the aforementioned. The corner portion of the BM picture-frame portion 108 shown in FIG. 7 is bent at a right angle unrelated to the arc-shape curve of the sealing material. Therefore, as shown in the diagram, an area where the overlap between the sealing material 6 and the BM picture-frame portion becomes 0.9 mm is generated. Since the sealing material 6 in such an area is not cured by the irradiation of UV light as evident in Table 3, the possibility of generating display irregularities in four corners of the display area exists.

By keeping the width overlapping the corner portions of the BM picture-frame portion 108 and the sealing material 6 within a predetermined range in the manner shown in FIG. 6 and by making the area overlapping the sealing material 6 and the BM picture-frame portion 108 substantially the same all around the panel, the sealing material 6 all around the panel can be sufficiently cured and a high-quality picture without display irregularities can be displayed.

Figure 8A:
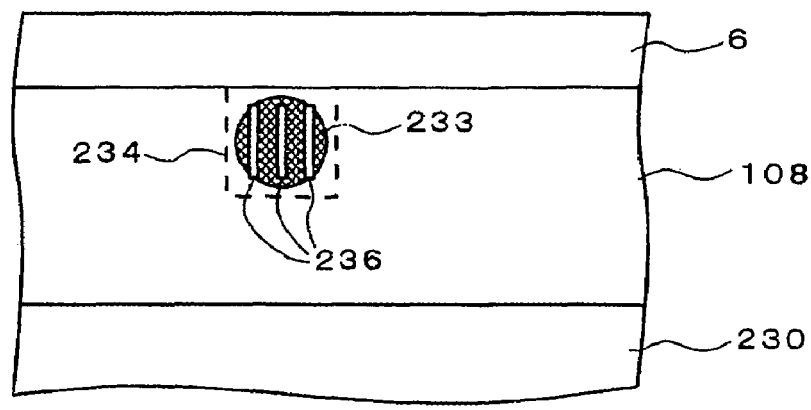
FIGS. 8a and 8b are diagrams describing a relation between a transfer of a liquid crystal display according to a third embodiment of the present invention and a BM picture-frame portion.
Figure 8B:
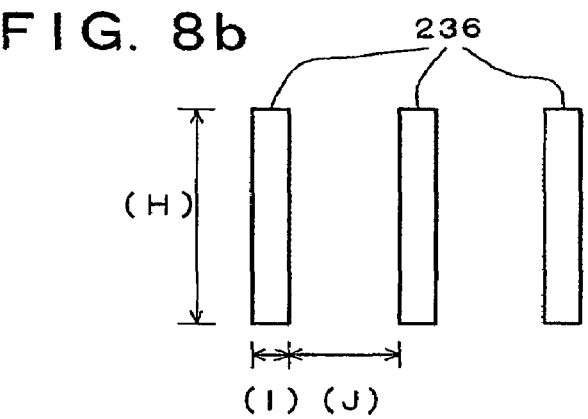
Figure 9:
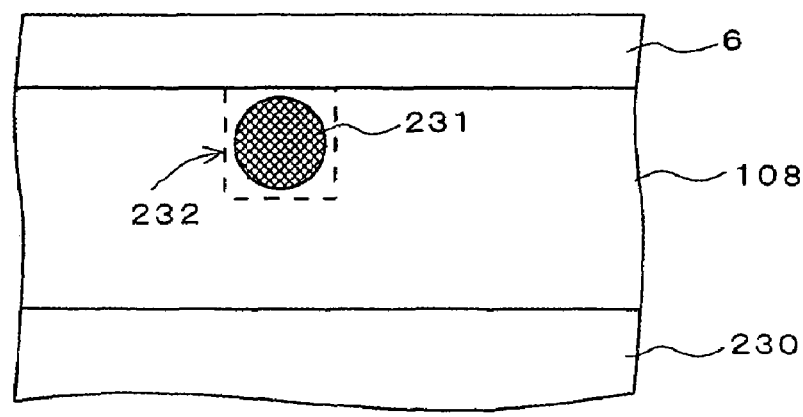
FIG. 9 is a diagram showing a comparison example with respect to the liquid crystal display shown in FIGS. 8a and 8b according to the third embodiment of the present invention.

Next, a liquid crystal display and a fabrication method thereof according to a third embodiment of the present invention is described with reference to FIG. 8a through FIG. 9. It will be noted that structuring elements having the same operation functions as the first and the second embodiments are referred by the same codes, and the descriptions are omitted. FIGS. 8a and 8b show a transfer 233 according to this embodiment arranged in the BM picture-frame portion 108. FIG. 9 shows a vicinity of the BM picture-frame portion 108 provided with the similar transfer to the past for comparison. The conventional transfer 231 shown in FIG. 9 is formed in the BM picture-frame portion 108 adjacent to the sealing material 6. The transfer 233 according to this embodiment is also formed in the BM picture-frame portion 108 adjacent to the sealing material 6 in the similar manner to the past. Each of the transfers 231 and 233 are electrically connected to both of the substrates via transfer pads 232 and 234.

A plurality of long and narrow rectangular-shape slits 236 are opened in the BM area on the transfer pad 234 shown in FIG. 8a. The length (H) of a long side of the slit 236 is equal to approximately 1.00 mm and the length (I) of a short side is equal to approximately 0.2 mm. The length (J) of the space between the adjacent slits 236 is equal to 0.2-0.8 mm. A black-color conductive spacer depositing nickel (Ni) is added to the transfer 233. Slits are not formed on the conventional transfer 231 shown in FIG. 9 and the transfer 231 is shaded by the BM film.

A method of UV irradiation is similar to the above embodiments already described. As a result of UV irradiation, display irregularities occur due to curing defects of the transfer 231 in the conventional example. In this embodiment, display irregularities also occur due to photo-curing defects of the transfer 233, although better than the conventional example, when the length (J) of the space between the adjacent slits 236 is more than 0.6 mm. When the length (J) of the space between the slits 236 is less than 0.4 mm, neither display irregularities nor light leakage from back lighting occur.

Although it is possible to form the transfer 233 outside the sealing material 6, the outside dimension of the panel enlarges. Thus, the transfer 233 is required to be formed inside the sealing material 6 in a narrow picture-frame panel. In this case, the transfer 233 is formed in the BM picture-frame portion 108 and photo-curing defects are most likely to occur. Then, as the liquid crystal display according to this embodiment, light transmission windows such as the slit 236 and the like are arranged in the transfer area of the BM picture-frame portion 108 and colored particles such as the aforementioned black-color conductive spacer and the like are added to the transfer 233. Thus, photo-curing defects of the transfer 233 are eliminated and light leakage from the light transmission windows can be suppressed by mixing black-color or dark-color conductive particles in the transfer 233.

Further, as described above, a shape of the light transmission window is desired to be substantially the rectangular-shape slit and the slits are desired to be arranged so that the length (J) of the space between the adjacent slits are less than 0.4 mm. Furthermore, when colored-particles in the transfer 233 alone are insufficient to shade the light transmission windows, the light transmission windows are not required to be for a whole surface transmission and photo-curing is possible even if the window is substantially the rectangular-shape slit as long as the space between the slits is within the spreading distance of activated species. Since the spreading distance of the photo-cloven activated species is usually approximately 0.2 mm, the length (J) of the space between the slits is desired to be less than 0.4 mm even when considering to spread from both adjacent slits. It will be noted that since the colored particles are mixed in the transfer 233 in this embodiment, little UV light transmits the transfer 233 and curing by the wraparound of light due to multiple reflection described above can hardly be expected.

Further, the shape of the light transmission window may be substantially the circular-shape dot and the dots may be arranged so that the length (J) of the space between the dots is less than 0.4 mm. In the similar manner described above, even when the light transmission windows are circular-shape dots, as long as the length of the space between the adjacent dots is within the spreading distance of the activated species, photo-curing is possible and substantially the same exterior view as the other BM picture-frame area can be obtained.

Next, a liquid crystal display and a fabrication method thereof according to a fourth embodiment of the present invention is described with reference to FIGS. 10a, 10b and FIG. 11. It will be noted that structuring element having the same operational functions as the first through the third embodiments are referred by the same codes and the descriptions are omitted. This embodiment has a distinctive characteristic in a UV light source irradiating UV light to the sealing material 6 and a line (linear) light source in accordance with the shape of the sealing material 6 is used. In order to photo-cure the photo-curing resin, the light more than the curing illuminance is required for irradiation. In case of photo-curing resin by ultraviolet light, the irradiation illuminance equal to approximately 50~100 mW/cm$^2$ is required. In order to obtain this illuminance by surface irradiation by the conventional light source, the lamp output is required to be made large and it is not practical. In the structure according to this embodiment, since only the predetermined area of the sealing material is irradiated, the lamp output can be suppressed and furthermore, since the whole irradiation is possible, occurrences of misalignment of the substrates are also reduced.

Figure 10A:
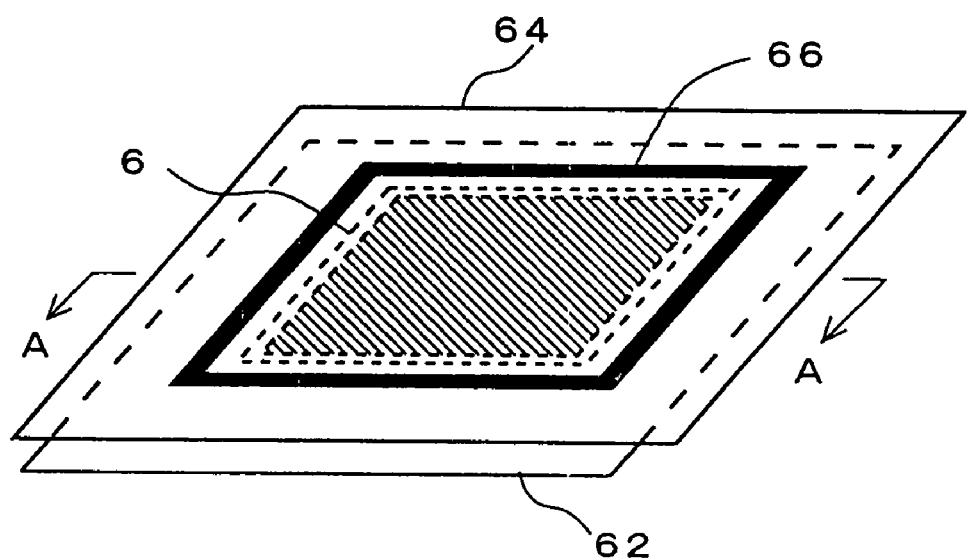
FIGS. 10a and 10b are diagrams describing a schematic structure of a light source for UV irradiation according to a fourth embodiment of the present invention.

FIG. 10a is an oblique view showing the UV light source and a state of using the UV light source according to this embodiment. FIG. 10b shows a part of the cross section cut at a line A-A of FIG. 10a.

Figure 10B:
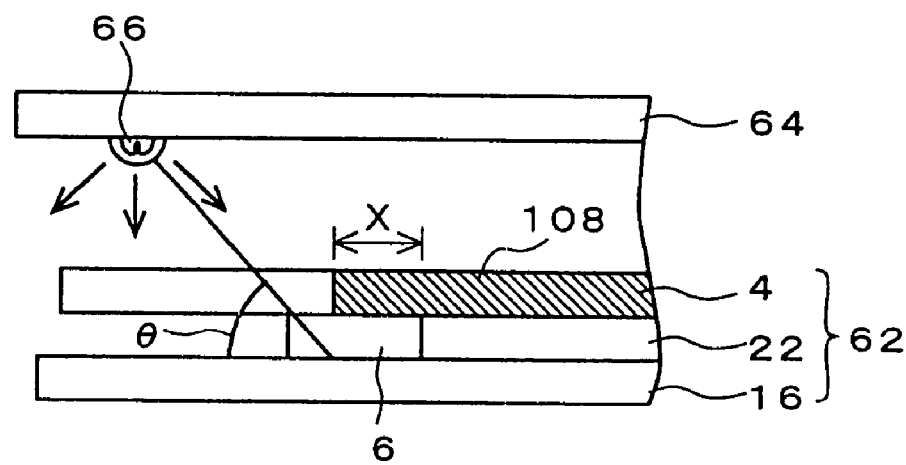

A UV light source 64 shown in FIGS. 10a and 10b are arranged in upper part of an attached substrate 62 of the array substrate 16 and the opposite substrate 4 with a predetermined distance and has a line light source 66 in a similar shape to the frame shape of the sealing material 6 and arranged outside the sealing material 6 slightly larger than the frame of the sealing material 6 on a flat surface substantially parallel to the surface of the attached substrate 62.

As shown in FIG. 10b, the upper surface of the sealing material 6 enters inside the BM picture-frame portion 108 by the width X. The UV light emitting from the line light source 66 enters inside the sealing material 6 from the area not overlapping with the BM picture-frame portion 108 on the surface of the sealing material 6. The incident angle θ at this time is approximately 45°. In such a structure, the lamp light source 64 can be arranged closely to the sealing material 6. Therefore, the same intensity of radiation as in the past can be irradiated by the lamp output as low as several hundred W. Further, since only a part of the attached substrate 62 is irradiated, an increase in temperature of the attached substrate 62 by irradiation can be suppressed and the misalignment between the array substrate 16 and the opposite substrate 4 due to thermal expansion can also be suppressed within 3 μm.

Thus, according to the UV irradiation light source 64 in this embodiment, the UV light can wraparound as far as the lower part of the BM picture-frame portion 108 since the light is irradiated from the outside diagonal direction (for example, diagonally 45°) of the BM picture-frame portion 108 with respect to the coating surface of the sealing material 6. Therefore, the overlap X between the sealing material 6 and the BM picture-frame portion 108 can be enlarged to approximately 0.8 mm, thereby further reducing the outside dimension of the panel. When the metal film exists on the lower surface of the sealing material 6, since the multiple reflection of the UV light by the diagonal irradiation is obtained, the overlap X between the sealing material 6 and the BM picture-frame portion 108 can be further expanded and the outside dimension of the panel can be further reduced. It will be noted that although the amount of light wraparounding the lower part of the BM picture-frame portion 108 by diagonal the lower part of the BM picture-frame portion 108 by diagonal irradiation increases, the intensity of irradiation to the coating surface of the sealing material 6 becomes lower than the irradiation from the vertical direction. Amount of light wraparounding due to the diagonal irradiation and intensity of irradiation on the coating surface of the sealing material are in a trade-off relationship and the irradiation from the angle of substantially 45° can be most effective.

Figure 11:
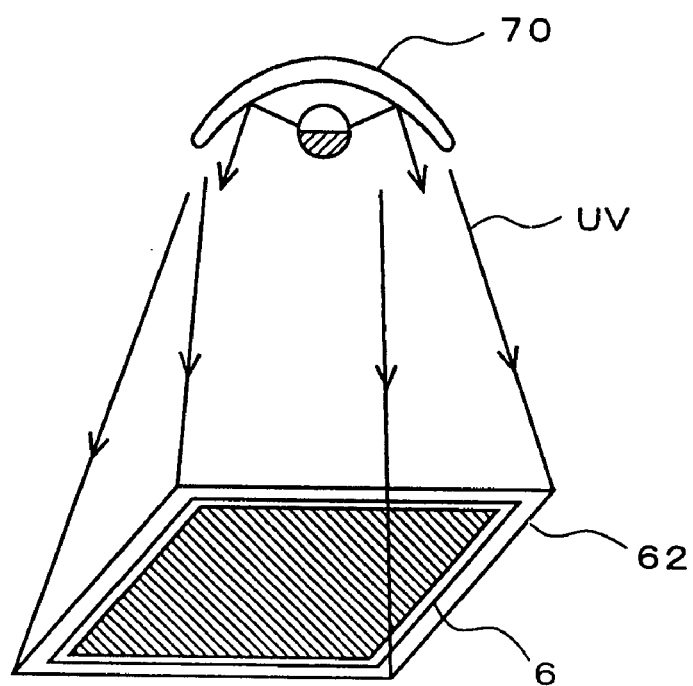
FIG. 11 is a diagram showing a comparison example with respect to the light source for UV irradiation shown in FIGS. 10a and 10b in the fourth embodiment of the present invention.

A conventional UV irradiation light source 70 is shown in FIG. 11 for comparison. In order to obtain the ultraviolet illuminance equal to 100 mW/cm$^2$, the surface irradiation by the conventional light source shown in FIG. 11 requires the high lamp output as large as several kW. The attached substrate 62 is heated to a high temperature by being irradiated on the whole surface, thereby resulting in a misalignment by approximately 7~10 μm.

Figure 12A:
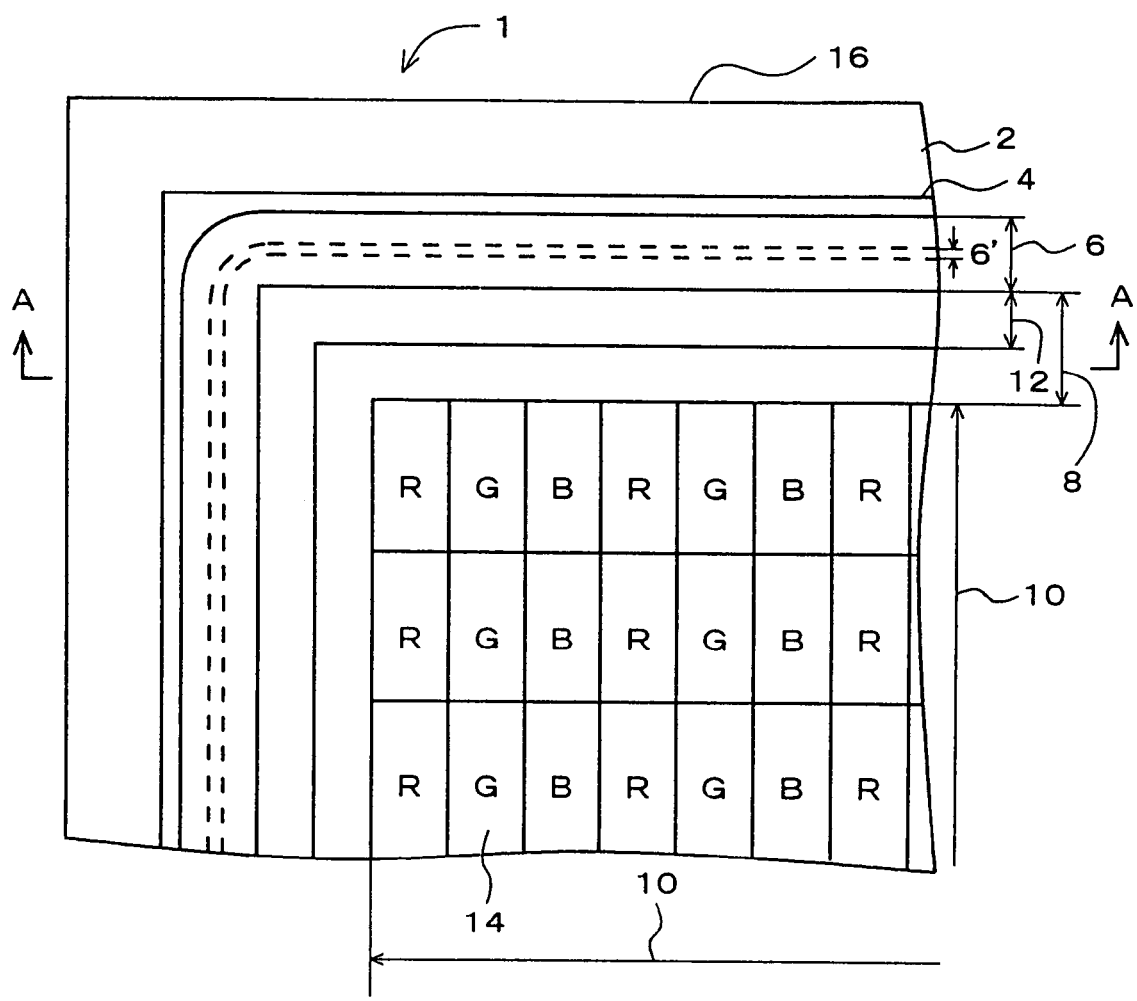
FIGS. 12a and 12b are diagrams showing a schematic structure of a liquid crystal display according to a fifth embodiment of the present invention.
Figure 12B:
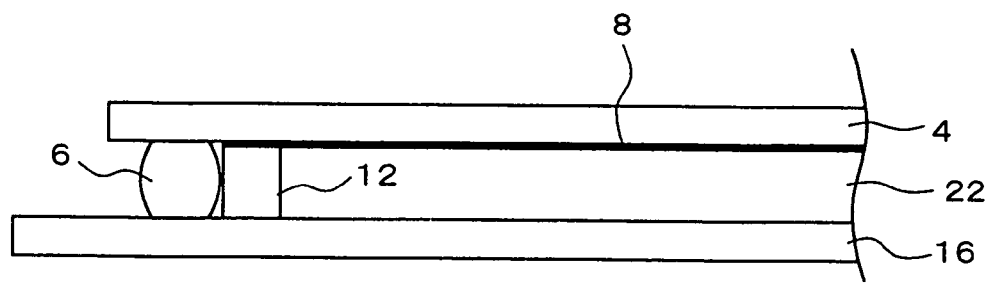

The liquid crystal display according to a fifth embodiment of the present invention is described with reference to FIG. 12*a* through FIG. 16. First, the schematic structure of the liquid crystal display according to this embodiment is described with reference to FIGS. 12*a* and 12*b*. FIG. 12*a* shows a part of the upper surface of an active matrix-type liquid crystal display panel 1 using the TFT as a switching element viewed from the CF substrate side. FIG. 12*b* shows a partial cross section cut at a line A-A of FIG. 12*a*. A plurality of pixel areas 14 arranged in a matrix shape are formed on the array substrate 16 side of the liquid crystal display panel 1, and a TFT (not shown in the diagram) is formed in each of the pixel area 14. The picture display area 10 is structured by the plurality of the pixel areas 14. Although a detailed diagram is omitted, the gate electrode of the TFT in each pixel area 14 is connected to a gate wiring and a drain electrode is connected to a data wiring respectively. Further, the source electrode of the TFT is connected to a pixel electrode formed in the pixel area 14. A plurality of data wirings and gate wirings are connected to a terminal portion 2 formed in the external periphery of the array substrate 16, thereby a plurality of data wirings and gate wirings are to be connected to a driving circuit (not shown in the diagram) provided externally.

The CF substrate 4 is formed slightly smaller than the array substrate 16 by substantially the width of the terminal portion 2 and is arranged facing the array substrate 16 sealing the liquid crystal 22 at a predetermined cell gap. The array substrate 16 and the CF substrate 4 are attached by a main seal 6 made of photo-curing type resin. The width 6' indicated by the two dotted lines in the diagram shows the width when the main seal 6 is coated. A frame-shape structure 12 separating the main seal 6 from the liquid crystal 22 is formed in an area between the main seal 6 and the display area 10. The liquid crystal 22 is sealed in an area surrounded by the frame-shape structure 12 between the array substrate 16 and the CF substrate 4.

Color filters (indicated by the letters R(red), G(green), B(blue) in the diagram) as well as a common electrode (not shown in the diagram) are provided on the CF substrate 4. Further, a BM picture-frame 8 and a BM 18 having a shading function are formed on the CF substrate 4. The BM picture-frame 18 is provided to shade undesired light from outside the display area 10. The BM 18 is used to earn contrast by deciding the plurality of the pixel areas 14 in the display area 10 and to prevent light leakage current from generating by shading the TFT.

The peripheral end of the frame-shape structure 12 is arranged to be substantially in accordance with the peripheral end of the BM picture-frame 8 viewed from the vertical direction to the surface of the array substrate 16. Therefore, even if the internal peripheral end portion of the main seal 6 is formed adjacent to the external peripheral end portion of the BM picture-frame 8, the internal peripheral end portion of the main seal 6 does not overlap the external peripheral end portion of the BM picture-frame 8 as long as the main seal 6 does not flow beyond the frame-shape structure 12 after attaching. Accordingly, since the shading of the UV light by the BM picture-frame 8 does not occur, a curing defect of the main seal 6 does not occur. It will be noted that depending on the curing characteristics of the main seal 6, since there is a case in which curing is possible by spreading the reaction activated species even if there is a certain shaded area, the generation of the shaded area as wide as approximately the spreading distance of the reaction activated species in the BM picture-frame 8 is not a problem. For example, when the width of the main seal 6 is equal to 1-2 μm after attaching the substrates, depending on the BM picture-frame 8, shading the width equal to approximately 200 μm is not a problem.

Thus, the liquid crystal display according to this embodiment has the main seal 6 attaching the substrates 16 and 4 in the external peripheral portion of the display area 10 of the two opposite substrates 16 and 4 sandwiching the liquid crystal 22 and frame-shape structure 12 and the BM picture-frame 8 formed in the area between the main seal 6 and the display area 10. The frame-shape structure 12 and the BM picture-frame 8 are formed so that the external peripheral end of the frame-shape structure 12 is substantially in accordance with the external peripheral end of the BM picture-frame 8 viewed from the vertical direction to the surface of the substrate 16. According to this structure, when the coated main seal 6' spreads and becomes the main seal 6 after attaching the substrates 16 and 4, the possibility that a part of the main seal 6 enters the external peripheral portion of the BM picture-frame 8 is eliminated. Accordingly, a phenomenon of UV light not to reach a part of the main seal 6 and to generate curing defects is prevented and the main seal which does not easily peel off can be obtained. Further, since the coating position of the main seal can be adjacent to the external periphery end portion of the BM picture-frame 8, enlargement of the picture-frame area can be suppressed, thereby effectively utilizing the surface of the glass substrate.

Figure 13A:
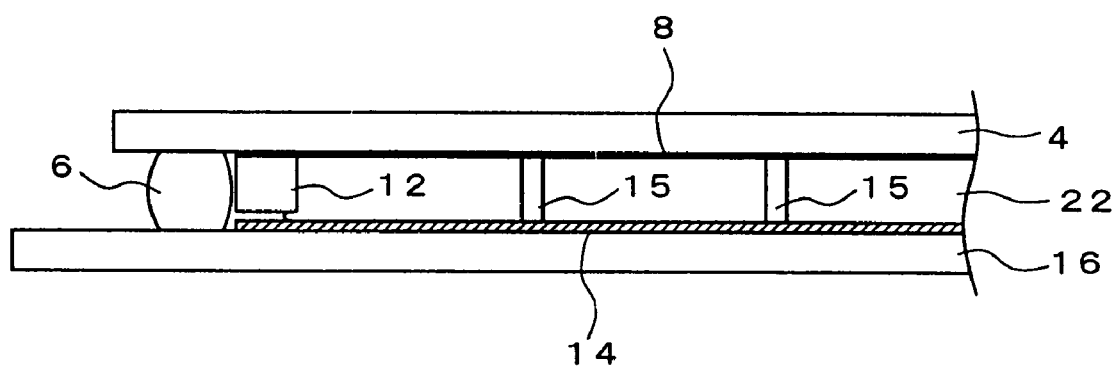
FIGS. 13a and 13b are diagrams showing a schematic structure relative to an example of a variation of the liquid crystal display according to the fifth embodiment of the present invention.
Figure 13B:
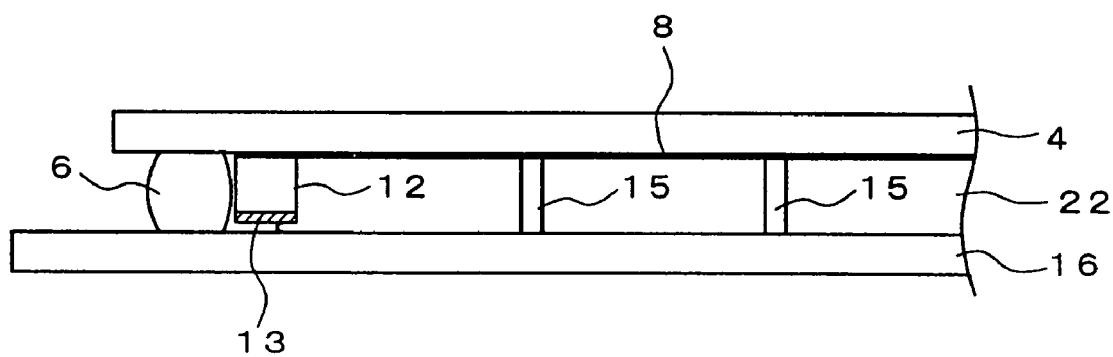

Next, the structure of an example of a variation of the liquid crystal display according to this embodiment is described with reference to FIGS. 13a and 13b. FIGS. 13a and 13b show partial cross sections cut at the line A-A of FIG. 12a. FIG. 13a shows a state in which a vertical alignment film 14 is formed in the display area 10 of the array substrate 16 and on the surface opposing to the frame-shape structure 12. Further, FIG. 13b shows a state in which a vertical alignment film 13 is formed on the surface of the end portion of the frame-shape structure 12. Pillar-shape spacers 15 to obtain a predetermined cell gap are formed in both FIGS. 13a and 13b.

Furthermore, the frame-shape structure 12 has a height which is more than substantially half the height of the spacer 15 in both FIGS. 13a and 13b. As described above, when the frame-shape structure 12 with a similar thickness of the cell gap is only provided in the fringe periphery, liquid crystal flows over the frame-shape structure 12 at instillation. However, if the vertical alignment film 13 is formed on the surface of the frame-shape structure 12 and the vertical alignment film 14 exists on the surface opposing to the frame-shape structure 12, the wettability of the liquid crystal 22 is reduced due to the vertical alignment films 13 and 14, therefore the liquid crystal 22 can not flow over the space between the frame-shape structure 12 and the array substrate 16 to reach the main seal 6 while the main seal 6 is under curing. It will be noted that although the liquid crystal 22 reaches the main seal 6 if time is taken, if the height of the frame-shape structure 12 is higher than half of the height of the spacer 15 in the display area 10 (for example, approximately 2 μm when the cell gap is 4 μm), several tens of minutes are required for the liquid crystal 22 to flow over the frame-shape structure 12 and reach the main seal 6. If the main seal 6 is cured during that time period, the liquid crystal 22 is not contaminated.

Further, the main seal 6 is required to be formed in a position where the internal peripheral end portion of the main seal 6 does not flow over the external peripheral end portion of the frame-shape structure 12 after the gap is created. Furthermore, the main seal 6 is desired to be formed in a position where the internal peripheral end portion of the main seal 6 is adjacent to the external peripheral end portion of the frame-shape structure 12 after the gap is created. If the main seal 6 is coated too closely to the frame-shape structure 12, the internal peripheral end portion of the main seal 6 flows over the external peripheral end portion of the frame-shape structure 12 in the process creating the gap, thereby resulting in curing defects of the sealing material and irregular cell gaps. On the other hand, if there is space between the main seal 6 and the frame-shape structure 12, the picture-frame area of the panel is enlarged and a possibility of not being able to effectively utilize the surface of the glass substrate is generated and when the liquid crystal panel is expanded or contracted due to extreme variations in temperature, a possibility that vacuum air bubbles in the space enter in the display area 10 increases.

Figure 14A:
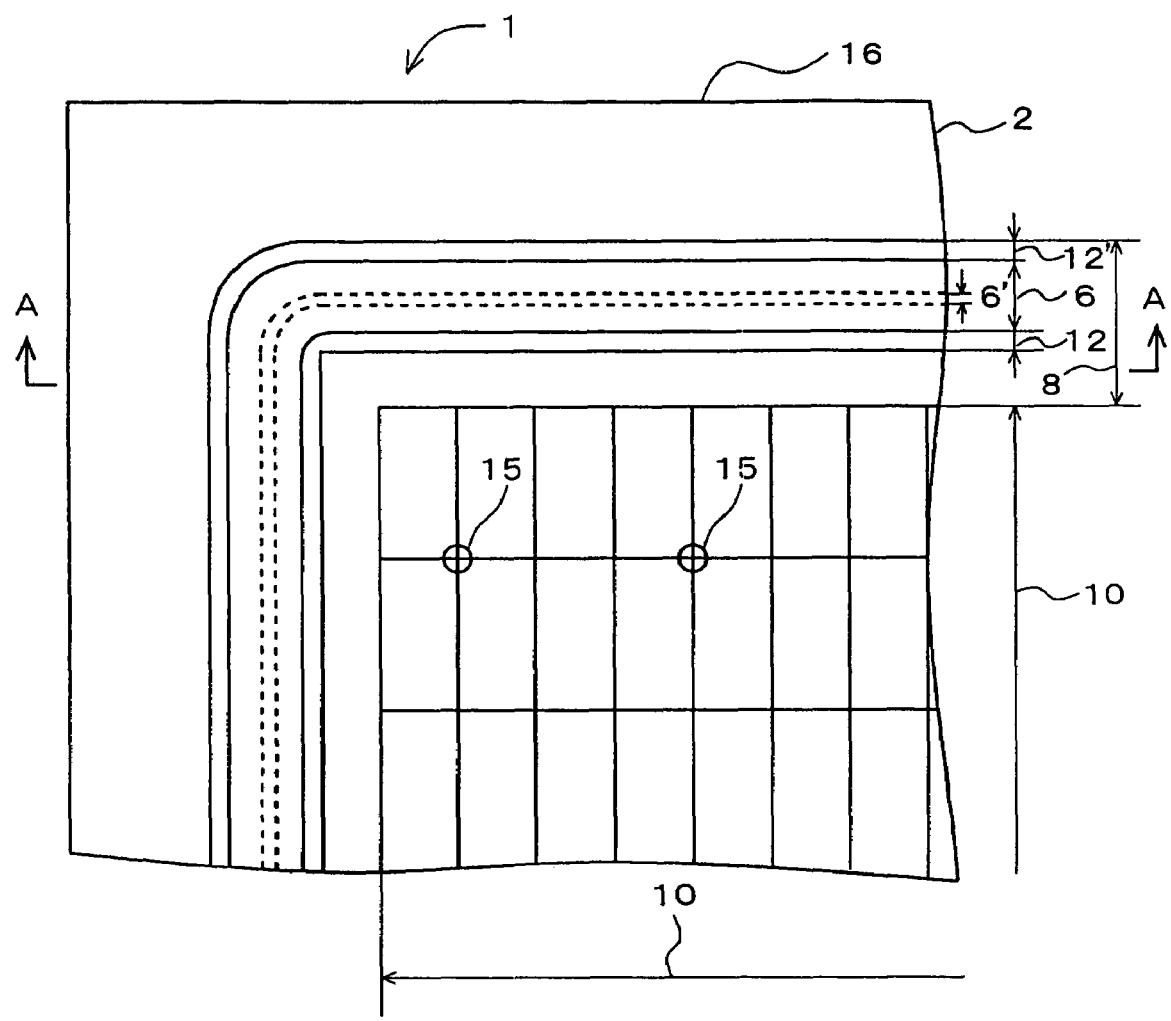
FIGS. 14a and 14b are diagrams showing a schematic structure relative to an example of an other variation of the liquid crystal display according to the fifth embodiment of the present invention.
Figure 14B:
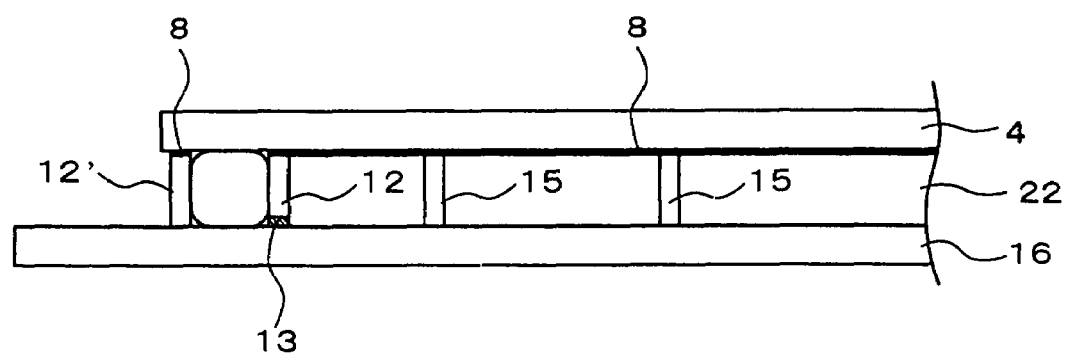

Next, the structure of an example of other variation of the liquid crystal display according to this embodiment is described with reference to FIGS. 14a and 14b. FIG. 14a shows a part of the upper surface of the active matrix-type liquid crystal panel 1 using the TFT as a switching element viewed from the CF-substrate side. FIG. 14b shows partial cross section cut at a line A-A of FIG. 14a. The same structuring elements as in the liquid crystal display shown in FIG. 12a through FIG. 13b are referred by the same codes and the descriptions are omitted.

In the liquid crystal display shown in FIGS. 14a and 14b, the frame-shape structure 12 separating the main seal 6 from the liquid crystal 22 is formed in the area inside the main seal 6 and outside the display area 10 and a second frame-shape structure 12' separating the main seal 6 from the external peripheral portion of the main seal 6 is formed in the area to be outside the main seal 6, therefore both sides of the main seal 6 is surrounded by the frame-shape structures 12 and 12'. The frame-shape structure 12' is provided to easily pressurize the main seal 6. By pressurizing from both sides of the main seal 6, the gap for the main seal 6 is easily created.

The frame-shape structures 12 and 12' have the height more than half the height of the spacer 15 in the display area 10, and the vertical alignment films 13 or 14 (the vertical alignment film 13 is shown in FIGS. 14a and 14b) is formed on the surface of or in the area opposing to the frame-shape structure 12. This vertical alignment film 13 or 14 is formed for the similar reason to the example of the variation described with reference to FIGS. 13a and 13b. Further, in order to prevent the peeling of the seal from generating by the reduction of the adhesive strength of the main seal 6, the vertical alignment film 14 is desired to be formed beyond the frame-shape structure 12 not to overlap the main seal 6.

Furthermore, the distance of the space between the frame-shape structures 12 and 12' is more than the width, preferably substantially the same width, of the main seal 6 after the gap is created, and the main seal 6 is arranged in a position where the internal and the external peripheral end portions of the main seal 6 do not flow over the external peripheral end portion of the frame-shape structure 12 and the internal peripheral end portion of the frame-shape structure 12', after the gap is created, preferably in a position adjacent to the frame-shape structures 12 and 12'.

Also this example of the variation has a distinctive characteristic in forming a part or all of the frame-shape structures 12 and 12' in the BM picture-frame 8 and not forming the BM in the space portion between the frame-shape structures 12 and 12'. If the frame-shape structures 12 and 12' are arranged in the BM picture-frame 8, and the space portion between the frame-shape structures 12 and 12', in other words, the area the main seal 6 is coated is opened so that UV irradiation can be performed, the main seal 6 can be completely cured and at the same time the area required to form the main seal 6 outside the BM picture-frame 8 in the past is no longer required.

Further, the frame-shape structure 12 is desired to be formed using a resin material which does not substantially transmit the wavelength of UV. At instillation, UV irradiation is performed from the CF substrate side which does not have the metal film in the main seal area so that the UV light is not shaded. Usually, although a mask is covered on the display area 10, a part of the UV light is reflected on the metal film formed on the array substrate 16 and enters the display area 10 side. This is a phenomenon called the light incidence or light wraparound by the multiple reflection. Photolysis of the liquid crystal 22 occurs due to this light, thereby resulting in the generation of display defects on the edge of the seal. Therefore, if a resin material which does not substantially transmit the wavelength of UV is used as the frame-shape structure 12, the multiple reflection component is absorbed by the frame-shape structure 12, the liquid crystal 22 at the edge of the seal is not irradiated by UV, thereby preventing the liquid crystal 22 from degrading.

The structure described above is most effective when an instilling method is used in the fabrication of the liquid crystal display. Prominent effects such as preventing the main seal 6 from curing defects due to shading, further preventing the uncured main seal 6 from contacting the liquid crystal 22, and preventing the liquid crystal 22 from being irradiated by the UV light when photo-curing the main seal 6 can be obtained by the instilling method, thereby greatly improving the reliability of instillation.

Figure 16:
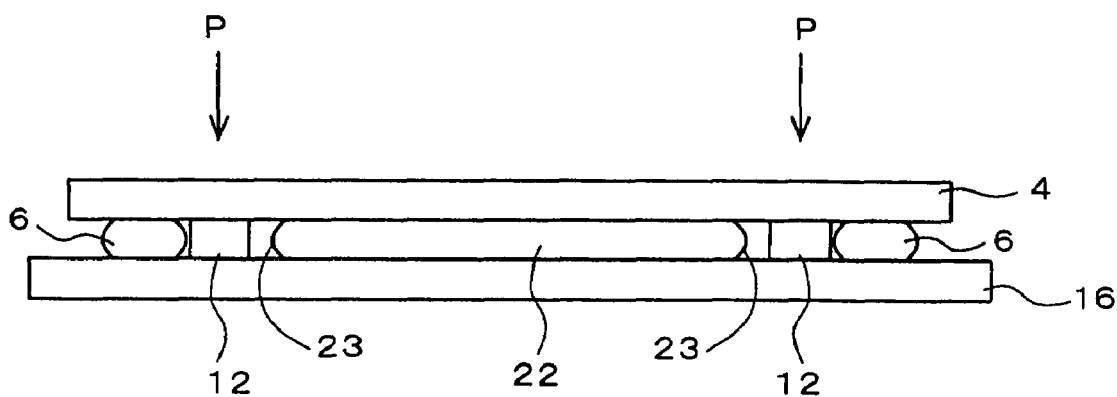
FIG. 16 is a diagram describing a creation of a gap adjacent to a frame-shape structure 12 by pressuring the frame-shape structure 12 by a pressure P before a liquid crystal boundary 23 of a liquid crystal 22 reaches the frame-shape structure 12 in the liquid crystal display according to the fifth embodiment of the present invention.

Further, when instillation is used, as shown in FIG. 16, after attaching the substrates 16 and 4 and before a liquid crystal boundary 23 of the liquid crystal 22 reaches the frame-shape structure 12, the gap adjacent to the frame-shape structure 12 is created by pressurizing the frame-shape structure 12 by a pressure P, thereby preventing the liquid crystal 22 from entering onto the frame-shape structure 12 and largely reducing the time required to create the gap of the main seal 6 as well.

Next, the fabrication method of the liquid crystal display according to this embodiment is described by using examples.

EXAMPLE 1

A colored-resin film (red/made by JSR (Japan Synthetic Rubber)) dispersed by pigment is evenly coated on the CF substrate and the spacer 15 of the display area 10 and the frame-shape structure 12 are patterned by photolithography process. The height of the spacer 15 of the display area 10 is equal to 4.0 µm in height and three kinds of the frame-shape structures 12 are formed into 4.0 µm (Example A), 3.0 µm (Example B) and 2.0 µm (Example C) in height. Further, the spacer 15 is formed in a non-pixel area of the display area 10 and the frame-shape structure 12 is formed in the area inside the main seal 6 and at the same time outside the display area so that the external peripheral end portion of the BM picture-frame 8 is substantially in accordance with the external peripheral end portion of the frame-shape structure 12 viewed from the direction vertical to the surface of the array substrate 16.

Further, comparative example A is structured by entering the external peripheral end portion of the frame-shape structure 12 to inside of the external peripheral end portion of the BM picture-frame 8 by 0.5 mm. The vertical alignment film (made by JSR) 14 is formed on the CF substrate 4 and the array substrate 16. The vertical alignment film 14 is formed to be substantially in accordance with the external periphery portion of the frame-shape structure 12 viewed from the direction vertical to the surface of the array substrate 16.

Furthermore, comparative example B is structured without forming a vertical alignment film on the surface of the frame-shape structure 12 and the area opposing the frame-shape structure 12.

The main seal (made by Kyoritsu Kagaku) 6 is coated so that the internal periphery of the main seal 6 is adjacent to the external periphery of the frame-shape structure 12 after the gap is created. Since the width of the main seal is equal to 1 mm after the gap is created in this embodiment, a seal line is 0.5 mm apart from the external periphery of the frame-shape structure 12. In comparative example C, the seal line is 2.0 mm apart from the frame-shape structure 12.

The required volume amount of the liquid crystal 22 obtained from the internal periphery of the frame-shape structure 12 and the height of a pattern is dropped on the display area 10 and the substrates 16 and 4 are attached in a vacuum. After attachment, atmospheric pressure is restored, the liquid crystal is spread and the gap is created. After the gap is created, the spread of the liquid crystal 22 substantially into the display area 10 is confirmed. Then, the main seal is cured by performing UV irradiation from upper part of the CF substrate 4. The attached substrates are scribed and broken and the liquid crystal panel is completed. After the liquid crystal panel is heated (isotropic treatment) at 100° C. for one hour, a lighting inspection and a seal peeling test are performed.

Results of the tests are shown in Table 4. In Comparative Example A, an overlap (shaded area) with the BM picture-frame 8 is created by the circular arc portion of the corner portion of the seal and display irregularities and peeling of the seal due to curing defects occur. In Comparative Example B, a part of the liquid crystal 22 flows over the frame-shape structure 12 and contacts with the uncured main seal 6 after attachment and display irregularities occur from the peripheral portion of the frame-shape structure 12. In Comparative Example C, although display irregularities do not occur, vacuum air bubbles are generated at corner portions after the heating. On the other hand, in Example A, B and C, none of the irregularities occur.

TABLE 4

Results of the panel tests of Comparative Examples A, B, and C and Examples A, B and C

| | Remarks | Lighting Test | Peeling Test |
| --- | --- | --- | --- |
| Comparison Example A | Corner portions shaded Others same as Example A | Display irregularities at corner portions and peripheral portion | Peeling at less than 1.5 kgf/mm |
| Comparison Example B | No vertical alignment film Others same as Example A | Display irregularities at peripheral portion | No peeling at 1.5 kgf/mm |
| Comparison Example C | Space in the seal Others same as Example A | Vacuum air bubbles at corner portions | No peeling at 1.5 kgf/mm |
| Example A | Improved Comparative Examples A, B & C Height of structure 4 µm | Excellent | No peeling at 1.5 kgf/mm |
| Example B | Improved Comparative Examples A, B & C Height of structure 3 µm | Excellent | No peeling at 1.5 kgf/mm |
| Example C | Improved Comparative Examples A, B & C Height of structure 2 µm | Excellent | No peeling at 1.5 kgf/mm |

EXAMPLE 2

A colored-resin film (red/made by JSR) dispersing pigment is evenly coated on the CF substrate 4 and the spacer 15 of the display area 10, and the frame-shape structures 12 and 12' are patterned by photolithography process. The height of the spacer 15 of the display area 10 is equal to 4.0 µm, three kinds of the frame-shape structures 12 and 12' are formed into 4 µm (Example D), 3.0 µm (Example E), and 2.0 µm (Example F) in heights, the size of the pattern for the spacer 15 is equal to 10 µm□, the width of the frame-shape structures 12 and 12' is equal to 0.75 mm, and the frame-shape structures 12 and 12' are similar figures to the main seal 6. The position of the pattern for the spacer 15 is in the non-pixel area of the display area 10, the frame-shape structure 12 is in the area inside the main seal 6 and at the same time outside the display area 10 and the frame-shape-structure 12' is apart 1 mm from the frame-shape structure 12. In this example, the width of the BM picture-frame 8 is equal to 2.5 mm so that the whole frame-shape structures 12 and 12' can be contained in the above area. Accordingly, the main seal area which is outside the BM picture-frame in the past can be eliminated, thereby realizing narrowing of the picture-frame by 1 mm on each side or 2 mm in panel measurement.

Then, the vertical alignment film (made by JSR) 14 is formed on the CF substrate 4 and the array substrate 16 so as to be level with the external periphery of the frame-shape structure 12. Further, as Comparative Example D, a structure forming the vertical alignment film 14 in the external periphery and the opposite area of the frame-shape structure 12 is structured. The main seal (made by Kyoritsu Kagaku) 6 is coated so that the internal and external peripheries of the main seal 6 are adjacent to the internal and external peripheries of the frame-shape structures 12 and 12'. The following is the liquid crystal panel completed by the similar method to the Example 1 and provided to the panel test.

Results of the tests are shown in Table 5. In Comparative Example D, since the vertical alignment film 14 is formed under the main seal 6, adhesive strength is weaker than the glass surface and peeling of the seal occurs. On the other hand, peeling of the seal did not occur in Examples D, E and F.

TABLE 5

Results of the panel tests of
Comparative Example D and Example D, E and F

|  | Remarks | Lighting Test | Peeling Test |
|---|---|---|---|
| Comparative Example D | Alignment film under the seal Others same as Example D | Excellent | Peeling at less than 1.5 kgf/mm |
| Example D | Improved Comparative Example D Height of structure 4 μm | Excellent | No peeling at 1.5 kgf/mm |
| Example E | Improved Comparative Example D Height of structure 3 μm | Excellent | No peeling at 1.5 kgf/mm |
| Example F | Improved Comparative Example D Height of structure 2 μm | Excellent | No peeling at 1.5 kgf/mm |

EXAMPLE 3

A colored-resin film (red/made by JSR) dispersing pigment is evenly coated on the CF substrate 4 and the spacer 15 of the display area 10 and the frame-shape structure 12 are patterned by photolithography process. Further, as a Comparative Example E, the similar pattern is structured by transparent resin (made by JSR). The height of the pattern is equal to 4.0 μm for both and the following is the liquid crystal panel completed by the similar method to Example 1 and provided to the panel test.

Figure 15:
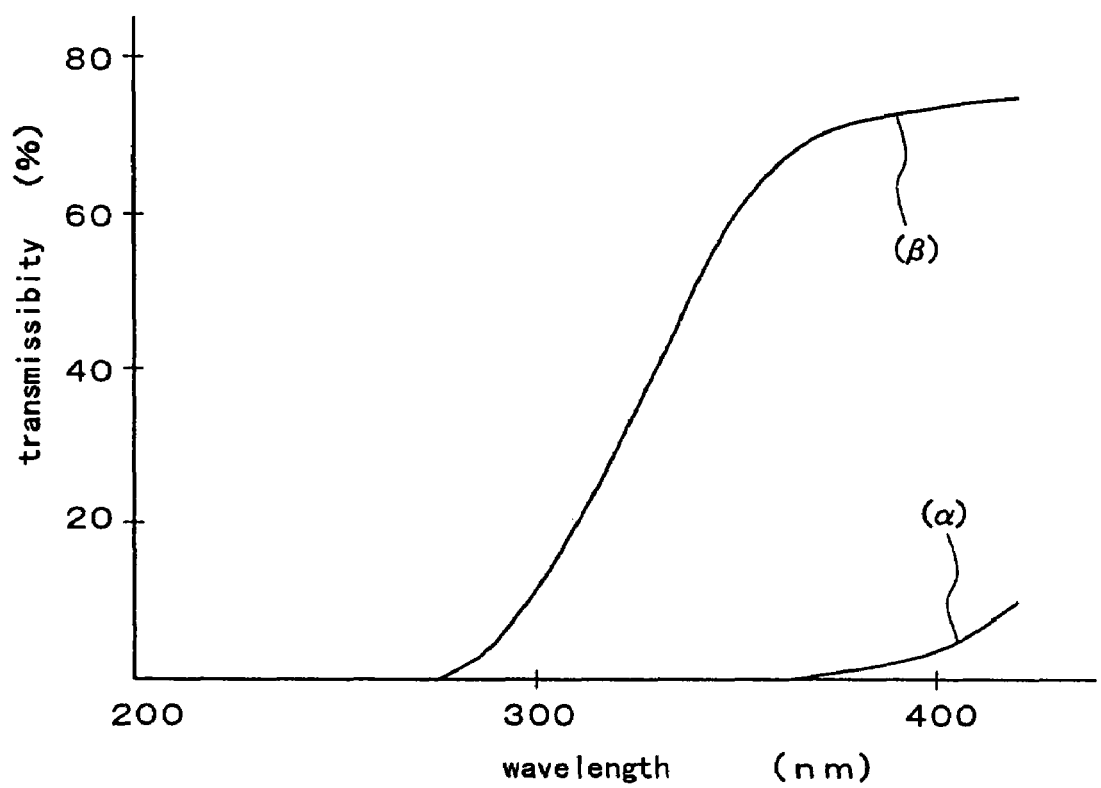
FIG. 15 is a diagram showing a UV spectrum of Comparison Example E and Example G in the liquid crystal display according to the fifth embodiment of the present invention.

The UV spectrums for Comparative Example E and Example G are shown in FIG. 15. In FIG. 15, the lateral axis indicates wavelength and the vertical axis indicates transmissivity. Although light in the long-wavelength side of more than 300 μm among the UV wavelengths is transmitted in Comparative Example E (a curved line (β) in FIG. 15), it is known that the colored resin in Example G (a curved line (α) in FIG. 15) hardly transmits light. The results of the panel tests are shown in Table 6. In comparative Example E, since the light component of multiple reflection generated by UV irradiation when curing the seal enters into the display area 10 via the transparent resin, photolysis of the liquid crystal 22 occurs, thereby resulting in the generation of display irregularities all around the periphery. On the other hand, display irregularities do not occur in Example G.

TABLE 6

Results of the panel tests of Comparative Example E and Example G

|  | Remarks | Lighting Test | Peeling Test |
|---|---|---|---|
| Comparative Example E | Above structure with transparent resin Others same as Example G | Display irregularities all around the edge | No peeling at 1.5 kgf/mm |
| Example G | Improved Comparative Example E | Excellent | No peeling at 1.5 kgf/mm |

A colored-resin film (red/made by JSR) dispersing pigment is evenly coated on the CF substrate 4 and the spacer 15 of the display area 10 and the frame-shape structure 12 are patterned by photolithography process. The height of the pattern is equal to 4.0 μm for both and the following is the attachment performed in a vacuum by the similar method to Example 1. After being released in an atmosphere, the gap of the frame-shape structure 12 is created by pressurizing the frame-shape structure 12 portion at 1.0 kgf/cm² before the liquid crystal 22 and the main seal 6 reach the frame-shape structure 12. Further, Comparative Example F releasing the air without performing partial pressurization is structured. After the gap is created, the time substantially spreading the liquid crystal 22 in the display area 10 is measured and the following is the liquid crystal display panel is completed by the similar method to Example 1. After heating at 100° C. for one hour (isotropic treatment), the cell gap adjacent to the seal is measured.

Results are shown in Table 7. Although the picture area equivalent to 15 inches in size is used as the liquid crystal display panel, approximately 10 minutes is required in Example F to substantially spread the liquid crystal 22 in the display area 10. Further, although the cell gap inside the picture area is equal to 4.0~4.1 μm, the cell gap adjacent to the seal is greater by +0.1~0.2 μm. If the amount of liquid crystal to be dropped is further reduced, this difference can be reduced. However, several tens of minutes are required to substantially spread the liquid crystal in the picture area, therefore reducing the amount of liquid crystal to be dropped is not practical. On the other hand, the time spreading the liquid crystal is shortened to approximately 3 minutes in Example H and the cell gap adjacent to the seal is approximately the same as the cell gap inside the picture area.

TABLE 7

Comparison of Comparative Example F and Example H

| | Remarks | Time spreading Liquid Crystal | Cell Gap |
|---|---|---|---|
| Comparative Example F | Gap created solely by releasing in an atmosphere | ~10 min. | 4.2~4.3 μm |
| Example H | After releasing in an atmosphere, the frame-shape structure partially pressurized | ~3 min. | 4.0~4.1 μm |

Thus, the liquid crystal panel can be fabricated with favorable yield according to this embodiment even if a vacuum injection method or an instilling method is used and the cost of liquid crystal display panel can be further reduced, thereby expanding the scale of the market as the display substituting CRT.

Next, a liquid crystal display and a fabrication method thereof according to a sixth embodiment of the present invention are described with FIG. 17 through FIG. 24. The black matrix (BM) is formed at a peripheral edge portion of the liquid crystal display panel and if there is no margin at a position the seal is coated, a part of the seal overlaps with the end of the BM picture-frame after attachment. If ultraviolet light is irradiated from the direction vertical to the substrate, the ultraviolet light is shaded in the portion overlapping with the BM picture-frame and the seal can not be cured. The adhesive strength of the seal is reduced in this portion and peeling of the seal occurs. Further, since the seal remains uncured, when the liquid crystal panel expands or contracts due to variations of temperature, the seal component is eluted and the voltage retention ratio at the edge of the seal is reduced. If the seal coating position is sufficiently apart from the end of the BM picture-frame, such defects do not occur. However, coating the seal sufficiently apart from the end of the BM picture-frame induces the picture-frame area to be enlarged and is not appropriate.

In this embodiment, the above problems are solved by using the following methods:

(1) By using ultraviolet-light-curing resin for the main seal, the frame-shape structure hardly transmitting ultraviolet light is formed into a height equivalent to the thickness of the panel in the area inside the main seal and at the same time outside the display area. The seal-curing is performed by irradiating ultraviolet light at least to the main seal from the direction horizontal or diagonal to the substrate surface. If the height of the frame-shape structure is equivalent to the thickness of the panel and the frame-shape structure has the absorbability for ultraviolet light, a part (particularly short-wavelength segment) or all of the ultraviolet light transmitting the seal is not irradiated on the liquid crystal layer, thereby resulting in the liquid crystal not to be photo-degraded even when ultraviolet light to the main seal from the direction horizontal or diagonal to the substrate surface is irradiating. Thus, ultraviolet light can be irradiated to the portion previously shaded viewed from the direction vertical to the substrate, thereby completely curing the seal.

(2) Ultraviolet light toward the main seal is irradiated from the direction horizontal or diagonal to the substrate surface. At the same time, ultraviolet light is irradiated from the direction vertical to the substrate surface as well. Ultraviolet light can be most easily irradiated from these directions. Ultraviolet light is absorbed by the resin and becomes low in intensity of illumination if being apart from the irradiated surface and depending on a material of the seal, a sufficiently cured substance may not be obtained when ultraviolet light is irradiated only from the above directions. This is because a seal component low in reactivity is more difficult to be cured at low intensity of illumination. Accordingly, such a seal is irradiated from the said directions as well as from the direction vertical to the substrate surface. Since the intensity of illumination is hardly reduced in the direction vertical to the substrate surface where the thickness of the seal film is thin, the seal component low in reactivity is cured and the sufficiently cured substance can be obtained.

(3) By irradiating ultraviolet light to the main seal from the direction diagonal to the substrate, the ultraviolet light is reflected to the shaded portion viewed from the direction of irradiation by a reflection film formed in the area under the main seal. When a seal coating position is apart from the side of the substrate, the main seal is also on other position besides the side of the substrate as in gang printing, or a dummy seal is between the side of the substrate and the main seal, the seal can not be completely cured by only irradiating ultraviolet light from the said direction. Accordingly, if the ultraviolet light is irradiated from outside the main seal to the said direction and is reflected by the said reflection film to the shaded portion from the direction of irradiation, the seal can be completely cured.

Since the reflection film in plane structure generates the area difficult for ultraviolet light to wraparound depending on the angle of irradiation, ultraviolet light is required to be reflected to the whole shaded portion by taking a broad angle of irradiation. Accordingly, if a concavo-convex structure is provided under the said reflection film so that the reflected light has directivity by controlling the angle of inclination, the ultraviolet light at a predetermined angle of irradiation can be efficiently reflected to the shaded portion, thereby eliminating the requirement of the broad angle of irradiation as described above.

(4) The reflection film and a metal film for the TFT substrate are formed together. When a gate bus line or data bus line is formed on the TFT substrate, generally a metal such as Al (aluminum) and the like is used for forming a film. If the metal film is also formed together in the area coating the seal at this time, a new process is not required to be added. In this case, ultraviolet light is irradiated from the CF substrate side and is reflected on the metal film on the TFT substrate.

(5) Even if a reflection substance having the concavo-convex structure in the area to be a the substrate stage and at the same time under the main seal is provided when the irradiation of ultraviolet light is performed and the angle of inclination of the reflection substance is controlled, the ultraviolet light can be effectively reflected to the shaded portion. In this case, although the concavo-convex structure according to the seal pattern is required to be structured, an advantage of not requiring to construct a concavo-convex structure or a reflection film for each substrate is generated. Accordingly, the ultraviolet light at the predetermined irradiation angle can be efficiently reflected to the shaded portion without adding a new process.

(6) Particles dispersing ultraviolet light in the main seal as a measure to irradiate ultraviolet light to the main seal in the direction horizontal or diagonal to the substrate surface are scattered and the ultraviolet light is scattered to the predetermined directions by the subject particles. Particle in an order of micron or submicron such as a filler is selected as the particle dispersing ultraviolet light to give dispersability by coating the surface with a metal film or an oxided metal film. When ultraviolet light is irradiated to these particles, all or a part of the ultraviolet light is dispersed and spread to the predetermined directions.

(7) The frame-shape structure and a color plate for the CF substrate are formed together and the color plate is laminated in the area forming the frame-shape structure. Although colored resins of R, G and B are used for the CF color plate, the colored resin hardly transmits ultraviolet light. Formation of the color plate to the CF substrate is performed by sequentially patterning the colored resin to each color-plate area by photolithography process. If each color plate is also patterned and laminated in the area forming the structure at this time, the structure can be formed without adding a new process.

(8) The main seal is formed at a position where the internal periphery of the main seal is adjacent to the external periphery of the frame-shape structure after attaching the substrates so that the internal periphery of the main seal and the external periphery of the frame-shape structure are adhered. Thus, the fixed surfaces of the main seal is made on the three surfaces, interface the upper and lower substrates and the structure, thereby increasing the adhesive strength.

Further, even if the liquid crystal expands or contracts due to variations of temperature, the frame-shape structure is fixed on the opposite substrate side via the main seal and the panel thickness of the structure portion does not vary. Thus, the liquid crystal and the seal completely do not make contact after attachment of the substrates as well and spreading contaminated substances from the seal into the liquid crystal can be prevented.

(9) The liquid crystal display is fabricated by instilling using the above methods. In instillation, since the seal is cured after liquid crystal is injected, improvement effects according to the above methods are significant. In other words, since the shaded portion of the seal remains uncured, the seal component is eluted into liquid crystal, thereby reducing the voltage retention ratio at the edge of the seal. Further, if ultraviolet light is irradiated to the direction horizontal or diagonal to the substrate surface in order to cure the shaded portion, the liquid crystal layer is also irradiated by the ultraviolet light, thereby resulting in photo-degradation of the liquid crystal. Thus, if ultraviolet light is irradiated after forming the frame-shape structure hardly transmitting the ultraviolet light adjacent to the uncured area, the above disadvantages generated by instillation can be improved.

Since the above problems are solved according to this embodiment, the yield of the liquid crystal display fabricated by UV press and instillation is improved. Particularly in instillation, since the seal is cured after liquid crystal is injected, an employment of this embodiment contributes tremendously to practical applications of instillation. The liquid crystal display and a fabrication method thereof according to this embodiment are described below using examples.

EXAMPLE 1

Figure 17:
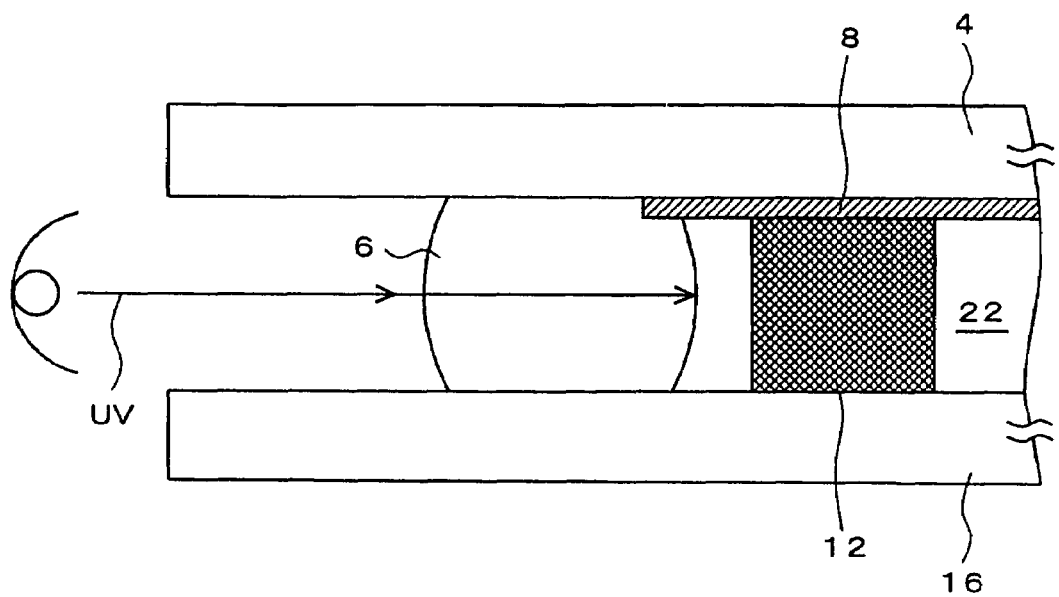
FIG. 17 is a diagram showing Example 1 in a liquid crystal display and a fabrication method thereof according to a sixth embodiment of the present invention.

As shown in FIG. 17, the frame-shape structure 12 equivalent to the panel in thickness is formed using a black-color resin on the BM 8 in the area inside the main seal 6 and at the same time outside the display area on the CF substrate 4. After forming the frame-shape structure 12, the alignment film (not shown in the diagram) is coated on the CF/TFT substrates 4 and 16, the main seal 6 made of an epoxy-acrylate-type ultraviolet-light-curing resin is coated at the CF substrate 4 side and the substrates are attached by instillation. In other words, the liquid crystal 22 with the required volume amount obtained from the internal peripheral side of the frame-shape structure 12 and the thickness of the panel is dropped in the display area and the substrates attachment is performed in a vacuum. Then, the atmospheric pressure is restored and liquid crystal instillation and creation of the gap are performed. After confirming the substantial spreading of the liquid crystal 22 in the display area subsequent to creating the gap, the main seal 6 is cured by irradiating ultraviolet light from the side of the substrate to the direction horizontal to the substrate surface. After performing the isotropic-treatment which heats these attached substrates at 120° C. for one hour, the substrates are scribed and broken and the liquid crystal panel is obtained. The obtained liquid crystal panel is provided to the lighting test and the seal peeling test. Further, as Comparison Example 1, the frame-shape structure formed using the transparent resin is formed and the liquid crystal display panel which cures the main seal is structured by irradiating ultraviolet light from the direction vertical to the substrate surface, and the similar tests are performed. Results of the lighting test and the seal peeling test of Example 1 and Comparative Example 1 as well as other examples and comparative examples are shown in Table 8.

EXAMPLE 2

Figure 18A:
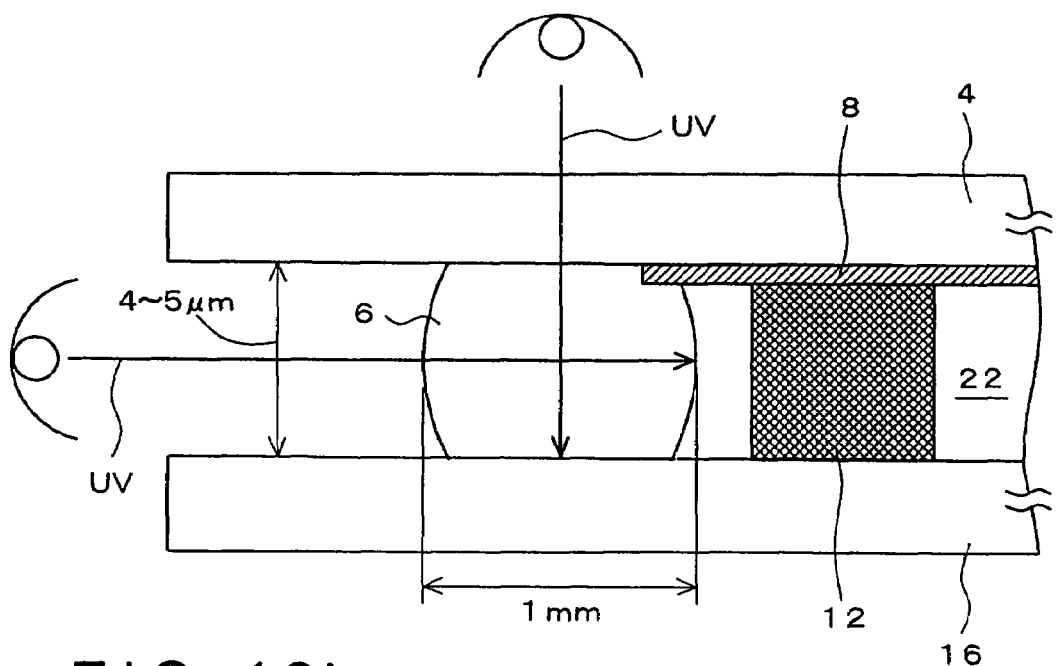
FIGS. 18a and 18b are diagrams showing Example 2 in the liquid crystal display and the fabrication method of the liquid crystal display according to the sixth embodiment of the present invention.
Figure 18B:
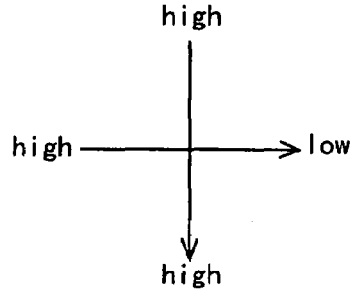

As shown in FIG. 18a, an epoxy-type ultraviolet-light-curing resin is selected for the main seal 6 and creation of the gap are performed by attachment using the similar technique to Example 1. As shown in FIG. 18a, since the thickness of the main seal 6 is as thin as 4~5 μm conforming with the width of the main seal 6 which is approximately 1 mm in the direction of the substrate surface as shown in FIG. 18b, while the luminous intensity in the direction vertical to the substrate surface hardly varies, the luminous intensity in the horizontal direction gradually reduces. Considering the above, the main seal 6 is cured by irradiating the ultraviolet light from the side of the substrate to the direction horizontal to the substrate surface as well as from the direction vertical to the substrate surface.

The similar treatments and tests to Example 1 are performed for the following. Further, as Comparative Example 2, the liquid crystal display panel is structured where the main seal 6 is cured by irradiating ultraviolet light only from the direction horizontal to the substrate surface, and the similar tests are performed. Results of the lighting test and seal peeling test of the Example 2 and Comparative Example 2 are shown in Table 8 as well as other examples and comparative examples.

EXAMPLE 3

Figure 19:
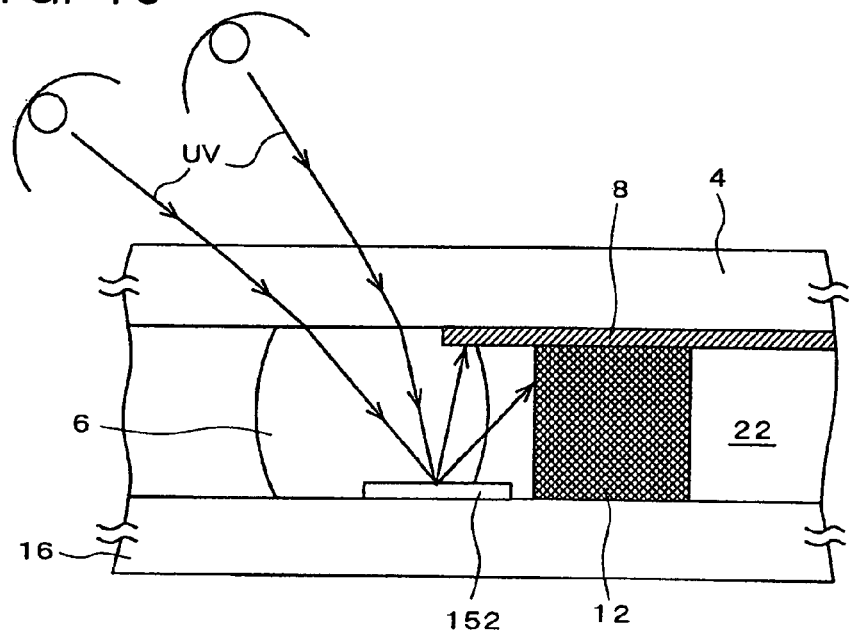
FIG. 19 is a diagram showing Example 3 in the liquid crystal display and the fabrication method of the liquid crystal display according to the sixth embodiment of the present invention.

As shown in FIG. 19, a reflection film 152 is formed by depositing Al in the main seal 6 area on the TFT substrate 16 and at the same time in the area to be under the main seal 6. After forming the reflection film 152, creation of the gap is performed by attaching the substrates using the similar technique to Example 1. Then, ultraviolet light is irradiated from outside the main seal 6 to the direction diagonal to the substrate surface, the ultraviolet light is reflected to the shaded portion by the reflection film 152 and the main seal 6 is cured. At this time, a broad angle of irradiation is taken so that the ultraviolet light is reflected to the whole shaded portion. The similar treatments and tests to Example 1 are performed for the rest. Results of the lighting test and seal peeling test of Example 3 are shown in Table 8 as well as other examples and comparative examples.

EXAMPLE 4

Figure 20A:
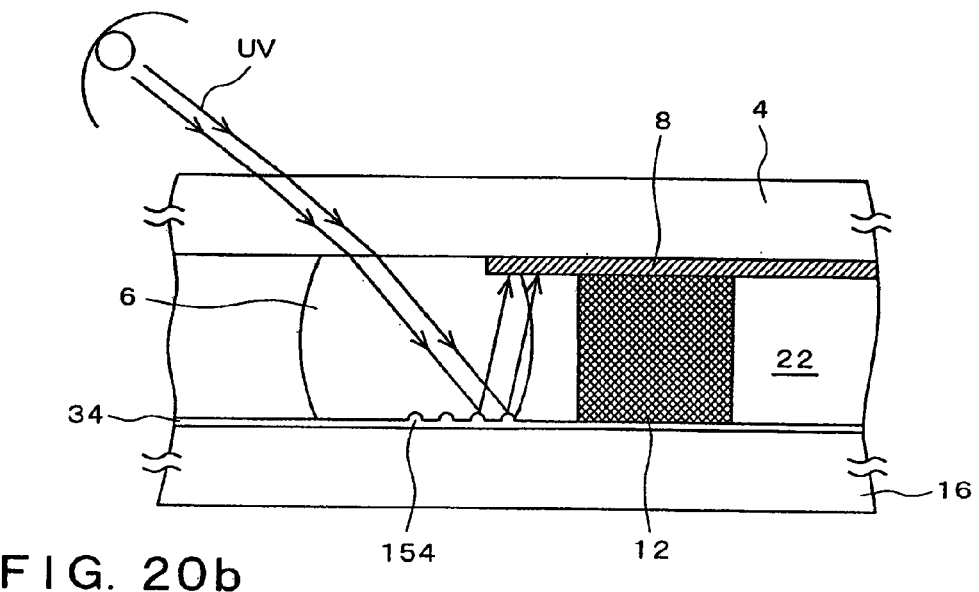
FIGS. 20a and 20b are diagrams showing Example 4 in the liquid crystal display and the fabrication method of the liquid crystal display according to the sixth embodiment of the present invention.
Figure 20B:
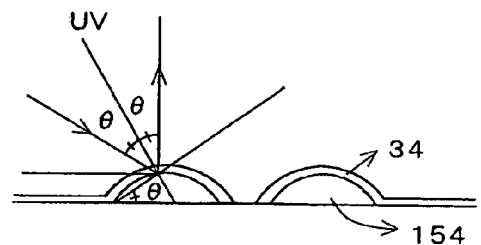

As shown in FIGS. 20a and 20b, a concavo-convex structure 154 is formed using a resistive resin in the main seal 6 area on the TFT substrate 16 and at the same time in the area to be under the main seal 6 so that the angle of inclination of the structure is equal to 15 degrees. Next, a reflection film 34 is formed in the subject area together with depositing Al on the TFT substrate. After forming the reflection film 34, creation of the gap is performed by attaching the substrates using the similar technique to Example 1. Then, ultraviolet light is irradiated from outside the main seal 6 to the direction 60 degrees diagonal to the substrate surface and is reflected by the reflection film 34 to the direction vertical to the substrate surface, thereby curing the main seal 6. The similar treatments and tests as Example 1 are performed for the rest. Results of the lighting test and seal peeling test of Example 4 are shown in Table 8 as well as other examples and comparative examples.

EXAMPLE 5

Figure 21A:
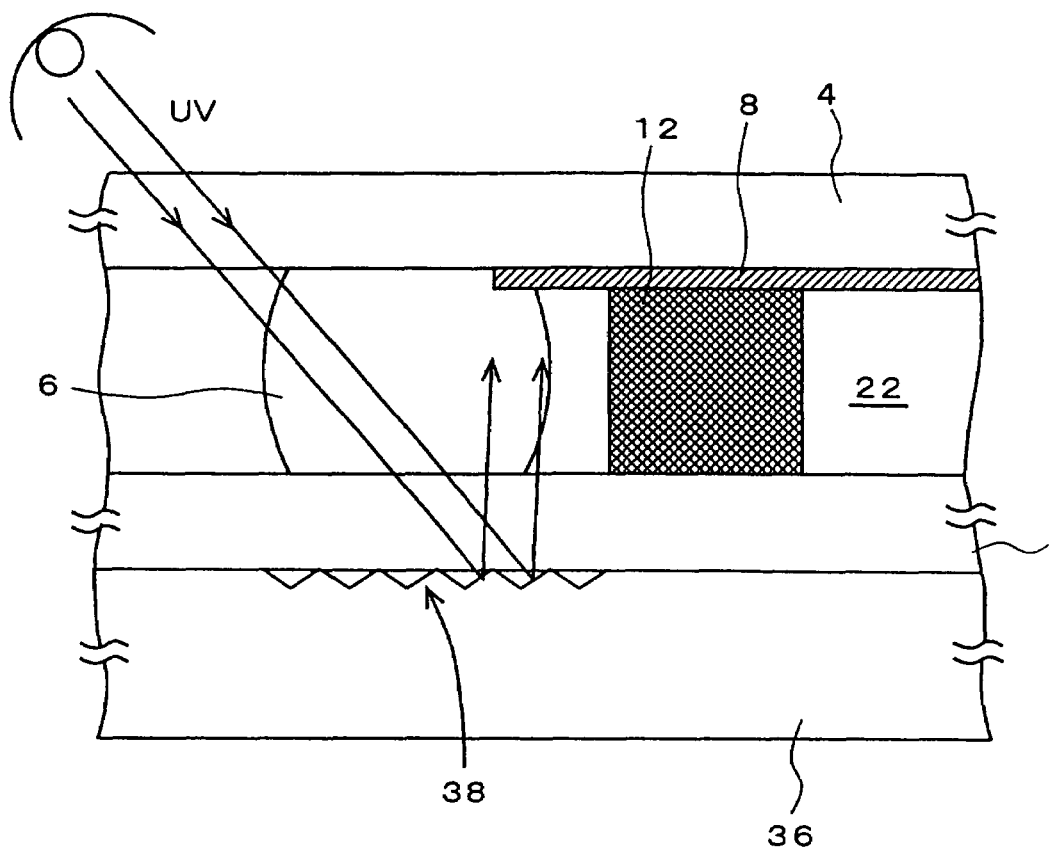
FIGS. 21a and 21b are diagrams showing Example 5 in the liquid crystal display and the fabrication method of the liquid crystal display according to the sixth embodiment of the present invention.
Figure 21B:
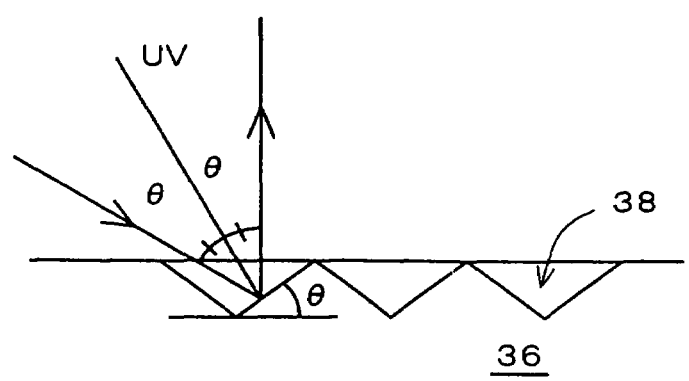

As shown in FIGS. 21a and 21b, a concavo-convex structure 38 is formed in the area to be lower part of the main seal 6 on the substrate state 36 made of stainless steel so that the angle of inclination of the structure is equal to 15 degrees. The concavo-convex structure 38 is formed by creating inverted triangle-shape grooves in the area which is the lower part of the main seal 6 on the substrate state 36 so that the convex portion is level with the upper surface of the substrate stage 36. Lamination of the substrates and creation of the gap are performed by the similar technique to Example 1. Then, the attached substrates are arranged on the substrate stage 36, ultraviolet light is irradiated from outside the main seal 6 to the direction 60 degrees diagonal to the substrate surface and is reflected to the vertical direction to the substrate surface by the concavo-convex structure 38 formed on the substrate stage 36, thereby curing the main seal 6. The similar treatments and tests to Example 1 are performed for the rest. Results of the lighting test and seal peeling test of Example 5 are shown in Table 8 as well as other examples and comparative examples.

EXAMPLE 6

Figure 22A:
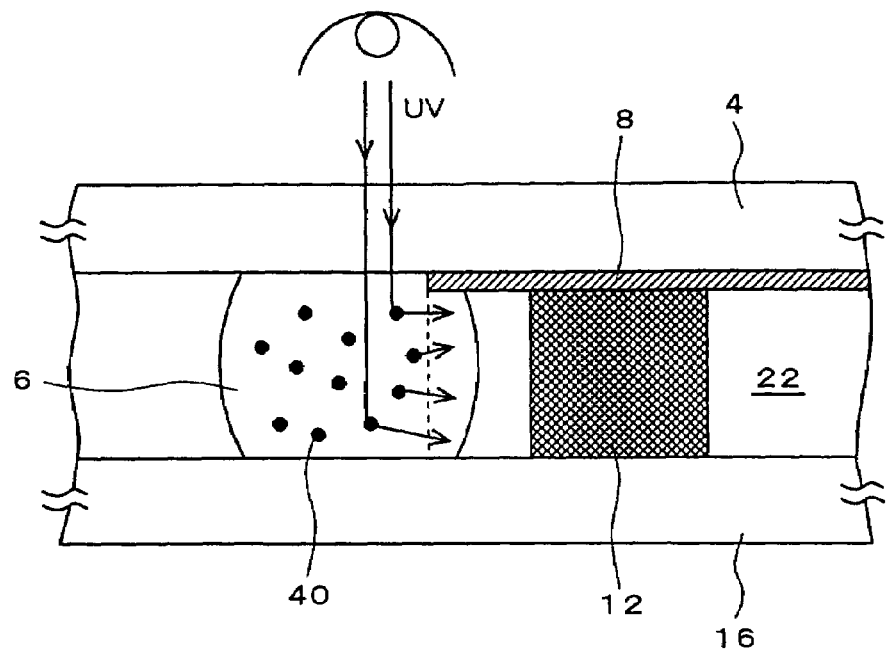
FIGS. 22a and 22b are diagrams showing Example 6 in the liquid crystal display and the fabrication method of the liquid crystal display according to the sixth embodiment of the present invention.
Figure 22B:
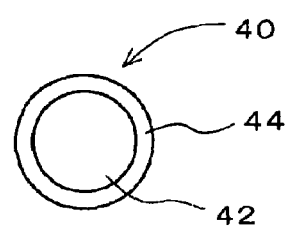

Dispersion-type particles 40 depositing an Au layer 44 on the surface of a resin filler 42 having particles of 1 μm in diameter in average as shown in FIG. 22b is added by the amount of 0.1 wt % in the main seal 6 as shown in FIG. 22a. Lamination of the substrates and creation of the gap using this main seal 6 are performed by the similar technique to Example 1. Then ultraviolet light is irradiated from the direction vertical to the substrate surface and is dispersed by the dispersion-type particles 40 to the direction horizontal or diagonal to the substrate surface, thereby curing the main seal 6. The similar treatments and tests to Example 1 are performed for the rest. Results of the lighting test and seal peeling test of Example 6 are shown in Table 8 as well as other examples and comparative examples.

EXAMPLE 7

Figure 23:
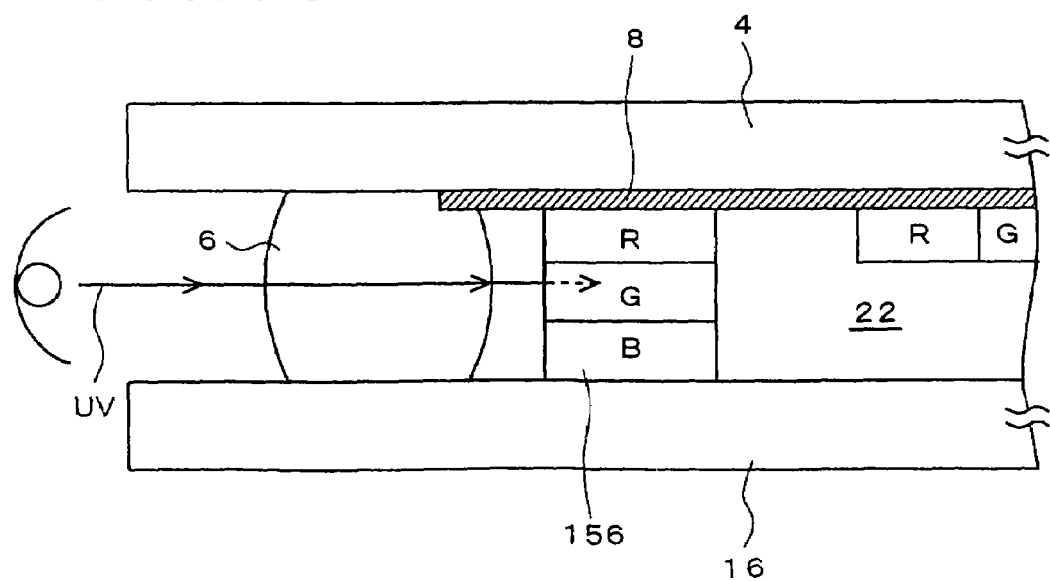
FIG. 23 is a diagram showing Example 7 in the liquid crystal display and the fabrication method of the liquid crystal display according to the sixth embodiment of the present invention.

As shown in FIG. 23, a frame-shape structure 156 equivalent to the panel in thickness is formed in the area inside the main seal 6 and at the same time outside the display area together with the formation of the color plates on the CF substrate 4. The frame-shape structure 156 is formed by laminating the CF color plates. After forming the frame-shape structure 156, attachment of the substrates and creation of the gap are performed by the similar technique to Example 1. Then, ultraviolet light is irradiated from the side of the substrate to the direction horizontal to the substrate surface and the main seal 6 is cured. The similar treatments and tests to Example 1 are performed for the rest. Results of the lighting test and seal peeling test of Example 7 as well as other examples and comparative examples are shown in Table 8.

EXAMPLE 8

As shown in FIG. 24, the main seal 6 is formed at a position where the internal periphery of the main seal 6 is adjacent to the external periphery of the frame-shape structure 12 after attaching the substrates. Lamination of the substrates and creation of the gap are performed by the similar technique to Example 1. Then, ultraviolet light is irradiated from the side of the substrate to the direction horizontal to the substrate surface as well as from the direction vertical to the substrate surface, thereby curing the main seal 6. The similar treatments and tests to Example 1 are performed for the rest. Results of the lighting test and seal peeling test of Example 8 are shown in Table 8 as well as other examples and comparative examples.

TABLE 8

Results of lighting test and seal peeling test of Example 1 through 7, Comparative Example 1 and 2

| | Lighting test at the Edge of Seal (3 V, 1 Hz Storage Drive) | | Seal Peeling Test | |
|---|---|---|---|---|
| | Before Heat Treatment | After Heat Treatment | Strength (kgf /mm) | Finding |
| Example 1 | ◯ | ◯ | 2.0 | Δ |
| Comparative Example 1 | ◯ | X | 1.5 | X |
| Example 2 | ◯ | ◯ | 2.5 | ◯ |
| Comparative Example 2 | ◯ | ◯ | 1.5 | X |
| Example 3 | ◯ | ◯ | 2.5 | ◯ |
| Example 4 | ◯ | ◯ | 2.5 | ◯ |
| Example 5 | ◯ | ◯ | 2.5 | ◯ |
| Example 6 | ◯ | ◯ | 2.5 | ◯ |
| Example 7 | ◯ | ◯ | 2.0 | Δ |
| Example 8 | ◯ | ◯ | 3.0 | ⊚ |

In Table 8 showing the results of lighting test and seal peeling test of Example 1 through 7 and Comparative Example 1 and 2, judgments are indicated by × for having a problem in strength, Δ for being a less than adequate heat-cured seal although having no problem, ○ for being equivalent and ⊙ for being more than equivalent.

While there is no problem in either the lighting test or the seal peeling test in Example 1 through 7, problems occur in the lighting test after the heat treatment and in strength of the seal peeling in Comparative Example 1 and a problem occurs in strength of the seal peeling in Comparative Example 2. Since ultraviolet light is irradiated from the direction vertical to the substrate surface in Comparison Example 1, the seal remains uncured in the area shaded by the BM picture-frame. Although elution of the uncured component is suppressed by the frame-shape structure equivalent to the cell gap before the heat treatment, the liquid crystal expands and flows over the frame-shape structure after the heat treatment due to variations of temperature, and therefore the uncured component is eluted in the liquid crystal and the voltage retention ratio is reduced. Seal peeling also begins from the shaded portion and the seal has been peeled at 1.5 kgf/mm by stress concentrating in the uncured portion.

An epoxy-type ultraviolet-light-curing resin is used in Comparison Example 2. The subject resin requires greater luminous intensity than the epoxy acrylate type ultraviolet curing resin in Example 1. Accordingly sufficient luminous intensity can not be obtained only if irradiated from the side face of the substrate to the direction horizontal to the substrate surface and the subject resin has peeled at 1.5 kgf/mm. However, if ultraviolet light is also simultaneously irradiated from the direction vertical to the substrate surface as in Example 2, sufficient peeling strength can be exhibited.

The peeling strength is greatest in Example 8 among the examples. This is owing to the fact that three surfaces which are the interfaces of the upper and lower substrates and the interface of the frame-shape structure become the fixed surfaces F.

According to this embodiment, the liquid crystal display panel with improved yield owing to UV press and instillation can be fabricated.

It will be noted that when the bus line is formed by a Ti/Al lamination layer as an example of a variation of this embodiment, if Ti is removed only at portions reflecting UV, concavo-convex is naturally formed on the Al surface by heat in the fabrication process of TFT (difference in level of Ti is insignificant and the reflection ratio is also insignificant). Accordingly, ultraviolet light may be reflected utilizing this and be incident upon the main seal 6.

A liquid crystal display and a fabrication method thereof according to a seventh embodiment are described with reference to FIG. 25a through FIG. 31c. Although a heat-curing resin is usually used for the main seal of the liquid crystal display panel, the curing rate of the heat-curing resin is slow and ultraviolet-light-curing resin is used to temporarily fasten in order to avoid misalignment. However, since the efficiency of operation of this temporary fastening process is poor, a method is proposed in Japanese Laid Open Patent Application No. 5-333351 to coat conductive-type ultraviolet-light-curing resin mixing conductive particles in circular shape at four corners of the external periphery side of the main seal and temporarily fasten with a transfer seal.

Figure 25B:

Further, since UV press and instillation require to cur the main seal in a short period of time, the ultraviolet-light-curing resin or an ultraviolet-light plus heat-curing resin is used for the main seal. Since these resins cure quickly, these resins have few misalignment and do not require temporary fastening. FIG. 25a shows a state in which stress is applied to a corner portion of the liquid crystal display panel using the main seal 6 containing, for example, ultraviolet-light-curing resin. The ultraviolet-light-curing resin or ultraviolet-light plus heat-curing resin is weak in peeling strength in comparison with the heat-curing resin, and as shown in FIG. 25b, interface peelings β with the substrate are generated at the corner portions of the main seal 6 where stress is concentrated and peeling by cohesion α is generated in the main seal 6 itself.

Figure 26:
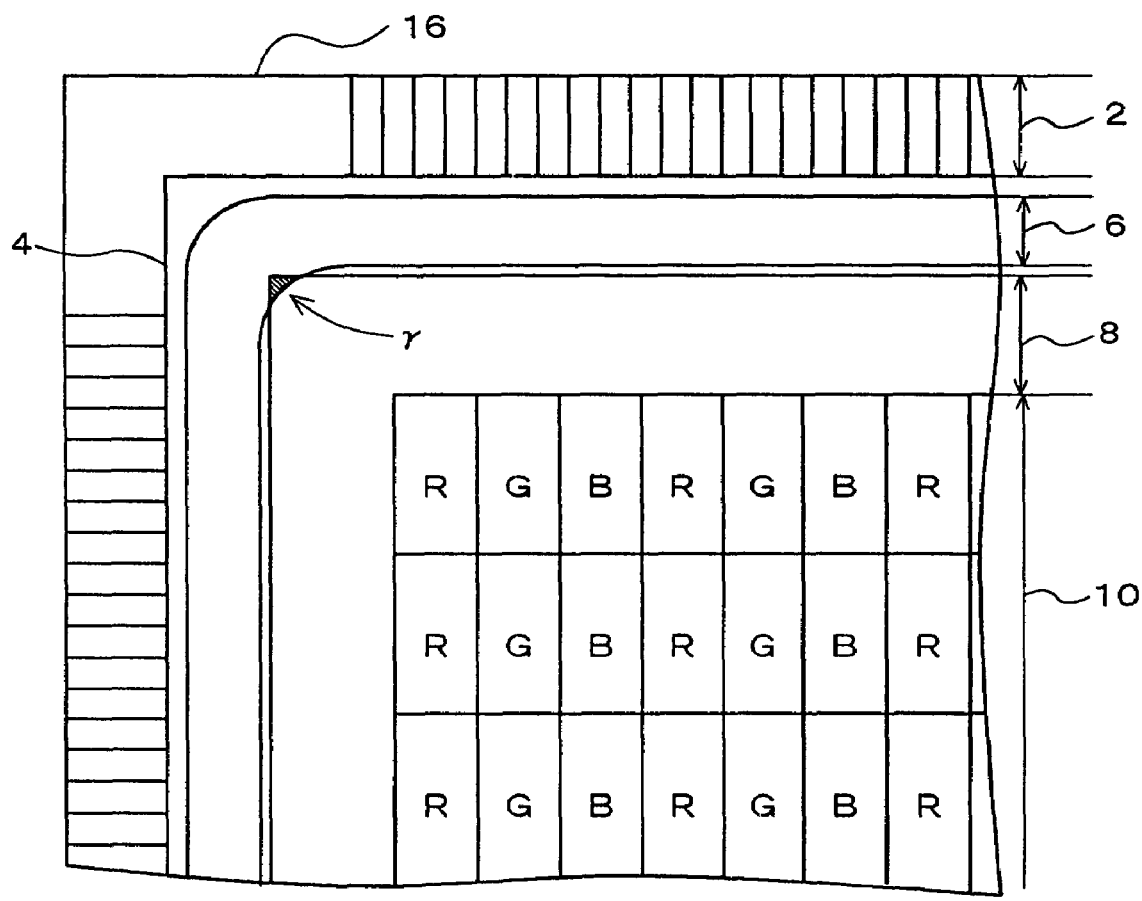
FIG. 26 is a diagram describing other problem in the past in the seventh embodiment of the present invention.

Furthermore, as shown in FIG. 26, the picture frame 8 of the black matrix (BM) is formed in the fringe periphery portion of the liquid crystal display panel, and if there is no margin at a position coating the main seal 6, the shaded area γ shaded by a part of the corner portion of the main seal 6 overlapping with the end of the BM picture frame 8 is generated and curing defects occur. The peeling strength of the main seal 6 is reduced in this shaded area y and at the same time the seal remains uncured and elutes into the liquid crystal, thereby resulting in a reduction of the voltage retention ratio of the liquid crystal.

In this embodiment, the above problems are solved by using the following methods:

(1) In the liquid crystal display panel using the ultraviolet-light-curing resin or the ultraviolet-light plus heat-curing resin for the main seal, an interconnecting structure being adjacent to the seal corner and having the peeling strength greater than that of the main seal in the area outside the main seal and at the same time inside the end of the CF substrate. A circular arc (R) is provided at the seal corner in order to make the width of the lines even at the periphery portion of the seal. However, since the shape of the substrate is rectangular, an air gap is created between the seal and the end of the substrate at the seal corner. If the interconnecting structure having the peeling strength greater than that of the main seal is partially arranged, the peeling strength of the seal corner is more than equal to the peeling strength of the heat-curing resin and seal peeling does not occur. The object of forming the resin in the above example in the publication is to prevent misalignment and the object of this embodiment is to prevent the seal peeling.

Therefore, this embodiment differs from the example in the publication in the points that the conductive-type particles in the interconnecting structure is not mixed, the interconnecting structure having the peeling strength greater than that of the main seal is used, and curing of the interconnecting structure is performed simultaneously or following thereafter. If the conductive-type particles are mixed in the interconnecting structure, the transmissivity is reduced. Accordingly, since the peeling strength is reduced in the ultraviolet-light-curing-type interconnecting structure, seal peeling can not be prevented. Further, in the example in the publication, if temporary fastening can be performed, the peeling strength greater than that of the main seal is not particularly required and curing of the resin is performed prior to curing of the main seal.

(2) In the above (1), the above interconnecting structure is arranged into a circular shape in the area which is outside the main seal and at the same time inside the end of the CF substrate. If the shape is circular, the interconnecting structure can easily be formed by dotting coating. Further, if there is sufficient space, it is possible to make the diameters larger by increasing the amount of coating to the extent the interconnecting structure does not flow beyond the end of the CF substrate or to increase the peeling strength by coating a plurality of points.

(3) In the above (1), the above interconnecting structure (resin) is arranged in the direction opposing the panel and at the same time in a linear shape in the area which is outside the main seal and at the same time inside the end of the CF substrate adjacent to the seal corner. If coated in the diagonal direction to the panel, the distance to the end of the CF substrate can be earned and the interconnecting structure can not easily flow beyond the end of the CF substrate and if the shape is linear, an adhesive area is larger than the circular shape and the peeling strength can be further increased.

(4) In the above (1), the curing contraction rate of the above interconnecting structure is substantially similar to that of the main seal. Although the curing contraction rate of the interconnecting structure differs depending on a selected material, the curing contraction rate for epoxy-type is equal to approximately 3% and the curing contraction rate for acrylic-type is equal to approximately 6% among polymerized resins. If a material different from the main seal in curing contraction rate is selected for the above interconnecting structure, distortion is generated in the above area after curing and become a cause of cracking or peeling. Therefore, the material substantially equal to the main seal in curing contraction rate is selected for the above interconnecting structure.

(5) In the above (1), the curing of the above interconnecting structure is simultaneously performed with or following the main seal. If the above interconnecting structure is the ultraviolet-light-curing type and is cured prior to curing of the main seal as in the example in the publication, the adjacent seal corner is partially cured by multiple reflection on the substrate interface. If the main seal is cured in stages from the corner to the whole, the residual stress is generated inside the seal and the peeling strength is reduced. If the above interconnecting structure is the heat-curing type, heating of the above area results in heating of the whole substrate as a consequence, the uncured main seal suffers sagging by heat and the shape of the seal is distorted. Therefore, when the above interconnecting structure is the ultraviolet-light-curing type and is cured simultaneously with curing of the main seal and when the above interconnecting structure is the heat-curing type and is cured following curing of the main seal, the above defects do not occur.

(6) In the liquid crystal display panel using the ultraviolet-light-curing resin for the main seal, the interconnecting structure being adjacent to the seal corner and having the peeling strength greater than that of the main seal in the step area formed by the CF substrate and the TFT substrate is formed. Since the subject area is an area where peripheral terminals are not usually formed, the interconnecting structure does not interfere with a driving circuit even if the interconnecting structure is partially arranged in the subject area. The same curing as the above (1) can be expected by partially coating and curing the interconnecting structure in the subject area after the liquid crystal display panel is formed.

(7) In the above (1) and (6), the above interconnecting structure is formed only in the area above the peripheral terminal region. Terminals connecting a driving element to a driving circuit are formed in the external peripheral portion of the TFT substrate. Since the peripheral terminals are exposed outside the end of the CF substrate by a margin (several mm) to connect the driving circuit, seal peeling is easily generated from a non-terminal region because when stress is applied to the peripheral terminals, the TFT substrate is considerably distorted and the stress is concentrated on the seal/substrate interface, and because the distance to the main seal and the stress point is lengthened, the stress is amplified by "the principle of the lever". On the contrary, since the upper and lower substrates are level in the non-terminal region, seal peeling hardly occurs. Accordingly, if the interconnecting structure is arranged only in the area around the peripheral terminals, seal peeling can be effectively suppressed.

(8) In the above (1) and (6), a polymerized resin for the interconnecting structure. As the polymerized resin is also coated to the main seal, the polymerized resin is superior in coatability and stability of the shape and is also high in adhesive strength to the substrate. Since the interconnecting structure is arranged outside the main seal, the interconnecting structure is not affected by contamination of liquid crystal, and any of the ultraviolet-light-curing-type, the heat-curing-type or the ultraviolet-light plus heat-curing-type polymerized resin can be used as long as the polymerized resin has the peeling strength greater than that of the main seal.

(9) In the liquid crystal display panel using the ultraviolet-light-curing resin or the ultraviolet-light plus heat-curing resin for the main seal, adjacent to the seal corner, an L-shape structure corresponding to the shape of the corner of the BM picture frame with the height equivalent to the width of the panel is arranged in the area which is inside the main seal and at the same time outside the display area. Since the BM picture frame is formed in the fringe periphery portion of the liquid crystal display panel, if there is no margin at a position the seal is coated, a part of the seal corner is shaded by overlapping with the end of the BM picture frame, thereby resulting in the curing defects after substrate attachment. Accordingly, if adjacent to the seal corner, the L-shape structure corresponding to the shape of the corner of the BM picture frame with a height equivalent to the width of the panel is formed in the area which is inside the main seal and at the same time outside the display area, the seal is blocked by the structure and can not flow inside beyond the structure even if the seal is coated after attachment so that the part of the seal corner overlaps with the end of the BM picture frame. The position to form the structure may be selected either outside or level with the end of the BM picture frame, or inside the end of the BM picture frame by the wraparound amount of light depending on the kind of ultraviolet light irradiation (either parallel light or dispersed light) and the sensitivity of the ultraviolet light of the main seal.

(10) In the above (9), the structure is formed with a material which does not transmit a part or all of the ultraviolet light, and the seal curing is performed by irradiating ultraviolet light only in the seal corner from the direction diagonal to the substrate surface. If ultraviolet light is irradiated from the direction diagonal to the substrate, curing can be accomplished to a considerable depth (~0.5 mm) utilizing multiple reflection on the substrate interface even if the seal corner is shaded by the end of the BM picture frame. However, the ultraviolet light transmitting the main seal is also irradiated to the liquid crystal, thereby resulting in a photo-degradation and a reduction of the retention in the vicinity. Accordingly, if the structure is formed with the material which does not transmit a part or all of the ultraviolet light, the above defects do not occur and the shaded portion of the seal corner can be effectively cured utilizing multiple reflection.

(11) The liquid crystal display panel is fabricated by instillation using the above (1) through (10). Although the ultraviolet-light-curing resin or the ultraviolet-light plus heat-curing resin is weak in peeling strength in comparison with the heat-curing resin, the peeling strength can be improved by increasing the amount of ultraviolet light irradiation or by increasing the amount of the heat-curing component to be added. However, in instillation, since curing of the seal is performed after injecting the liquid crystal, the liquid crystal is photo-degraded or the retention adjacent to the seal is reduced due to elution of the heat-curing component if the above treatment is employed. Further, when a part of the seal corner is shaded by overlapping with the end of the BM picture frame after attachment, the peeling strength is reduced and at the same time the uncured seal elutes into the liquid crystal, thereby a resulting in reduction of the voltage retention ratio at the edge of the seal.

Accordingly, if the liquid crystal display panel is fabricated by instillation using the above methods of (1) through (10), the above defects do not occur and effects of improvement are significant.

The yield of the liquid crystal display panel fabricated by the UV press and instillation is improved by this embodiment. Particularly, in instillation, since the curing of the seal is performed after injecting the liquid crystal, employment of this embodiment contributes tremendously to practical application of instillation. The liquid crystal display and the fabrication method thereof according to this embodiment are described below using examples.

EXAMPLE 1 AND 2

Example 1 is described with reference to FIGS. 27a through 27c. FIG. 27a shows a whole liquid crystal display panel and FIG. 27b shows a corner portion of the liquid crystal display panel. FIG. 27c shows a point to pressurize when determining the peeling strength.

An ultraviolet-light-curing resin A (epoxy resin/curing contraction rate 3%/made by Three Bond) is used as the main seal 6 and is coated into a frame-shape on the CF substrate 4 on which a CF 11 is formed so that the width of the line is equal to 1 mm after attaching the substrates. Sequentially, interconnecting structures 160a, 160b and 160c made of a heat-curing-type resin (epoxy reins/curing contraction rate 3%/made by Mitsui Kagaku) are coated into a circular shape in the area which is adjacent to the corner portion of the main seal 6, outside the main seal 6 and at the same time inside the end of the CF substrate 4 so that the diameter is equal to 1 mmφ after attaching the substrates.

Figure 28:
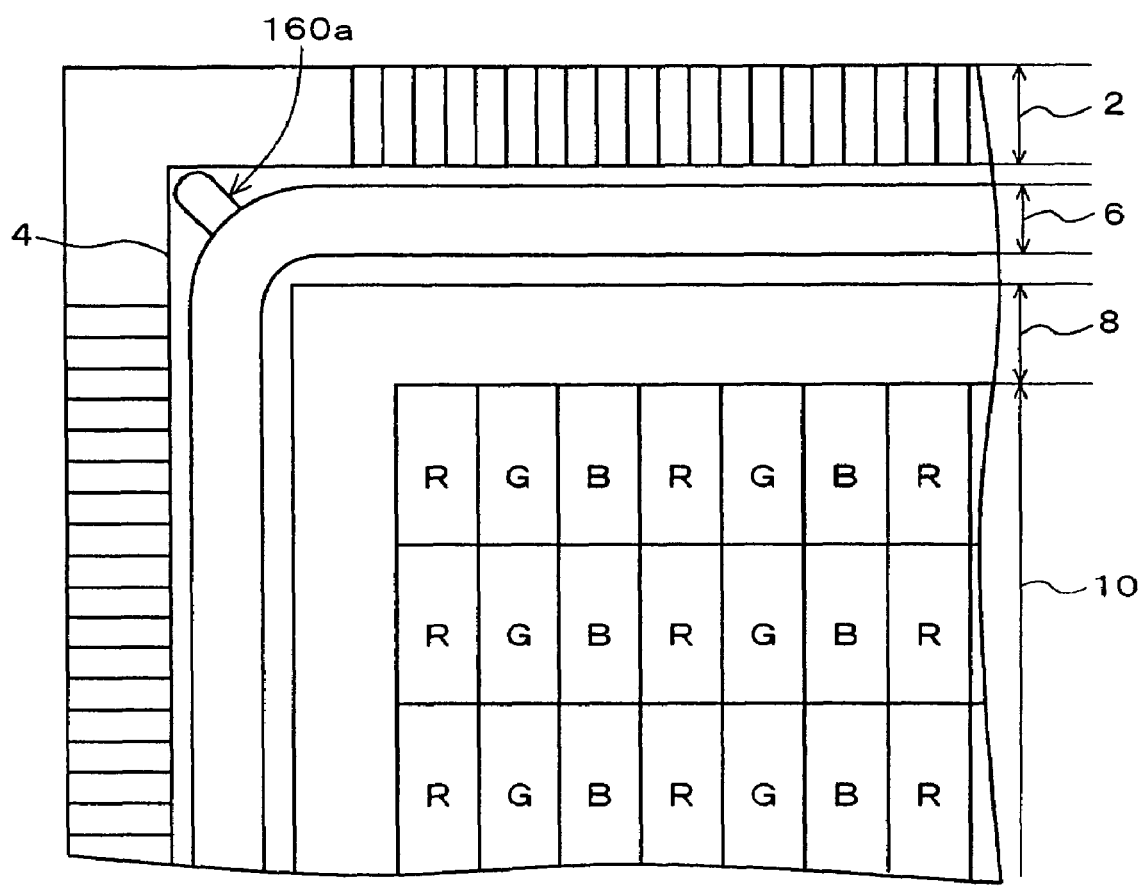
FIG. 28 is a diagram showing Example 2 in the liquid crystal display and the fabrication method of the liquid crystal display according to the seventh embodiment of the present invention.

FIG. 28 shows Example 2. In Example 2, the interconnecting structure 160a which is the same material as in Example 1 is coated in the direction opposing the panel and at the same time into a linear shape so that the width of the line is equal to 1 mm and the length is equal to 2 mm. Further, in Example 1 and 2, since the peripheral terminals are on each vertical and horizontal side of the TFT substrate 16, the interconnecting structures 160a through 160c are coated in the area (3 points) around the peripheral terminals.

Next, the liquid crystal display panel is fabricated by instillation. The required amount of liquid crystal obtained from the measurement of the internal periphery of the seal and the thickness of the panel is dropped in the frame-shape pattern of the main seal 6 and attachment is performed in a vacuum. Subsequently, atmospheric pressure is restored and injection of liquid crystal and creation of the gap are performed. After the gap is created, the main seal 6 is cured by irradiating ultraviolet light from upper part of the substrate surface. The attached substrates are heated at 120° C. for one hour and the curing of the interconnecting structure 160 and isotropic (realignment) treatment of the liquid crystal are performed. After that, the liquid crystal display panel is obtained by cutting the substrates. Further, the liquid crystal display panel (Conventional Example 1) without the interconnecting structure is also fabricated by the similar technique.

Measurement of the peeling strength is performed separately for the resin unit and the liquid crystal display panel. For the measurement of the resin unit, the main seal 6 or the interconnecting structure 160 is coated on the center of the glass substrate equal 50 mm×20 mm in size into a circular shape so that the diameter is 1 mmφ after attaching the substrates, and is attached into a cross shape by the glass substrate with the same size and is cured after the gap is created. An area 1 mm inside the end of the glass substrate is pressurized toward lower direction by a force gauge and the pressure completely peeling the main seal 6 or the interconnecting structure 160 is read. For the measurement of the liquid crystal display panel, the CF substrate 4 is arranged on top, the TFT substrate is arranged at bottom, an area 1 mm inside (refer to FIG. 27c) the end corner of the TFT substrate 16 is pressurized toward lower direction by the force gauge, and the pressure completely peeling the interconnecting structure 160 or the main seal 6 is read.

As a result, the peeling strength of the ultraviolet-light-curing resin A used for the main seal 6 is equal to 1.6 kgf/mm and that of the heat-curing resin used for the interconnecting structure 160 is equal to 2.5 kgf/mm. Further, the peeling strength of the liquid crystal display panel in Example 1 is equal to 3.0 kgf/mm, that in Example 2 is equal to 3.5 kgf/mm, and that in Conventional Example 1 is equal to 1.8 kgf/mm. The peeling strength of the liquid crystal display panel is required to be a value more than the maximum load on the peripheral terminals in the unitizing process and the value is usually required to be more than 2.0 kgf/mm considering the load when replacing a polarizing plate and the attracting force of the driving circuit. In Conventional Example 1, since this standard value is not fulfilled, the yield of fabrication is reduced due to the seal peeling. Since the peeling strengths in Example 1 and 2 exceed that of the conventional example and fulfill the standard value, therefore seal peeling does not occur.

EXAMPLE 3

Figure 29A:
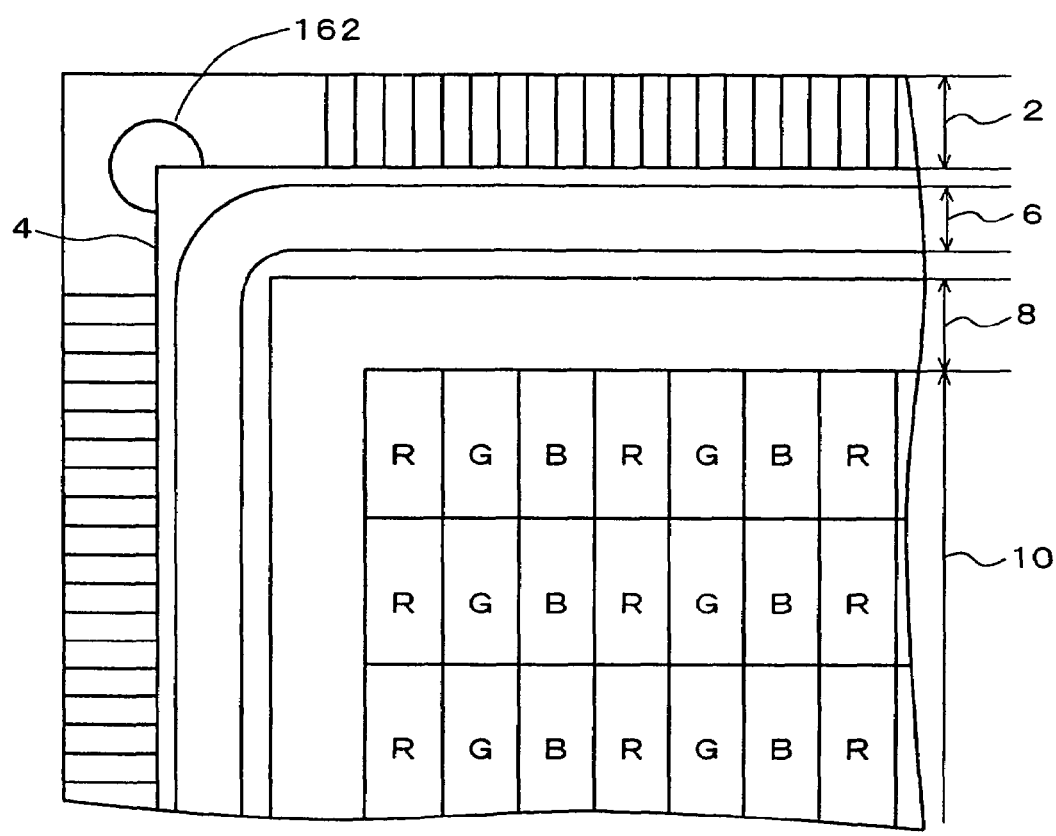
FIGS. 29a and 29b are diagrams showing Example 3 in the liquid crystal display and the fabrication method of the liquid crystal display according to the seventh embodiment of the present invention.
Figure 29B:
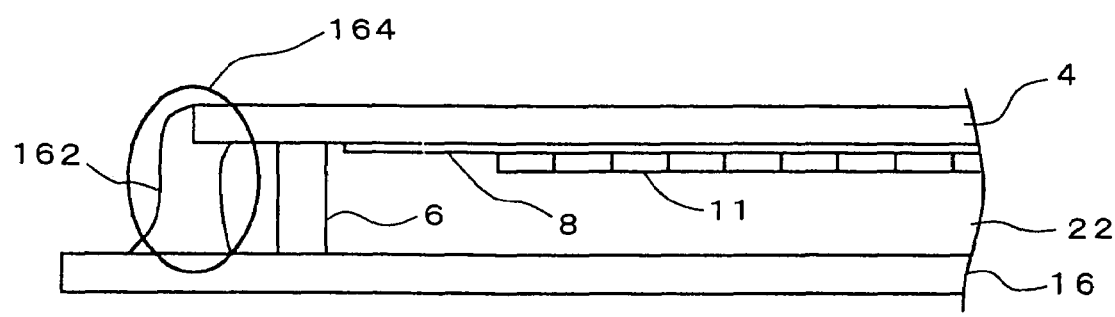

Example 3 is described with reference to FIGS. 29a and 29b.

The ultraviolet-light-curing resin A (epoxy resin/curing contraction rate 3%/made by Three Bond) is used for the main seal 6 and coated into a frame shape on the CF substrate 4 so that the width of the line is equal to 1 mm after attaching the substrates. Sequentially, the liquid crystal display panel is fabricated by instillation. After fabricating the liquid crystal display panel, the diameter is equals to 2 mmφ and contacts with both of the substrates so that an interconnecting structure 162 made of an ultraviolet-light-curing resin B (epoxy resin/curing contraction rate 3%/made by Three Bond) is coated into a circular shape in a step area 164 (refer to FIG. 29b) formed by the CF substrate 4 and the TFT substrate 16 adjacent to the corner portion of the main seal 6. It will be noted that since the peripheral terminals 2 are also on each vertical and horizontal side on the TFT substrate 16 in this example as in Example 1, the interconnecting structure 162 is coated only in the area (three points) of two sides of the peripheral terminals and only the interconnecting structure 162 is spot-irradiated by ultraviolet light and cured. Measurement of the peeling strength is similar to Example 1 and 2.

As a result of the measurement, the peeling strength of the ultraviolet-light-curing resin A used for the main seal 6 is equal to 1.6 kgf/mm and that of the ultraviolet-light-curing resin B used for the interconnecting structure 162 is equal to 2.0 kgf/mm. The difference between the ultraviolet-light-curing resins A and B is that while the amount of addition of multi-functional component or low-molecular component in A is reduced considering the contaminatibility to the liquid crystal, the amounts of those in B are increased to enhance the peeling strength since B does not make contact with the liquid crystal. Although the above components are more likely to contaminate the liquid crystal since those components are high in polarity and solubility, those components have a function to increase the peeling strength of resin. Further, the peeling strength of the liquid crystal display panel in Example 3 is equal to 2.3 kgf/mm and that of the conventional example is equal to 1.8 kgf/mm. Since the peeling strength of Example 3 exceeds that of Conventional Example 1 and fulfills the standard value, seal peeling does not occur.

EXAMPLE 4

Figure 30A:
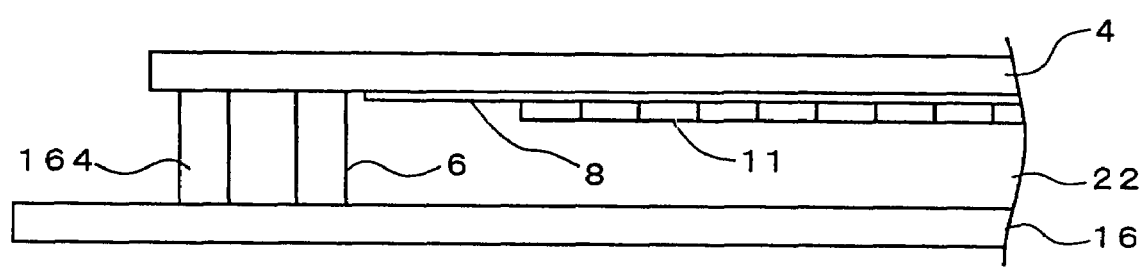
FIGS. 30a and 30b are diagrams showing Example 4 in the liquid crystal display and the fabrication method of the liquid crystal display according to the seventh embodiment of the present invention.
Figure 30B:
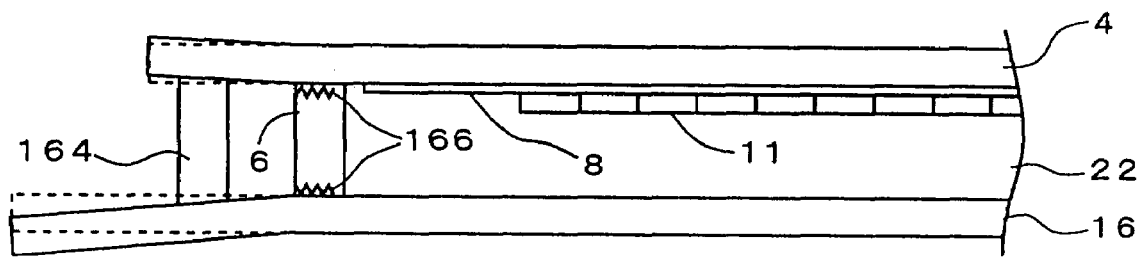

This example is described with reference to FIGS. 30a and 30b. An ultraviolet-light-curing resin C (epoxy acrylate resin/curing contraction rate 6%/made by Three Bond) is used for the main seal 6 and coated into a frame shape on the CF substrate 4 so that the width of the line is equal to 1 mm after attaching the substrates. Sequentially, an interconnecting structure 164 made of the ultraviolet-light-curing resin C is coated into a circular shape in the area outside the main seal 6 and at the same time inside the end of the CF substrate 4 adjacent to the corner portion of the main seal 6 so that the diameter is equal to 1 mm$\phi$ after attaching the substrates.

Further, as Comparative Example 1, an interconnecting structure 164 made of the ultraviolet-light-curing resin A (epoxy resin/curing contraction rate 3%/made by Three Bond) is coated in the similar manner. Then, the liquid crystal display panel is fabricated by liquefactional injection.

As a result, the peeling strength of the ultraviolet-light-curing resin C used for the main seal 6 is equal to 1.6 kgf/mm and that of the ultraviolet-light-curing resin A used for the interconnecting structure 164 is equal to 1.6 kgf/mm. Since the ultraviolet-light-curing resin C and A are different resins, the curing contraction rates are different. Further, the peeling strength of the liquid crystal display panel of Example 4 is equal to 2.2 kgf/mm and that of the comparative example is equal to 1.8 kgf/mm, and in Comparative Example 1 as shown in FIG. 30b, cracks 166 are generated prior to the peeling test in the main seal 6 side where the curing contraction rate is high. Since the peeling strength of Example 4 exceeds those of Conventional Example 1 and Comparative Example 1 and fulfills the standard value, seal peeling does not occur.

EXAMPLE 5

Figure 31A:
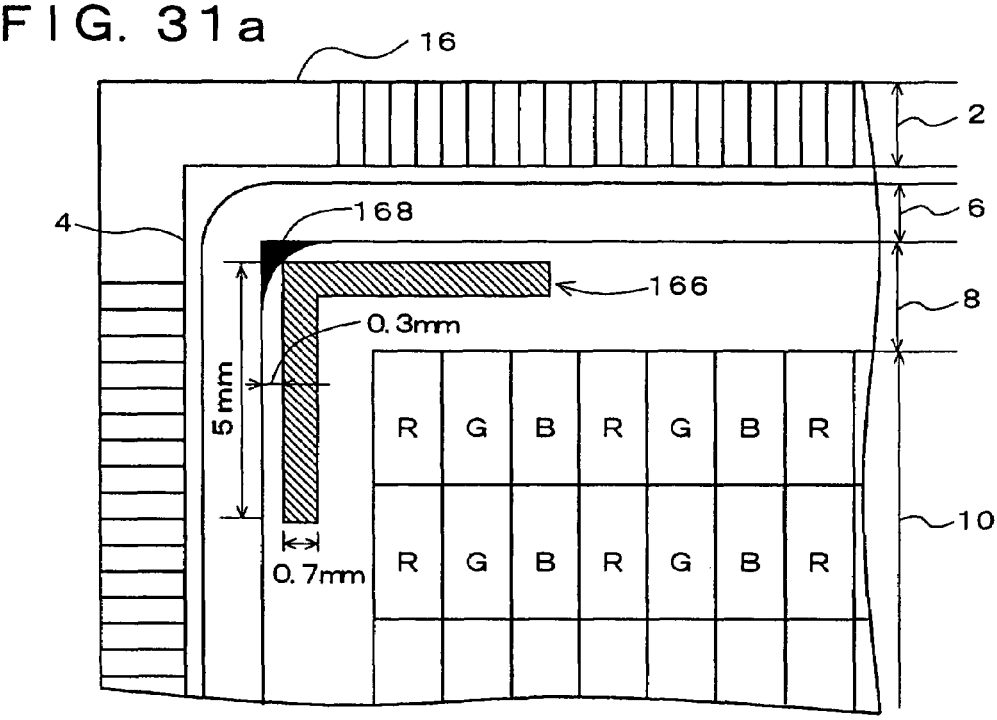
FIGS. 31a through 31c are diagrams showing Example 5 in the liquid crystal display and the fabrication method of the liquid crystal display according to the seventh embodiment of the present invention.
Figure 31B:
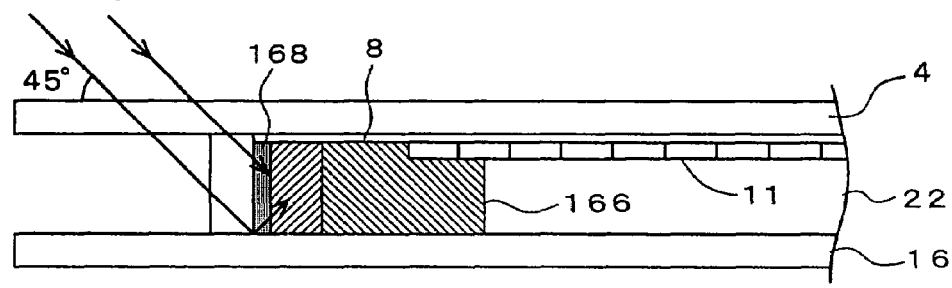
Figure 31C:
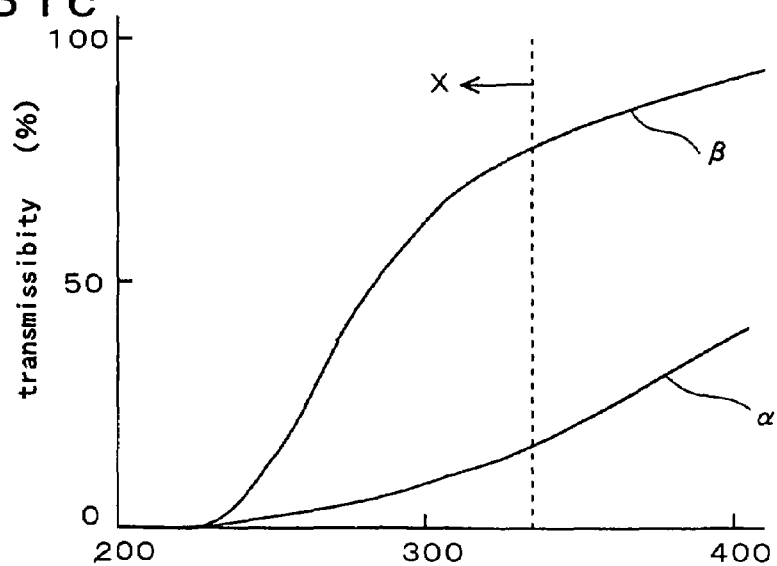

Example 5 is described with reference to FIGS. 31a through 31c. As shown in FIG. 31a, an L-shape structure 166 corresponding to the shape of the corner portion of the BM picture frame 8 is formed using a resist (made by Shipley) in the area inside the main seal 6 and at the same time outside the display area on the CF substrate 4 adjacent to the corner portion of the main seal 6. The structure 166 being equal to 5 mm in length, 0.7 mm in width and 4 μm in height (equivalent to the thickness of the panel) is formed at a position 0.3 mm inside from the external periphery of the BM picture frame 8.

An ultraviolet-light plus heat-curing resin (partially acrylic epoxy resin/curing contraction rate 4%/made by Kyoritsu Kagaku) is used for the main seal 6 and coated into a frame shape on the CF substrate 4 so that the width of the line is equal to 1 mm after attaching the substrates. The main seal 6 is coated so that the internal periphery of the seal precisely contacts with the external periphery of the BM picture frame 8. Then, the liquid crystal display panel is fabricated by instillation.

Further, the liquid crystal display panel (Conventional Example 2 and 3) without the structure 166 is also fabricated in the similar technique. After irradiating ultraviolet light from upper part of the substrate surface in Example 5 and Conventional Example 3, as shown in FIG. 31b, only the corner portion of the main seal 6 is spot-irradiated by ultraviolet light from the direction 45 degrees diagonal to the substrate surface and the main seal 6 is cured. In addition to measurement of the peeling strength, in order to examine the shielding effect of ultraviolet light by the structure 21, transmission characteristics of the ultraviolet light and when the resist is formed on the glass are measured.

As a result, the peeling strength of the ultraviolet-light plus heat-curing resin used for the main seal 6 is equal to 2.0 kgf/mm. Further, the peeling strength of the liquid crystal display panel of Example 5 is equal to 2.3 kgf/mm, that of Conventional Example 2 is equal to 1.8 kgf/mm, and that of Conventional Example 3 is equal to 2.3 kgf/mm. When the lighting tests are performed for those liquid crystal display panels at an half tone (60 Hz, 3V short wave applied), irregularities in brightness occur in the seal corner in Conventional Example 2 and 3 due to a reduction of retention ratio. The reduction of the retention ratio is attributed to the curing defect of the shaded portion 168 in Conventional Example 2 and photo-degradation of the liquid crystal in Conventional Example 3. However, the peeling strength in Example 5 fulfills the standard value and irregularities in brightness due to a reduction of the retention ratio does not occur.

This is owing to irradiation of ultraviolet light from the direction diagonal to the substrate and wraparound of the ultraviolet light to the shaded portion 168 and also the resist absorbing the harmful ultraviolet-light wavelength to liquid crystal. FIG. 31c is a graph showing the transmission characteristics of ultraviolet light of glass and glass plus resist. The transmission characteristics of ultraviolet light in FIG. 31c indicates that harmful wavelength band (short wavelength side from 334 nm) to liquid crystal is reduced by the glass plus resist (curved line a) to less than ¼ of that of the glass (curved line β).

Since the liquid crystal display panel having an excellent yield can be fabricated by UV press and instillation according to this embodiment, cost reduction of the liquid crystal display panel can be further achieved.

Figure 32A:
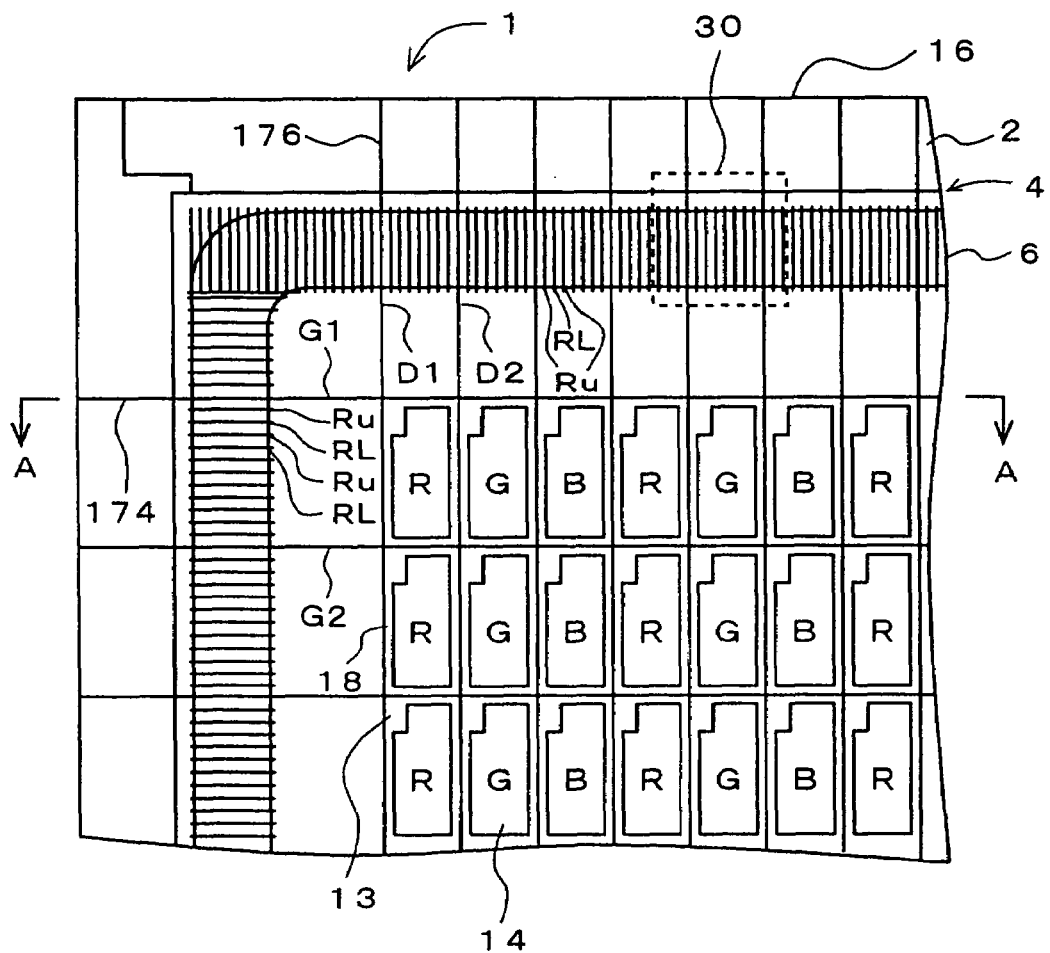
FIGS. 32a and 32b are diagrams showing a schematic structure of a liquid crystal display according to an eighth embodiment of the present invention.
Figure 32B:
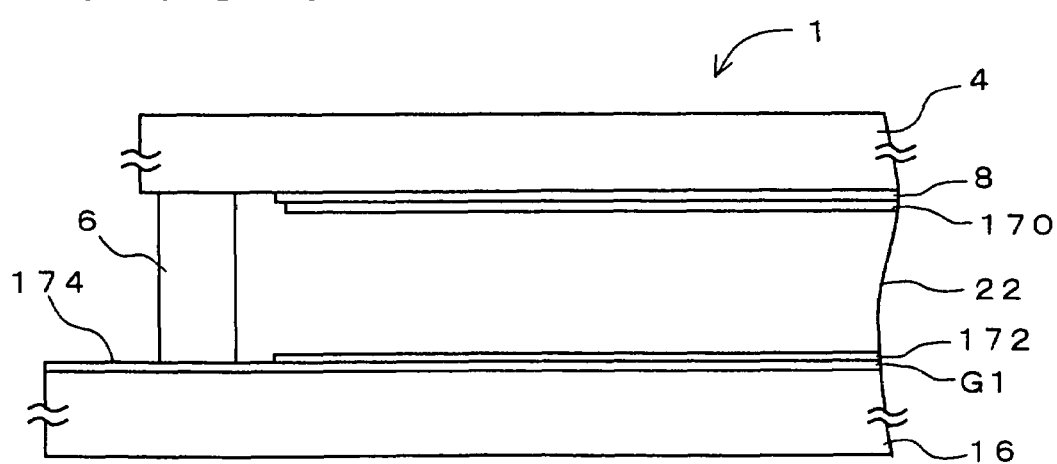

The liquid crystal display and the fabrication method thereof according to an eighth embodiment of the present invention are described with reference to FIG. 32a through FIG. 35. First, a schematic structure of the liquid crystal display according to this embodiment is described with reference to FIGS. 32a and 32b. FIG. 32a typically shows a part of the upper surface of the active matrix-type liquid crystal display panel 1 using the TFT for the switching element viewed from the opposite substrate side. FIG. 32b shows a partial cross section cut at a line A-A of FIG. 32a. A plurality of gate bus lines G1, G2, . . . Gn (hereinafter, abbreviated as G) extending in horizontal direction on the substrate in the diagram are formed in parallel in vertical direction on the array substrate 16. Further, an insulation film which is not shown in the diagram is formed on the plurality of the gate bus lines G and a plurality of data bus lines D1, D2, . . . Du (hereinafter, abbreviated as D) substantially orthogonal to the gate bus line G are formed on the insulation film. Each area decided in a matrix shape by the gate bus line G and the data bus line D which are orthogonal to each other becomes a pixel area and a TFT 13 and a display electrode 14 are formed in each pixel area. A gate electrode of the TFT 13 is connected to a predetermined gate bus line G, a drain electrode is connected to a predetermined data bus line D and a source electrode is connected to the display electrode 14 in the pixel area.

FIG. 32*b* shows a cross section along the gate bus line G1, the gate bus line G1 is formed on the surface of the array substrate 16 facing the opposite substrate 4, and an alignment film 172 is formed on the top surface. A common electrode 8 is formed on the surface of the opposite substrate 4 facing the array substrate 16 and an alignment film 170 is formed on the top surface.

The opposite substrate 4 formed substantially smaller by approximately the width of the terminal portion 2 than the array substrate 16 is arranged facing the array substrate 16 with a predetermined cell gap. The array substrate 16 and the opposite substrate 4 are attached by the sealing material 6 made of the photo-curing resin. The liquid crystal 22 is sealed in the area surrounded by the sealing material 6 between the array substrate 16 and the opposite substrate 4.

A plurality of the gate bus lines G and the data bus lines D extend to the terminal portion 2 formed in the external periphery of the array substrate 16 and are to be connected to a driving circuit (not shown in the diagram) arranged externally. An external output electrode 174 is formed in the end portion of each of the gate bus line G and an external output electrode 176 is formed in the end portion of each of the data bus line D as well.

The TFT 13 connected to the gate electrode of the subject gate bus line becomes an "On" state by a scanning signal output to a predetermined gate bus line G, and the voltage based on a gradation signal outputted to the data bus line D is applied to the pixel electrode 14. On the other hand, a predetermined voltage is also applied to the common electrode 8 on the opposite substrate side so that the liquid crystal 22 between the pixel electrode 14 and the common electrode 8 is driven by the voltage applied to the pixel electrode 14 and the common electrode 8.

Figure 33A:
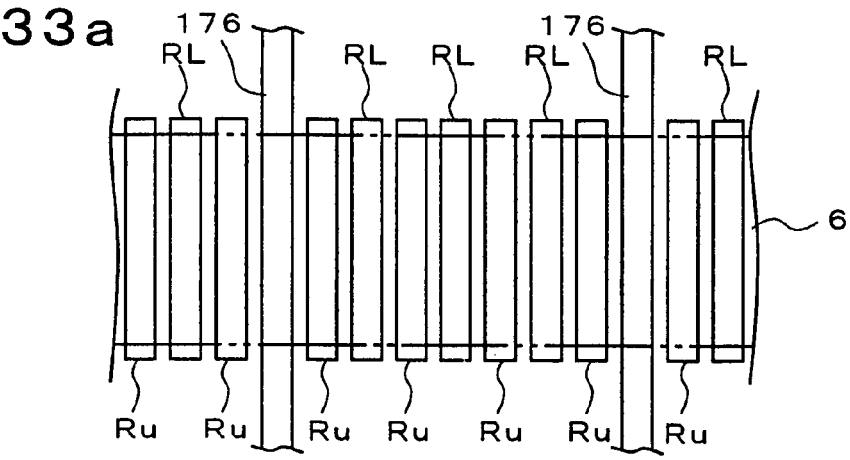
FIGS. 33a through 33c are diagrams showing a structure of a light reflection layer provided in the liquid crystal display according to the eighth embodiment of the present invention.
Figure 33B:
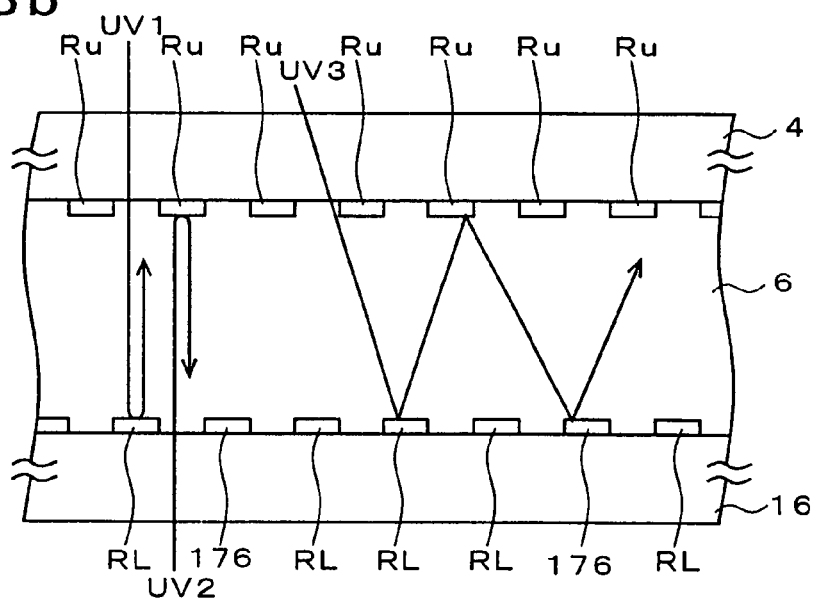
Figure 33C:
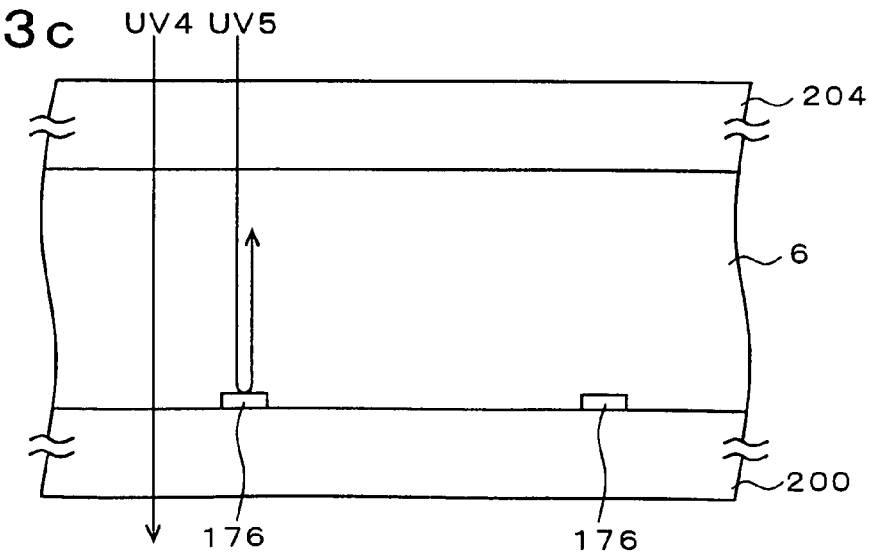

Now, the liquid crystal display according to this embodiment has a distinctive characteristic in forming a plurality of light-reflection layers R in the contacting area of the array substrate 16 and the opposite substrate 4 of the sealing material 6. This light-reflection layer R is described with reference to FIGS. 33*a* through 33*c*. FIG. 33*a* shows an enlarged block 30 indicated by the dotted line in FIG. 32*a*. FIG. 33*b* shows a cross section of the panel of the area shown in FIG. 33*a*. Further, FIG. 33*c* shows a cross section of a conventional panel corresponding to FIG. 33*b* for comparison.

As shown in FIGS. 33*a* and 33*b*, the light-reflection layer R is alternately formed in the sealing material coating area of the array substrate 16 and the opposite substrate 4. A light-reflection layer RL is formed, for example, simultaneously in the sealing material coating area on the array substrate 16 by using a metal for forming the gate bus line or a metal for forming the data bus line in the area coating the sealing material on the array substrate 16 when forming those bus lines. The light-reflection layer RL is formed in a line-and-space pattern parallel to the gate bus line G or the data bus line D and having a long side slightly longer than the width of the area forming the sealing material 6.

On the other hand, a light-reflection layer RU is formed in the contacting area of sealing material in the opposite substrate 4 side by patterning a metal layer and has a line-and-space pattern shifted by half a pitch from the light-reflection layer RL on the array substrate 16 as if filling a space portion (space) of the light-reflection layer RL when attaching the opposite substrate 4 with the array substrate 16.

Therefore, when irradiating UV light for curing the sealing material 6 as shown in FIG. 33*b*, if an UV light UV1 is entered substantially vertical to the surface of the panel from the opposite substrate 4 side, the light UV1 is reflected at the light-reflection layer RL on the array substrate 16 and goes and back in the sealing material 6 in the subject area. Thus, the energy of the light UV1 can be effectively utilized to cur the sealing material 6 of the subject area without waste and degradation of the liquid crystal 22 can be prevented by quickly curing the sealing material 6. Similarly, if an UV light UV2 is entered substantially vertical to the surface of the panel from the array substrate 16 side, the light UV2 is reflected at the light-reflection layer RU on the opposite substrate 4 and goes and back in the sealing material 6 of the subject area. Thus, the energy of the light UV2 can be effectively utilized to cur the sealing material 6 of the subject area without waste and degradation of the liquid crystal 22 can be prevented by quickly curing the sealing material 6.

Figure 108A:
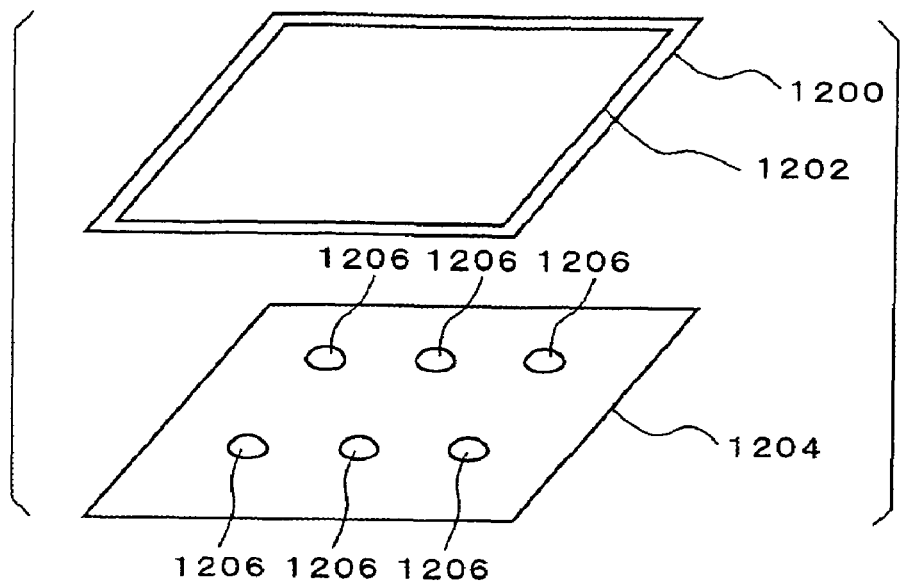
FIGS. 108a through 108c are diagrams describing a fabrication process of a liquid crystal display panel according to an instilling method.
Figure 108B:
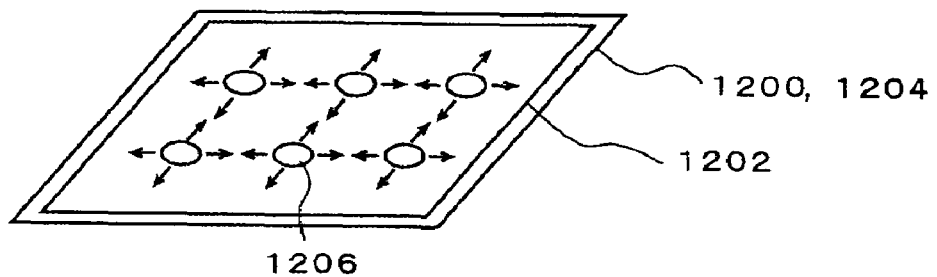
Figure 108C:
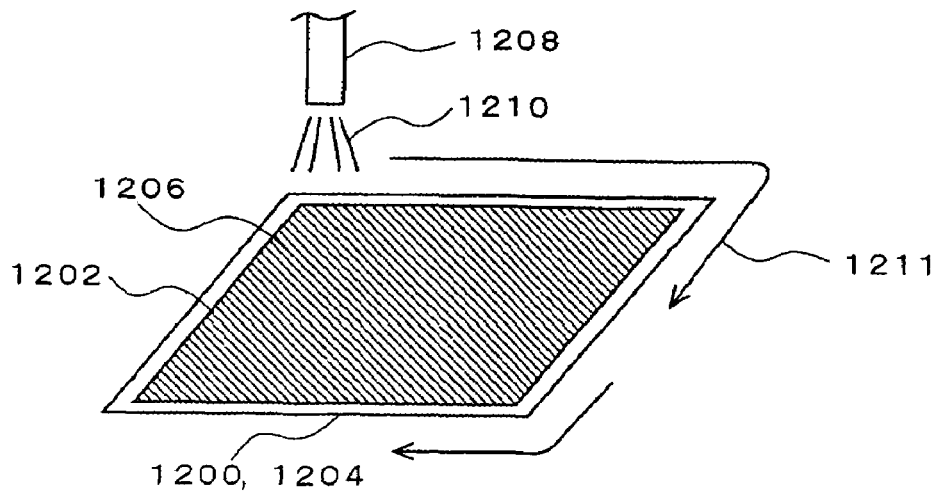
Figure 109:
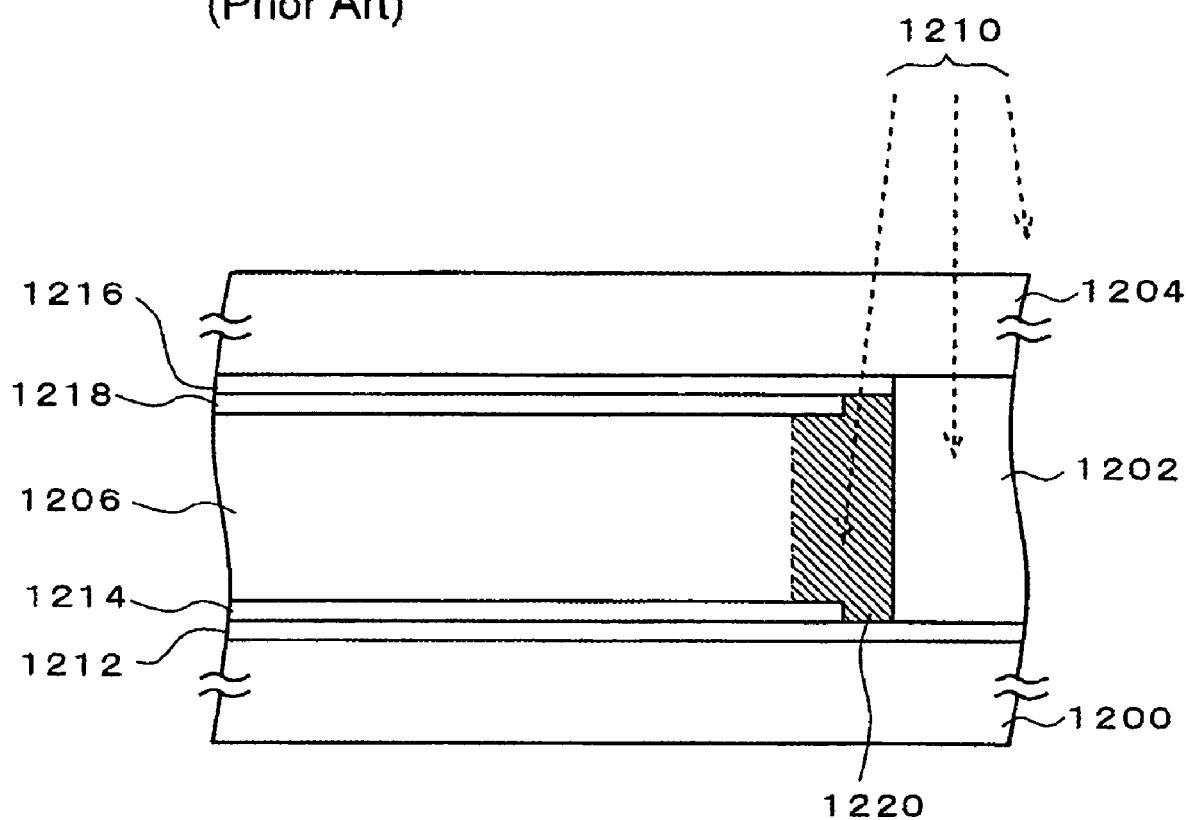
FIG. 109 is a diagram showing a partial horizontal cross section of an end portion of the conventional liquid crystal display panel.
Figure 110A:
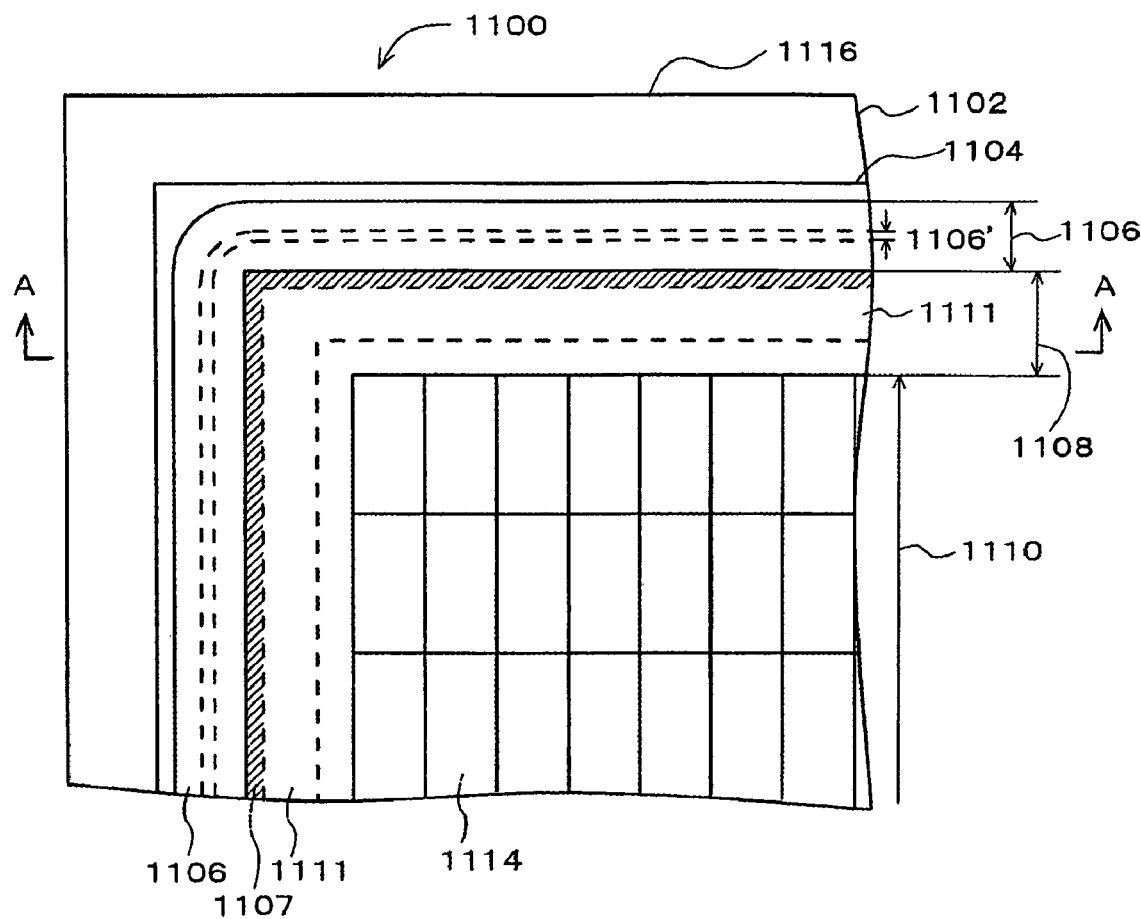
FIGS. 110a and 110b are diagrams showing a schematic structure of a conventional liquid crystal display.
Figure 110B:
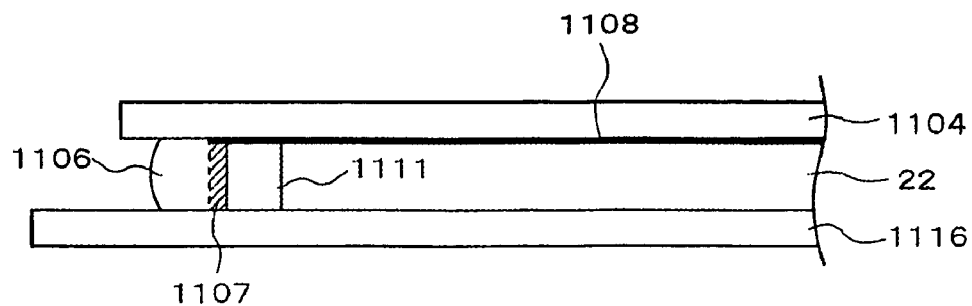
Figure 111:
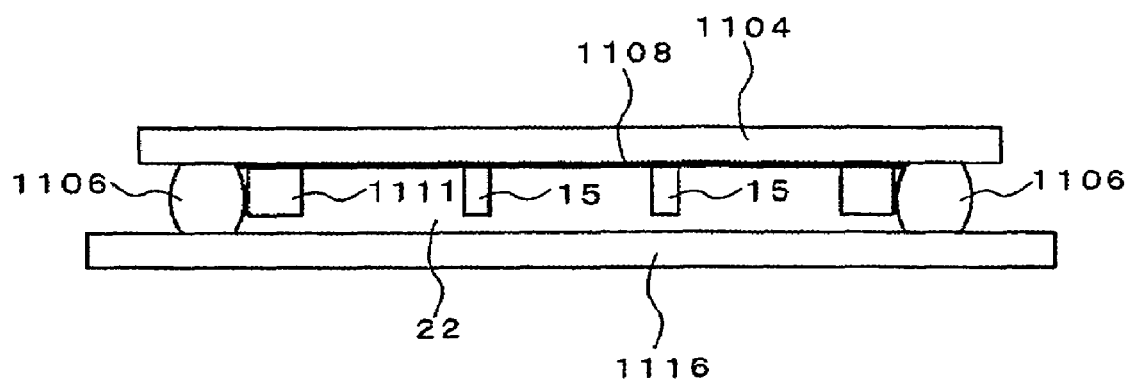
FIG. 111 is a diagram describing a problem in a fabrication method of the conventional liquid crystal display.

While the above UV lights UV1 and UV2 are irradiated from both surfaces of the panel, an UV light UV3 may be irradiated diagonally to the surface of the panel. Although light transmitting through the panel exists in this case, the amount of UV light reflecting once or in plurality at the light-reflection layers RL and RU and transmitting through the sealing material 6 can be increased, thereby effectively utilizing the energy of the light UV3 to cure the sealing material 6 of the subject area without waste and preventing degradation of the liquid crystal 22 by quickly curing the sealing material 6. It will be noted that, since the major side of the line-and-space pattern of the light reflection layers RL and RU are substantially orthogonal to the traveling direction (same as a moving direction 211 shown in FIG. 108*a*) of the UV light source in this embodiment, irradiating the light UV3 diagonally to the surface of the panel within the surface created by the normal line of the surface of the panel and the traveling direction of the UV light source is desirable with respect to effectively utilizing irradiation energy. Furthermore, if the previously-described surface can be slightly inclined assuming the traveling direction of the UV light source as an axis, the light UV3 can be irradiated from the center of the liquid crystal display portion toward outside the display portion. Thus, the UV light leakage toward the liquid crystal display portion side adjacent to the sealing material 6 can be reduced and degradation of the liquid crystal 22 can surely be.

FIG. 33*c* shows UV irradiation according to the conventional liquid crystal display for comparison. Even if UV irradiation UV4 and UV5 is performed from the direction substantially vertical to the panel in the structure of the conventional liquid crystal display, all the light such as the light UV4, except for reflecting at the external output electrodes 174 and 176 of the gate bus line G and the data bus line D such as the light UV5, only once transmits the sealing material 6. Therefore, the energy of the UV light can not be sufficiently utilized for curing the sealing material in the conventional liquid crystal display.

Various variations are possible in this embodiment. This embodiment is described assuming that the light-reflection layer R has the line-and-space pattern. However, for example, the widths of the gate bus lines G and the data bus lines D in the contacting area of the sealing material 6 on the array substrate 16 may be widened to make the light-reflection layer RL, and the light-reflection layer RU may be formed in the contacting area of the sealing material 6 on the opposite substrate 4 to fill the gap between the light-reflecting layers RL.

Figure 34:
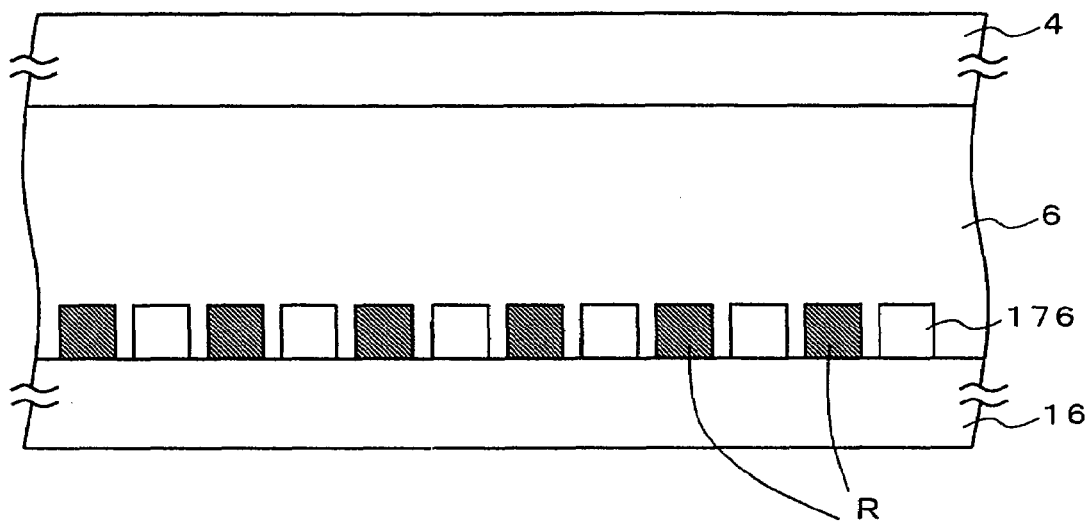
FIG. 34 is a diagram showing a structure of a light reflection layer provided in a reflection-type liquid crystal display as an example of a variation of the eighth embodiment of the present invention.

Further, in the case of a reflection-type liquid crystal display as shown in FIG. 34, the light-reflection layer R can be arranged between the plurality of the bus lines passing through the contacting area of the sealing material 6 on the array substrate (reflection substrate). Thus, in the reflection-type liquid crystal display, by utilizing the reflecting light of the UV light, the energy of the light also can be effectively utilized for curing the sealing material without waste and degradation of the liquid crystal 22 can be prevented by quickly curing the sealing material 6.

Figure 35:
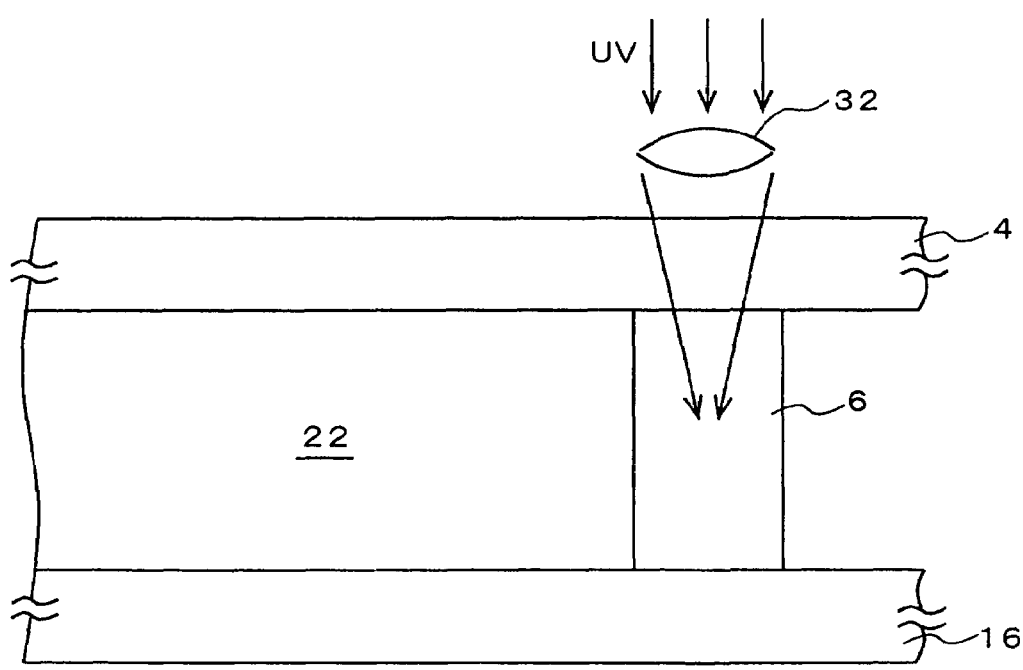
FIG. 35 is a diagram describing an example of an irradiation method of UV light according to the eighth embodiment of the present invention.

Furthermore, as shown in FIG. 35, it is effective to irradiate UV light gathered by a lens 32 toward the sealing material 6 so that the UV light does not enter the liquid crystal 22. Since the energy of the UV light can be concentrated and provided to the sealing material 6 according to this, time to cure the sealing material can be shortened, thereby preventing the liquid crystal 22 from degradation.

It will be noted that although the sealing material 6 is cured by making a direct contact on the light-reflection layer R in the above embodiment, in order to improve the adhesive ability of the sealing material 6, for example, a silicon oxide film ($SiO_2$ film) and the like may certainly be formed on the light-reflection layer R to make the sealing material 6 direct contact with the silicon oxide film.

EXAMPLE 1

Next, an example of the fabrication method of the liquid crystal display based on this embodiment is briefly described with reference to FIG. 32a through 33c. Further, since the fabrication method of the liquid crystal display according to this example has a distinctive characteristic in reducing degradation of the liquid crystal due to UV irradiation for curing the sealing material so that instillation in the cell process can be performed with certainty, description is omitted for the similar process to the past among the processes such as the array process forming a wiring pattern, switching elements and the like on the other glass substrate, the cell process dealing with alignment layer treatment, arranging spacers and the like, or the module process installing a driver IC, setting up the back light and the like.

First, for example, the array substrate 16 made of the glass substrate equal to 50 mm×60 mm×0.7 mm is used. When forming the gate bus lines and the data bus lines on the array substrate 16, the light-reflection layer RL is formed on the contacting area of sealing material 6 by patterning the metal layer for forming the bus line formed on the whole substrate surface. As the metal for forming the bus line, Cr, Al, Ti and the like can be used. The light-reflection layer RL is equal to 100 μm in width and is the line-and-space pattern having the width between the adjacent light-reflection layers is also equal to 100 μm. On the other hand, on the opposite substrate 4 side, for example, when forming the black matrix (BM: shading film), the light-reflection layer RU is formed in the contacting area of sealing material 6 by patterning the metal layer for forming the BM formed on the whole substrate surface. As a metal for forming the BM, Cr can be used. The light-reflection layer RU is patterned when the opposite substrate 4 is attached with the array substrate 16 so that the light-reflection layer RU shifts by half a pitch from the line-and-space pattern of the light-reflection layer RL. Therefore, the light-reflection layer RU also is equal to 100 μm in width and the width between the adjacent light-reflection layers is also equal to 100 μm.

After forming an alignment film (AL 3506) on the substrate surface inside the contacting area of the sealing material 16 of the array substrate and the opposing substrate 4 and performing a rubbing treatment so that a TN (torsion nematic) liquid crystal layer can be formed, an UV sealing material (made by Kyoritsu Kagaku) 6 is coated on the opposite substrate 4. After the liquid crystal (FT-5082) 22 is dropped on the array substrate 16 by an instilling equipment which is not shown in the diagram, both of the substrates 4 and 16 are attached. By irradiating the UV light of 60 mW/$cm^2$ in irradiation energy from both sides of the array substrate 16 and the opposite substrate 4 to the coating area of the sealing material 6, the sealing material 6 is cured and the panel is completed.

On the other hand, as a comparative example, the UV sealing material 6 is coated on the opposite substrate where the light-reflection layer RU is not formed, both substrates are attached after instillation, and the sealing material 6 is cured by performing UV irradiation only from the opposite substrate side. In this case, substantially twice as much as that of the UV irradiation according to the above example is required in order to generate a sufficient curing effect.

When ion densities at predetermined areas of the above two panels are measured, the ion density of this example is much lower than that of the comparative example, thereby confirming that damages to liquid crystal can be substantially reduced by the structure according to this embodiment.

Figure 36:
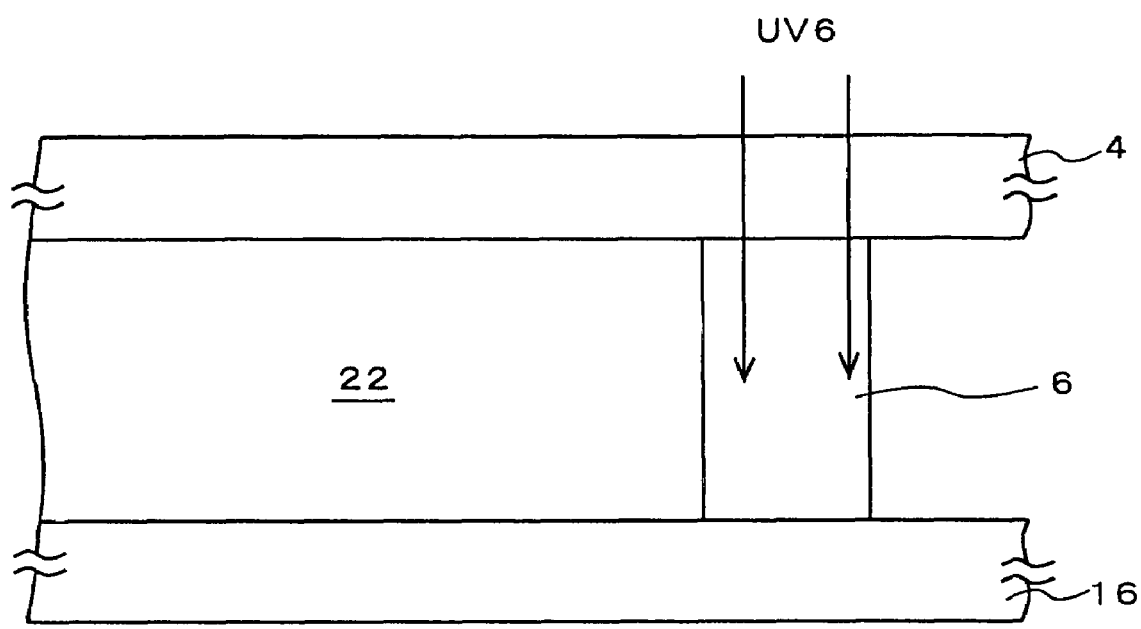
FIG. 36 is a diagram showing a partial horizontal cross section of an end portion of a liquid crystal display according to a ninth embodiment of the present invention.

A liquid crystal display and a fabrication method thereof according to a ninth embodiment of the present invention is described with reference to FIG. 36 through FIG. 39b. FIG. 36 shows a state in which UV irradiation of the sealing material is performed at the end portion of the liquid crystal panel. As to a point where the sealing material 6 of a photo-curing type material is provided to seal liquid crystal between the array substrate 16 and the opposite substrate 4, this embodiment is similar to the conventional liquid crystal display. However, this embodiment has a distinctive characteristic that an UV light UV6 for curing the sealing material 6 is a polarized light and, further, that the liquid crystal 22 is a material which is not degraded in characteristics even if the UV6 having polarized light is irradiated thereon.

Figure 37:
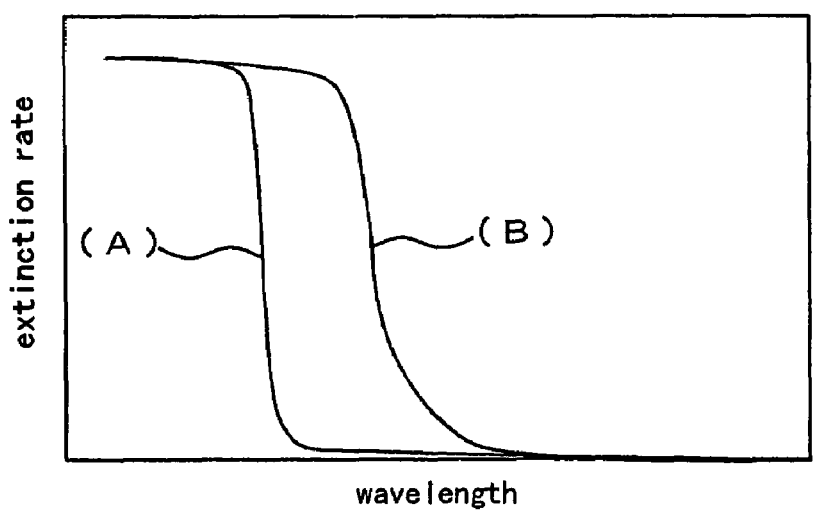
FIG. 37 is a diagram showing characteristics of two kinds of liquid crystal materials (A) and (B).

FIG. 37 shows the characteristics of two kinds of liquid crystal material (A) and (B). The vertical axis indicates extinction rate and the lateral axis indicates wavelength. The Δn (optical anisotropy: difference in refractive indexes between extraordinary ray and ordinary ray) of the liquid crystal material (A) is smaller than that of the liquid crystal material (B). As shown in FIG. 37, both liquid crystal materials (A) and (B) show high extinction rates in the short wavelength side and that it is confirmed that the more the Δn is great, the more the end of extinction is relatively at a high frequency side. This end of extinction is in the ultraviolet light area equal to approximately 300 nm to 360 nm in wavelength. Therefore, the larger the refraction index of the liquid crystal material is, the more ultraviolet light is absorbed and are more easily changed. In other words, if the UV light is irradiated when the refraction index of a liquid crystal material is reduced, tolerance against the degradation of characteristics due to UV light can be improved.

Figure 38A:
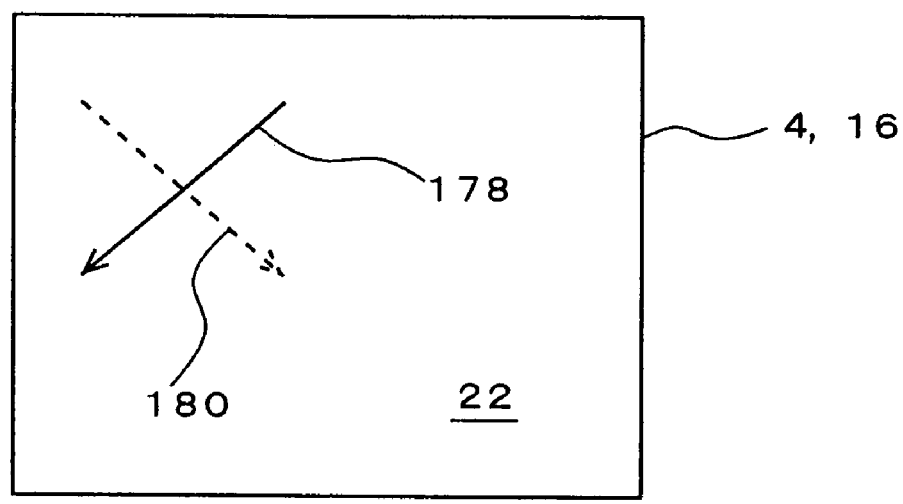
FIGS. 38a through 38c are diagrams describing a direction of a polarizing axis 46 in irradiation of a polarized UV according to the ninth embodiment of the present invention.
Figure 38B:
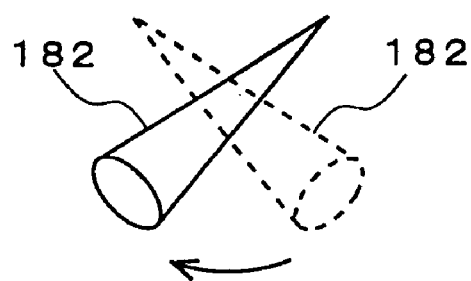
Figure 38C:
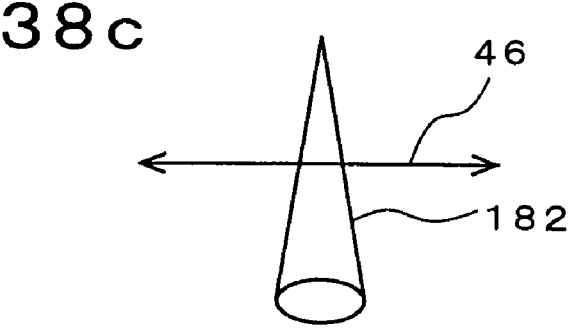

For example, as shown in FIGS. 38a through 38c, if UV is irradiated so that a polarizing axis 46 of the polarized UV to be irradiated is in accordance with the direction of a minor axis of a liquid crystal molecules 182, the degradation of the liquid crystal 22 can be suppressed. FIG. 38a shows a part of the area of the liquid crystal display panel viewed from the opposite substrate side. The alignment film formed on the array substrate side, as shown by an arrow 180 of a dotted line in the diagram, is performed the rubbing treatment from upper left to lower right and the alignment film formed on the opposite substrate 4 side, as shown by an arrow 178 of a solid line in the diagram, is performed the rubbing treatment from upper right to lower left in the direction substantially orthogonal to the arrow 180. As a result of this rubbing treatment, the liquid crystal molecules 182 of the liquid crystal 22, as shown in FIG. 38b, are arranged adjacent to the surfaces of both substrate 4 and 16 so that a major axis is twisted 90° from the rubbing direction. With respect to such a torsion alignment as shown in FIG. 38c, if UV light having the polarizing axis 46 in the direction orthogonal to the half way of the direction of the major axis of the liquid crystal molecules 182 adjacent to both substrate surfaces shown in FIG. 38b is irradiated, irradiation in a state that the refraction index of liquid crystal is reduced can be realized.

Figure 39A:
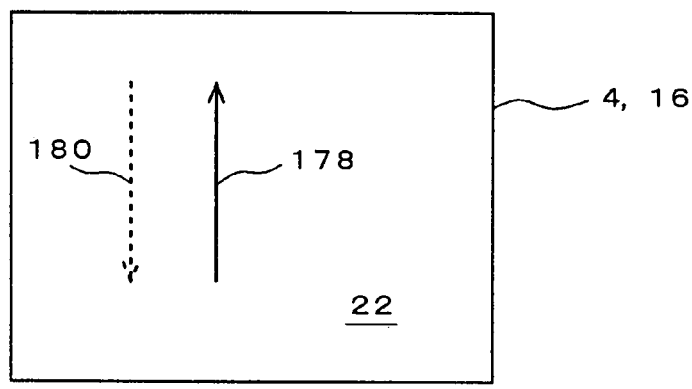
FIGS. 39a and 39b are diagrams describing the direction of the polarizing axis 46 in irradiation of the polarized UV according to the ninth embodiment of the present invention.
Figure 39B:
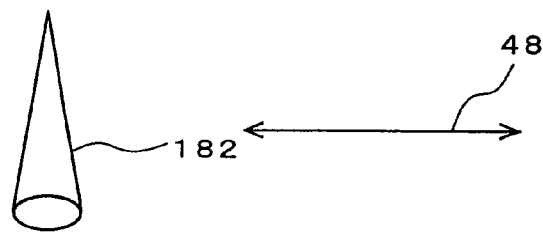

An example applied to an arrangement of other liquid crystal molecules is described with reference to FIGS. 39a and 39b. FIG. 39a shows a part of the liquid crystal display panel viewed from the opposite substrate side. The alignment film formed on the array substrate 16 side, as shown by the arrow 180 of a dotted line in the diagram, is performed the rubbing treatment from up to down in the diagram, and the alignment film formed on the opposite substrate 4 side, as shown by the arrow 178 of a solid line in the diagram, is performed the subbing treatment from down to up. As a result of this rubbing treatment, the major axis of the liquid crystal molecules 182 is an arrangement contained in a plane vertical to the substrate. In such an alignment, as shown in FIG. 39b, if UV light having the polarizing axis 48 in the direction orthogonal to the direction of the major axis of the liquid crystal molecules 182, irradiation in a state that the refraction index of liquid crystal is reduced can be realized.

EXAMPLE 2

A panel by instillation is fabricated by using the similar glass substrate to the one in Example 1. The rubbing direction of the alignment film is, as shown in FIG. 39a, an anti-parallel direction and a liquid crystal cell is homogeneous. A liquid crystal panel irradiated the polarized UV having the polarizing axis in the direction of the major axis of the liquid crystal and the liquid crystal panel irradiated the polarized UV having the polarizing axis in the direction of the minor axis of the liquid crystal are fabricated. As a result of comparison at predetermined areas, it is confirmed that the voltage retention ratio is higher and the ion density is lower in the liquid crystal panel irradiated polarized UV having the polarizing axis in the direction of the minor axis of the liquid crystal.

Thus, according to this embodiment, degradation of the liquid crystal 22 can be suppressed in comparison with the case of irradiation of the non-polarized UV light.

Figure 40:
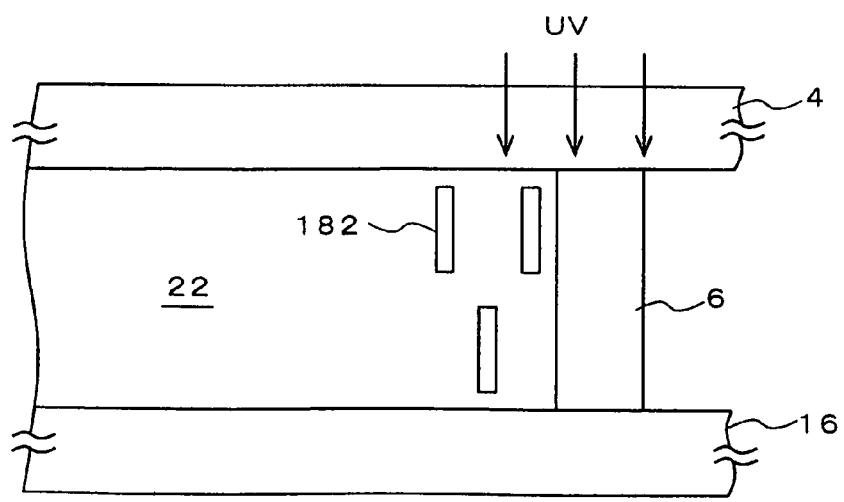
FIG. 40 is a diagram of a partial horizontal cross section of an end portion of a liquid crystal display according to a tenth embodiment of the present invention and showing a state in which a liquid crystal 22 of negative dielectric anisotropy is instilled and vertically aligned by a vertical alignment film.

Next, a liquid crystal display and a fabrication method thereof according to a tenth embodiment of the present invention are described with reference to FIG. 40 through FIG. 42b. FIG. 40 shows a state in which the liquid crystal is vertically aligned due to a vertical alignment film by instilling the liquid crystal 22 of, for example, a negative dielectric anisotropy. In this case, since the major axis of the liquid crystal molecules 182 is substantially parallel to the irradiation direction of an UV light UV7 for irradiating the sealing material 6, dependency of polarizing direction against the UV light to be irradiated can be reduced. Thus, the light UV7 can be non-polarized.

Figure 41A:
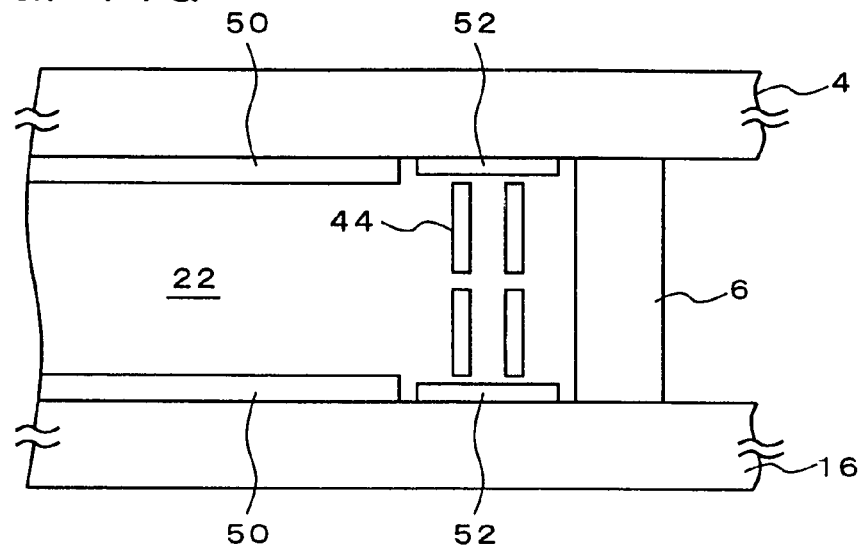
FIGS. 41a through 41c are diagrams of a partial horizontal cross section of the end portion of a liquid crystal display according to the tenth embodiment of the present invention and showing a state in which a liquid crystal 22 of positive dielectric anisotropy is instilled and vertically aligned by the vertical alignment film.

Further, for example, when fabricating a liquid crystal display panel using the liquid crystal 22 of positive dielectric anisotropy, as shown in FIG. 41a, an alignment film 50 for a horizontal alignment is formed in the main portion of the display area and adjacent to the sealing material 6 aside from the alignment film 50, a vertical alignment film 52 for vertically aligning the liquid crystal is formed. Thus, when irradiating UV for curing the sealing material 6, even if leaked light is incident on the liquid crystal 22 adjacent to the sealing material 6, since the major axis of the liquid crystal molecules 182 is parallel to the irradiation direction of UV light, dependency of polarizing direction is small, therefore degradation of liquid crystal can be suppressed even with non-polarized UV light.

Figure 41B:
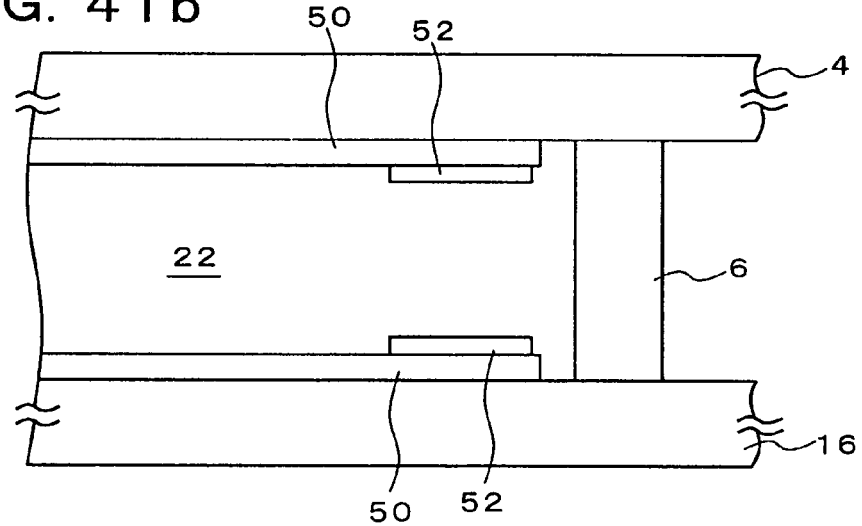
Figure 41C:
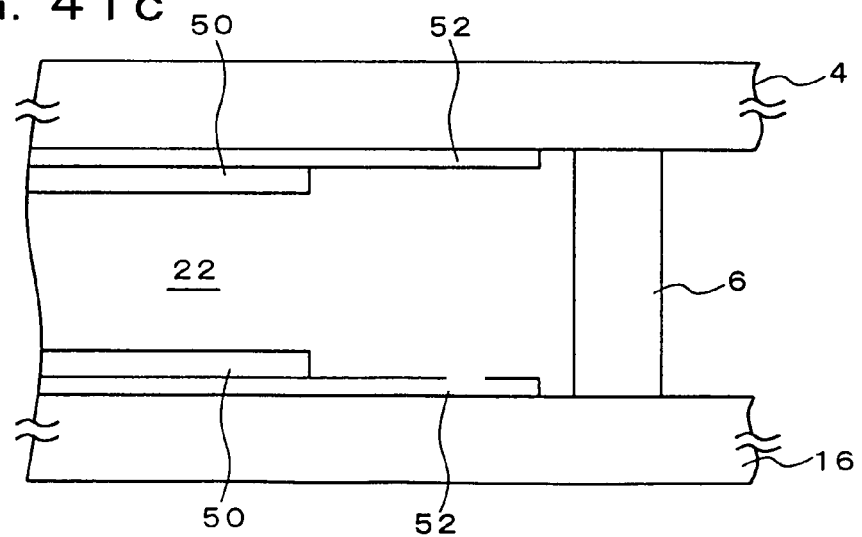

FIG. 41b shows a structure of an example of a variation in which the alignment film 50 for horizontal alignment is formed as far as adjacent to the sealing material 6, and the alignment film 52 for vertical alignment is separately formed on the alignment 50 adjacent to the sealing material 6. Further, FIG. 41c shows a structure of an example of another variation in which the alignment film 52 for vertical alignment is formed as far as adjacent to the sealing material 6 and the alignment film 50 for horizontal alignment is separately formed on the alignment film 52.

Figure 42A:
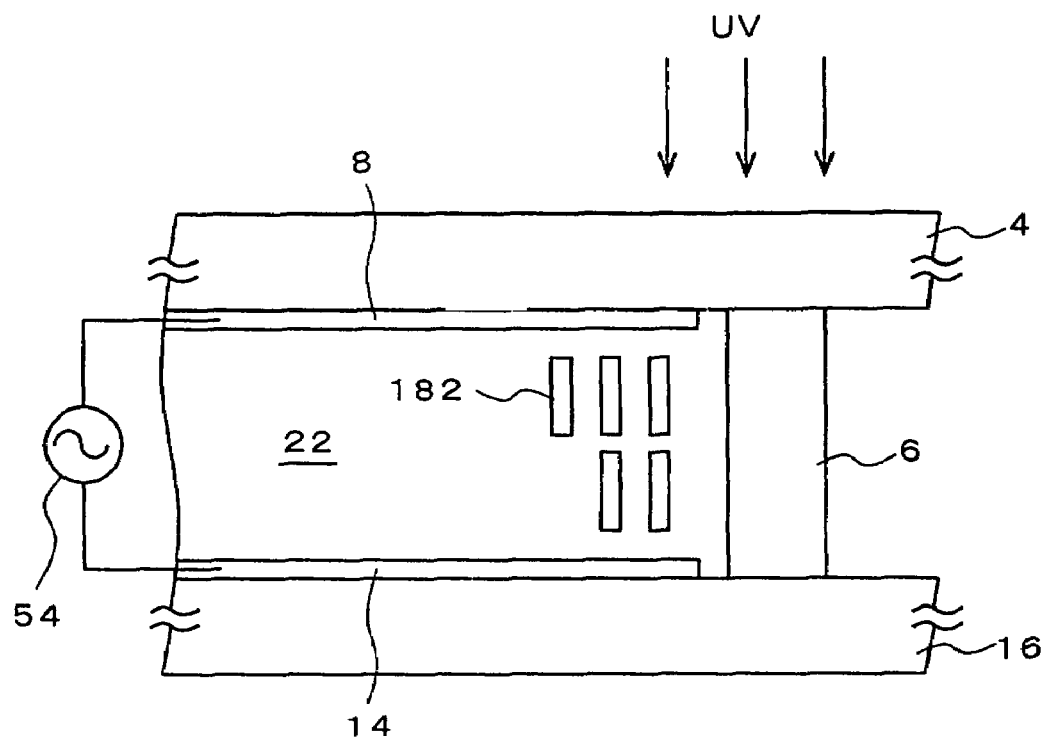
FIGS. 42a and 42b are diagrams of a partial horizontal cross section of the end portion of the liquid crystal display according to the tenth embodiment of the present invention and showing a state in which the liquid crystal 22 of positive dielectric anisotropy is instilled and vertically aligned by applying voltage to the liquid crystal 22.
Figure 42B:
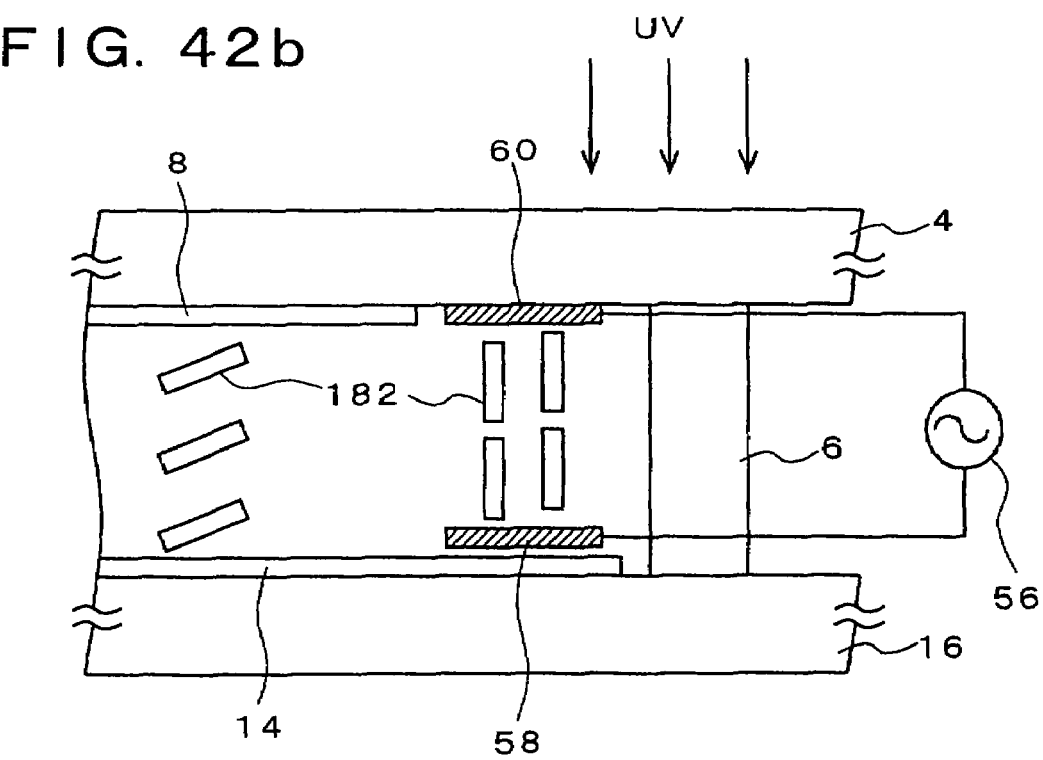

Furthermore, when the liquid crystal 22 has a positive dielectric anisotropy, by adopting a structure shown in FIGS. 42a and 42b, degradation of liquid crystal can be suppressed even if non-polarized UV light is irradiated. FIG. 42a shows, when irradiating UV for curing the sealing material, that the liquid crystal molecules 182 adjacent to the sealing material 6 are vertically aligned by applying voltage between a display electrode 14 on the array substrate 16 adjacent to the sealing material 6 and a common electrode of an opposite electrode 4 by a voltage supply source 54. Thus, even if leaked light is incident on the liquid crystal 22 adjacent to the sealing material 6 when irradiating UV to cure the sealing material 6, since the major axis of the liquid crystal molecules 182 is parallel to the irradiation direction of UV irradiation light, dependency of polarizing direction is small, therefore degradation of liquid crystal can be suppressed even if UV light is non-polarized.

Also, as shown in FIG. 42b, another electrode 58 electrically isolated from the pixel electrode 14 may be formed in advance on the array substrate 16 adjacent to the sealing material 6, and another electrode 60 electrically isolated from the common electrode 8 may be formed on the opposite substrate 4 adjacent to the sealing material 6. The electrodes 58 and 60 are connected to a driving power source 56.

When irradiating UV to cure the sealing material 6, voltage is applied between the electrodes 58 and 60 by the driving power source 56 and the liquid crystal molecules 182 adjacent to the sealing material 6 are vertically aligned. Even if leaked light from UV irradiation is incident on the liquid crystal 22 adjacent to the sealing material 6, since the major axis of the liquid crystal molecules 182 are parallel to the irradiation direction of UV irradiation light, dependency of polarizing direction is small, therefore degradation of liquid crystal can be suppressed even if UV light is non-polarized. If the structures shown in FIG. 41a through 41c, and FIG. 42b are used in a normally white-type liquid crystal display, the area between the alignment films 52 or the area between the electrodes 58 and 60 can function as the picture-frame portion of display area.

EXAMPLE 3

The panel is fabricated by using the similar glass panel and instillation to Example 1. The alignment film is rubbed as if forming the TN liquid crystal cell. When both substrates are attached and UV light is irradiated to the sealing material 6, the liquid crystal 22 between the electrodes 58 and 60 is vertically aligned by applying rectangular wave equal to 5V (30 Hz) to the electrodes 58 and 60 shown in FIG. 42*b* and the sealing material 6 is cured. As a result, excellent results are shown in both voltage retention ratio and ion density in comparison with when voltage is not applied.

Next, a liquid crystal display and a fabrication method thereof according to an eleventh embodiment of the present invention are described with reference to FIG. 43*a* through FIG. 55. It will be noted that the structuring elements having the same operation functions as in the first through tenth embodiments are referred by the same codes and the descriptions are omitted. In this embodiment, an object is to realize a narrow picture frame and a big effect can be achieved by combining a reflective type LCD or technology to form CF on the array side. Further, this technology can be applied to an instilling method in a fabrication process of a polymer dispersion-type liquid crystal display (PDLC).

In recent years, the PDLC providing a picture display high in brightness without using a polarization plate as in the past is proposed by using polymer dispersion-type liquid crystal in which nematic liquid crystal is dispersed and maintained in a polymer having the similar refraction rate to a liquid crystal molecules and performing switching by applying voltage between the two substrates sandwiching this polymer dispersion-type liquid crystal. Fabrication methods of this PDLC include, for example, a method of making an uniform solution of liquid crystal and polymerized material, filling up the liquid crystal panel and then phase-separating by photo-polymerization and forming a phase-separated structure.

Usually, since the amount or wavelength of exposure required for polymerizing liquid crystal and curing a sealing material are different, if UV light required for irradiating the sealing material of a photo-curing-type resin is irradiated to liquid crystal, the liquid crystal is inadequately exposed. In this embodiment, a structure and a method to prevent this are described by using examples. When the instilling method is used in a fabrication process of the PDLC panel, by introducing the technique described below, reduction of picture-frame width of a panel can be realized and at the same time a fabrication line to fabricate a polymer dispersion-type liquid crystal display by a simple process can be realized.

Although previously explained in the above embodiment, in order to realize a reduction in picture-frame width of a panel in the instilling method, forming a sealing material in the BM picture-frame portion on the color filter (CF) side is essential. In this embodiment, light is irradiated from the array substrate side so that the sealing material at lower part of the BM picture-frame portion can be sufficiently cured. A wraparound phenomenon of the light is generated by a plurality of wirings formed on the array substrate side and the light is highly effectively transmitted in the sealing material. Descriptions based on examples follow.

EXAMPLE 4

Example 4 is described with reference to FIG. 43*a* through FIG. 46.

UV light is not necessarily required to be irradiated in the whole area of the sealing material to photo-curing the UV curing-type sealing material 6 coated on the opposite substrate 4. Because, the light incident upon the sealing material 6 wraparounds other areas than the irradiated area by dispersing and internally reflecting. The distance in which the wraparounding of the light can be expected is equal to approximately 200 μm. Therefore, if a wiring 78 is within 400 μm in width (L), the sealing material 6 can be sufficiently cured by the effects of the wraparounding of the light from both edge of the wiring 78.

Further, in order to realize a narrow picture-frame panel, the sealing material 6 is required to be coated so that a part or all of the contacting area with the substrate of the sealing material 6 overlaps inside the BM picture-frame portion. Usually, the BM picture-frame portion 108 is formed by depositing a low-reflection chrome (Cr) film or a black-color resin on the opposite substrate 4 side where the CF is to be formed. Since the transmissivity of light at the BM picture-frame portion 108 is extremely small, in order to irradiate UV light to the sealing material 6 overlapping with the bottom of the BM picture-frame portion 108, UV irradiation is performed from the array substrate 16 side via the wiring 78 just under the sealing material 6.

Figure 43A:
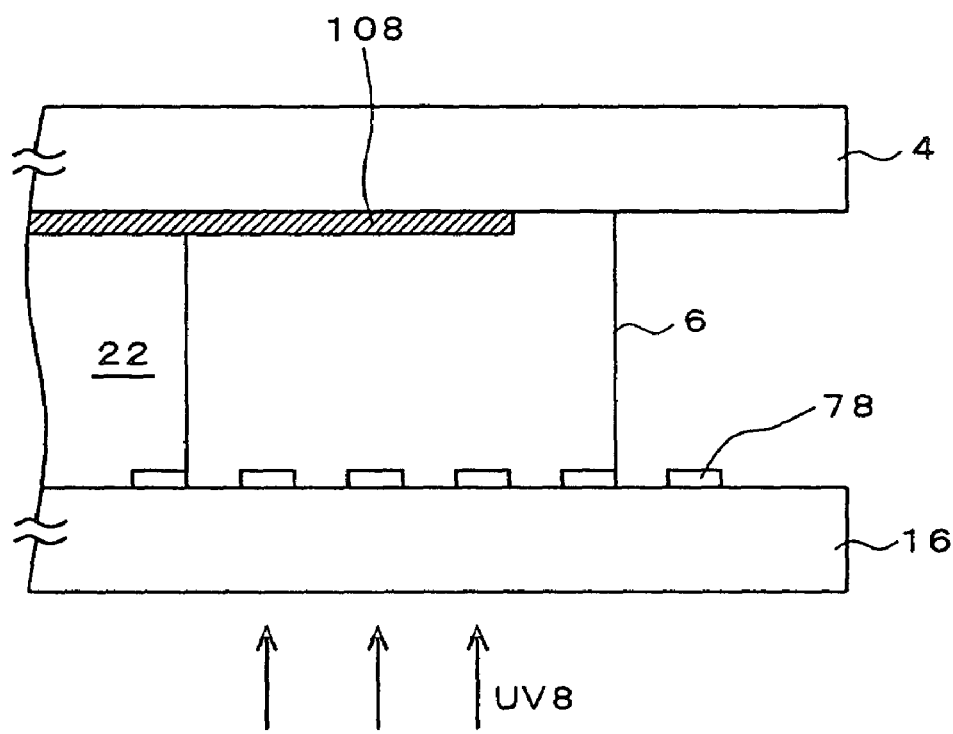
FIGS. 43a and 43b are diagrams describing Example 4 in a liquid crystal display according to an eleventh embodiment of the present invention.
Figure 43B:
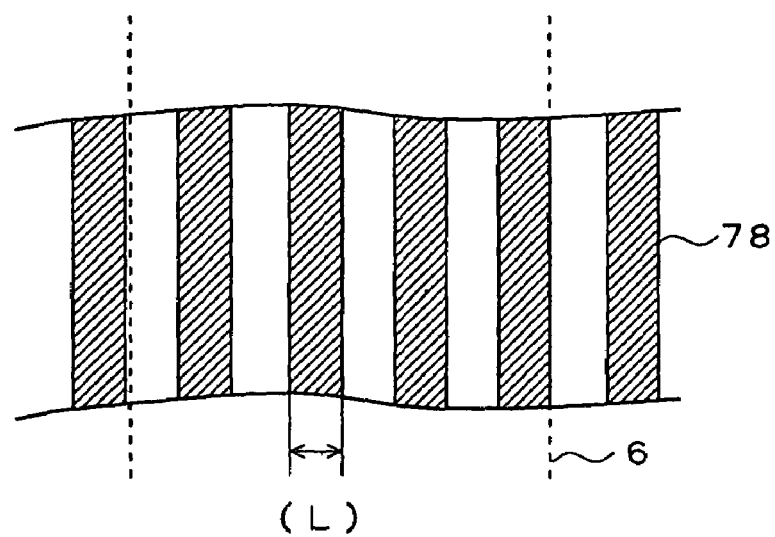

FIG. 43*a* is an example showing a schematic structure of a part of the cross section at the end portion of the liquid crystal panel. FIG. 43*b* is a partial plan view of the end portion of the panel viewed toward the array substrate surface. In the contacting area of sealing material 6 on the array substrate 16 which is a transparent glass substrate, the wiring 78 of the TFT (thin film transistor) or formation metal of the gate/drain bus line is used. In the example shown in FIGS. 43*a* and 43*b*, the plurality of the wirings 78 extending along the coating direction of the sealing material 6 are formed in parallel. The wiring 78 is equal to approximately 400 μm in width (L) as described above. The width between the wirings is also equal to approximately 400 μm. The sealing material 6 contacts with the array substrate 16 on the plurality of the wirings 78. The other end of the sealing material 6 contacts with the opposite substrate 4 where the BM picture-frame portion 108 is formed. Approximately 80% of the contacting area at the other end of the sealing material 6 overlaps with the BM picture-frame portion 108. The liquid crystal 22 is sealed between both substrates. If a UV light UV8 is irradiated from the array substrate 16 side in such a structure, the light UV8 wraparounds inside the sealing material 6 by the wiring 78, is further reflected at the BM picture-frame portion 108 and is dispersed inside the sealing material 6 after a part of the UV light is still more reflected on the back of the wiring 78, thereby sufficiently curing the whole sealing material 6.

Figure 44:
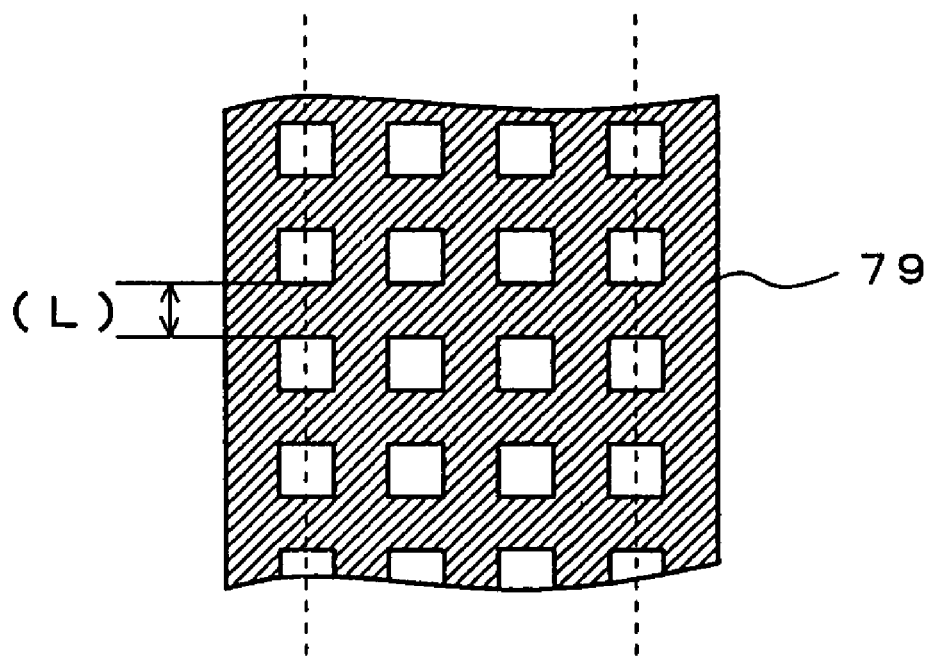
FIG. 44 is a diagram describing Example 4 in the liquid crystal display according to the eleventh embodiment of the present invention.
Figure 45:
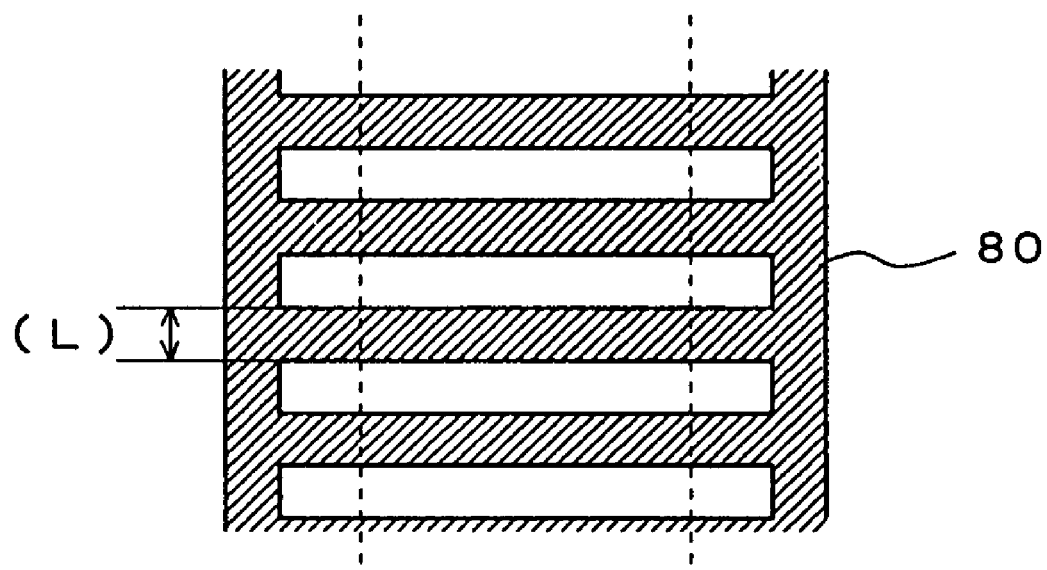
FIG. 45 is a diagram describing Example 4 in the liquid crystal display according to the eleventh embodiment of the present invention.
Figure 46:
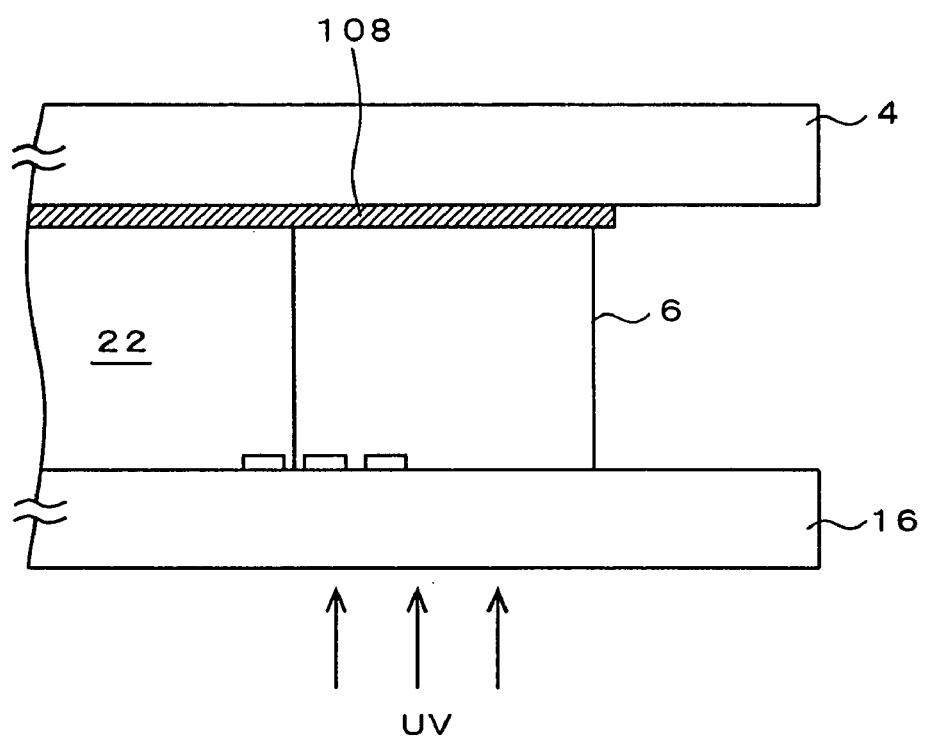
FIG. 46 is a diagram describing Example 4 in the liquid crystal display according to the eleventh embodiment of the present invention.

FIG. 44 shows an example of a variation of the wiring 78 shown in FIG. 43*b*. While the wiring 78 shown in FIG. 43*b* has a stripe pattern, a wiring 79 shown in FIG. 44 has a structure forming a plurality of short light transmission windows in the area where a plurality of wirings orthogonally cross. The width (L) of the wirings is also equal to 400 μm in this example. A wiring 80 shown in FIG. 45 is also an example of a variation of the wiring 78 and has a formation having a plurality of wirings bridged over the two wirings formed on the side of the contacting area of sealing material. The width (L) of each wiring is equal to 400 μm. FIG. 46 shows an example of a variation of the panel shown in FIG.

43a. The whole contacting area of the sealing material 6 on the opposite substrate 4 side overlaps with the BM picture-frame portion 108. By irradiating UV light from the array substrate 16 side, the sealing material can be sufficiently cured in this case as well.

EXAMPLE 5

Example 5 is described with reference to FIGS. 47a, 47b and FIG. 48.

As previously described in the above embodiment, the peaks of bright lines which particularly degrade liquid crystal among the ultraviolet lights transmitting the glass substrate are the line j (313 nm) and the line i (365 nm). In the case of a UV incidence from the color filter side, the CF color plate hardly transmits the line j nor the line i and the BM does not transmit the line nor the line I at all. In short, when entering the UV light from the array substrate 16 side of the transmission-type liquid crystal display, the degradation of the liquid crystal 22 can be prevented by forming the color filter on the array substrate 16 side. Further, in the reflection-type liquid crystal display, a reflection electrode can perform a function of shading to some extent.

Figure 47A:
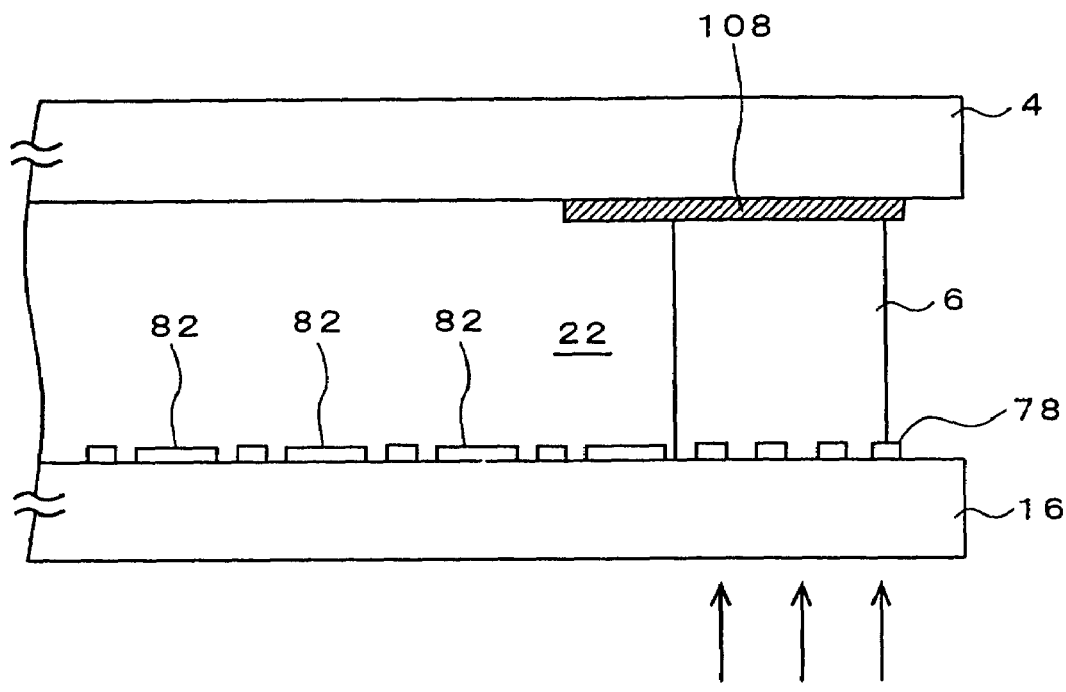
FIGS. 47a and 47b are diagrams describing Example 5 in the liquid crystal display according to the eleventh embodiment of the present invention.
Figure 47B:
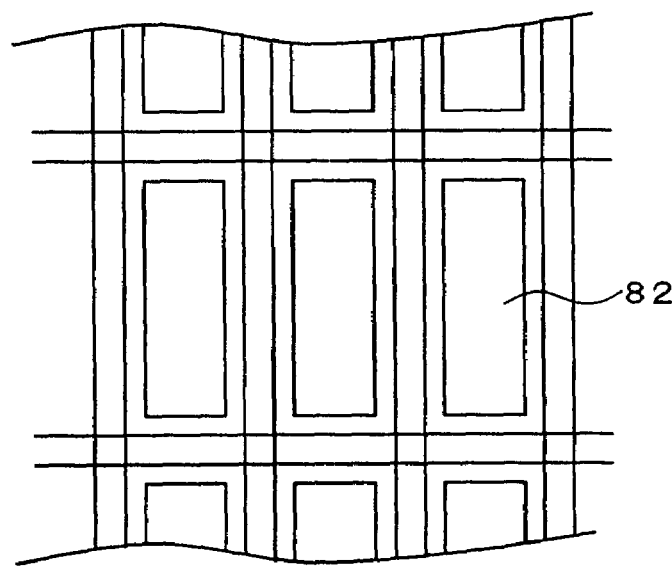
Figure 48:
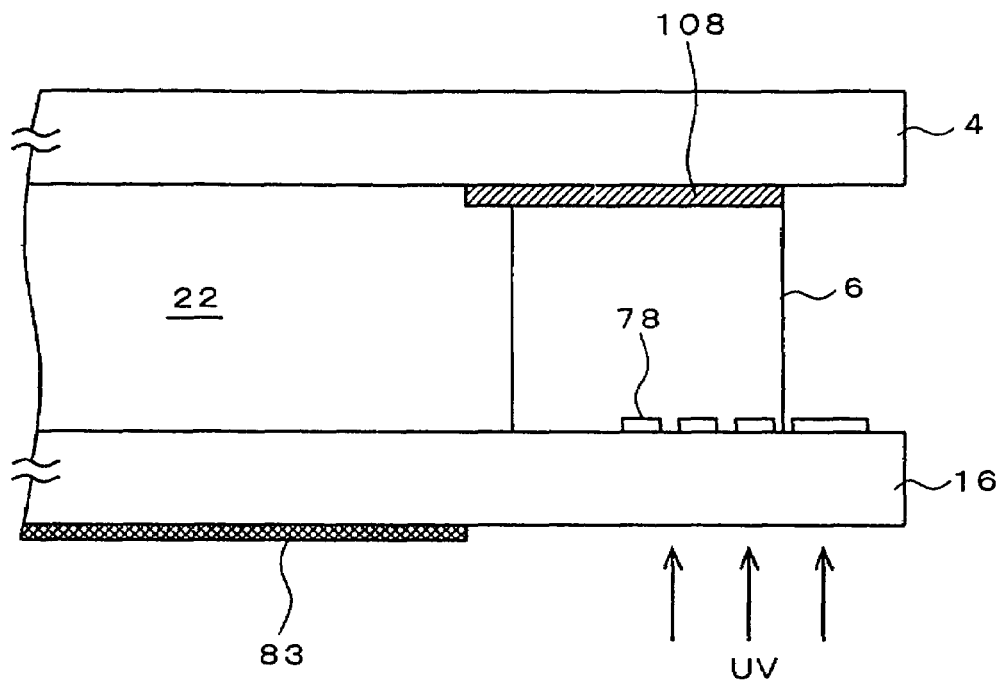
FIG. 48 is a diagram describing Example 5 in the liquid crystal display according to the eleventh embodiment of the present invention.

FIG. 47a is an example showing a schematic structure of a part of the cross section of the end portion of the liquid crystal panel. FIG. 47b is a partial plan view of the end portion of the panel viewed toward the array substrate surface. The panel shown in FIGS. 47a and 47b forms a CF 82 in the area forming a pixel on the array substrate side. Therefore, by blocking at least the line j and the line i among UV lights, the degradation of the liquid crystal 22 can be prevented. FIG. 48 shows a reflection-type liquid crystal display panel utilizing a reflection electrode 83 as an UV shading film to block the line j and the line i. The reflective electrode may be formed on the side where the liquid crystal of the array substrate surface is filled.

EXAMPLE 6

Figure 49:
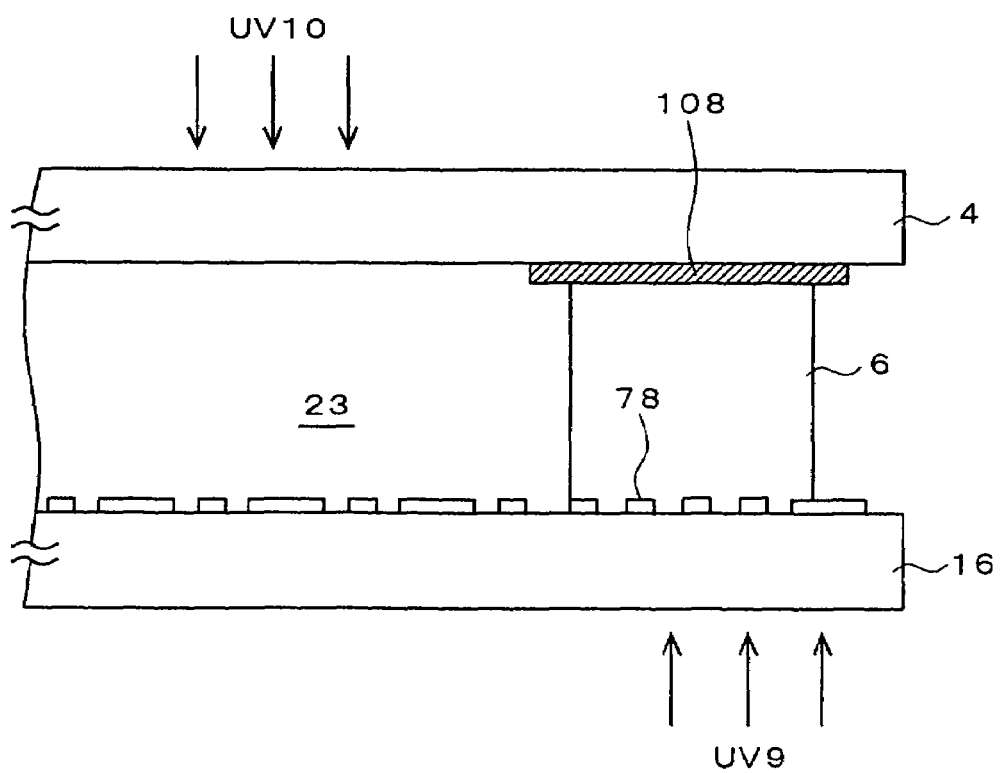
FIG. 49 is a diagram describing Example 6 in the liquid crystal display according to the eleventh embodiment of the present invention.

Example 6 is described with reference to FIG. 49.

When a photo-curing-type liquid crystal 23 is used, conditions for the light irradiation to the liquid crystal 23 and to the sealing material 6 are different. In this example, an UV light UV9 irradiating the sealing material 6 is equal to approximately 1000 mJ/cm$^2$ in irradiation energy. Further, an UV light UV10 irradiating the liquid crystal 23 is equal to approximately 2000 mJ/cm$^2$ in irradiation energy without the CF. The UV light UV9 for curing the sealing material 6 is irradiated from the array substrate 16 side via the wiring 78 and the like. The UV light UV10 for polymerizing the liquid crystal 23 is irradiated from the opposite substrate 4 side. At this irradiation, the color filter may be formed on either substrates. By separately using the two conditions for the irradiation with the use of separate light sources in this manner, performing of the most adequate curing for each is possible.

EXAMPLE 7

Figure 50:
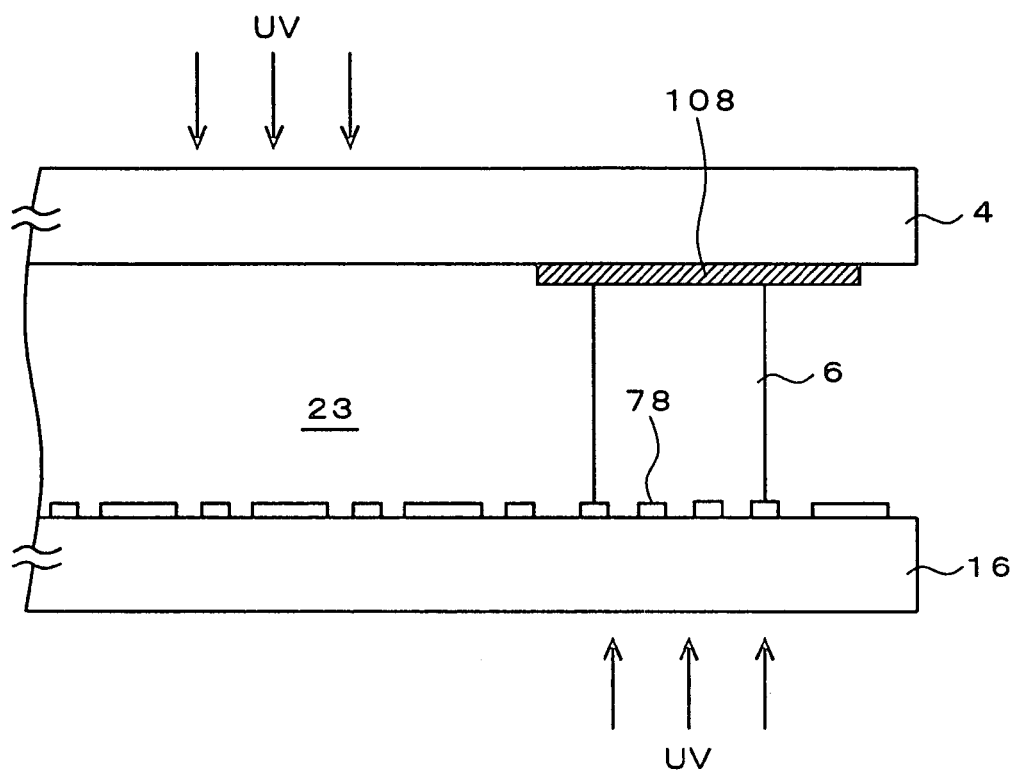
FIG. 50 is a diagram describing Example 7 in the liquid crystal display according to the eleventh embodiment of the present invention.

Example 7 is described with reference to FIG. 50.

By previously performing polymerization of the liquid crystal 23 which directly affects to the display quality of the liquid crystal display, it is possible to prevent curing of the liquid crystal 23 from inadequately starting by light leakage or wraparound of UV light when curing the sealing material 6. By curing the liquid crystal 23 in advance, contamination from the uncured sealing material 6 can be suppressed.

Further, a material having a photo-polymerization characteristic or a liquid crystal material mixed with photo-polymerization-type resin may be used for liquid crystal and a heat-curing-type material may be used for a sealing material. In this case, after attaching the two substrates, the liquid crystal can be cured by irradiating the UV light, and then heat treatment for the sealing material can be performed. Since the liquid crystal is cured in advance, contamination from uncured sealing material can be also tolerated for a long period of time in this manner.

EXAMPLE 8

Figure 51:
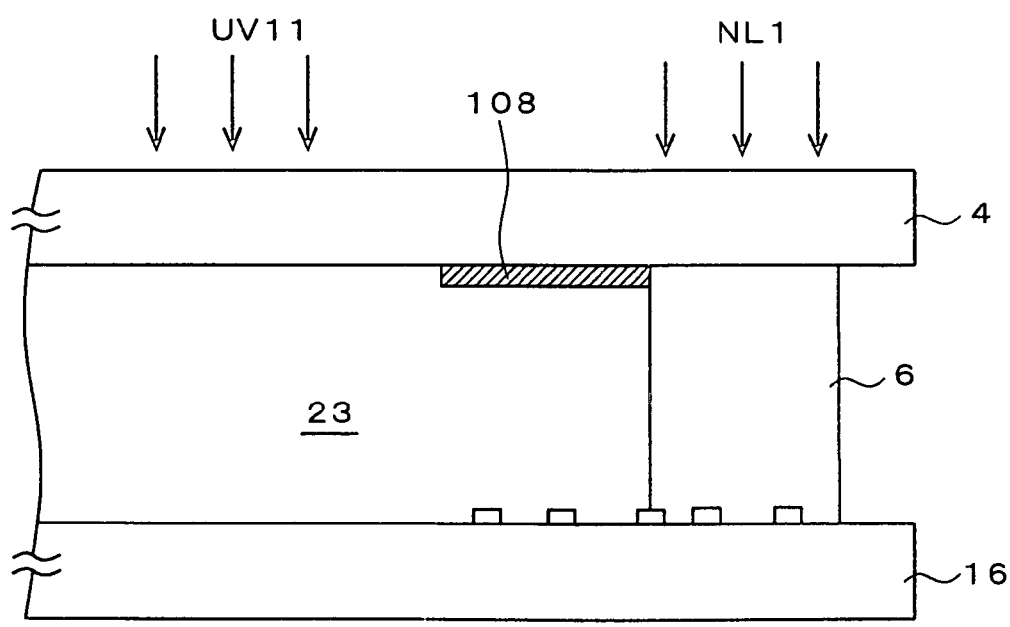
FIG. 51 is a diagram describing an example 8 in the liquid crystal display according to the eleventh embodiment of the present invention.
Figure 52:
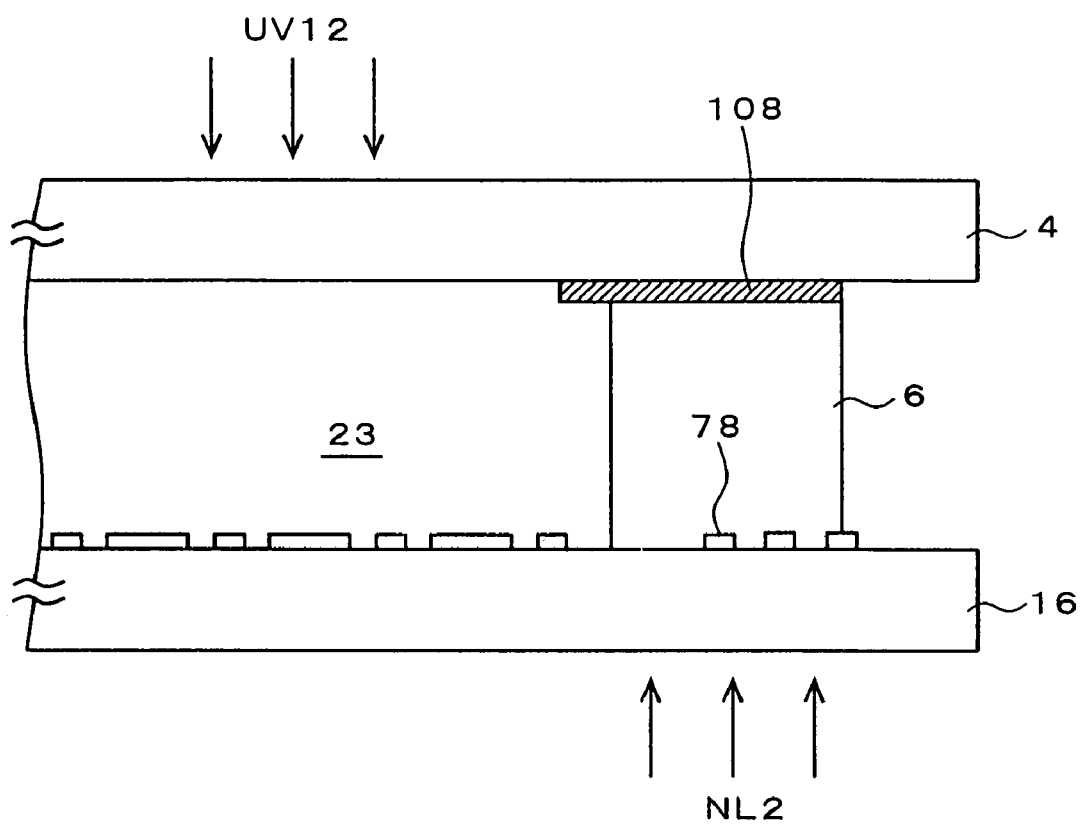
FIG. 52 is a diagram describing Example 8 in the liquid crystal display according to the eleventh embodiment of the present invention.
Figure 53:
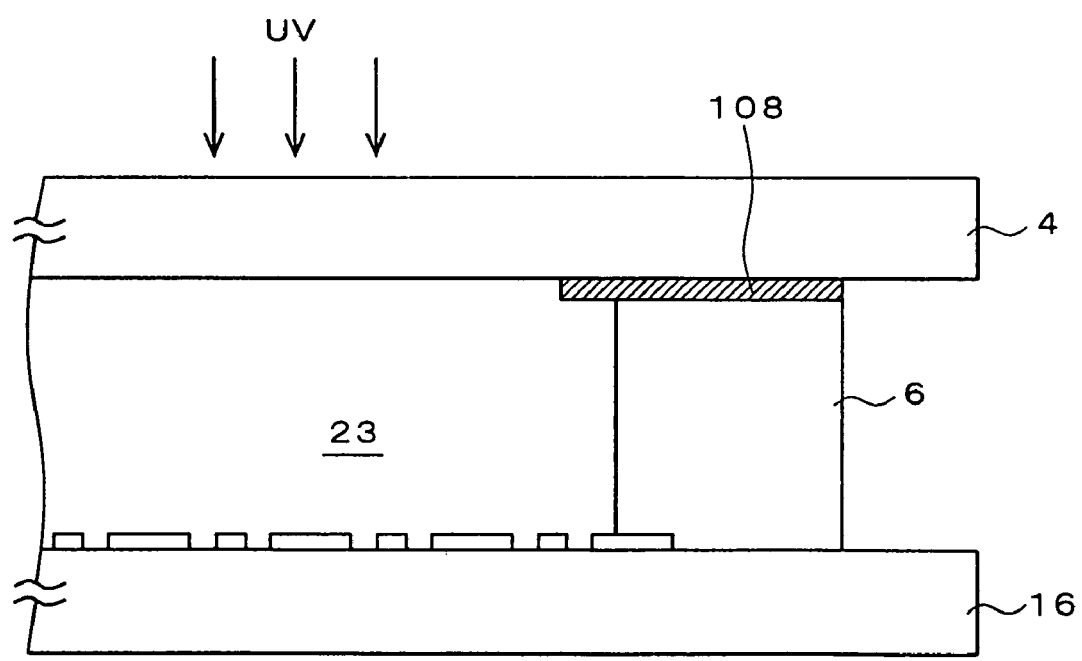
FIG. 53 is a diagram describing Example 8 in the liquid crystal display according to the eleventh embodiment of the present invention.

Example 8 is described with reference to FIG. 51 through FIG. 53.

A distinctive characteristic is that visible light photosensitive-type resin is used for the sealing material 6. Therefore, in FIG. 51, the sealing material 6 is first irradiated by a visible light NL1 and cured. At this time, even if the liquid crystal 23 is irradiated by the leaked visible light NL1, since irradiation is off the photosensitive area of the liquid crystal 23, a problem does not occur. Next, the liquid crystal 23 is exposed by irradiating a UV light UV11. At this time, even if the sealing material 6 is irradiated by the leaked light, curing of the sealing material has already been completed, thereby not resulting in any problem. In FIG. 52, the sealing material 6 is irradiated by a visible light NL2 and cured in a reflection-type liquid crystal display and the like. Then, the liquid crystal 23 is irradiated by an UV light UV12 from the opposite substrate 4 side and exposed. In FIG. 53, the visible light photosensitive-type sealing material 6 is used to cure by a natural light.

EXAMPLE 9

Example 9 is described with reference to FIG. 54.

Figure 54:
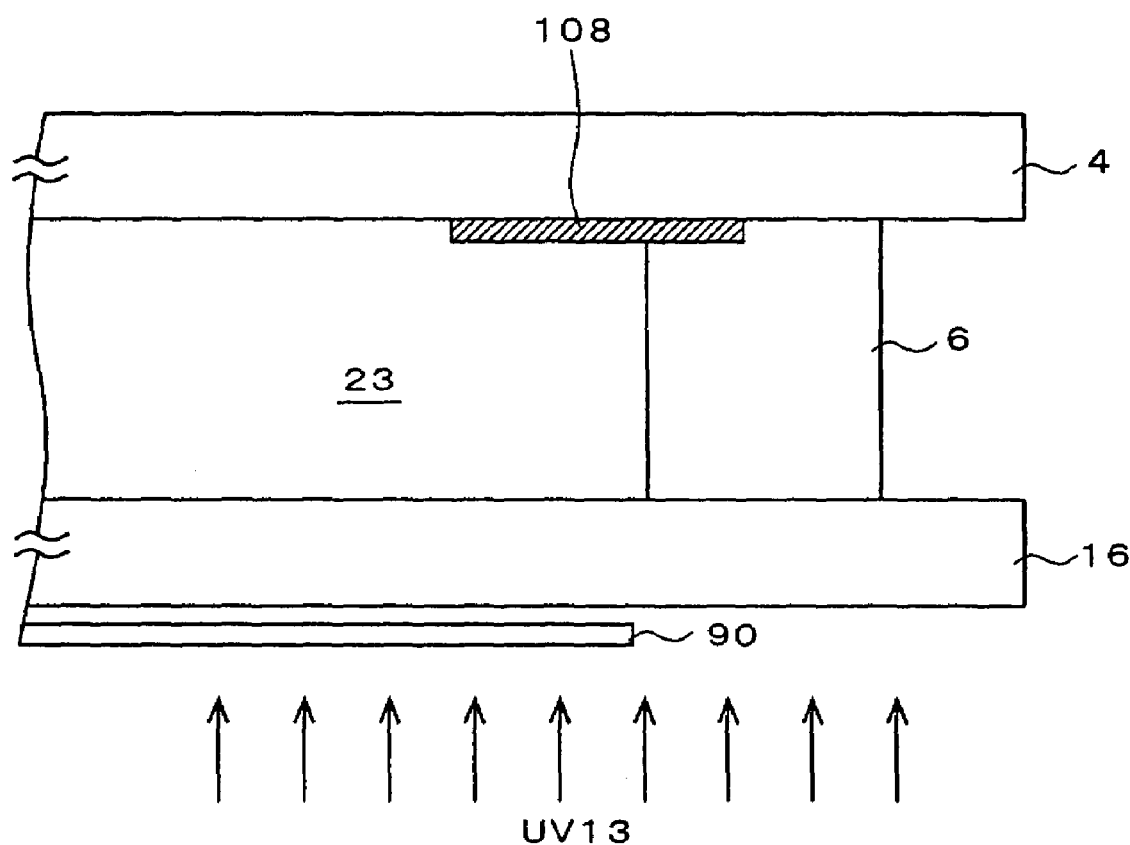
FIG. 54 is a diagram describing Example 9 in the liquid crystal display according to the eleventh embodiment of the present invention.

The liquid crystal display shown in FIG. 54 shows a state in which an UV light UV13 for curing the sealing material 6 is irradiated from the array substrate 16 side without specifically limiting the irradiation area. A filter 90 for reducing the amount of irradiation of the UV light UV13 is laminated in the area outside the irradiation area for the sealing material 6 on the surface of the light irradiation side of the array substrate 16. When a difference in condition for exposure between the liquid crystal 23 and the sealing material 6 exists in the wavelength of light, the light can be modulated by using a band-pass filter for the filter 90. When a difference in condition for exposure between the liquid crystal 23 and the sealing material 6 exists in the amount of light irradiation, the light can be modulated by using a semi-transmission-type filter for the filter 90. Further, according to this irradiation method, the UV irradiation for curing the sealing material 6 can be performed from the array substrate 16 side and at the same time the UV irradiation for the liquid crystal 23 can be performed from the opposite substrate 4 side.

EXAMPLE 10

Figure 55:
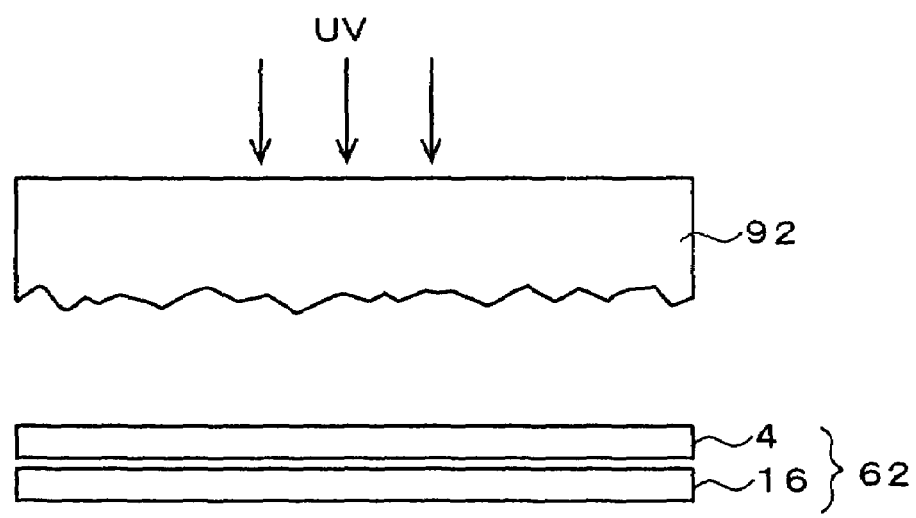
FIG. 55 is a diagram describing Example 10 in the liquid crystal display according to the eleventh embodiment of the present invention.

Example 10 is described with reference to FIG. 55. FIG. 55 shows a state in which a light dispersion member 92 made of glass or film forming irregularities on the surface for dispersing irradiated light is inserted between the light source for irradiation and the attached substrate 62. In this manner, the phenomenon of wraparound of light already described in the above example can be effectively generated.

Next, a fabrication method of a liquid crystal display according to a twelfth embodiment of the present invention is described with reference to FIGS. 56a and 56b. In this embodiment, a fabrication of a liquid crystal display in which peeling of a sealing material is prevented and instillation in the cell process can be steadily performed is described.

FIGS. 56a and 56b show instillation of liquid crystal in the cell process for the liquid crystal panel according to this embodiment. FIG. 56a shows a state in which substantially the same amount as liquid crystals are dropped on the array substrate surface in the sealing material 6 so that distances for dispersion between the adjacent drops of fluid are substantially the same, and liquid crystals 188 having the amount less than the dropping amount of the liquid crystal 184 are dropped at positions where the dispersion of liquid crystal is sparse in the external periphery of the liquid crystal 184. With respect to the dropping position of each liquid crystal 184, the distances to positions where adjacent liquid crystals 184 are dropped have a relationship of d1=d2=d3=d4=d5=d6 as shown in the diagram. FIG. 56b shows a state in which the liquid crystals 184 and 188 are dispersed after the array substrate and the CF substrate are attached. As shown in FIG. 56b, in this embodiment, a gap 186 at dispersion of liquid crystal after the substrates are attached is small and dispersion of liquid crystal can be completed as little as less than 5 minutes. Therefore, peeling of a seal as in the past does not occur and neither does a leakage of liquid crystal.

Thus, this embodiment has a distinctive characteristic in varying the amount of liquid crystals 184 and 188 to be dropped depending on a dropping position in the fabrication process of the liquid crystal display having the process in which the array substrate 16 and the CF substrate 4 are attached after liquid crystal is dropped at a plurality of positions on the array substrate 16. Further, another distinctive characteristic is that liquid crystal is dropped by combining a dropping pattern for deciding the positions to drop the liquid crystal 184 and a dropping pattern for deciding the positions to drop the liquid crystal 188. In this example, according to the dropping pattern for deciding the dropping positions for the liquid crystal 184, substantially the same amounts of the liquid crystal are dropped so that the distances for dispersion between the adjacent drops of fluid are substantially the same and according to the dropping pattern for deciding dropping positions for the liquid crystal 188, liquid crystal in the amount less than the amount of the liquid crystal 184 is dropped in positions where dispersion of liquid crystal is sparse at the external periphery of the liquid crystal 184.

As explained above, by dividing the dropping amount of liquid crystal and the dropping patterns into at least two kinds and performing liquid crystal instillation, the liquid crystal inside the liquid crystal display panel can be rapidly and substantially evenly dispersed. Although drops of liquid crystal fluid disperse in a circular shape when attaching the substrates, if liquid crystal is dropped so that the distances for dispersion between the adjacent drops of fluid are substantially the same, interference among the adjacent drops of fluid is minimized and the rectangular-shape area decided by the frame-shape of the sealing material can be densely filled up with circular-shape drops of liquid crystal fluid. Further, if an area where dispersion of liquid crystal is sparse in the external periphery of the dropping positions is created, the amount of liquid crystal adequate for that area can be supplemented. Thus, dispersion of liquid crystal is substantially evenly rapid in both corner portions and inside the panel, thereby preventing occurrences of defects as in the past.

Figure 57:
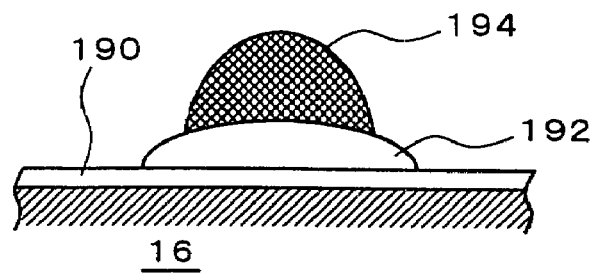
FIG. 57 is a diagram briefly describing an instillation in a fabrication method of a liquid crystal display according to a thirteenth embodiment of the present invention.

Next, a liquid crystal display according to a thirteenth embodiment of the present invention is described with reference to FIG. 57 through FIG. 60. This embodiment relates to a fabrication method of a liquid crystal display according to the instilling method and is specifically preferable to be used in a fabrication method of an MVA type liquid crystal panel. First, an instillation according to this embodiment is briefly described with reference to FIG. 57. FIG. 57 shows a cross section of a substrate cut vertical to the substrate surface. In the fabrication method of a liquid crystal display having processes in which liquid crystal is dropped on one substrate (for example, TFT substrate) 16, the one substrate 16 and the other substrate are attached by the sealing material made of photo-curing-type material, and the sealing material is irradiated by light and cured, this embodiment shown in FIG. 57 has a distinctive characteristic that liquid crystals 192 and 194 are dropped by dividing the liquid crystal instillation into more than two sessions and at the same time the components (structure, composition ratio, etc.) of those liquid crystals 192 and 194 are different. In other words, in this embodiment, the liquid crystal 192 contacting the surface of an alignment film 190 under an atmospheric pressure and the liquid crystal 194 contacting the surface of the alignment film 190 in a vacuum are made of different materials. In order to realize this, when instilling liquid crystal, the liquid crystal 192 higher in reliability is dropped on the substrate 16 and to be contacted with the alignment film 190 for the first time and from the second time, the liquid crystal 194 slightly inferior in reliability than the first time is overlappingly dropped in the area (the same substrate side) where the liquid crystal 192 is dropped the first time.

Figure 58:
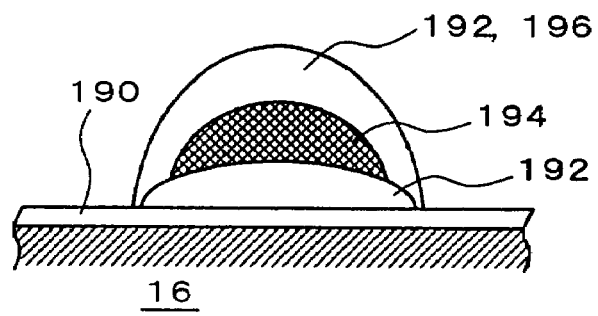
FIG. 58 is a diagram briefly describing the instillation in the fabrication method of the liquid crystal display according to the thirteenth embodiment of the present invention.

Further, as shown in FIG. 58, from the third time, by dropping the liquid crystal 192 or another liquid crystal 196 higher in reliability, the liquid crystal 194 slightly inferior in reliability may be covered by the liquid crystals 192 or 196 which are higher in reliability.

Figure 59:
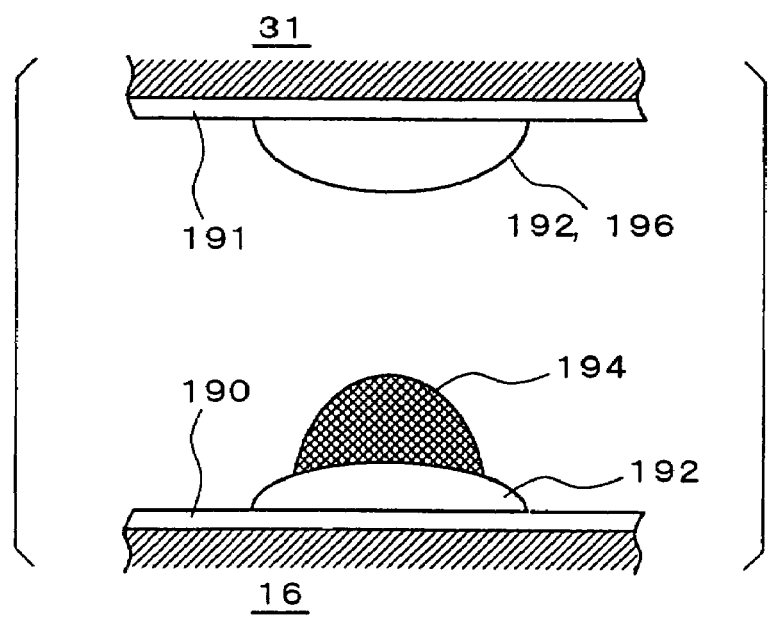
FIG. 59 is a diagram briefly describing the instillation in the fabrication method of the liquid crystal display according to the thirteenth embodiment of the present invention.

As shown in FIG. 59, the liquid crystal 192 higher in reliability may be dropped on the substrate 16 for the first time to be contacted with the alignment film 190, the liquid crystal 194 slightly inferior in reliability may be dropped in the area (the same substrate side) where the first dropping has been performed and then the liquid crystal 192 or 196 high in reliability may be dropped in the corresponding area on an opposite substrate 31 facing the substrate 16 and attach.

Here, the reliability of liquid crystal relates to a characteristic value (physical property value) owned by the liquid crystal material and, generally the following relationship is established. In other words, the resistivity of the liquid crystals 192 and 196 higher in reliability is higher than that of the liquid crystal 194 slightly inferior in reliability, and the liquid crystals 192 and 196 higher in reliability fulfills the requirement of resistivity equal to be more than $10^{14} \Omega \cdot cm$. Further, the absolute value ($|\Delta\epsilon_{192}|$ or $|\Delta\epsilon_{196}|$) of dielectric anisotropy for the liquid crystals 192 and 196 higher in reliability is desired to be smaller than the absolute value of dielectric anisotropy for the liquid crystal 194 slightly inferior in reliability is desirable. The average dielectric constant $\epsilon_{192}$ and $\epsilon_{196}$ [average dielectric constant: $\epsilon=(2\epsilon\perp+\epsilon//)/3$] of the liquid crystals 192 and 196 higher in reliability are desired to be less than 5.

As an example distinctly differentiating the reliabilities of the two liquid crystals, for example in FIG. 59, a neutral material (neutral component) having no strong polar group may be dropped as the liquid crystals 192 and 196 higher in reliability and a liquid material (P-type·N-type material) having a polar group of fluorine and the like may be dropped as the liquid crystal 194 slightly inferior in reliability.

Further, by dropping the second liquid crystal 194 on the first liquid crystal 192 previously dropped, it is required that the liquid crystal 192 does not contact with the surface of the alignment film under the atmospheric pressure. So, the surface tension of the liquid crystals 192 and 196 higher in reliability is desired to be smaller than the surface tension of the liquid crystal 194 slightly less in reliability.

Figure 60:
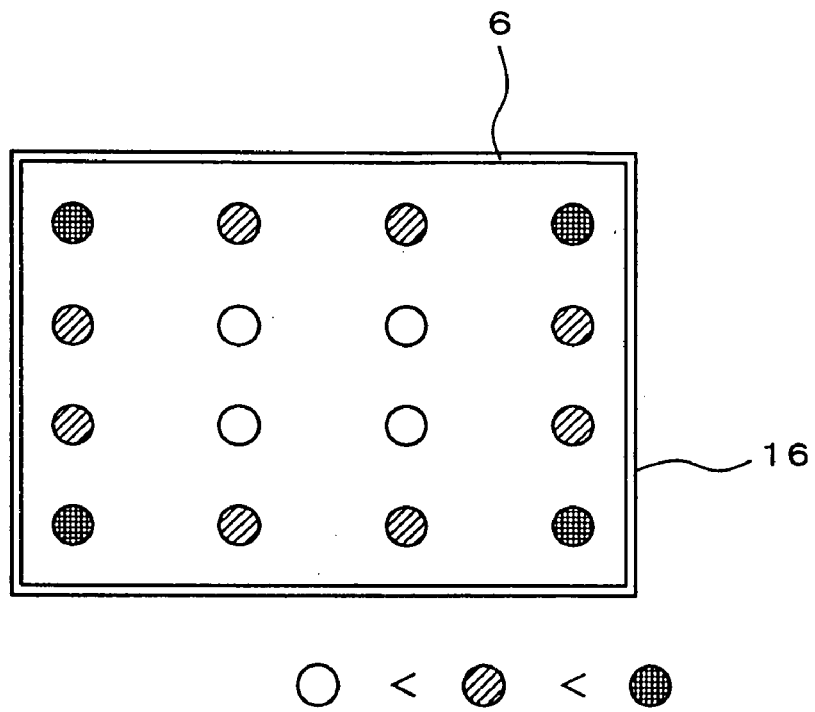
FIG. 60 is a diagram showing an upper surface of a substrate 30 where liquid crystal is dropped in the fabrication method of the liquid crystal display according to the thirteenth embodiment of the present invention.

In the above fabrication method of the liquid crystal display, depending on the dropping position of the liquid crystal inside the surface of the substrate 16, the liquid crystal to be dropped may be in different structure and component composition ratio. FIG. 60 shows an upper surface of the substrate 16 where liquid crystal is dropped. A mark ○ in the diagram indicates the dropping position of liquid crystal. With respect to a mark ○ with diagonal hatching, the plain mark ○ indicates the dropping position of the liquid crystal having a higher ratio of liquid crystal low in reliability and a mark ○ with vertical and horizontal hatchings indicate the dropping position of the liquid crystal having a higher ratio of liquid crystal high in reliability. As shown in FIG. 60, the liquid crystal at the dropping position of liquid crystal close to the main seal 6 for attaching the two substrates has high ratio of the liquid crystals 192 and 196 higher in reliability than the center portion of the substrate. This is because if the positions liquid crystal is dropped contacts with the main seal 6 or is irradiated by UV, the liquid crystal having high resistance against the above is required.

Furthermore, in the above liquid crystal display, an anneal treatment by the heat treatment and leveling of the liquid crystal layer by the flow of the liquid crystal layer may be performed. This is because if the liquid crystal materials are partially different in the liquid crystal layer area, optical characteristics is scattered and display irregularities occur. The above fabrication method is preferable to be used in a fabrication method for an MVA-mode liquid crystal display using a vertical alignment film and N-type liquid crystal material and having a bank-like or protrusion-type structure on the substrate.

Next, a fabrication method of a liquid crystal display according to this embodiment is described using examples.

EXAMPLES 1

Glass substrates A and B equal to 50 (mm) in length, 60 (mm) in width and 0.7 (mm) in thickness, forming an electrode X, electrode Y and electrode z which is equal to 1 cm$^2$ in electrode area are prepared by using ITO (indium tin oxide) which is a transparent electrode material. By coating a bank-like material S1808 (resist) on the opposing surfaces of the substrates A and B and patterning, a protrusion is formed. After an ashing treatment, an alignment film JALS-684 (made by JSR) is formed on both substrates A and B. An UV sealing material (made by Kyoritsu Kagaku) is coated on the substrate A and a spacer (micropearl SP-204: 4.0 μm) is dispersed on the substrate B.

By using the instilling equipment, the liquid crystal equal to $\Delta\epsilon=-2.1$ is dropped only on the electrode Y on the substrate A side. Sequentially the liquid crystal equal to $\Delta\epsilon=-3.8$ is dropped on the electrodes X, Y and Z on the substrate A side, then a UV light equal to 60 mW/cm$^2$ in irradiation energy is irradiated to the main seal and the substrates A and B are attached. Then, a polarizing plate is arranged in cross-nicol and an MVA-mode liquid crystal cell is completed. By applying a voltage equal to 3.5V to the liquid crystal cell, display irregularities at a half tone are confirmed. As a result, while there are drop-mark shaped irregularities at the electrodes X and Z, an excellent alignment state without irregularities are confirmed at the electrode Y portion where dropping is performed twice.

EXAMPLE 2

Using the glass substrate of Example 1, a dropped liquid crystal cell is fabricated by forming banks, protrusions, alignment film, seal coating, UV irradiation and spacer dispersion in a similar manner. Neutral liquid crystal having $\Delta\epsilon=0$ is dropped only on the electrode Y on the substrate A side. Sequentially liquid crystal having $\Delta\epsilon=-4.5$ is dropped on the electrodes X, Y and Z on the substrate A side, then UV light equal to 60 mW/cm$^2$ in irradiation energy is irradiated to the main seal and the substrates A and B are attached. A polarizing plate is arranged in cross-nicol with respect to these substrates and an MVA-mode liquid crystal cell is completed. After attachment, the liquid crystal cell is sufficiently annealed and uniformly composed therein by performing an ultrasonic treatment. By applying a voltage equal to 3.5V to the liquid crystal cell, display irregularities at a half tone are confirmed. As a result, while drop-mark shaped irregularities exist at the electrodes X and Z, excellent alignment state without irregularities is confirmed at the electrode Y portion where dropping is performed twice.

As described above, by using the fabrication of the liquid crystal display according to this embodiment, display irregularities at the instillation panel can be improved and the display quality of a liquid crystal panel can be improved.

Figure 61:
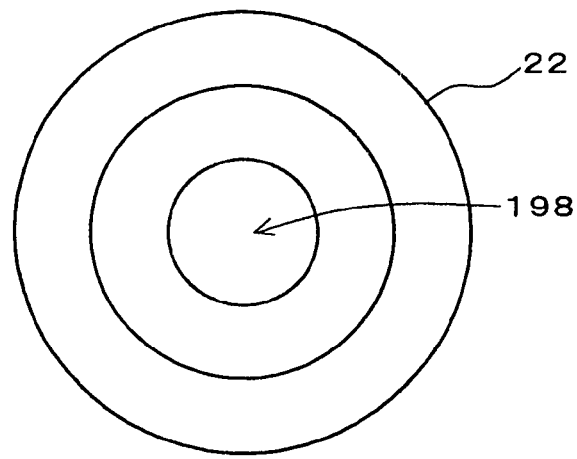
FIG. 61 is a diagram describing a dispersion state of dropped liquid crystal in a fourteenth embodiment of the present invention.
Figure 112:
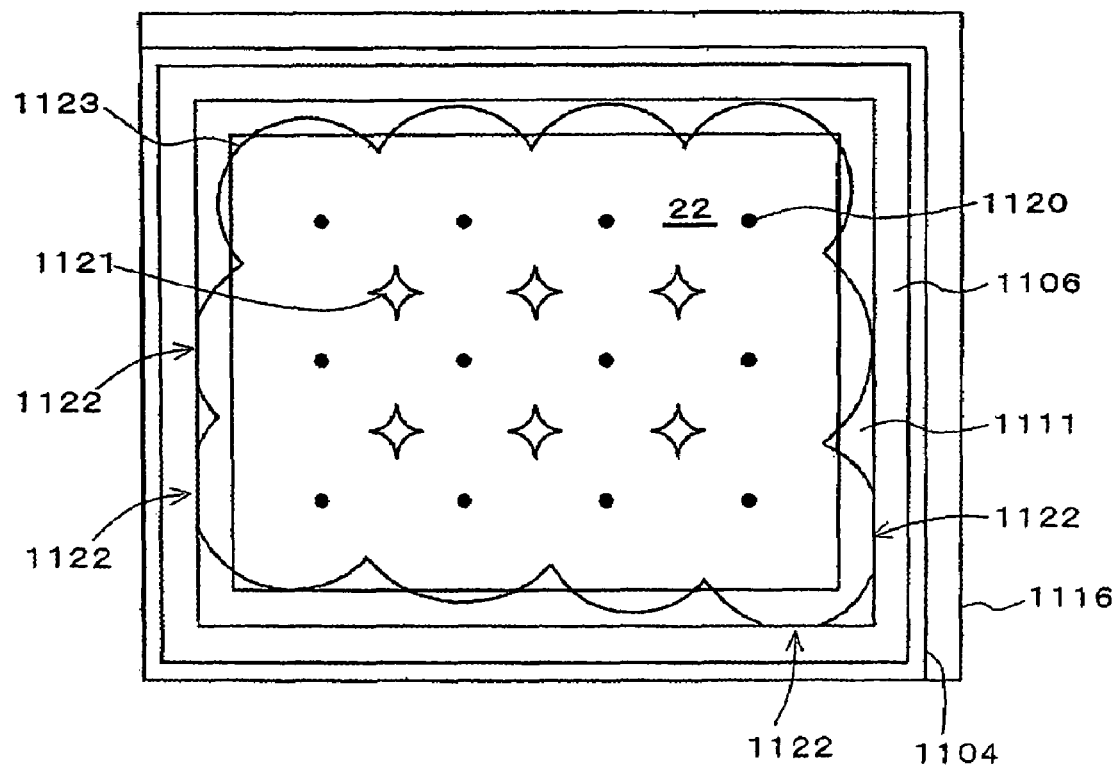
FIG. 112 is a diagram describing the problem in the fabrication method of the conventional liquid crystal display.
Figure 113:
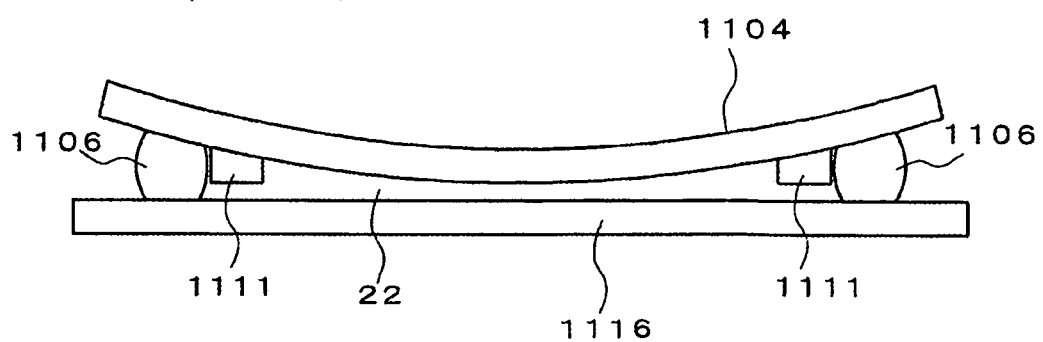
FIG. 113 is a diagram describing the problem in the fabrication method of the conventional liquid crystal display.
Figure 114A:
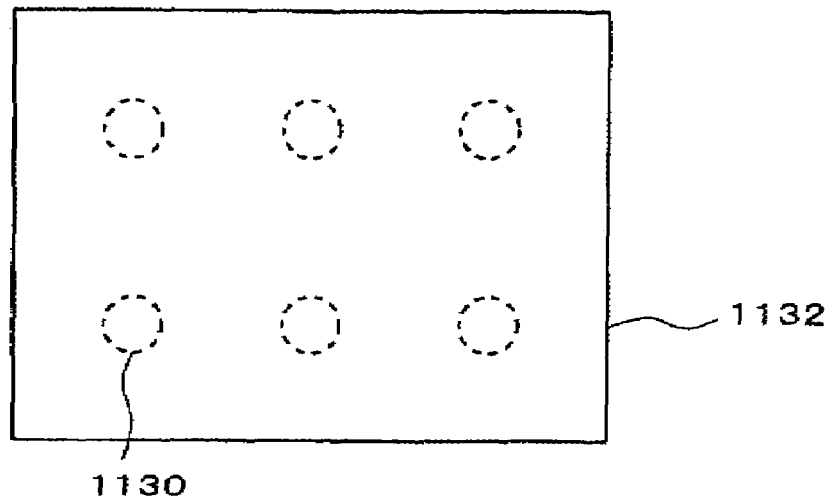
FIGS. 114a, 114b, and 114c are diagrams describing the problem in the fabrication method of the conventional liquid crystal display.
Figure 114B:
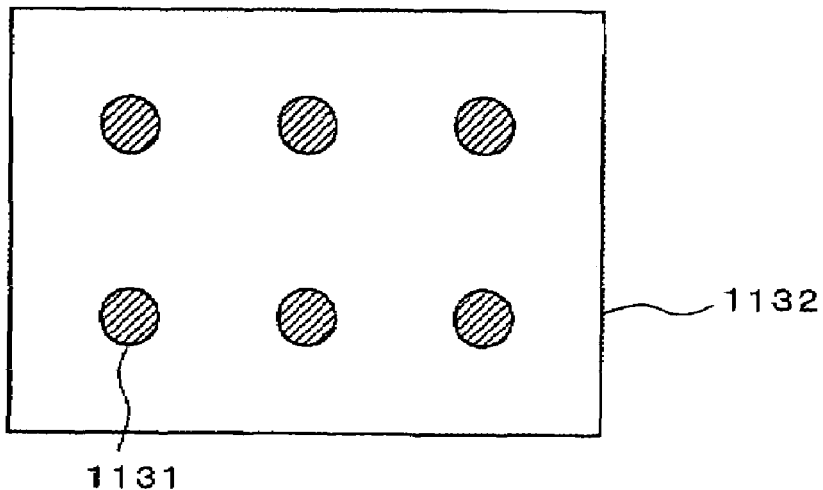
Figure 114C:
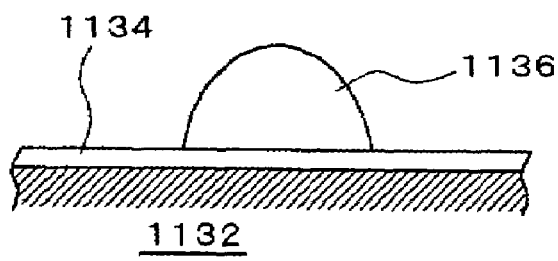

A liquid crystal display and a fabrication method thereof according to a fourteenth embodiment of the present invention is described with reference to FIG. 61 through FIG. 66. Usually, liquid crystal is dropped at a plurality of positions of the panel by a dispenser. The dropped liquid crystal 22, as shown in FIG. 61, spreads in a concentric circular shape from a dropping point 198 as time passes. As shown in FIG. 112, spreading front end portions of a plurality of dropped liquid crystal overlap with each other and form a corrugated shape. Thus, arrival of the liquid crystal is delayed in comparison with other portions at the corner portions of the main seal which is formed in a rectangular frame-shape, thus resulting in a vacuum air bubbles to be remained or a requirement of a long period of time for liquid crystal to completely spread. If a long period of time is spent for spreading liquid crystal, the time the sealing material and liquid crystal contact is also extended, thereby easily generating a contamination of liquid crystal.

So, in this embodiment, a protrusion is provided on the substrate to control the spreading speed of liquid crystal. By distributing liquid crystal at a predetermined arrangement density and an arrangement shape on the substrate where the protrusion is formed, the spreading speed and direction of liquid crystal is controlled. Further, a column-shape spacer provided to obtain a predetermined cell gap can be applied as a protrusion to control the spreading speed.

Although dropped liquid crystal evenly spreads in all directions on the substrate, if liquid crystal contacts with the protrusion, spreading front end portions of liquid crystal spread by wraparounding the protrusion. Therefore, the spreading speed in the direction where the protrusion exists is relatively slower than the direction where a protrusion does not exist. Therefore, by arranging a plurality of protrusions on the substrate at a predetermined distribution density and a distribution shape, the spreading shape of the spreading front end portions of liquid crystal which is dropped on the substrate can be controlled.

Figure 62:
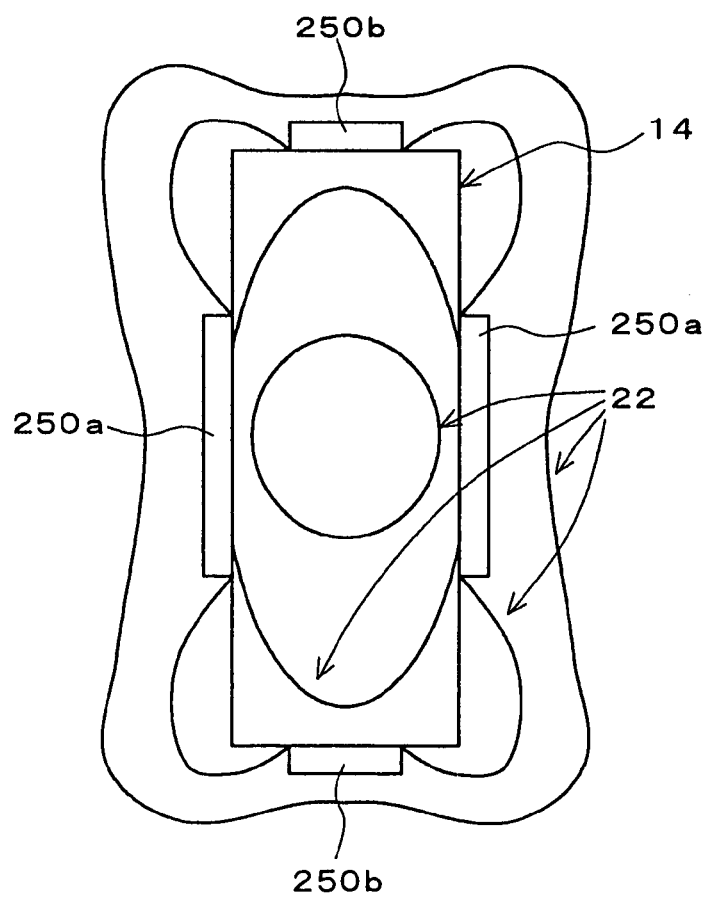
FIG. 62 is a diagram showing a pixel formed in a liquid crystal display panel and a dispersion state of the liquid crystal which is dropped in the pixel formed in the liquid crystal display panel in the fourteenth embodiment of the present invention.
Figure 63:
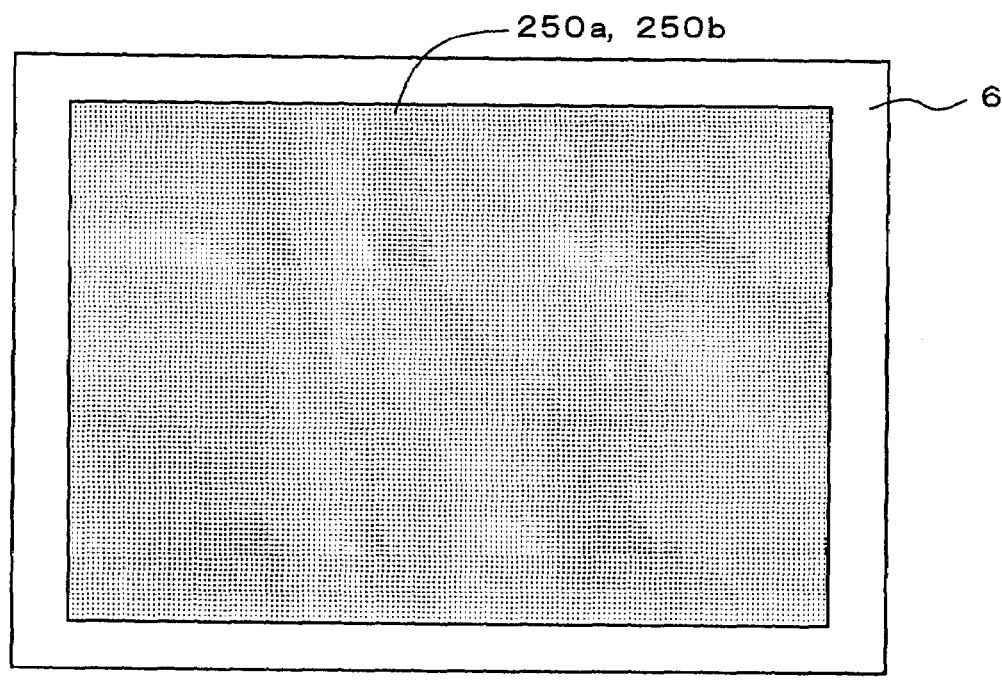
FIG. 63 is a diagram showing a state in which an outline shape of a front end portion of dispersing liquid crystal is controlled to be substantially a similar shape to a shape of a main seal 6 in the liquid crystal display according to the fourteenth embodiment of the present invention.

FIG. 62 shows a pixel formed on the liquid crystal display panel and spreading state of liquid crystal which is dropped on the pixel. Liquid crystal is assumed to be dropped in substantially the center of the pixel electrode having an elongated rectangular shape in the diagram. A relatively long structure 250a is formed at the center of the long side and along the long side of the external shape of the pixel electrode 14 and a relatively short structure 250b is formed at the center of the short side and along the short side of the external shape of the pixel electrode 14 in the external periphery of the pixel electrode 14. No structure is formed in a direction of a diagonal line in the pixel electrode 14. By providing such structures 250a and 250b, the spreading speed of the dropped liquid crystal 22 to each portion is faster in the diagonal direction in comparison with the vertical and horizontal directions. So, the outline shape of front end portions of the spreading liquid crystal changes from a circular shape to a square shape. Therefore, as shown in FIG. 63, by arranging the structures 250a and 250b in the whole panel, the outline shape of the front end portions of the spreading liquid crystal can be substantially similar figures to the shape of the frame-shape main seal 6. Further, if the arrangement shape and density of the structure are controlled, spreading speed can be also controlled. Furthermore, spacers such as beads and the like can be used by replacing the structure 252 with the predetermined cell gap.

According to this embodiment, the direction and speed of liquid crystal to spread can be controlled and the liquid crystal can be spread along the shape of the main seal. Thus, the yield can be improved by reducing the generation of vacuum bubbles remained in the corner portions of the main seal, thereby fabricating a liquid crystal display panel having a high attaching accuracy at a low cost. A liquid crystal display and a fabrication method thereof according to this embodiment are described below with reference to examples.

EXAMPLE 1

Figure 64:
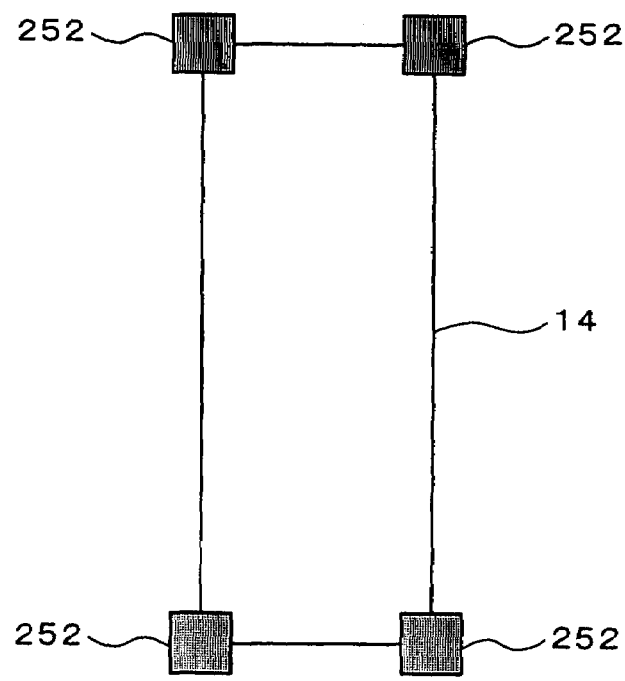
FIG. 64 is a diagram showing a structure 29 for determining a cell gap in the liquid crystal display according to the fourteenth embodiment of the present invention.
Figure 65:
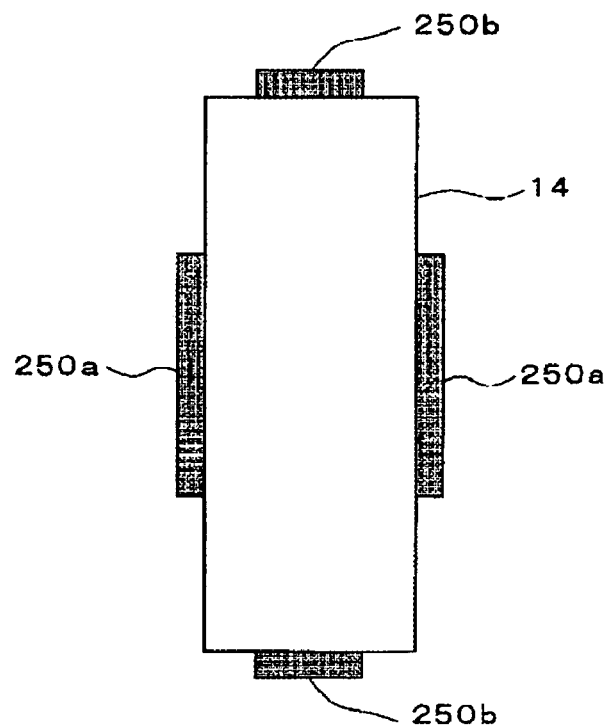
FIG. 65 is a diagram showing structures 28a and 28b for controlling liquid crystal dispersion in the liquid crystal display according to the fourteenth embodiment of the present invention.
Figure 66:
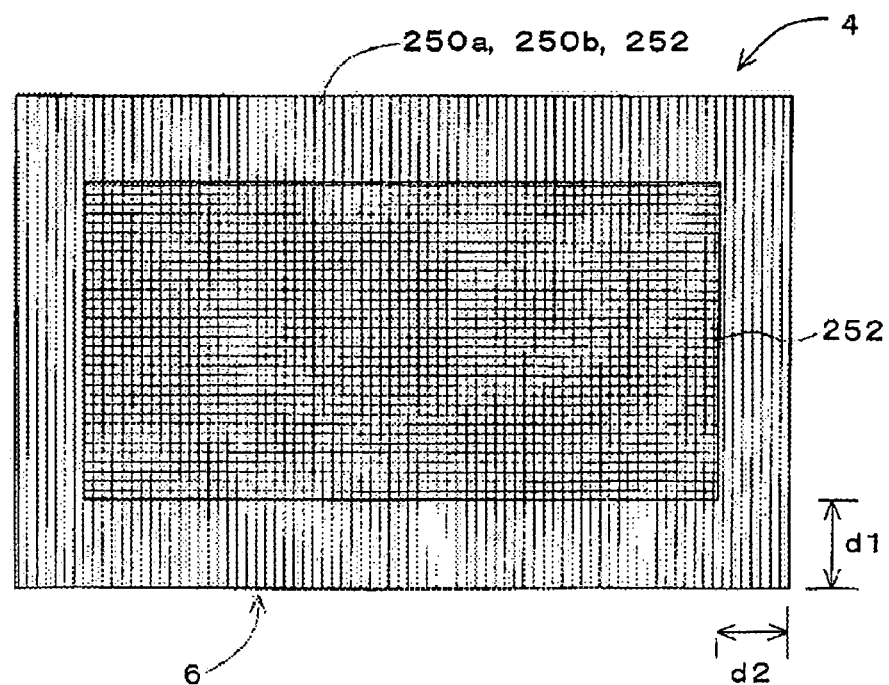
FIG. 66 is a diagram showing an example of arrangement of the structures 28a, 28b and 29 in the liquid crystal display according to the fourteenth embodiment of the present invention.

A structure is formed on the CF substrate. The structure is formed by overlaying color plates. Further, two kinds of structures are formed. One is a structure 252, as shown in FIG. 64, to define a cell gap and the others are structures 250a and 250b, as shown in FIG. 65, to control spreading of liquid crystal. The structure 252 to define the cell gap is formed on the whole surface of the substrate 4. On the other hand, the structures 250a and 250b to control spreading of liquid crystal, as shown in FIG. 66, are arranged adjacent to the seal. In this example, the structures 250a and 250b are provided in the internal periphery of the main seal 6 a width of approximately 1/10 of the long side of the main seal in the horizontal direction of the main seal 6, and a width of approximately 1/10 of the short side of the main seal in the vertical direction of the main seal 6.

It will be noted that the density of the structure 252 defining the cell gap may be reduced depending on the accuracy of the cell gap. After liquid crystal is dropped, the two substrates are attached under a decompressed circumstance. When the circumstance is restored to the pressurized state (atmospheric pressure), the liquid crystal spreads. However, in the center portion of the panel where the structure 252 defining the cell gap exists, the dropped liquid crystal spreads in a concentric circular shape having the dropping point as a center. When the liquid crystal reaches the area where the structures 250a and 250b controlling the spreading of liquid crystal exist, the direction of the spreading liquid crystal is controlled by the structures 250a and 250b and the spreading becomes easy in the diagonal direction of the pixels. Therefore, the outline shape of the spreading front end portions change from the concentric circular shape to a square shape while spreading, and lastly the liquid crystal spreads having substantially the same shape as the main seal 6. As a result, since a time to reach the main seal 6 is substantially the same at each area of the main seal, the generation of the vacuum bubbles at corner portions can be suppressed.

According to this embodiment, liquid crystal can be evenly spread and a panel in which vacuum bubbles do not remain in corner portions of the seal can be fabricated with high yield.

Further, in the above fabrication method of the liquid crystal display, the arrangement density and arrangement shape of the structures can be also controlled so that the spreading speed in which the spreading front end portions of the dropped liquid crystal do not contact with the main seal 6 immediately after pressurized state is restored. It will be noted that when a first dummy seal 6 and a second dummy seal 8 are formed in the external periphery of the main seal 6, a vacuum area is formed between the first dummy seal 6 and the second dummy seal 8 when pressurized after the substrates are attached. At this time, the distance between the spreading front end portions of the dropped liquid crystal and the main seal 6 is the same as or more than the width between the first dummy seal 6 and the second dummy seal 8.

Next, a fabrication method of a liquid crystal display according to a fifteenth embodiment of the present invention is described. An object of this embodiment is to steadily perform a liquid crystal instillation in the cell process by reducing substrate deformations and display defects. In this embodiment, a fabrication method of a liquid crystal display having a distinctive characteristic in holding method of the glass substrate in a vacuum in order to realize the above object is described.

FIGS. 67a through 67d show cross section cut vertically to the liquid crystal panel, and a liquid crystal instillation, a substrate attachment process and a substrate maintaining operation when attaching the substrates according to this embodiment is described with reference to FIGS. 67a through 67d. First, in FIG. 67a, the array substrate 16 is mounted on a parallel surface plate 256. The frame-shape sealing material 6 has been already formed on the array substrate 16 and liquid crystal 184 is further dropped on the surface of the array substrate 16 by instillation. In this example, the sealing material 6 is coated by approximately 20 μm in thickness. The dropping amount of liquid crystal inside the frame-shape sealing material 6 by a dispenser is determined by taking the thickness of a cell into consideration after the liquid crystal display panel is attached. For example, if lengths of the vertical and horizontal sides of the internal wall of the frame-shape sealing material 6 are equal to 187.4 mm×247.7 mm, the dropping amount of liquid crystal is equal to approximately 280 ml.

The liquid crystal instillation is performed in an atmosphere. An electrostatic chuck 264 which does not operate in an atmosphere is provided on the upper surface of the parallel surface plate 256, and the array substrate 16 on the parallel surface plate 256 is mounted on the parallel surface plate 256 by a positioning pin (not shown in the diagram) and the like.

The CF substrate 4 mounted on a parallel surface plate 258 and held by a mechanical holding device 260 directly opposes the array substrate 16 mounted on the parallel surface plate 256 apart by a predetermined distance. Although an electrostatic chuck 262 is provided on the upper surface of the parallel surface plate 258, the electrostatic chuck 262 does not operate in an atmosphere. Therefore, the CF substrate 4 on the parallel surface plate 258 is held by the mechanical holding device 260. Spacers 254 dispersing a plurality of beads are previously attached on the substrate 4 surface. The spacer 254 may certainly form a plurality of column shaped member with a predetermined height from the CF substrate 4 surface in place of dispersing beads.

Next, the pressure of an environment is reduced from the above state to approximately $5 \times 10^{-3}$ torr. After performing a predetermined pressure reduction, the electrostatic chuck 264 on the upper surface of the parallel surface plate 256 is operated, and the array substrate 16 is fixed on the parallel surface plate 256 by an electrostatic attraction. Further, in a similar manner, the electrostatic chuck 262 on the upper surface of the parallel surface plate 258 is operated and the CF substrate 4 is fixed on the parallel surface plate 258 by the electrostatic attraction. By the above operations, deformations such as a curvature, deflection or the like of the substrate are removed from the array substrate 16 and the CF substrate 4, and at the same time the array substrate 16 and the CF substrate 4 are securely fixed on the surface plates respectively so that a displacement of substrates and the like do not occur when the substrates are attached in the next process. Furthermore, the operations of the electrostatic chucks 262 and 264 can be started if the pressure of the environment is in a stable condition less than $1 \times 10^{-1}$ torr and an electric discharge between a circuit element such as TFT and the like formed on the array substrate 16 and gas in the environment does not occur.

Figure 67A:
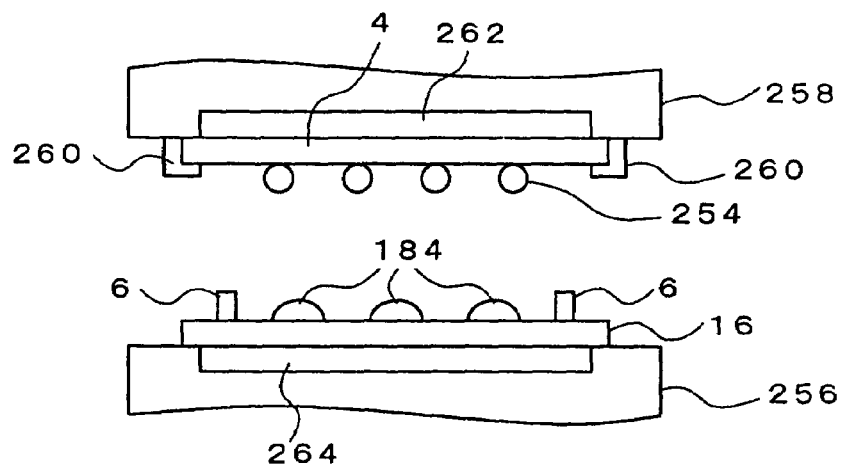
FIGS. 67a through 67d are diagrams describing liquid crystal instillation, a substrate attaching process and a substrate holding operation in the substrate attaching process in a liquid crystal display according to a fifteenth embodiment of the present invention.
Figure 67B:
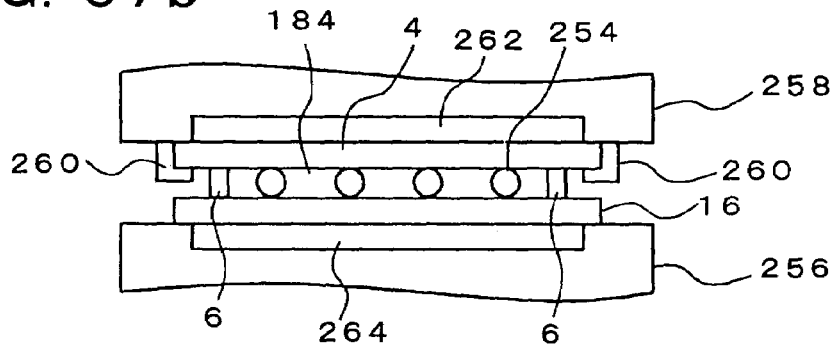

Next, after an alignment of the array substrate 16 and the CF substrate 4 are performed, as shown in FIG. 67b, the two parallel surface plates 256 and 258 are brought closer and the attachment of the array substrate 16 and the CF substrate 4 is performed. A load at the time of attachment of the substrates is equal to approximately 150 kgf.

Figure 67C:
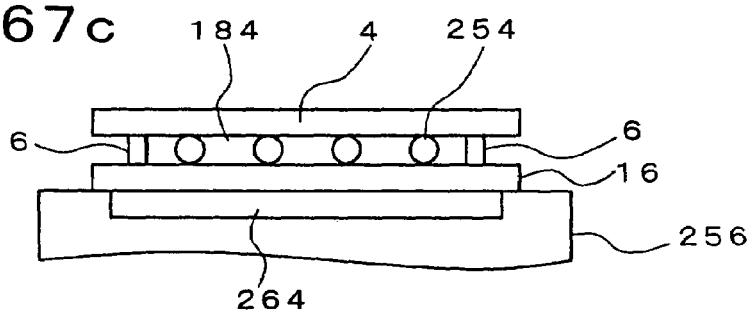

Next, as shown in FIG. 67c, by releasing the attraction due to the electrostatic chuck, the CF substrate 4 is released from the parallel surface plate 258 and the pressure of the environment is restored to the atmospheric pressure. Thus, the opposite array substrate 16 and the CF substrate 4 are further pressurized by the atmospheric pressure via the sealing material 6, liquid crystal 184 and spacers 254, thereby obtaining a uniform cell gap and at the same time uniformly spreading the liquid crystal 184 inside the sealing material 6 as well.

Figure 67D:
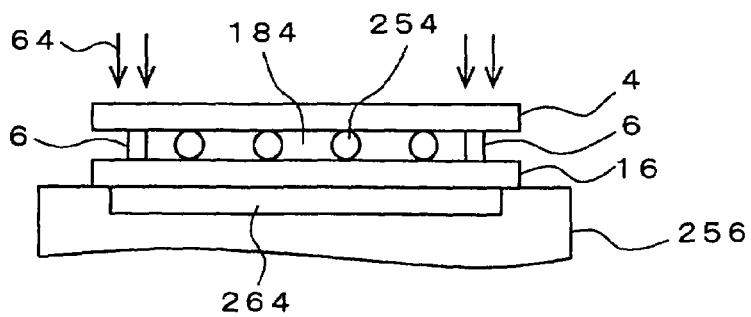

Then, as shown in FIG. 67d, by performing, for example, an UV (ultraviolet light) irradiation 266 to the sealing material made of photo-curing-type resin, the sealing material 6 is cured.

As described above, according to the fabrication method of the liquid crystal display including the substrate holding method according to this embodiment, a substrate can be securely held on a parallel surface plate even at the degree of vacuum less than $10^{-1}$ torr. Therefore, the fabrication method according to this embodiment is extremely effective to be used in an instillation process on the premise that substrates are to be attached in a vacuum. Further, since the pressure at the time of substrate attachment can be sufficiently increased, the substrates can be uniformly attached. Furthermore, generation of the air bubbles in a liquid crystal layer inside the liquid crystal display panel can be prevented. Thus, the liquid crystal display panel superior in attachment accuracy can be fabricated at a low cost.

Next, a liquid crystal display and a fabrication method thereof according to a sixteenth embodiment of the present invention are described with reference to FIGS. 68a and 68b. An object of this embodiment is to steadily perform liquid crystal instillation in the cell process by reducing substrate deformations and display defects which can be produced due to the electrostatic chuck used in the fifteenth embodiment. In this embodiment, a fabrication method of a liquid crystal display having a distinctive characteristic in a holding method of a glass substrate in a vacuum in order to realize the above objects is described.

FIGS. 68a and 68b are diagrams describing an attachment of substrates by an electrostatic chuck according to this embodiment. FIG. 68a shows, as an example, a plan view of a glass substrate 268 structured by two array substrates 16 and 16' when the glass substrate 268 is electrostatically attracted by electrostatic chucks 272 through 278. FIG. 68b shows a cross section cut at a line A-A shown in FIG. 68a viewed toward the cross section when the array substrate 16 and the CF substrate 4 are attached.

As shown in FIGS. 68a and 68b, two conductive paths 292 and 294 electrically connecting both array substrates 16 and 16' are formed at an area between the areas to be the array substrate 16 and 16' (hereinafter, abbreviated as array substrate 16 and 16') which is a two-panel formation area formed in parallel on the glass substrate 268. It will be noted that although the conductive paths are provided at two places in this embodiment, this is not limited to this and the conductive paths can be provided in one place or more than three places. The electrostatic chuck for electrostatically attracting the glass substrate 268 has four electrodes 272, 274, 276 and 278 on the parallel surface plate. Among the four electrodes 272 through 278, the electrodes 272 and 276 structure positive electrodes and the electrode 274 and 278 structure negative electrodes. A power source 288 is connected between the positive electrodes 272 and 276 and the negative electrodes 274 and 278. By an applied voltage from the power source 288, the surface of one array substrate 16 is electrostatically attracted by the positive electrodes 272 and 276, and the surface of the other array substrate 16' is electrostatically attracted by the negative electrodes 274 and 278. An air gap is provided between boundaries of each electrode 272 through 278. Although illustration of the plan view is omitted, the electrostatic chuck of the glass substrate on the CF substrate 4 side also has the similar structure to the above structure on the array substrate 16 and 16' side, in which positive electrodes 280 and 284, negative electrodes 282 and 286 (illustration omitted), and a power source 290 to apply voltage to the above electrodes are provided.

Further, the conductive paths (not shown in the diagram) electrically connecting the two CF substrates 4 is also formed, in the similar manner to the glass substrate 268 on the glass substrate 270 which is a panel formation area and a plurality of areas to be the CF substrates 4 (hereinafter, abbreviated as a CF substrate 4), are formed. Particularly, since a common electrode which is a conductive film on the CF substrate 4 side is formed only in the display area in order to prevent the display defects caused by a reduction in adhesive strength of a sealing material or a shortage, usually the CF substrates 4 are electrically separated. Therefore, if the whole substrate surface is electrically conducted by providing a line-shape conductive path between the CF substrates 4, the substrate attraction can also accomplished by applying a voltage of the same polarity to one of the CF substrates 4.

By mounting a glass substrate on which a conductive film is formed and applying a voltage between the electrode and the conductive film, and by generating the coulomb's force between the glass and the conductive film, the glass substrate can be attracted on electrostatic chucks of such a structure. In the case shown in FIGS. 68a and 68b, the conductive film on the glass substrate 268 is composed of pixel electrodes formed on the array substrate 16 and 16', gate wirings, data wirings and the like. Further, the conductive film on the glass substrate the CF substrates 4 is formed thereon is composed of the common electrode and the like.

In order to attach the array substrates 16 and 16' and the CF substrates 4 by using such electrostatic chucks, by contacting the positive electrodes 272 and 276 to the array substrate 16, also contacting the negative electrodes 274 and 278 to the array substrate 16', and applying a predetermined voltage between the positive and negative electrodes, the glass substrate 268 is electrostatically attracted. At this time, as shown in FIGS. 68a and 68b, the surface of the array substrate 16 of the glass substrate 268 is charged with negative (−) and the surface of the array substrate 16' is charged with positive (+) by the conductive paths 292 and 294. Accordingly, since only the electric charges of the same polarity concentrates on a single array substrate 16 or 16', a boundary between positive charge and negative charge within a single array substrate 16 is not created as in the past. Therefore, since impure ion in the liquid crystal is not selectively adsorbed on the alignment film, display irregularities in which the surface of the liquid crystal display panel is divided into two equal parts and brightness becomes uneven do not occur.

Furthermore, when the glass substrate 268 forming the array substrates 16 and 16' and the glass substrate 270 forming the CF substrates 4 are attached while being held by electrostatic attraction, as shown in FIG. 68b, if a voltage of the same polarity is applied to the opposing surfaces of the both substrates, electric charges of the same polarity concentrate on both opposing substrates and repel to each other, thereby reducing the substrate attraction strength by electrostatic attraction and preventing substrate deformations and contacts among the substrates.

Figure 69A:
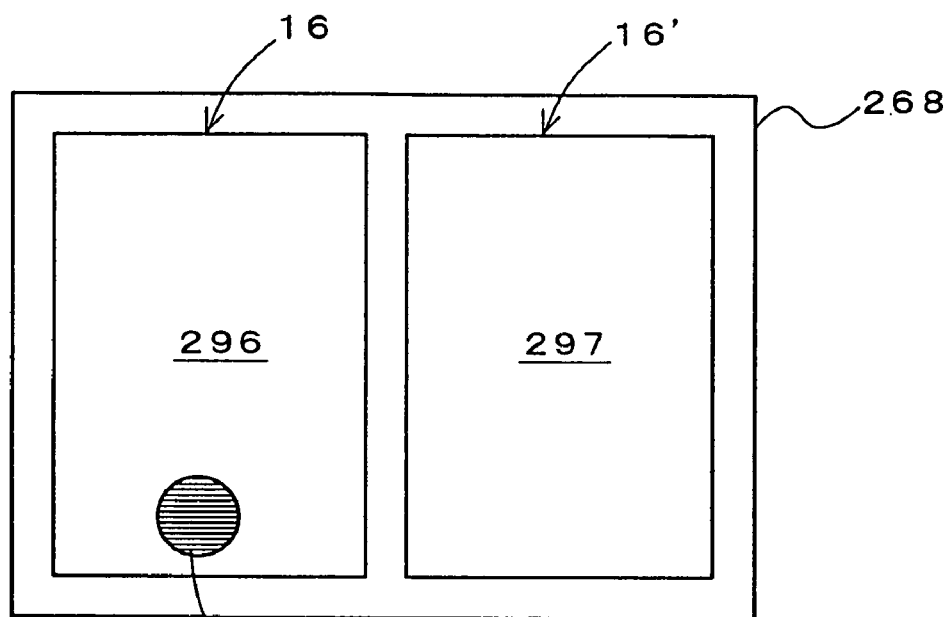
FIGS. 69a and 69b are diagrams describing substrate attachment with a use of electrostatic chucks in a liquid crystal display according to a seventeenth embodiment of the present invention.
Figure 69B:
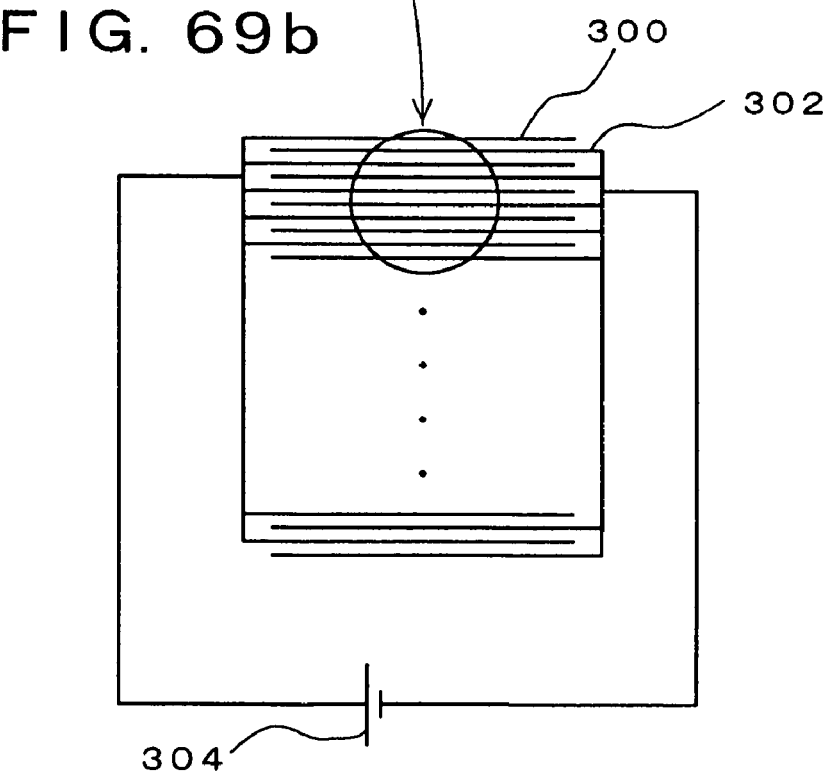

Next, a fabrication method of a liquid crystal display according to a seventeenth embodiment of the present invention is described with reference to FIGS. 69a and 69b. An object of this embodiment, similar to the sixteenth embodiment, is to steadily perform a liquid crystal instillation in the cell process by reducing substrate deformations and display defects which can be caused by the electrostatic chucks used in the fifteenth embodiment. In this embodiment, a liquid crystal display having a distinctive characteristic in a holding method of the glass substrate in a vacuum is described. FIGS. 69a and 69b are diagrams describing an attachment of substrates with the use of electrostatic chucks according to this embodiment. FIG. 69a shows, as an example, a plan view in which the glass substrate 268 structured by two array substrates 16 and 16' is electrostatically attracted by electrostatic chucks. FIG. 69b shows a structure of an electrode which includes an enlarged view of the inside the circular-shape frame of FIG. 69a.

As shown in FIGS. 69a and 69b, the two array substrates 16 and 16' (panel forming area) are formed in parallel on the glass substrate 268. The electrostatic chucks for electrostatically attracting the glass substrate 268 have two electrode portions 296 and 297 on the parallel surface plate. FIG. 69b is an enlarged schematic view of the electrode portion 296. As shown in FIG. 69b, the electrode portion 296 of the electrostatic chuck is formed so that the teeth of a comb-shape positive electrode 300 and the teeth of a comb-shape negative electrode 302 are alternating to face to each other. The positive electrode 300 and the negative electrode 302 are connected to a power source 304. By applying a voltage to a circuit from the positive electrode 300 to the negative electrode 302 via the surface of the array substrate 16, the surface of the array substrate 16 can be electrostatically attracted.

In this embodiment, the space (electrode pitch) between the comb-teeth shape electrodes of the positive electrode 300 and the negative electrode 302 is fined to be equal to approximately 100 to 1000 μm. Therefore, even if a voltage is applied between both electrodes alternating to each other at minute intervals, the boundary as is in the past becomes fine. Thus, the fabricated liquid crystal panel can obtain a uniform display quality on the display surface.

Figure 70A:
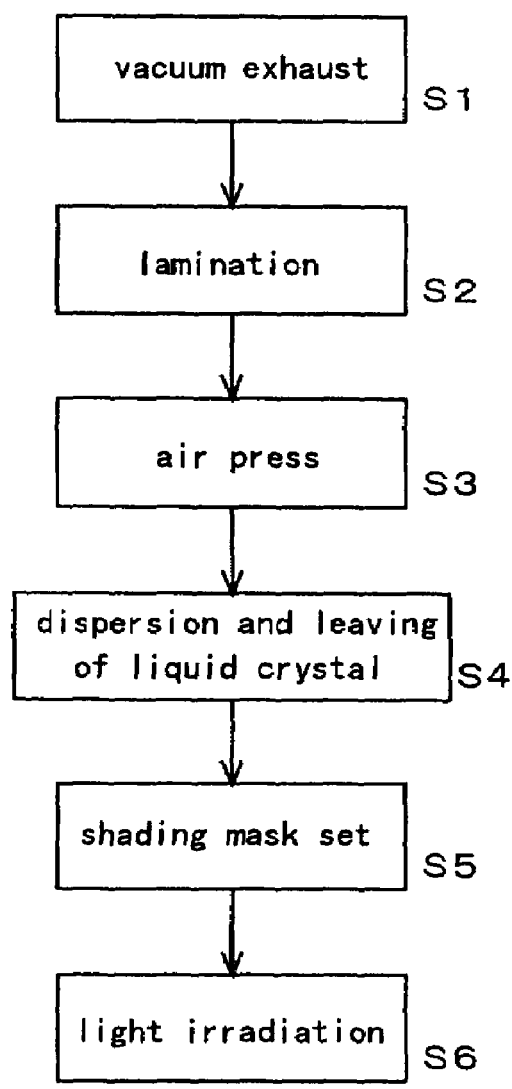
FIGS. 70a and 70b are diagrams showing a comparison between a photo-curing process in an instillation according to an eighteenth embodiment of the present invention and a photo-curing process in a conventional instillation.
Figure 70B:
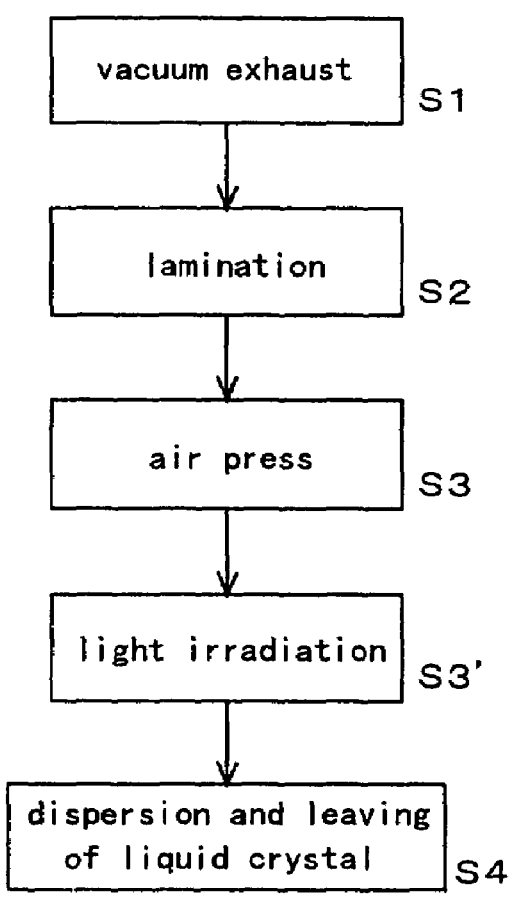
Figure 71:
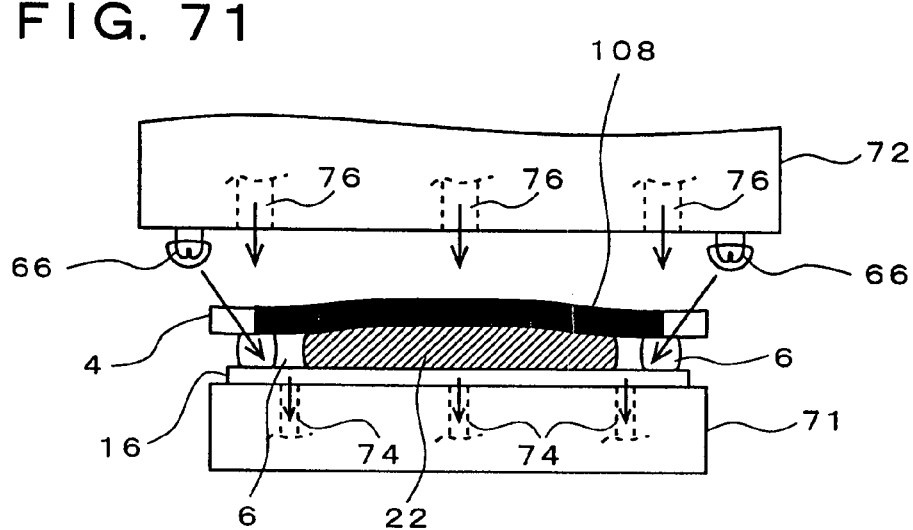
FIG. 71 is a diagram showing a schematic structure of a substrate attachment equipment according to the eighteenth embodiment of the present invention.

Next, a liquid crystal display and a fabrication method thereof according to an eighteenth embodiment of the present invention with reference to FIGS. 70a, 70b, and FIG. 71. It will be noted that the structuring elements having the same operation functions as the first through seventeenth embodiments are referred by the same codes and the descriptions are omitted. FIGS. 70a and 70b show a comparison between a photo-curing process by the conventional (FIG. 70a) instillation and a photo-curing process by an instillation according to this embodiment (FIG. 70b). Both processes are the same from a coating of the sealing material after dropping liquid crystal and vacuum exhaustion (step S1) to attaching the array substrate and the opposite substrate in an vacuum environment (step S2).

The attached substrates are returned in an atmosphere and the liquid crystal inside the substrates is dispersed by a use of the atmospheric pressure in the past (step S3). In order to completely disperse the liquid crystal, the substrates are further left for several minutes (step S4). Then, a shading mask is set on the substrate so that UV light is irradiated only to the area adjacent to the sealing material (step S5). In order to cure the sealing material, the UV light from an UV light source is irradiated from the color filter side through the shading mask, thereby completing the photo-curing process (step S6).

On the other hand, in this embodiment, UV light for curing the sealing material is irradiated from the UV light source (step S3') in parallel with returning the substrates in an atmosphere and dispersing the liquid crystal inside the substrates by the air press (step S3). This step S3' is performed during the air press in the step S3 and at the same time until the liquid crystal reaches the sealing material and transfer, and the sealing material is photo-cured by being directly irradiated the UV light on the color filter side. After completing the air press and the UV irradiation, the substrates are left for several minutes for liquid crystal dispersion, thereby completing the photo-curing process (step S4).

It will be noted that, with respect to the relationship of the substrates arrangement, the opposite substrate forming the color filter thereon is provided on the upper substrate side and the array substrate is provided on the lower substrate side in both of the conventional examples and this embodiment. Further, photo-curing is performed without fixing the substrates in the conventional example, and in this embodiment, photo-curing is performed by fixing the lower substrate on the parallel surface plate by vacuum chucks. As a result, in the conventional example, picture-frame irregularities occur due to press defects and a displacement equal to approximately 7 to 10 μm occurs due to waviness and curvature of the substrate. In this embodiment, picture-frame irregularities do not occur and a displacement can be suppressed within 3 μm.

Next, a substrate attachment equipment used in this embodiment is described with reference to FIG. 71. As shown in FIG. 71, the substrate attachment equipment has a vacuum stage 71 on which a plurality of vacuum attraction holes 74 for fixing the substrate by vacuum chucks are formed and a substrate pressing portion 72 which has a plane surface for pressing opposing the stage surface of the vacuum stage 71 and forms a plurality of air blow-off holes 76 for air press on the said pressing plane surface. The substrate pressing portion 72 movable vertically in the diagram so that the opposing distance between the stage surface and the pressing plane surface of the substrate pressing portion 72 can be varied. It will be noted that in place of the vacuum stage 71, a stage having the electrostatic chucks may be certainly used as well. Further, since an UV light source 66 similar to the one described in the sixth embodiment is installed on the substrate pressing portion 72, the UV light can be irradiated to the sealing material 6 during air press.

With the use of the above structure, the array substrate 16 is fixed on the vacuum stage 71 by attraction using the vacuum attraction holes 74 (or electrostatic chucks) and pressurized by air press by blowing the air from the air blow-off holes 76 of the substrate pressing portion 72 to the surface of the opposite substrate 4. At the same time, UV light is irradiated from the UV light source 66 and the sealing material 6 and transfer are cured. Since the array substrate 16 is fixed in parallel on the vacuum stage 71 according to this equipment, even if the opposite substrate 4 on the unfixed side has waviness or curvature, after heat treatment, the stress is released to be along the array substrate 16 side, thereby minimizing a displacement. Further, since the sealing material 6 is photo-cured while being pressurized by air press from the opposite substrate 4 side, the sealing material 6 is not pushed back and press defects can be prevented.

Furthermore, according to this embodiment, the sealing material 6 and transfer are cured by an irradiation of the UV light before the liquid crystal 22 reaches the sealing material 6 and transfer. Therefore, contamination of the liquid crystal 22 due to contacts between the uncured sealing material 6 and the liquid crystal 22 can be prevented. Also, as in this embodiment, by making the lower substrate as the array substrate 16 and the upper substrate as the opposite substrate 4 the color filter is formed, the color filter can be used as a shading mask.

Figure 72:
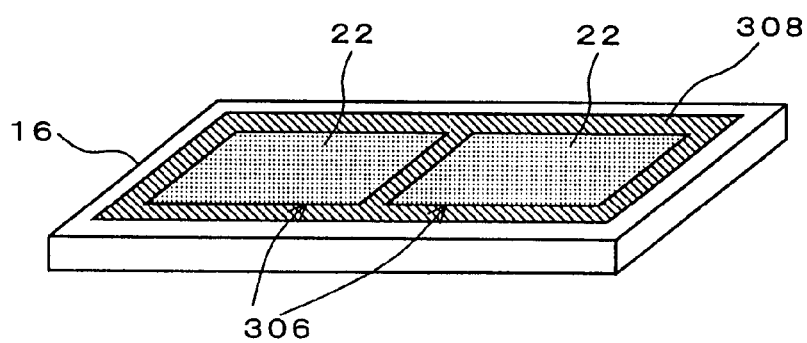
FIG. 72 is a diagram briefly describing a fabrication method of a liquid crystal display according to a nineteenth embodiment of the present invention.

Next, a liquid crystal display and a fabrication method thereof according to a nineteenth embodiment of the present invention is described with reference to FIG. 72 through FIG. 78. First, a fabrication method is briefly described with reference to FIG. 72 and FIG. 73. FIG. 72 is a schematic oblique view of the array substrate 16 equal to 515 (mm)× 404 (mm) structured by the two panels. Alignment layer treatment is performed inside the area of the two panels on the array substrate 16 and a frame-shape main seal 306 is coated in the external periphery of each panel area. At the same time, a dummy seal 308 surrounding the two main seals 306 at a predetermined air gap is coated. A heat combination-type sealing material is used for the main seal 306 and the dummy seal 308.

After coating the sealing materials, the liquid crystal 22 is dropped inside the area of the two panels on the array substrate 16 by instilling method.

Figure 73:
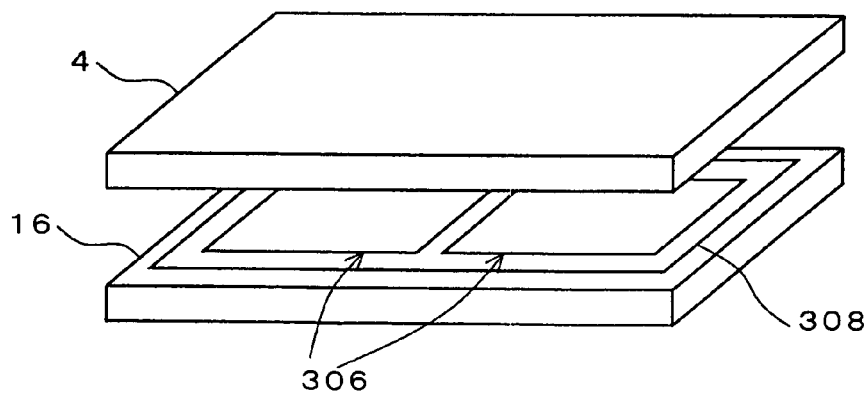
FIG. 73 is a diagram briefly describing the fabrication method of the liquid crystal display according to the nineteenth embodiment of the present invention.
Figure 74:
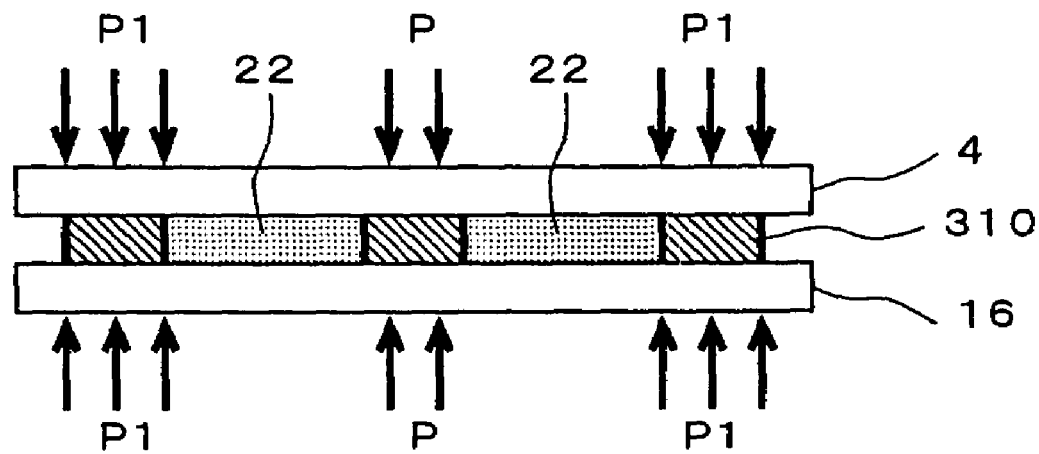
FIG. 74 is a diagram briefly describing the fabrication method of the liquid crystal display according to the nineteenth embodiment of the present invention.
Figure 75:
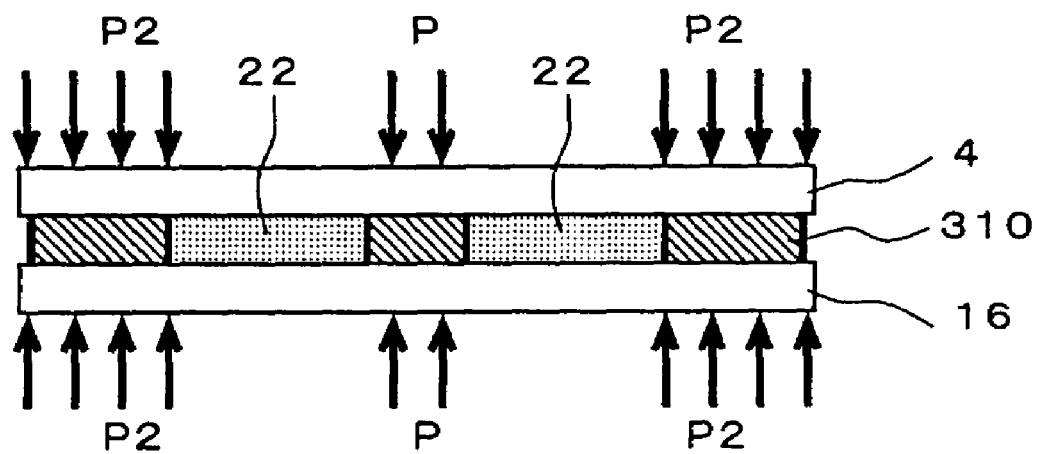
FIG. 75 is a diagram briefly describing the fabrication method of the liquid crystal display according to the nineteenth embodiment of the present invention.
Figure 76:
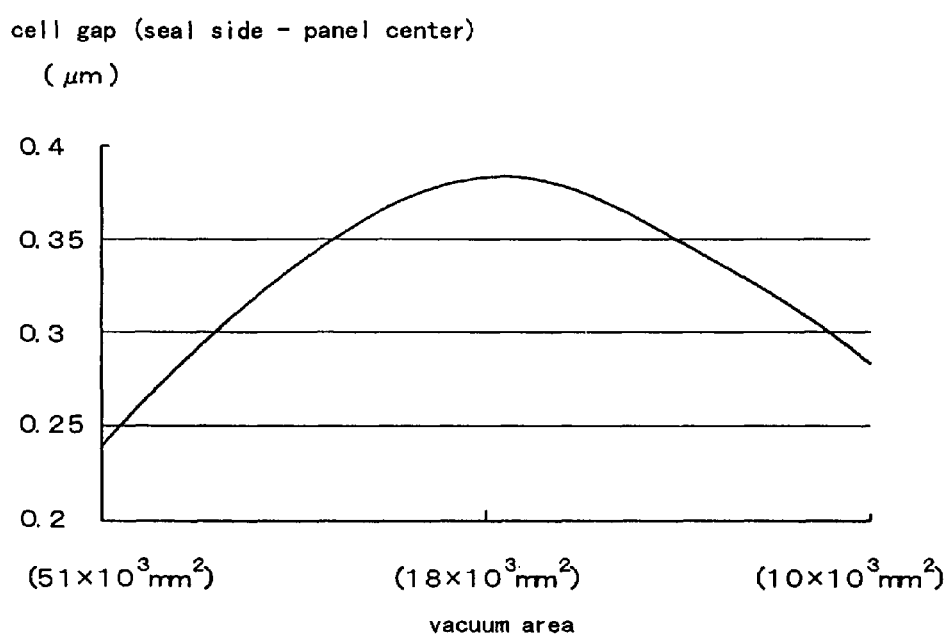
FIG. 76 is a diagram briefly describing the fabrication method of the liquid crystal display according to the nineteenth embodiment of the present invention.

Next, as shown in FIG. 73, the array substrate 16 and the CF substrate 4 are attached. Adhesive spacers are previously dispersed on the CF substrate 4. This process is performed in a vacuum. Next, when the attached substrates are returned in an atmosphere, as the cross section shown in FIG. 74, the liquid crystal 22 between the attached substrates of the array substrate 16 and the CF substrate 4 is spread due to the atmospheric pressure. At this time, a vacuum area 310 is formed between the main seal 306 and the dummy seal 308, as shown in FIG. 74, forces P and P1 from the atmosphere operate according to an area on the substrate in the vacuum area 310. These forces P and P1 are used for creating the gap for the main seal. By controlling the forces P and P1 from the atmosphere, a desired gap can be created. For example, when the viscosity of the main seal is high, as shown in FIG. 75, by making the area on the substrate in the vacuum area 310 larger than the area shown in FIG. 74, a larger force P2 can be operated to create the gap. FIG. 76 shows a difference of cell gaps, obtained by varying the area on the substrate surface in the vacuum area 310, adjacent to the center portion of the display area and the main seal. As shown in FIG. 76, by varying the area on the substrate surface in the vacuum area 310, the difference of the cell gaps can be controlled.

Further, according to this embodiment, since the gap can be created by the vacuum area 310, a conventional gap controlling material 312 made of glass fiber and the like arranged in the main seal 306, as shown in FIG. 77a, is no longer required, thereby easily creating a gap regardless of variations in cell gap due to changes in size or structure of the panel. Furthermore, as shown in FIG. 77b, instead of providing the gap controlling material 312 in the main seal 306, a bank material 314 for defining the height of a gap can be previously formed adjacent to the main seal 306.

Also, as shown in FIG. 78, by installing a thermal heater plate 316 on the substrate attachment stage and mounting the array substrate 16 on which the main seal 306 and the dummy seal 308 are created, attachment with the CF substrate 4 can be performed. In this case, since the viscosity of the sealing material is increased by heating the sealing material and promoting the curing of the seal, the more heat is applied, the thicker the gap becomes. Therefore, by heating the sealing material just before the substrates are attached or during the time the substrates are attached in a vacuum, the gap creation can be controlled.

Thus, according to this embodiment, a preferable cell gap can be also formed by using the instilling method of liquid crystal.

A fabrication method of a liquid crystal display according to a twentieth embodiment of the present invention is described with reference to FIG. 79 through FIG. 87. This embodiment relates to a fabrication method of a liquid crystal display by the instilling method. When vacuum bubbles are left in the sealing material in the liquid crystal instillation process, liquid crystal leaks after attaching the substrates and the vacuum bubbles remain in the panel display, thereby resulting in display irregularities. Further, if a sealing material with a low to mid-viscosity (80,000 to 400,000 cps) is used, the sealing material is separated from the substrate before being cured and the liquid crystal may leak out from the separated portion, thereby resulting in display irregularities. Furthermore, if a cell gap is created thick due to an excessive amount of the dropped liquid crystal, the surface of the panel end is shaved and an excess of liquid crystal is extracted, thereby obtaining a uniform cell gap. However, a problem of a cost increase can not be avoided.

In this embodiment, in order to solve the above problems, a main seal is formed in the periphery of the panel area, a first dummy seal is formed by surrounding the main seal with a predetermined air gap, and liquid crystal is dropped both inside the main seal and the air gap.

According to this embodiment, display irregularities at instillation can be minimized, a problem of a seal peeling caused by the viscosity of a sealing material and the like can be further eliminated, thereby to easily selecting a material and at the same time easily controlling a cell gap.

A fabrication method of a liquid crystal display according to this embodiment is described using examples below.

EXAMPLE 1

Figure 79:
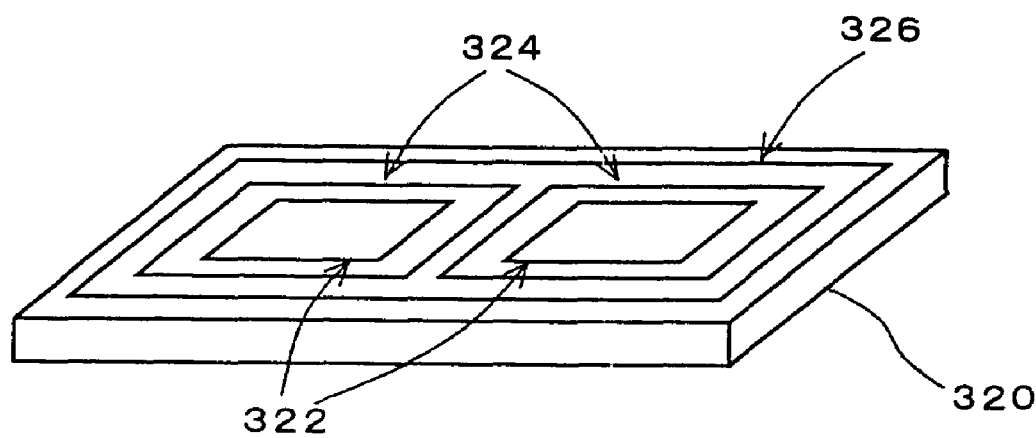
FIG. 79 is a diagram showing a fabrication method of a liquid crystal display according to a twentieth embodiment of the present invention.

A CF substrate and a TFT substrate which are performed an alignment layer treatment thereon and equal to 515 mm×404 mm are used. As shown in FIG. 79, a first dummy seal 324 is formed by coating a heat-combination-type sealing material so that the dummy seal 224 surrounds a main seal 322 on a TFT substrate 320. Further, a second dummy seal 326 is also formed by coating the heat-combination-type sealing material in the external periphery of the first dummy seal as well.

Figure 80:
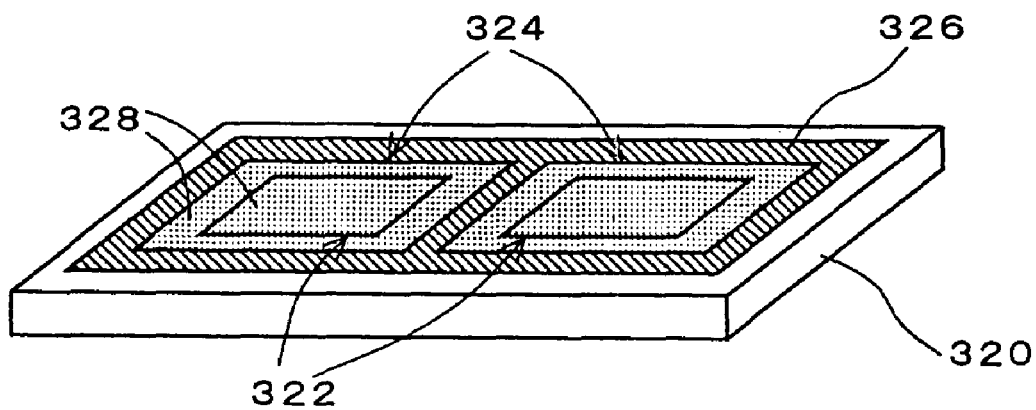
FIG. 80 is a diagram showing the fabrication method of the liquid crystal display according to the twentieth embodiment of the present invention.

Next, as shown in FIG. 80, liquid crystal 328 is dropped inside the main seal 322 and in the area between the main seal 322 and the first dummy seal 324.

Figure 81:
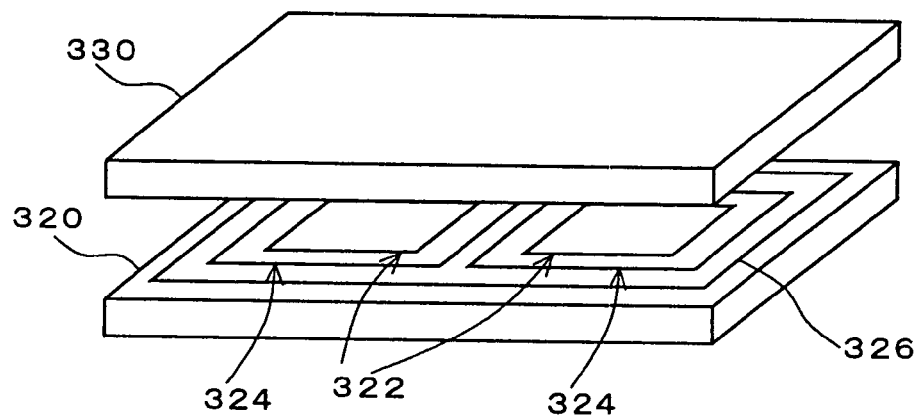
FIG. 81 is a diagram showing the fabrication method of the liquid crystal display according to the twentieth embodiment of the present invention.

Next, as shown in FIG. 81, adhesive spacers (not shown in the diagram) are dispersed on a CF substrate 330 and the CF substrate 330 and the TFT substrate 320 are attached in a vacuum. Then the substrates are returned in an atmosphere and at the same time a gap is created.

Figure 82B:
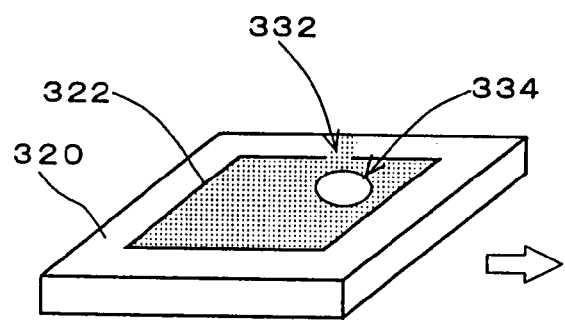
FIGS. 82a and 82b are diagrams showing the fabrication method of the liquid crystal display according to the twentieth embodiment of the present invention.

At this time, if a notch 332 and the like are generated in a part of the main seal 322 as shown in FIG. 82b, liquid crystal flows out of the main seal 322 through the notch 332 and a vacuum bubble 334 enters inside the main seal 322, thereby resulting in generating display irregularities.

Figure 82A:
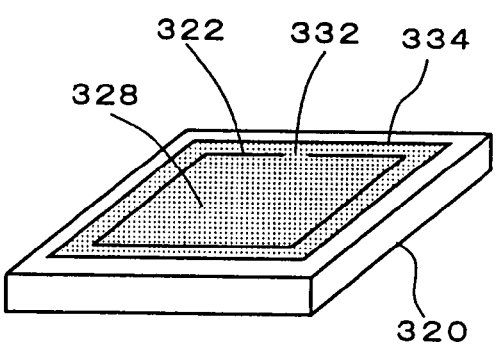

In this example, as shown in FIG. 82a, the notch 332 is intentionally provided in a part of the main seal 322 so that the liquid crystal 328 leaks out of the main seal 322. However, since the liquid crystal 328 is in between the main seal 322 and the first dummy seal 324, a vacuum bubble does not enter inside the main seal 322 and display irregularities do not occur.

EXAMPLE 2

Figure 83:
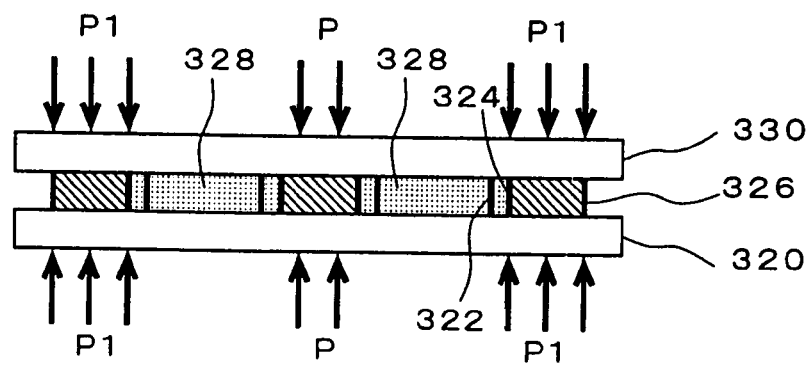
FIG. 83 is a diagram showing the fabrication method of the liquid crystal display according to the twentieth embodiment of the present invention.

Using the TFT substrate 320 of Example 1 and keeping an area between the first dummy seal 324 and the second dummy seal 326 as an air gap, the TFT substrate 320 and the CF substrate 330 are attached as shown in FIG. 83. Adhesive spacers are previously dispersed on the CF substrate 330. This process is performed in a vacuum. Next, when the attached substrates are returned in an atmosphere, the liquid crystal 328 between the attached TFT substrate 320 and the CF substrate 330 is spread due to the atmospheric pressure as in a cross sectional view shown in FIG. 83. At this time, since a vacuum area is formed between the first dummy seal 324 and the second dummy seal 326, forces P and P1 from the atmosphere are operated, as shown in FIG. 83, according to an expanse of the vacuum area on the substrates. These forces P and P1 are utilized to create a gap in the main seal 322. By controlling the forces P and P1 from the atmosphere, a desired gap can be created.

EXAMPLE 3

The main seal 322 is formed by a sealing material with low to mid-viscosity (80,000 to 400,000 cps) and the first dummy seal 324 and the second dummy seal 326 are formed by a sealing material with high viscosity and strong adhesion. Although when the main seal 322 and the first and a second dummy seals 324 and 326 are formed by the sealing material with low to mid-viscosity, a seal peeling and a leakage of liquid crystal are generated. By using the sealing material with strong adhesion for the first and second dummy seals 324 and 326, display irregularities due to a leakage of liquid crystal and the like do not occur although a seal peeling of the main seal 322 may be generated.

EXAMPLE 4

Figure 84:
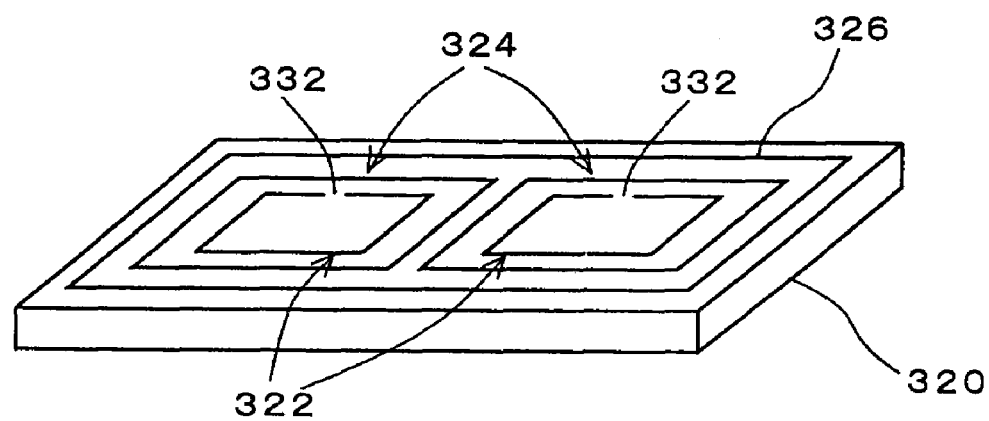
FIG. 84 is a diagram showing the fabrication method of the liquid crystal display according to the twentieth embodiment of the present invention.

As shown in FIG. 84, the notch 332 is formed in a part of the main seal 322. The first dummy seal 324 is coated in the external periphery of the main seal 322. Liquid crystal is dropped in the whole area inside the first dummy seal 324, and the CF substrate and the TFT substrate are attached in a vacuum. After a gap is determined along with the release of atmosphere, the substrates are put in the oven at 120° C. for performing a full curing of the sealing material and the seal is completely cured. At this time, the cell gap inside the panel display is formed to be 0.4 µm thinner than the intended thickness.

Figure 85:
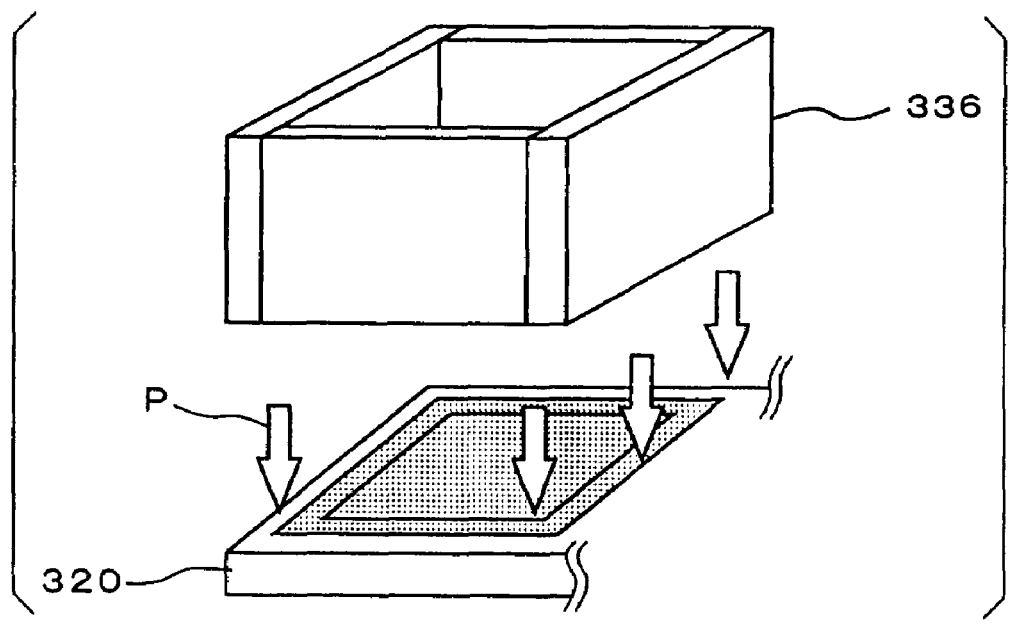
FIG. 85 is a diagram showing the fabrication method of the liquid crystal display according to the twentieth embodiment of the present invention.
Figure 86:
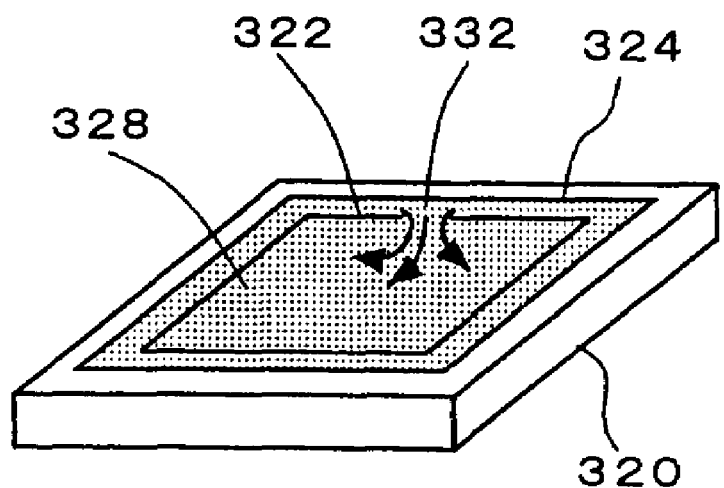
FIG. 86 is a diagram showing the fabrication method of the liquid crystal display according to the twentieth embodiment of the present invention.
Figure 87:
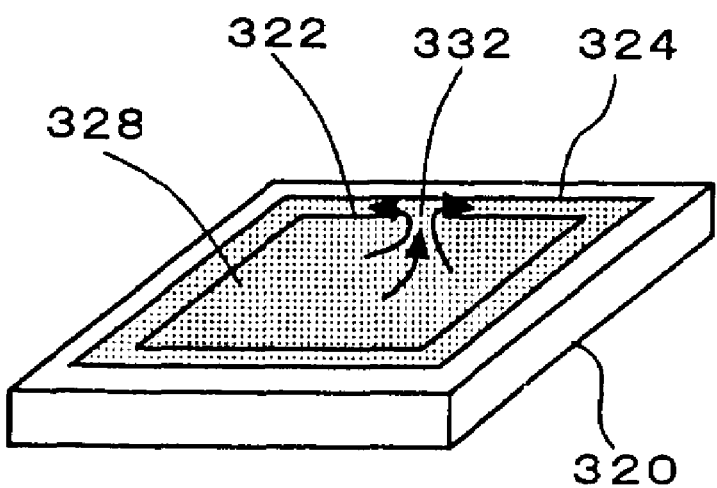
FIG. 87 is a diagram showing the fabrication method of the liquid crystal display according to the twentieth embodiment of the present invention.

Then, by using a pressurization jig 336 shown in FIG. 85, the area between the main seal 322 and the first dummy seal 324 is pressurized by the pressure of 0.3 kg/cm² for 10 hours. Owing to this pressurization, the liquid crystal 328 between the main seal 322 and the first dummy seal 324, as shown by arrows in FIG. 86, flows into inside the main seal 322 through the notch 332 of the main seal 322, and a predetermined cell gap can be obtained.

On the other hand, when the cell gap inside the panel display is thicker than the intended value, inside the main seal 322 is pressurized by the pressurization jig 336. By this pressurization, the liquid crystal 328 inside the main seal 322, as shown by the arrow in FIG. 87, flows out of the main seal 322 through the notch 332 of the main seal 322 and a predetermined cell gap can be obtained.

As described above, according to this embodiment, display irregularities at instillation can be minimized and the yield can be improved.

Figure 88A:
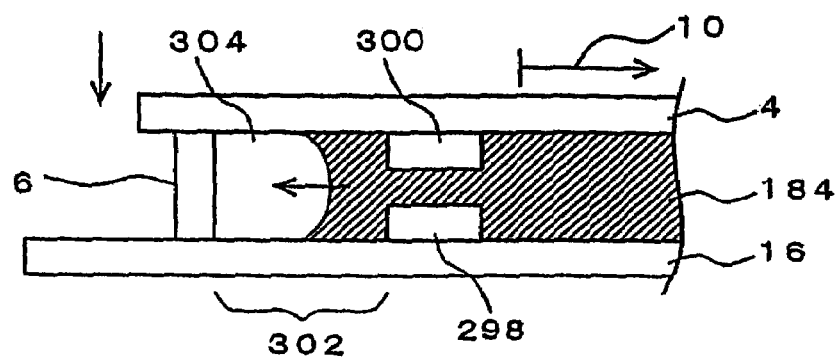
FIGS. 88a and 88b are diagrams describing substrate attachment in a liquid crystal display according to a twenty-first embodiment of the present invention.
Figure 88B:
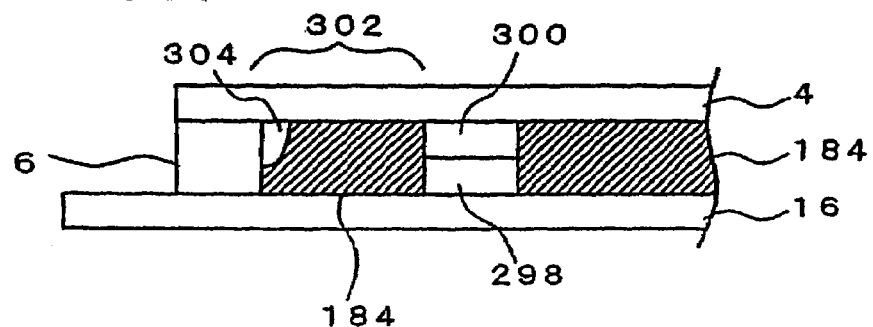

Next, a liquid crystal display and a fabrication method thereof according to a twenty-first embodiment of the present invention are described with reference to FIGS. 88a and 88b. In this embodiment, a liquid crystal display which can suppress irregularities in cell gap even if the amount of liquid crystal drops at instillation in the cell process is not accurate is described. FIGS. 88a and 88b are diagrams describing an attachment according to this embodiment. FIG. 88a is a cross section cut vertically to the surface of a liquid crystal panel and shows an intermediate state of substrate attachment. FIG. 88b is a cross section cut vertically to the surface of a liquid crystal panel and shows a completed state of substrate attachment. In the diagram, the structuring members having the same functional operations as the structuring members previously described are referred by the same codes previously used and the descriptions are omitted.

As shown in FIGS. 88a and 88b, on the array substrate 16, a convex-type structure 298 for defining a cell gap is provided in frame shape inside the sealing material 6 and outside the display area 10. Further, on the CF substrate 4, a convex-type structure 300 for defining a cell gap is also provided in frame shape inside the sealing material 6 and outside the display area 10 and at the same time at a position facing the convex-type structure 298 on the array substrate 16.

A liquid crystal 184 which is more than the amount required to fill inside the display area 10 and at the same time also less than the amount required to fill inside the sealing material 6 is dropped inside the convex-type structure 298 on the array substrate 16. Then, substrate attachment is performed by the method which is previously described. First, as shown in FIG. 88a, the array substrate 16 and the CF substrate 4 are brought closer together and the front end portion of the sealing material 6 on the array substrate 16 side contacts with the CF substrate 4. Although both of the substrates 4 and 16 are further brought closer together by pressurization, at this intermediate point of substrate attachment, space between the convex-type structures 298 and 300 still exists, and therefore excess liquid crystal 184' overflowing from the display area 10 is drained to an air gap 94 in a gap portion 93 between the sealing material 6 and the convex-type structures 298 and 300.

In a state in which substrate attachment is completed as shown in FIG. 88b, both of the front end portions of the convex-type structures 298 and 300 are closely adhered, and a predetermined cell gap is decided by the sum of the heights of both structures. At the same time, drainage of the excess liquid crystal 184' is also prevented. Even if the air gap 94 exists in the gap portion 93 to some degree, since the gap portion 93 is outside the display area, a problem does not occur. It will be noted that although the convex-type structures 298 and 300 are formed on both of the array substrate 16 and the CF substrate 4 in this embodiment, this is not limited to this. A convex-type structure with a predetermined height may certainly be provided on only the array substrate 16 side or only the CF substrate 4 side.

As described above, according to this embodiment, even if the dropping amount of liquid crystal varies, since the excess liquid crystal 184' is drained between the sealing material 6 and the convex-type structures 298 and 300, the array substrate 16 and the CF substrate 4 are pressurized toward each other by the heights of the convex-type structures 298 and 300. Accordingly, a cell gap is defined by the heights of the convex-type structures 298 and 300. Therefore, a problem in which a cell gap varies depending on the dropping amount of liquid crystal as in the past does not occur. In other words, even if the amount of liquid crystal drops is not accurate, irregularities in cell gap can be suppressed.

Next, a liquid crystal display and a fabrication method thereof according to a twenty-second embodiment of the present invention are described with reference to FIG. 89. In this embodiment similarly to the sixth embodiment, a liquid crystal display in which irregularities in cell gap can be suppressed even if the dropping amount of liquid crystal at instillation in the cell process is not accurate is described. In the diagram, the structuring members having the same functional operations as the structuring members previously described are referred by the same codes previously used and the descriptions are omitted.

Figure 89:
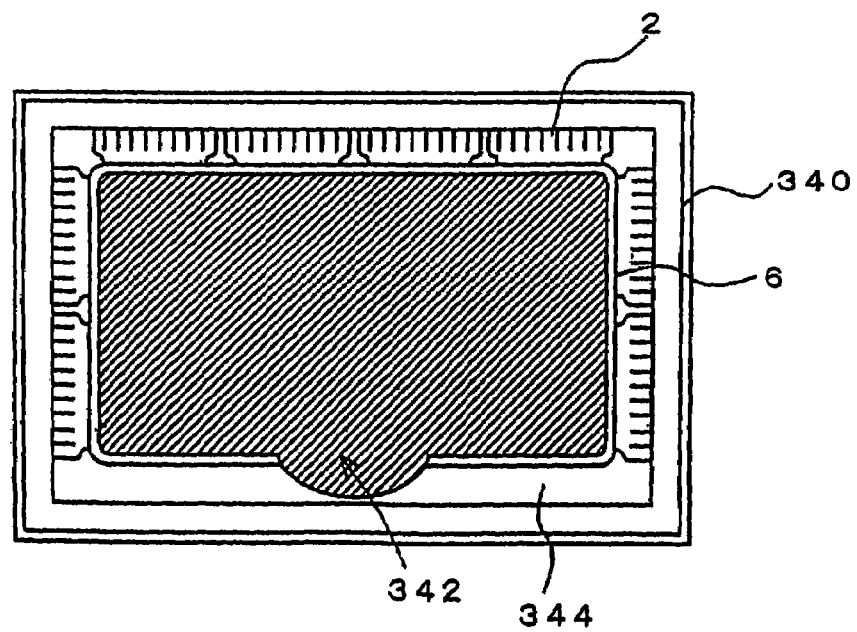
FIG. 89 is a diagram describing substrate attachment in a liquid crystal display according to a twenty-second embodiment of the present invention.

As shown in FIG. 89, in the display panel according to this embodiment, the sealing material has a double structure in which an inner sealing material is the rectangular frame-shape sealing material 6 as shown in FIGS. 1a and 1b and the like and another rectangular frame-shape sealing material 340 is formed outside the sealing material 6. An opening portion 342 is provided inside the sealing material by cutting out a portion of the sealing material 340 so that liquid crystal can flow out.

By liquid crystal instillation process, liquid crystal more than the amount required to fill inside the sealing material 6 but less than the amount to fill inside the sealing material 340 is dropped. Then, both substrates are pressurized and attached. At this time, liquid crystal which becomes an excess inside the sealing material 6 flows out from the opening portion 342 of the sealing material 6 to an area between the sealing material 6 and the sealing material 340.

As described above, according to this embodiment, even if the dropping amount of liquid crystal varies, since an excess liquid crystal is drained between the sealing material 6 and the sealing material 340, a problem in which a cell gap varies depending on the dropping amount of liquid crystal is not accurate, irregularities in cell gap can be suppressed.

Further, in this embodiment, the opening portion 342 of the sealing material 6 is provided on a side portion 344 where a TFT terminal portion 2 is not formed. Since the substrates are cut in the area between the sealing material 6 and the sealing material 340 after the substrates are attached, the opening portion 342 is required to be sealed after the substrates are cut. If the opening portion 342 is provided on a side portion of the TFT terminal portion 2 side, a plan to prevent a sealing material from flowing to a TAB (Tape Automated Bonding) pressing area is required and the sealing process becomes complicated. On the other hand, if the opening portion 342 is provided on the side portion 344 side where the TFT terminal portion 2 is not formed, the closing process can be simply performed.

Figure 90A:
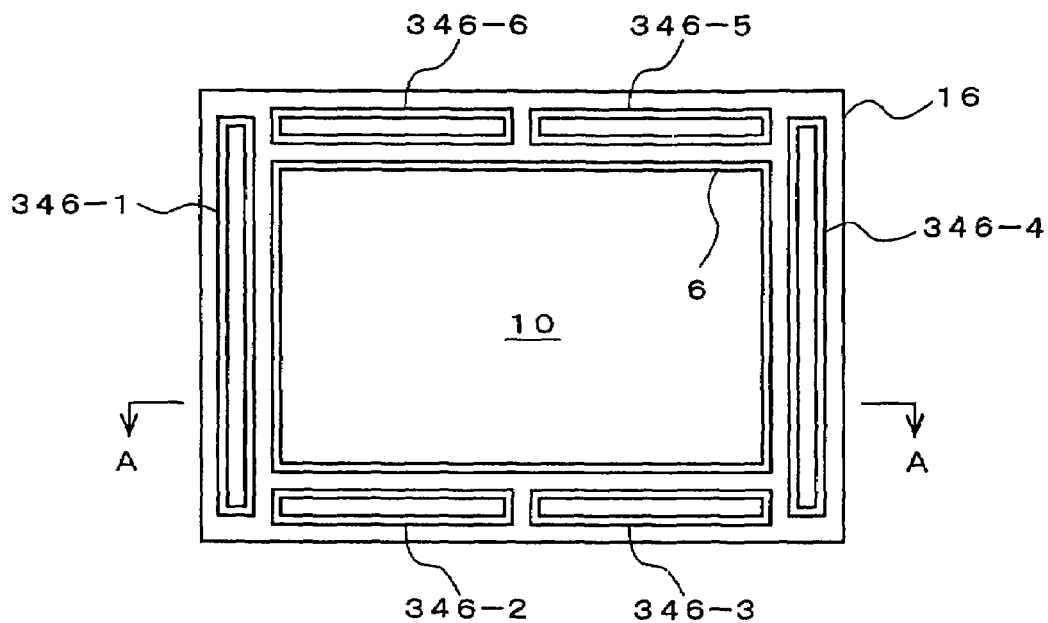
FIGS. 90a through 90c are diagrams describing a liquid crystal display and a fabrication method thereof according to a twenty-third embodiment of the present invention.
Figure 90B:

Next, a liquid crystal display and a fabrication method thereof display according to a twenty-third embodiment of the present invention are described with reference to FIGS. 90a through 90c. In the diagram, the structuring members having the same functional operations as the structuring members previously described are referred by the same codes previously used and the descriptions are omitted. First, FIG. 90a shows an upper surface on the array substrate 16 side and FIG. 90b shows a cross section cut at a line A-A of FIG. 90a. The display area 10 is formed on the array substrate 16 and the sealing material 6 is formed in rectangular frame-shape in the periphery of the display area 10. Six sealing materials 346-1 through 346-6 which are in a rectangular frame-shape and have a definite space inside the frame are formed in the external periphery of the sealing material 6.

In the liquid crystal instillation process, liquid crystal is dropped only on the display area 10 inside the sealing material 6 and liquid crystal is not dropped inside the frames of the sealing materials 346-1 through 346-6. Then, the array substrate 16 and the CF substrate 4 (not shown in the diagram) are attached in the vacuum environment. Accordingly, since inside the frames of the sealing materials 346-1 through 346-6 where liquid crystal is not dropped is attached in a decompressed state, the sealing materials 346-1 through 346-6 function as a suction cups in an atmosphere. Thus, a displacement between both substrates when the panel is released in an atmosphere after the substrates are attached can be certainly prevented and the accuracy of attachment can be improved.

Figure 90C:
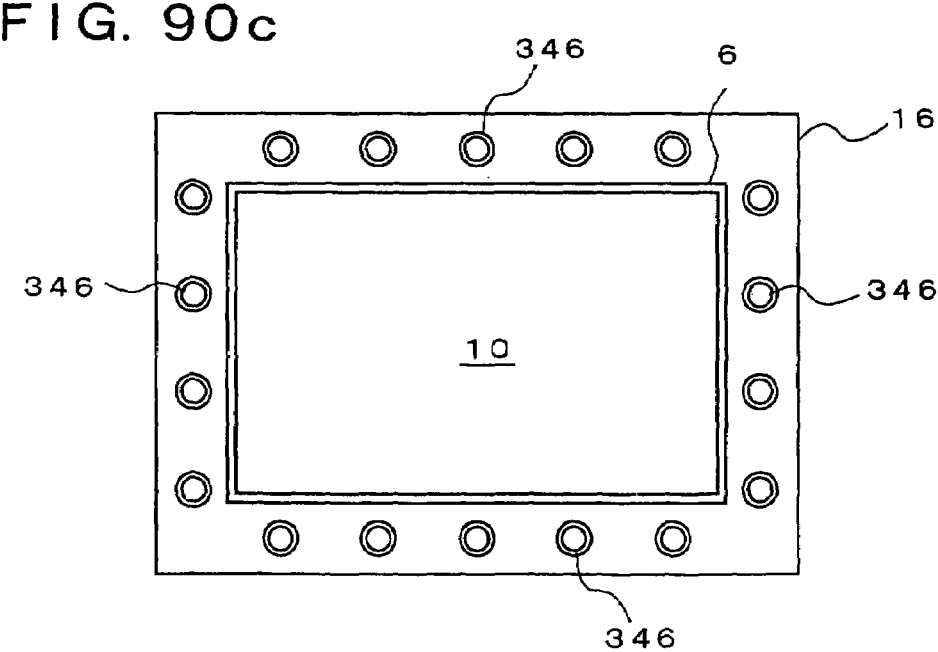

FIG. 90c shows an example of a variation of the sealing material 346-1 through 346-6 in which a plurality of cylindrical sealing materials 346, in place of the rectangular frame-shape shape, are provided in the external periphery of the sealing material 6. Since inside of the cylindrical frames of the sealing materials 346 is also attached in a decompressed state in this manner, when the substrates are returned into the atmosphere, the sealing materials 346 function as suction cups. Thus, a displacement between both substrates when the panel is released in the atmosphere after the substrates are attached can be certainly prevented and the accuracy of attachment can be improved. Shape, size, quantity, position of arrangement and the like are not limited to the examples in FIGS. 90*a* through 90*c* and various shapes can be adopted.

As described above, according to the above first through twenty-third embodiments, problems in fabricated technology related to a liquid crystal instillation process in the cell process can be solved and by using the instilling method, a liquid crystal display can be fabricated with high yield. Accordingly, the application of the instillation process is realized and the cost of liquid crystal display can be further reduced, thereby expanding the market size by replacing CRT.

Next, a liquid crystal display and a fabrication method thereof according to a twenty-fourth embodiment of the present invention are described with reference to FIG. 91 through FIG. 94. It will be noted that structuring elements having the same operation functions as the structuring elements in the above embodiments are referred by the same codes and the descriptions are omitted.

This embodiment relates to a holding method of a glass substrate in a liquid crystal instilling method and an object of this embodiment is to simply fabricate a liquid crystal panel at a low cost by holding a substrate on a surface plate in a vacuum.

In the instilling method, after liquid crystal is dropped on a substrate, an array substrate and an opposite substrate are aligned and attached under a decompressed environment. However, an accurate alignment of substrates under a decompressed environment is attended by difficulties. Further, an alignment system for aligning substrates is complicated and a equipment tends to be large.

In this embodiment, protrusions are provided on substrates so that when substrates are attached, an accurate alignment can be easily accomplished based on the protrusions formed on both substrates.

Figure 91:
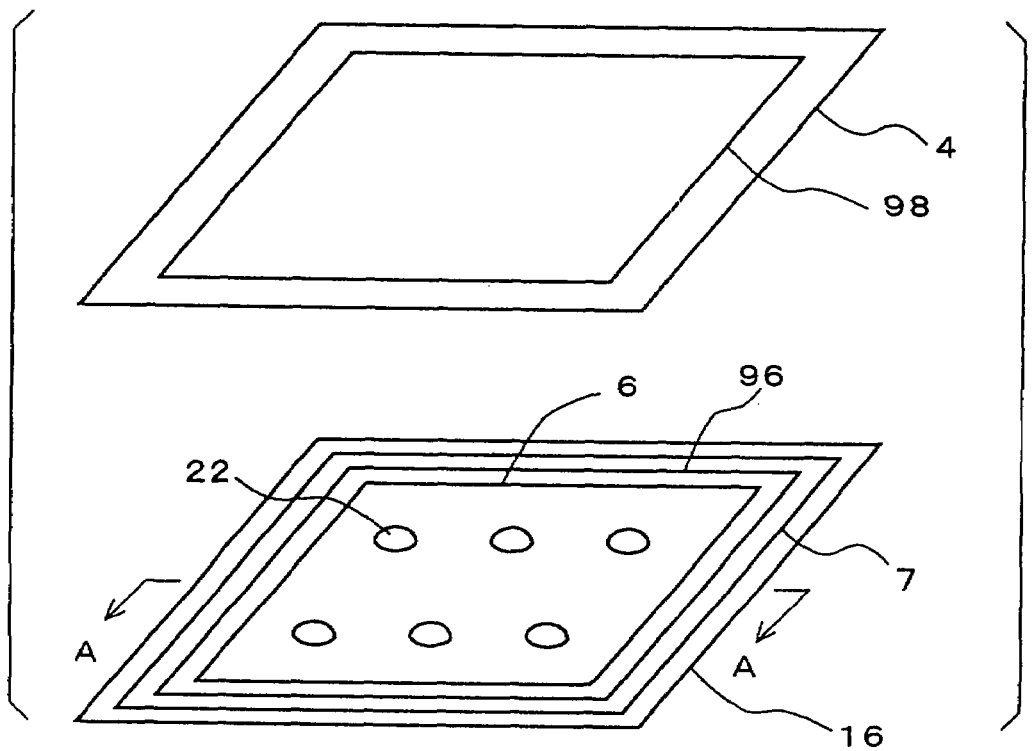
FIG. 91 is a diagram showing a schematic structure of a substrate of a liquid crystal display according to a twenty-fourth embodiment of the present invention.

Structures of the substrates in a liquid crystal display according to this embodiment are briefly described with reference to FIG. 91. As shown in FIG. 91, sealing materials 6 and 7 are double-coated on the array substrate 16. A protruding portion 96 having a predetermined height from the substrate surface is formed in frame shape in the area between the sealing material 6 and the sealing material 7. Further, the liquid crystal 22 is dropped at a plurality of points inside the display area on the array substrate 16 by a liquid crystal instilling equipment which is omitted in the diagram. On the other hand, a frame-shape protruding portion 98 is also formed on the opposite substrate 4.

Figure 92:
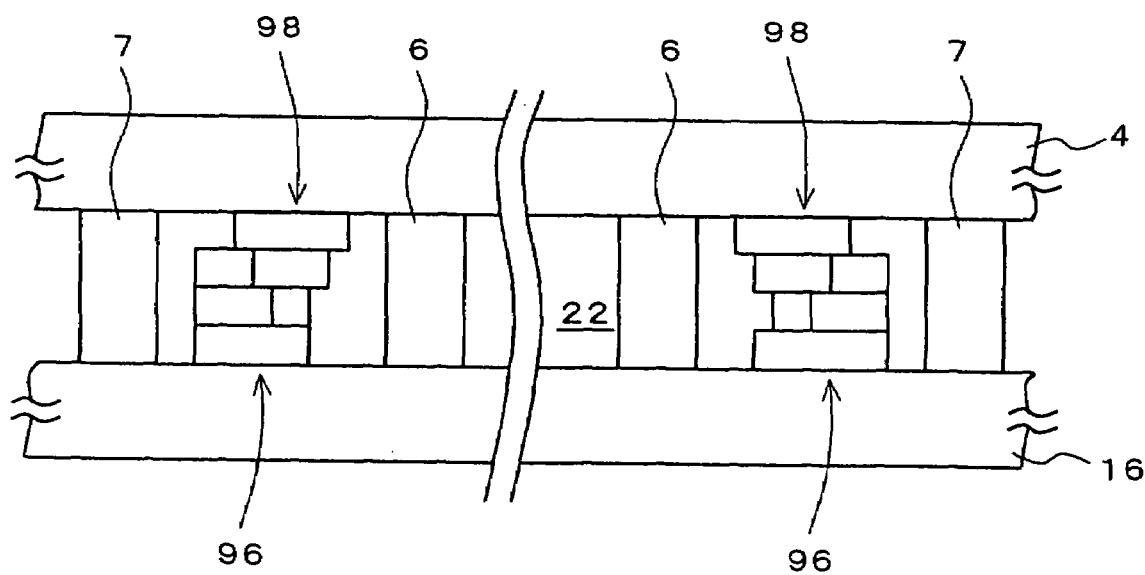
FIG. 92 is a diagram describing protruding portions 96 and 98 of the liquid crystal display according to the twenty-fourth embodiment of the present invention.

Using FIG. 92 showing a cross section cut at a line A-A of FIG. 91, the protruding portions 96 and 98 are described in more detail. As shown in FIG. 91, the protruding portions 96 and 98 formed between the sealing material 6 and sealing material 7 are formed so that, with respect to the protruding portion 96, the protruding portion 98 is formed inward by a predetermined measurement on the substrate surface. Therefore, when both substrates 4 and 16 are attached after rough alignment, a difference of level of the protruding portion 98 outside of the substrate and a difference of level of the protruding portion 96 inside of the substrate fit together. Accordingly, the two substrates 4 and 16 are accurately attached. It will be noted that sum of the height of both protruding portions 96 and 98 is formed higher than the cell gap of the panel. Further, at least one protruding portion of the protruding portions provided on the two substrates is formed so that an envelope of a wall portion is inclined with respect to the substrate surface.

The protruding portion 98, for example, is fabricated by patterning three color filter forming materials for forming a color filter on the opposite substrate 4 by photolithography technology and by laminating the three color filter forming materials in a step shape. The protruding portion 96 is fabricated by patterning and laminating resist used in the photolithography process when forming elements such as TFT and the like on the array substrate 16.

Figure 93:
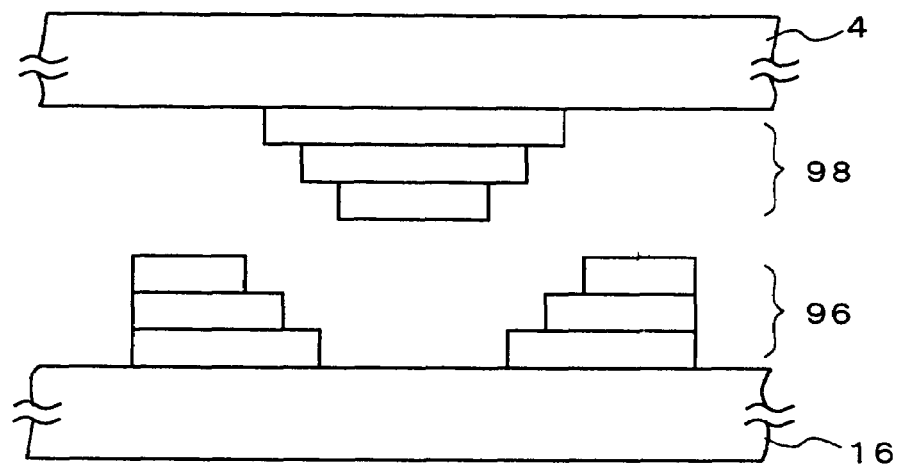
FIG. 93 is a diagram describing an example of a variation of the protruding portions 96 and 98 of the liquid crystal display according to the twenty-fourth embodiment of the present invention.

FIG. 93 shows an example of a variation of the protruding portion. As shown in FIG. 93, for example, by forming the protruding portion 96 on the array substrate 16 side into a concave shape and the protruding portion 98 into a convex shape on the opposite substrate 4 side and then fitting both protruding portions together, accurate alignment can be accomplished. It will be noted that, in this embodiment, the protruding portion 96 is a two-parallel structure, the protruding portion 98 is to be filled between the two parallel structures of the protruding portion 96 and the protruding portions 96 and 98 are continuously provided all around the substrates. However, this not essential and, for example, frame-shape protruding portions may certainly be formed intermittently along the frame. Further, the protruding portions may certainly be provided at four vertical and horizontal positions. In essence, a protruding portion for deciding one position in one direction of the two substrates to be attached and for deciding the other position in an orthogonal direction to the other are required to be provided. Furthermore, the protruding portion 96 shown in FIG. 93 may be formed into a conical shape of an annulus ring and the protruding portion 98 into a conical shape to fit in the protruding portion 96 as a whole, and the plurality of the protruding portions may certainly be formed on the substrates.

Furthermore, although double sealing materials 6 and 7 are formed in the above embodiment, the sealing material 7 to be formed outside may certainly be different in quality of a material from the sealing material 6 inside. In this case, the sealing material 6 may be of any material as long as the material has a quality which does not substantially change the resistance value of the liquid crystal 22. In order to prevent display irregularities to be generated due to a reduction in voltage retention ratio of the liquid crystal, the use of a material in which variation of the resistance rate of the liquid crystal 22 is less than 5% is desirable. Also, a material different from the inner sealing material 6 may be used as the outside sealing material 7. It will be noted that, since the double sealing materials 6 and 7 are provided to further closely fix both substrates by having the structure of the double sealing materials function as a suction cup between the two attached substrates, for example, the structure may certainly be of only the sealing material 6.

Thus, according to this embodiment, a final alignment in substrate attachment can be decided by the position of the protrusions formed on the substrates. If a protrusion is formed using photolithography technology, the accuracy of alignment equal to approximately 2 μm can be easily realized. Therefore, an alignment can be easily and accurately accomplished under a decompressed atmosphere and the size of a display can also be kept from being too large, thereby fabricating a liquid crystal panel which is accurately attached without an increase in a fabrication cost.

According to this embodiment, a liquid crystal display panel in which the accuracy of alignment is improved can be fabricated at a low cost. Further, even if the sealing materials are formed by heat-curing type materials and the sealing materials are weakened by a heat-curing treatment, a displacement of the substrates and the like can be prevented.

Figure 94:
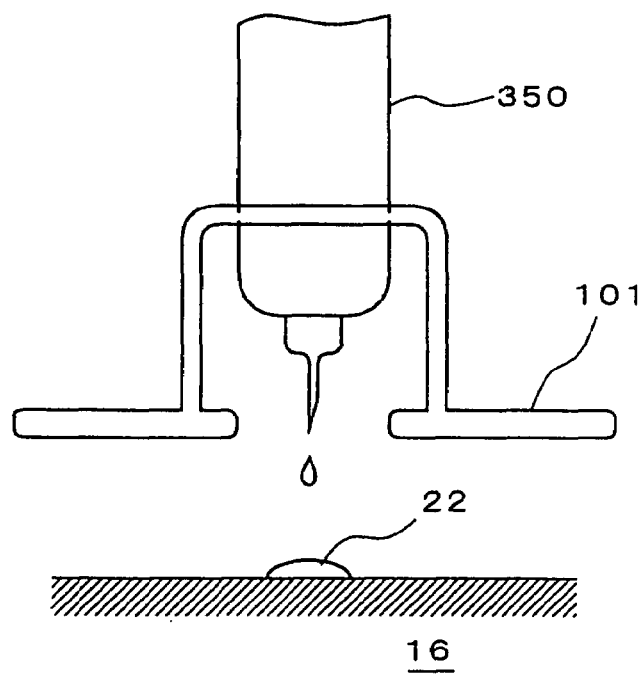
FIG. 94 is a diagram showing a liquid crystal instilling equipment used to fabricate the liquid crystal display according to the twenty-fourth embodiment of the present invention.

FIG. 94 shows a liquid crystal instilling equipment used in this embodiment. A flange-shape liquid crystal scattering prevention member 101 is installed in the periphery of a liquid crystal dropping hole at front end of a liquid crystal dispenser portion 350 from which liquid crystal is dropped. By this liquid crystal scattering prevention member 101, when liquid crystal, for example, is dropped in the substrate surface of the array substrate 16, a splash of the dropped liquid crystal can be prevented from adhering to the sealing materials 6, 7 and the like. By obstructing a splash of liquid crystal from adhering to the sealing materials 6 and 7, the adhesion strength of the sealing material can be further improved.

Next, a liquid crystal display according to a twenty-fifth embodiment of the present invention is described with reference to FIG. 72 and FIG. 95 through FIG. 100. This embodiment relates to a fabrication method of a liquid crystal display according to an instilling method. This embodiment has a distinctive characteristic in that after the substrates are attached by the instilling method and released in an atmosphere, the substrates are left on a stage with a high degree of flatness, and UV irradiation for curing the sealing material is performed under a state in which the substrates are further attracted on the stage. By attracting and holding the substrates to the stage with a high degree of flatness, the substrate surface copies after the state surface of a high degree of flatness, and steady curing of the sealing materials in which displacement of substrates and distortion are suppressed can be obtained.

Further, if the same stage can be used for substrate mounting stages when releasing in an atmosphere and when irradiating UV, stability against the displacement of substrates can be further increased. If a stage is changed when releasing the substrates in an atmosphere and when irradiating UV to the substrates, by always keeping conveyance and waiting periods of the substrates constant until UV irradiation is performed, distortions become stabilized and displacement can be controlled.

Examples of a fabrication method of a liquid crystal display according to this embodiment is described with below reference to comparative examples and diagrams.

Adhesive spacers or column-shape spacers made of resin are formed on one of the array substrate which can take two 15-inch planes performed the alignment-film treatment therein and the CF substrate, and a heat-combination-type UV sealing material is coated on the other. At this time, by surrounding the external periphery of the main seal 306, as shown in FIG. 72, by a dummy seal 72 and forming a vacuum area 74, the substrate displacement between the array substrate 16 and the CF substrate 4 when attaching the substrates and substrate displacement due to vibrations and deflection during the substrate conveyance can always be substantially constant.

Sequentially, the liquid crystal 22 is dropped on the array substrate 16 and the both substrates are mounted on the stage and attached in the vacuum environment. Although then the substrates are released in an atmosphere, since the area surrounded by the main seal 306 is kept vacuum, when the liquid crystal 22 spreads in the subject area, a gap formation simultaneously begins owing to a pressure difference with the atmospheric pressure.

At this time, as a comparative example, the panel is first conveyed onto the top of an ordinary desk and the like having a low degree of flatness, then the panel is returned on the released stage in the atmosphere and UV irradiation is performed.

On the other hand, as an example, after the panel is left on top of the ordinary desk and the like similarly to the comparison example, the panel is returned on the released stage in an atmosphere, the panel is further attracted by an attraction mechanism and UV irradiation is performed.

Figure 95:
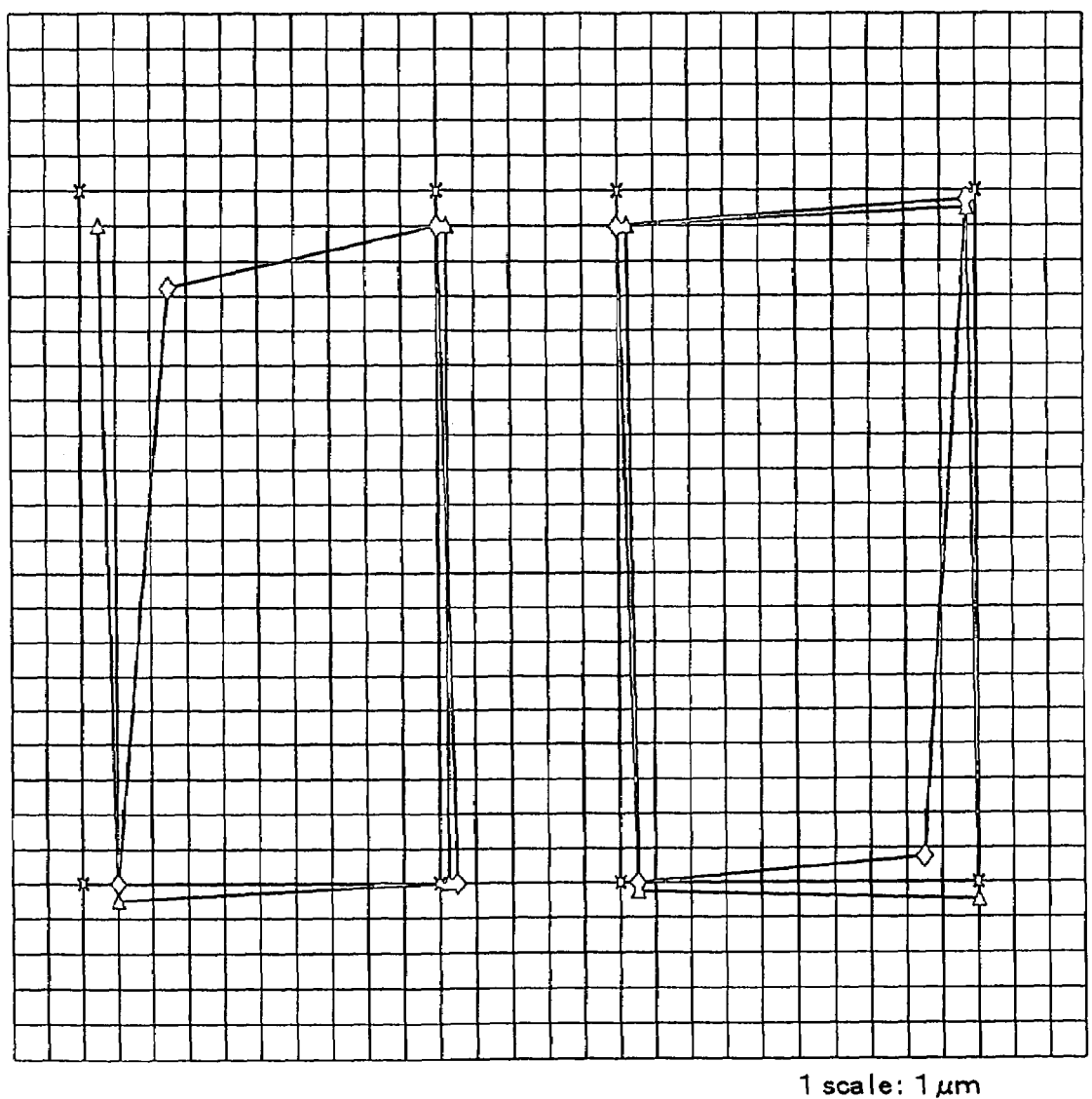
FIG. 95 is a diagram showing the results of Example 1 in a fabrication method of a liquid crystal display according to a twenty-fifth embodiment of the present invention and a comparison example.

FIG. 95 illustrates the result of the above example and comparative example. In FIG. 95, a scale mark represents 1 µm and the solid line with a mark x on corner portions shows a position for attaching the CF substrate on the array substrate taking two 15-inch planes therein based on the design values. In FIG. 95, the solid line with a mark Δ on corner portions shows a displacement of attachment between the array substrate and the CF substrate according to this example. Further, the solid line with a mark ♦ on corner portions shows a displacement of attachment between the array substrate and the CF substrate according to the comparative example. As shown in FIG. 95, while a displacement between the substrates is as small as approximately 2 µm in this example, a displacement between the substrate in the comparative example is more than 5 µm due to a large distortion generated in the panel.

Figure 96:
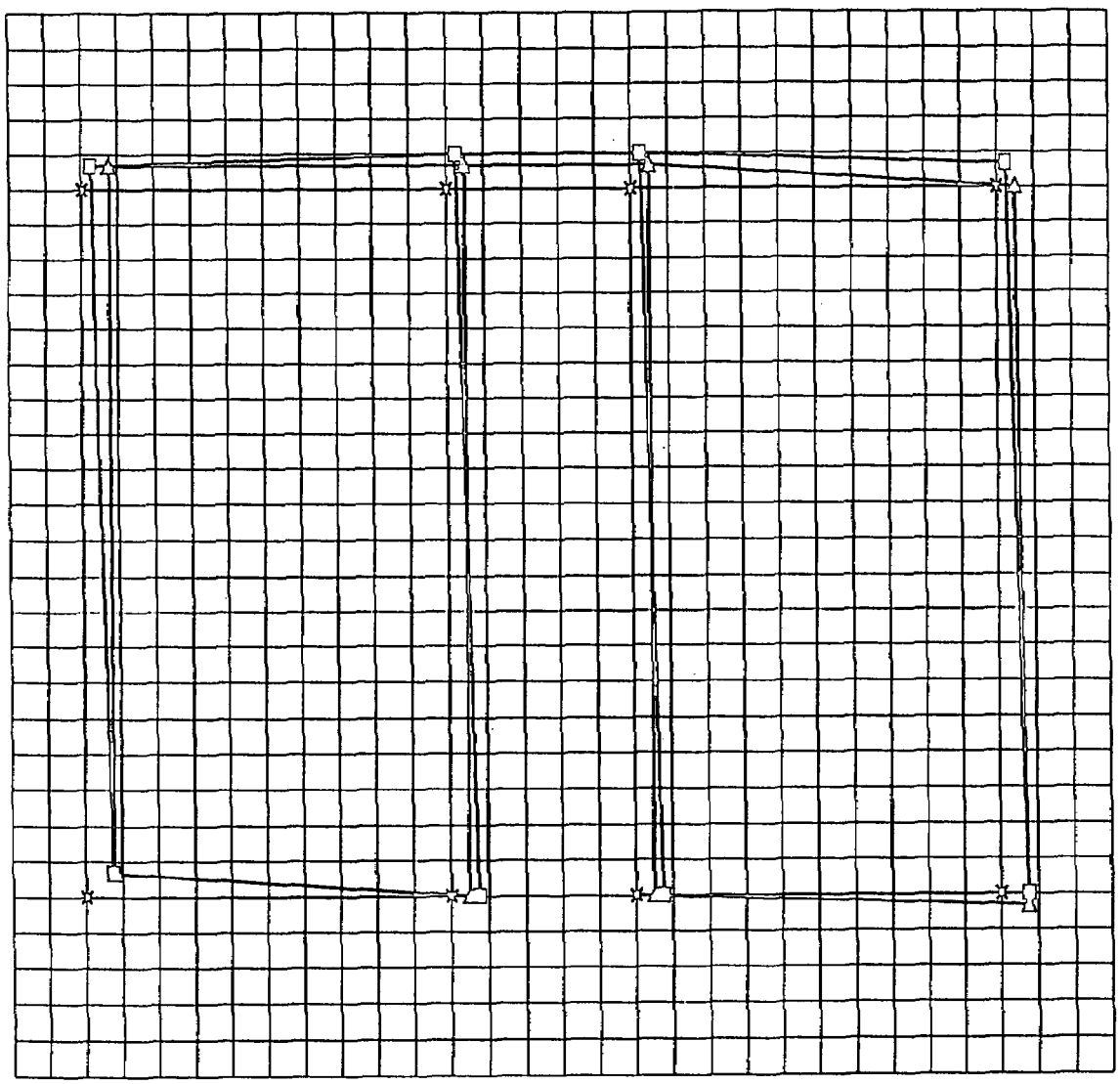
FIG. 96 is a diagram showing the result of Example 2 in the fabrication method of the liquid crystal display according to the twenty-fifth embodiment of the present invention.

Next, as an example 2, a panel is mounted on a stage having a degree of flatness equal to ±50 µm and attached in a vacuum, the panel is left attracted on the subject stage after releasing the panel in an atmosphere until a gap is completely created, and the sealing material is cured by UV while the panel is still attracted on the stage. FIG. 96 illustrates the result of the example 2. In FIG. 96, a scale mark represents 1 µm, the solid line with a mark x on corner portions shows a position for attaching the CF substrate on the array substrate taking two 15-inch planes therein based on the design values. In FIG. 96, the solid line with a mark ■ on corner portions shows a displacement of attachment between the array substrate and the CF substrate according to this example for the first time. The solid line with a mark Δ on corner portions shows a displacement of attachment between the array substrate and the CF substrate according to this example for the second time. As clear FIG. 96, according to this example, a displacement between the substrates can be less than 2 µm and at the same time the amount of displacement between the substrates can be suppressed to a substantially constant and stable amount.

Figure 97:
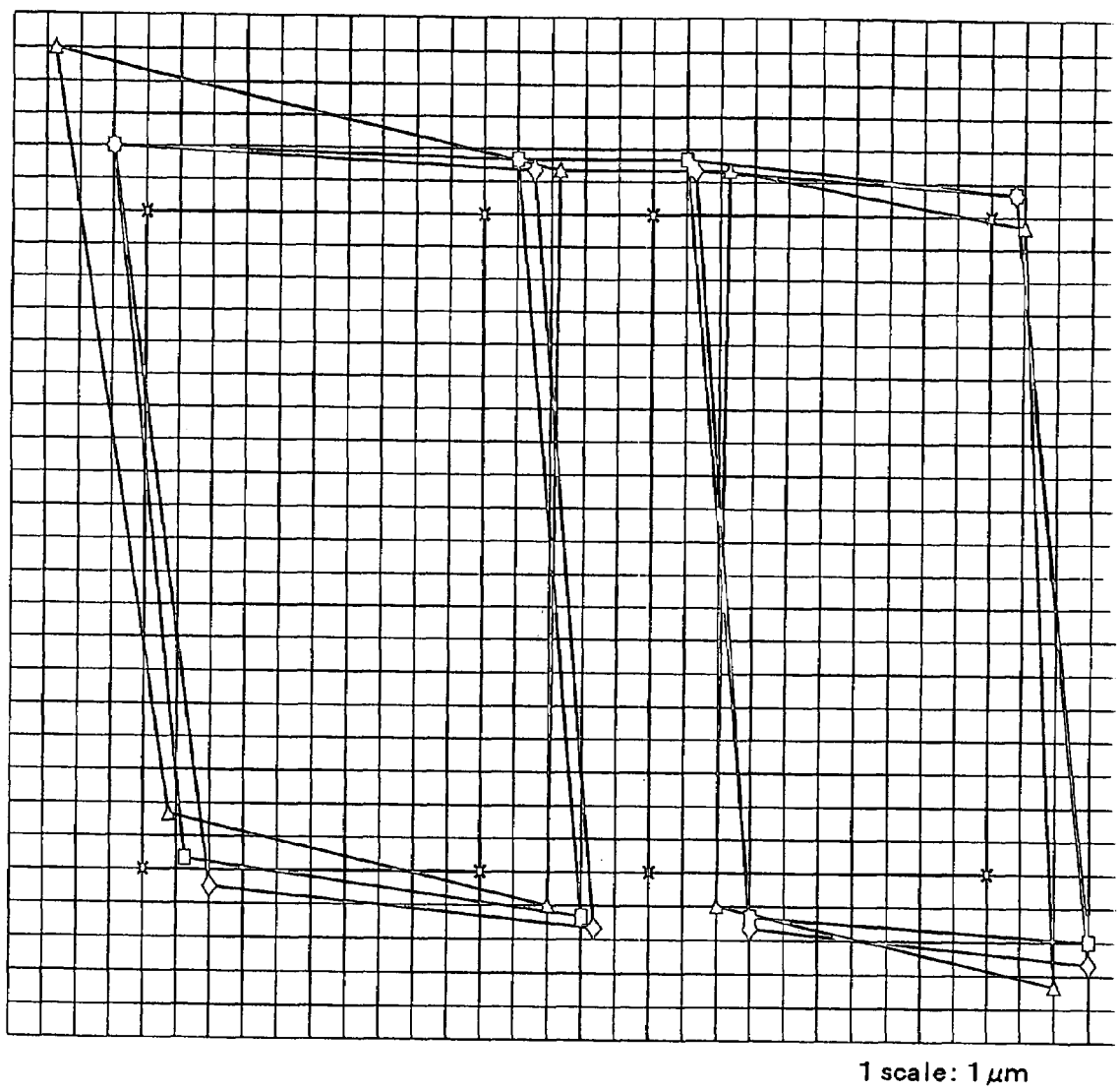
FIG. 97 is a diagram showing the result of Example 2 in the fabrication method of the liquid crystal display according to the twenty-fifth embodiment of the present invention.

On the other hand, as a comparative example 2, a panel is mounted on a stage having a degree of flatness equal to ±50 µm and attached in a vacuum, and the panel is carried out of the stage after releasing the panel in an atmosphere and irradiated by UV on top of a desk. FIG. 97 shows the result of the comparative example 2. In FIG. 97, a scale mark represents 1 µm, the solid line with a mark x on corner portions shows a position for attaching the CF substrate on the array substrate taking two 15-inch planes therein based on the design values. In FIG. 97, the solid lines with marks ■,♦ and Δ on corner portions show displacements of attachment between the array substrate and the CF substrate according to this comparative example for the first through third times respectively. As clear in FIG. 97, according to the comparative example 2, large displacements between the substrates occur due to the distortions generated in the panels.

Figure 98:
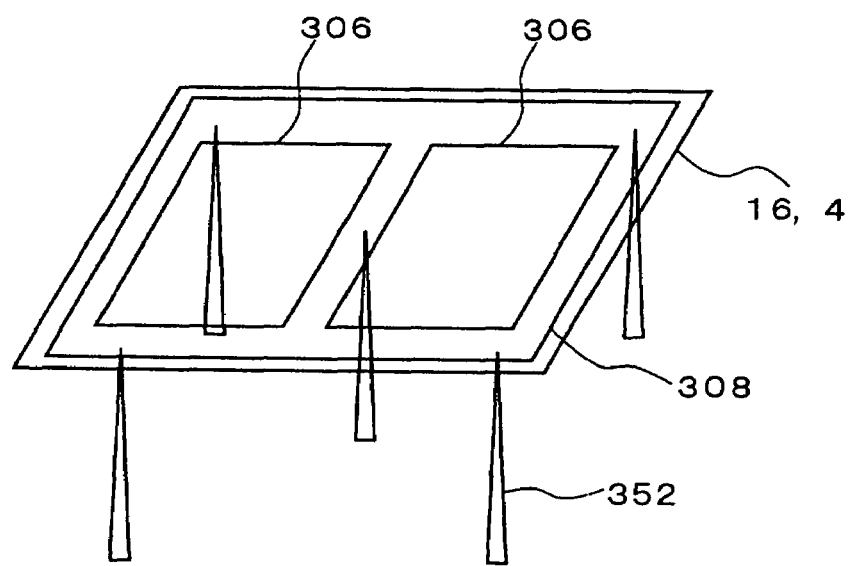
FIG. 98 is a diagram showing a pin 90 used in the fabrication method of the liquid crystal display according to the twenty-fifth embodiment of the present invention.
Figure 99:
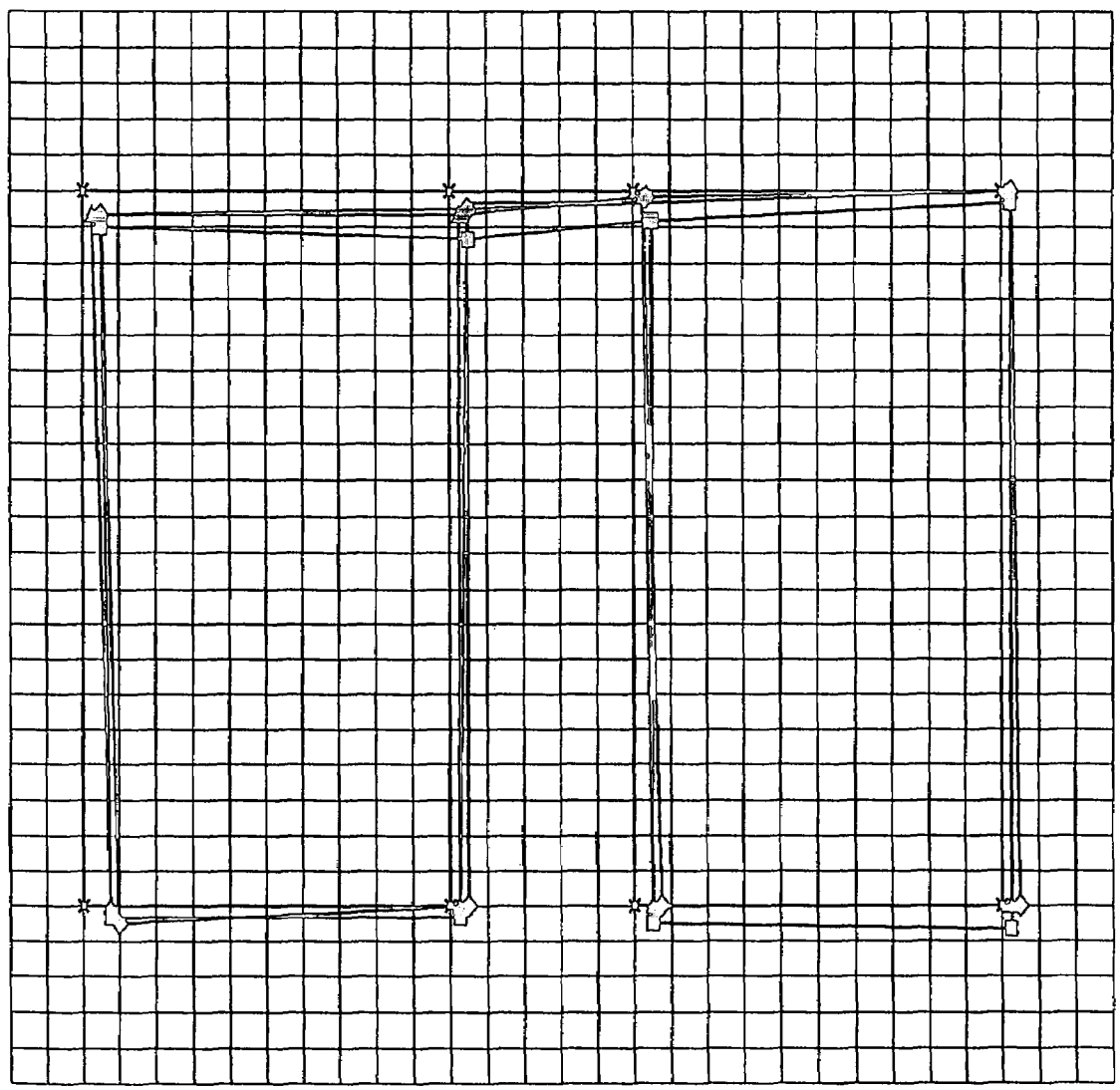
FIG. 99 is a diagram showing the result of Example 3 in the fabrication method of the liquid crystal display according to the twenty-fifth embodiment of the present invention.

Next, as shown in FIG. 98 as an example 3, taking a distortion of the panel into consideration, the panel is supported by five pins 352 at four corners and substantially the center under the panel for a predetermined period after releasing the panel in an atmosphere. Subsequently, the panel is again mounted on the stage used for attachment and attracted, and performed the sealing-cure by UV irradiation. The result of the example 3 is shown in FIG. 99. In FIG. 99, a scale mark represents 1 µm and the solid line with a mark x on corner portions shows a position for attaching the CF substrate on the array substrate taking two 15-inch planes therein based on the design values. In FIG. 99, the solid line with a mark ■ on corner portions shows the result in which after the panel is supported by the pins 352 for 30 seconds, the panel is mounted on a stage, attracted therein, and cured the seal by UV irradiation. The solid line with a mark Δ on corner portions shows the result in which after the panel is supported by the pins 352 for 60 seconds, the panel is mounted on a stage, attracted, and cured the seal by UV irradiation. Further, the solid line with a mark ♦ on corner portions shows the result in which the panel is mounted on a stage without being supported by the pins 352, attracted, and cured the seal by UV irradiation. As clear in FIG. 99, distortions vary depending on the period the panel is supported. If the amount of distortion is as small, constant and stable as shown in FIG. 99, a displacement between the substrates can be controlled by correcting the stage apparatus for mounting the panel and the like.

Figure 100:
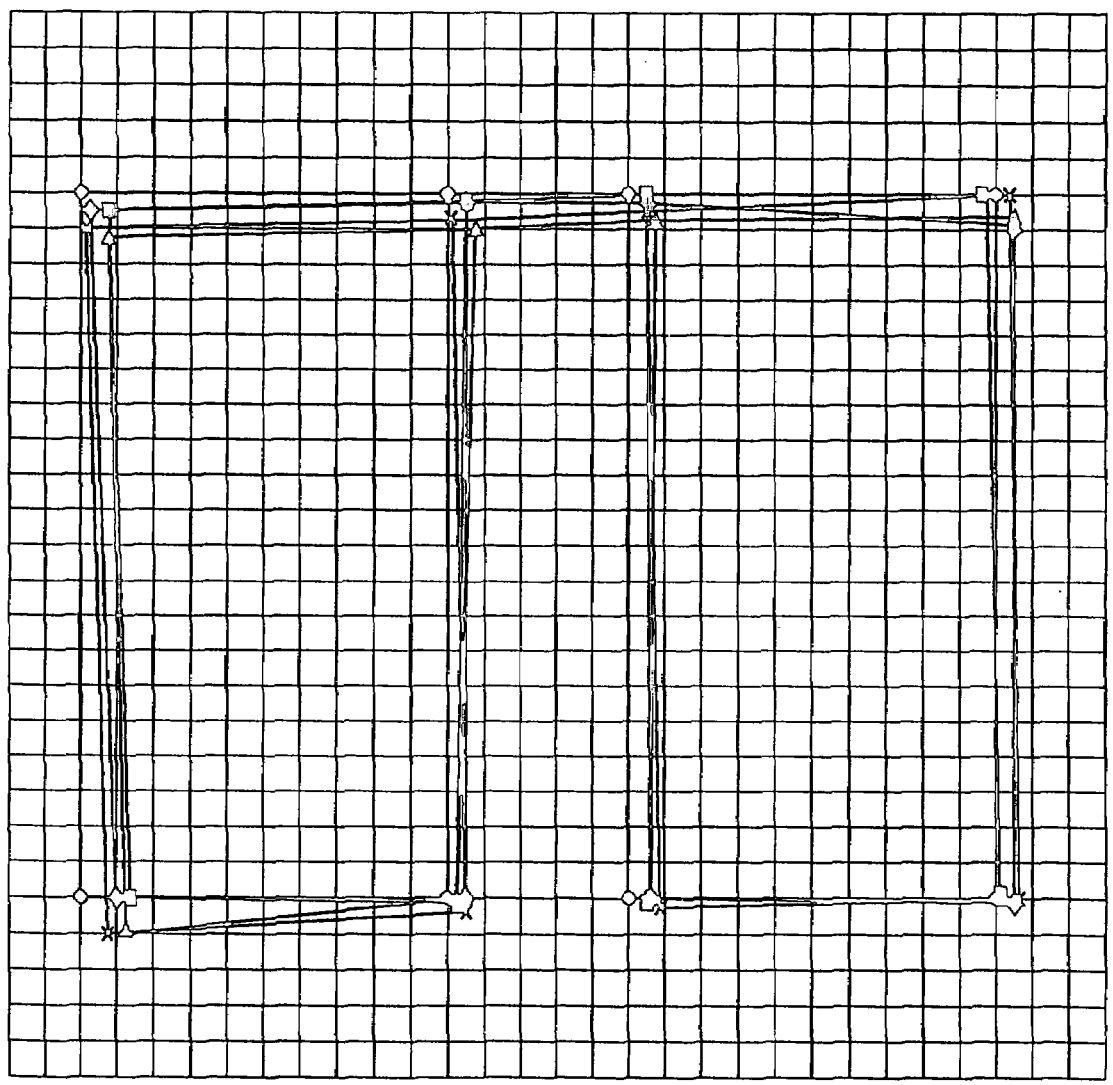
FIG. 100 is a diagram showing the result of the examples in the fabrication method of the liquid crystal display according to the twenty-fifth embodiment of the present invention.

FIG. 100 shows the result of consecutively fabricating five substrates in which each panel is conveyed by the similar operation to the above, the period from the time the panel is released in an atmosphere to the time UV irradiation is performed is constant, and the panel is attracted and cured by UV. As clear in FIG. 100, the amount of displacement is contained within a 3 µm square area at four corners of the CF substrate and can be sufficiently controlled by correcting the offset at the attachment even in the mass production process. Further, when an UV lamp generating a UV wavelength of less than 280 nm is used, liquid crystal is degraded and display irregularities reducing the retention ratio are generated. However, by using a filter to cut the UV wavelength less than 280 nm, a panel without display irregularities can be formed.

Thus, according to this embodiment, by using the instilling method, distortions generated in the glass substrate and a displacement between the two substrates facing each other can be steadily controlled and a stable fabrication process in which display irregularities do not occur and is feasible for mass production can be obtained.

Figure 101:
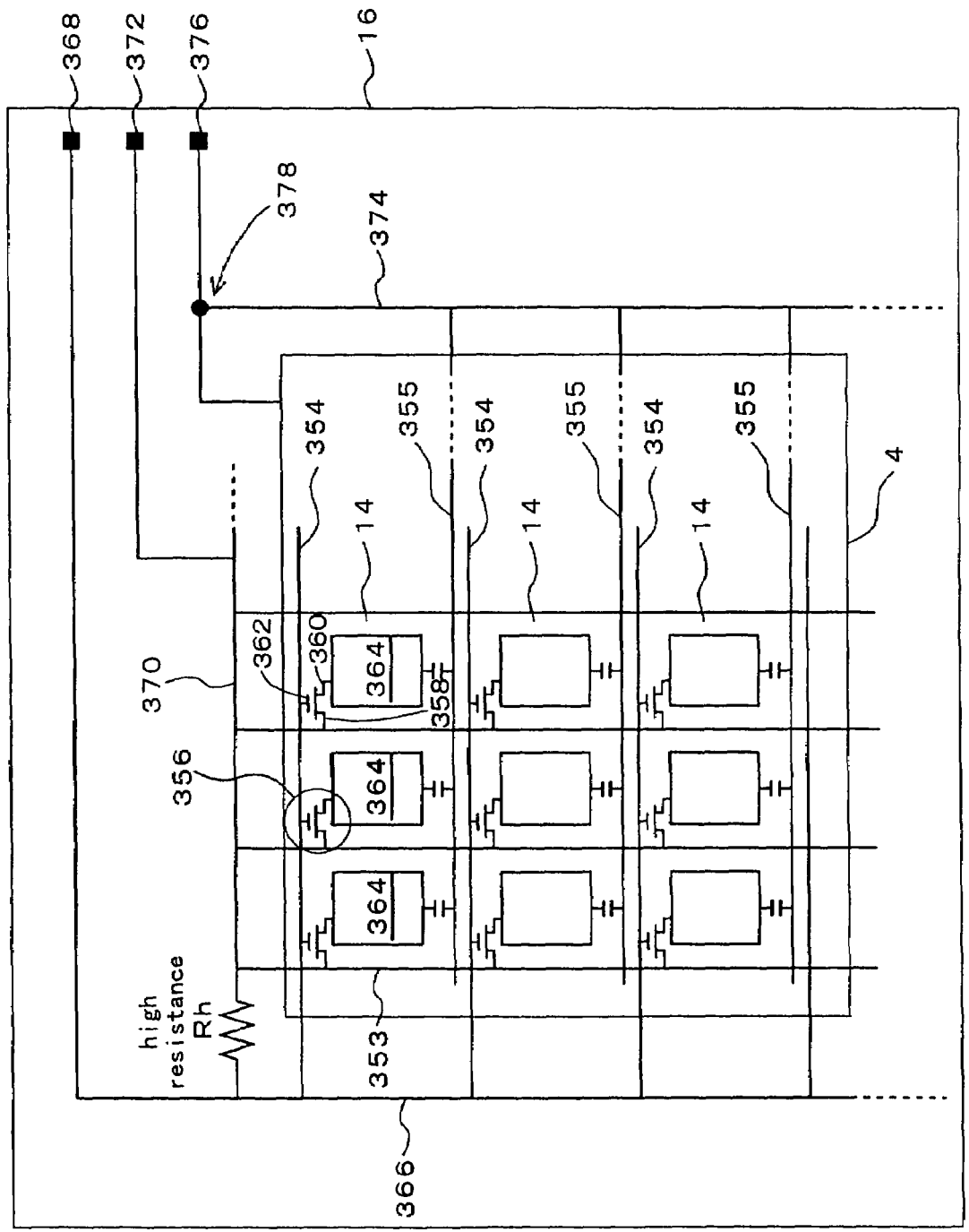
FIG. 101 is a diagram showing a schematic structure of an active matrix-type liquid crystal display fabricated by a fabrication method of a liquid crystal display according to a twenty-sixth embodiment of the present invention.
Figure 102:
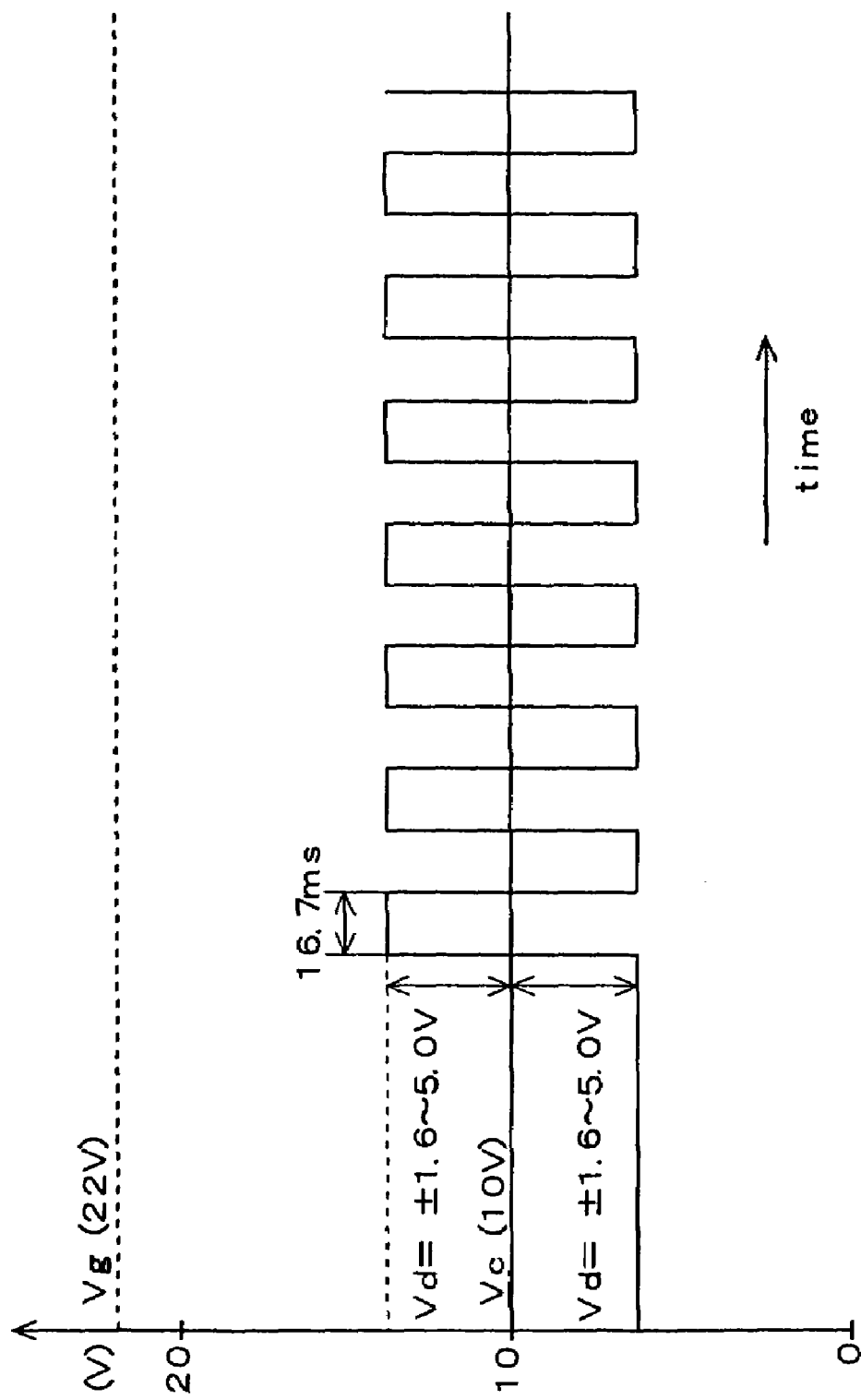
FIG. 102 is a diagram showing an example of a panel inspection in the fabrication method of the liquid crystal display according to the twenty-sixth embodiment of the present invention.

Next, a fabrication method of a liquid crystal display according to a twenty-sixth embodiment of the present invention is described with reference to FIG. 101 through FIG. 103. This embodiment also relates to a fabrication method of a liquid crystal display according to the instilling method and is particularly ideal for using in a fabrication method of an MVA-type liquid crystal panel. First, a structure of an active matrix-type liquid crystal display fabricated by a fabrication method of a liquid crystal display according to this embodiment is briefly described with reference to FIG. 101. FIG. 101 shows a plane surface of a substrate and equivalent circuits of the pixels viewing the array substrate of a liquid crystal display from the liquid crystal layer side. As shown in FIG. 101, a plurality of drain bus lines 353 extending vertically in the diagram are formed on the array substrate 16. Further, a plurality of gate bus lines 354 which are orthogonal to the drain bus lines 353 and extend horizontally in the diagram are formed on the array substrate 16. The areas decided by these drain bus lines 353 and gate bus lines 354 are the pixel areas.

A TFT 356 is formed adjacent to the intersection of the drain bus line 353 and the gate bus line 354 in each pixel area. A drain electrode 358 of the TFT 356 is connected to an adjacent drain bus line 353. A source electrode 360 is connected to a pixel electrode 364 formed in the pixel area. A gate electrode 362 is connected to an adjacent gate bus line 354. Further, a storage capacitor bus line 355 is formed crossing each pixel area.

Further, one end portion of each gate bus line 354 is electrically connected by a gate bus line bundle wiring 366. The end portion of the gate bus line bundle wiring 366 is pulled out to the end portion of the array substrate 16 and connected to an external connecting terminal 368. Similarly, one end portion of the drain bus line 353 is electrically connected by a drain bus line bundle wiring 370. The end portion of the drain bus line bundle wiring 370 is pulled out as far as to the end portion of the array substrate 16 and connected to an external connecting terminal 372.

Further, one end portion of the storage capacitor bus line 355 is electrically connected by a storage capacitor bus line bundle wiring 374. Furthermore, a common electrode (not shown in the diagram) formed on the CF substrate 4 side is also connected to the storage capacitor bus line bundle wiring 374 via a transfer 378. The end portion of the storage capacitor bus line bundle wiring 374 is pulled out to the end portion of the array substrate 16 and connected to an external connecting terminal 376. The external connecting terminals 368, 372 and 376 are adjacent to one another and arranged in a row on the end portion of the array substrate 16 so that a signal from in an inspection device at the time of a panel inspection can be input. Also, the end portion of the external connecting terminals 368, 372, 376 arranged on the array substrate 16 are formed with a shift from the end portion of the CF substrate 4.

These bundle wirings 366, 370 and 374 are utilized as common electrodes electrically connecting each bus line 354 in order to protect from static electricity in the fabrication process of the array substrate 16. The gate bus line bundle wiring 366 and the drain bus line bundle wiring 370 among these bundle wirings 366, 370 and 374 are cut and separated after attaching the array substrate 16 and the CF substrate 4 and performing the panel inspection. On the other hand, the storage capacitor bus line bundle wiring 374 is left alone and functions to supply common electrode potential to the storage capacitor bus line 355.

In a fabrication method of a liquid crystal display, for example, having the process in which liquid crystal is dropped on the array substrate 16, the array substrate 16 and the CF substrate 4 are attached by a sealing material made of photo-curing-type material and the sealing material is irradiated by light and cured, the liquid crystal display panel shown in FIG. 101 can be obtained by attaching the array substrate 16 and the CF substrate 4 so that the end portions of both substrates are relatively shifted and by arranging the external connecting terminals 368, 372 and 376 for panel inspection in the shifted area. It will be noted that by varying the sizes of the substrates for the array substrate 16 and the CF substrate 4 beforehand, the external connecting terminals 368, 372 and 376 may also be arranged in an open area created when both substrates are attached.

Next, an example of a panel inspection is described with reference to FIG. 102 and FIG. 103. The lateral axis in FIG. 102 represents time and the vertical axis represents voltage. FIG. 102 shows each voltage wave when gate voltage (Vg) is applied from the external connecting terminal 368, drain voltage (Vd) is applied from the external connecting terminal 372 and common voltage (Cv) is applied from the external connecting terminal 376. The object of the panel inspection shown in FIG. 102 is to inspect irregularities in cell gap and liquid crystal instillation (uninstillation, leakage, etc.). Therefore, by fixing the common voltage (Vc) at 10V and further fixing the gate voltage (Vg) at 22V and reversing the drain voltage (Vd) at an interval equal to 16.7 ms within a range of plus or minus 1.6 through 5.0V based on the common voltage, display irregularities in the display area are detected. Display irregularities can be detected with the visual observation or automatically a solid image pickup element such as CCD and the like.

Figure 103:
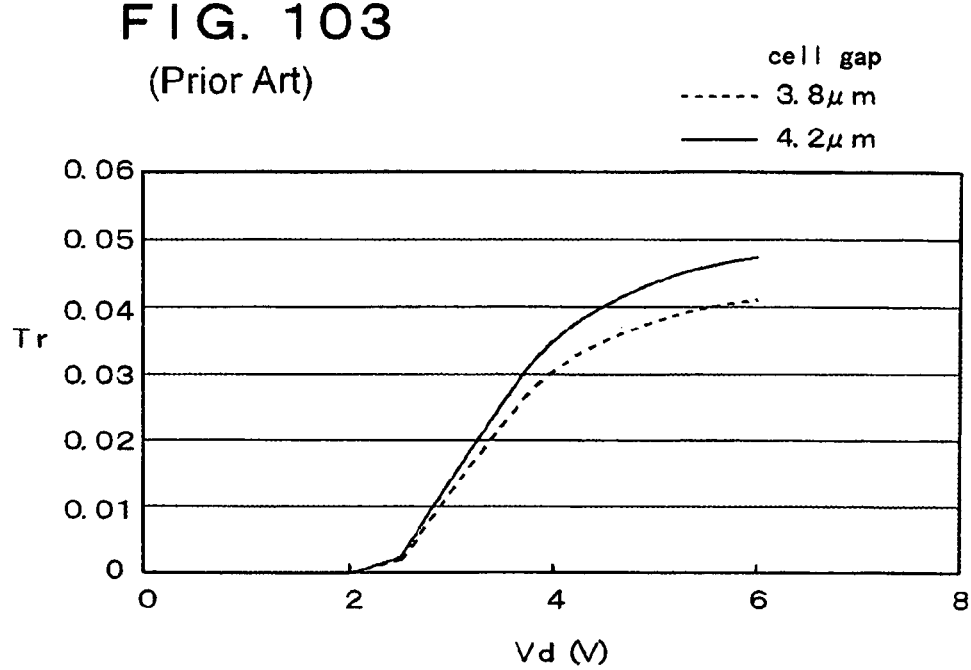
FIG. 103 is a diagram showing the example of the panel inspection in the fabrication method of the liquid crystal display according to the twenty-sixth embodiment of the present invention.
Figure 104:
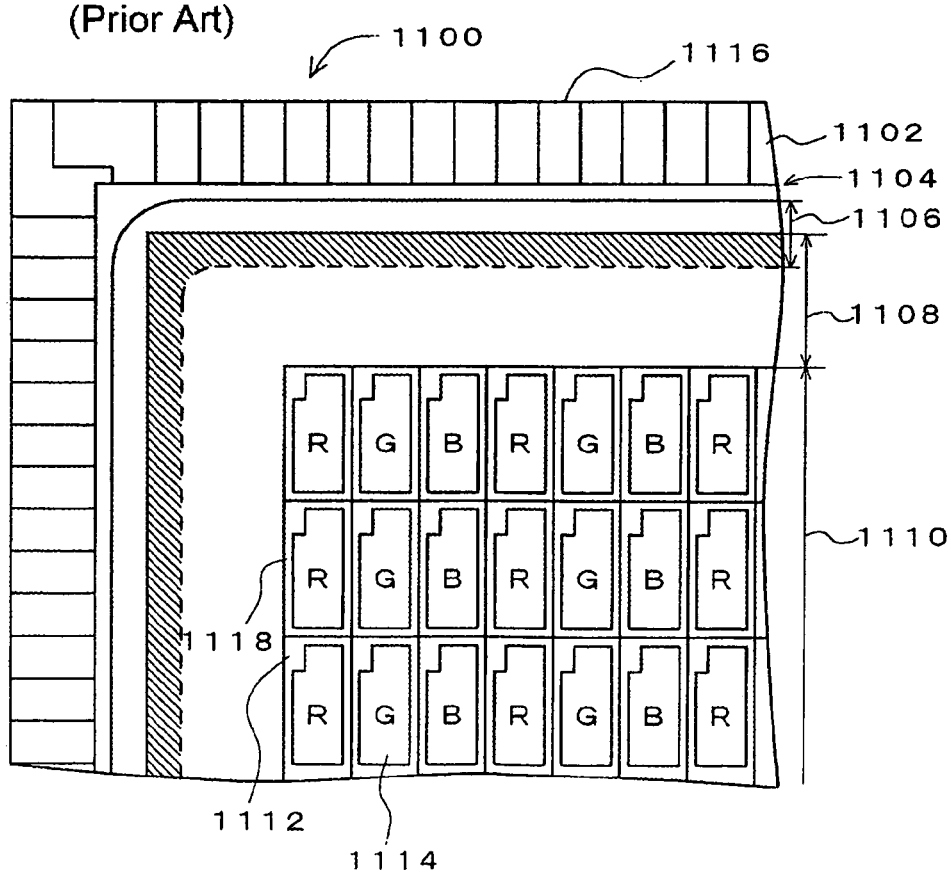
FIG. 104 is a diagram showing a schematic structure of a conventional liquid crystal display panel.
Figure 105A:
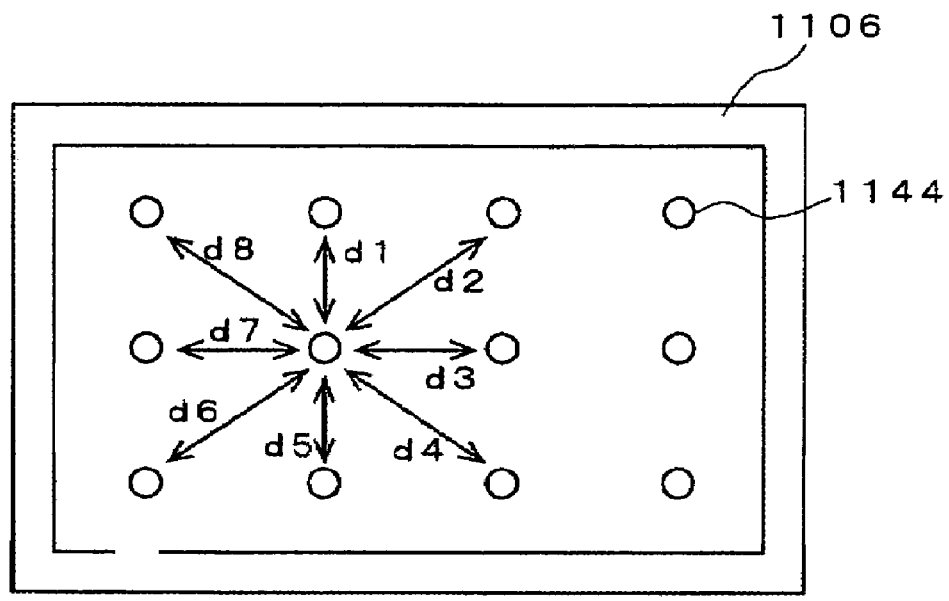
FIGS. 105a and 105b are diagrams showing a liquid crystal instillation in a cell process of the conventional liquid crystal panel.
Figure 105B:
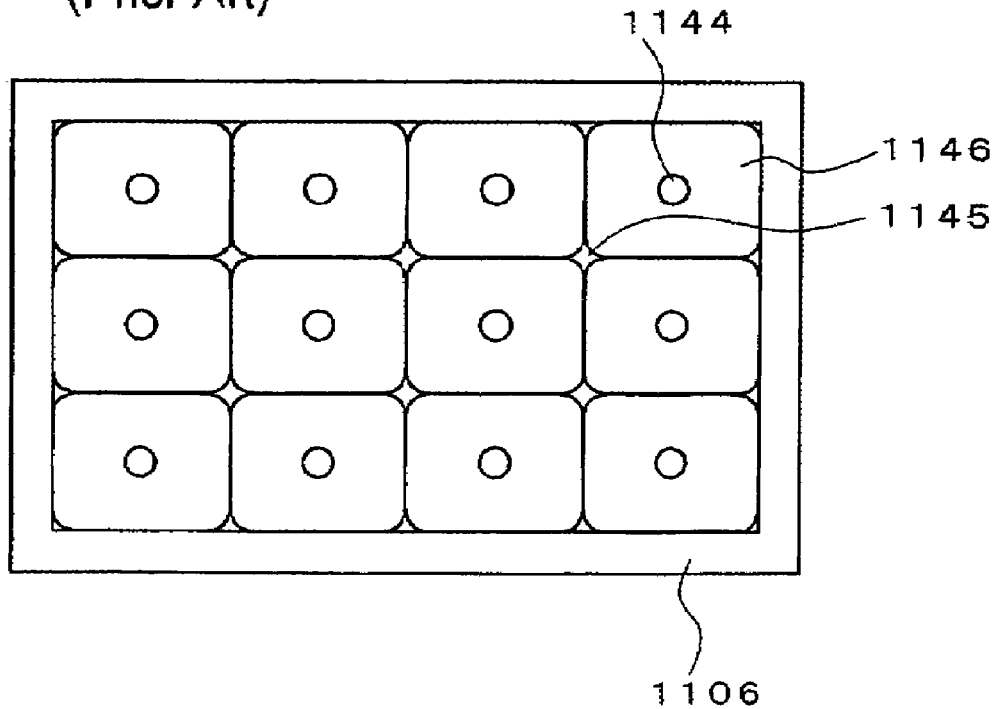
Figure 106A:
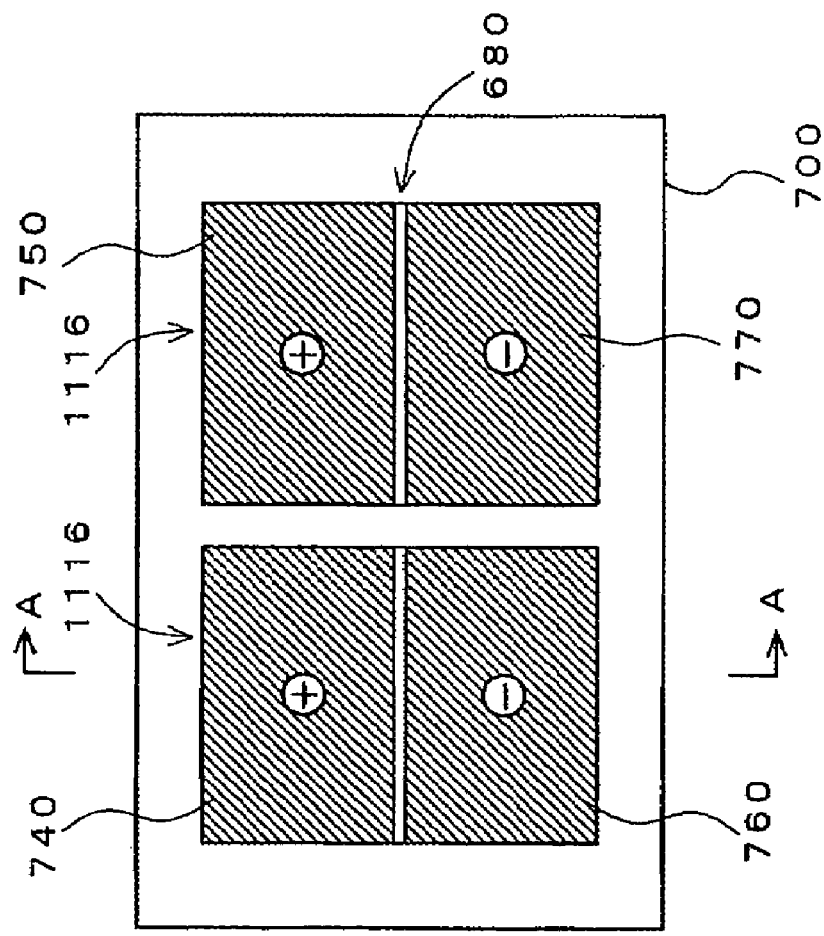
FIGS. 106a and 106b are diagrams describing substrate attachment by conventional electrostatic chucks.
Figure 106B:
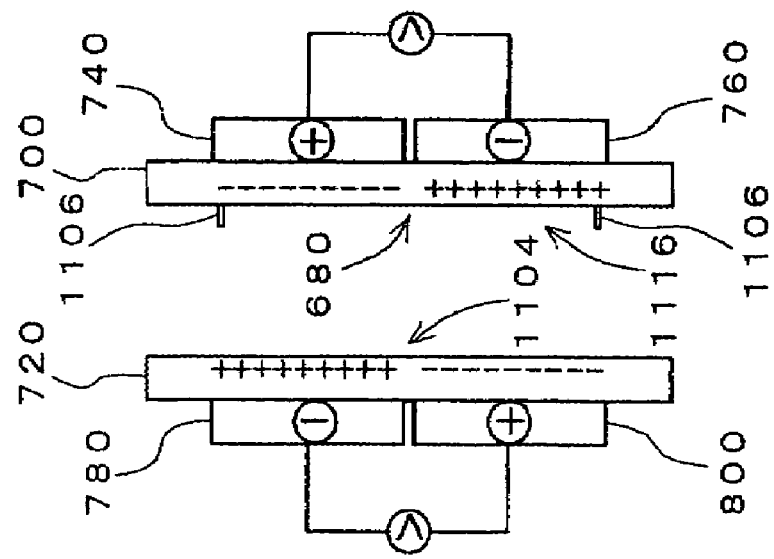
Figure 107A:
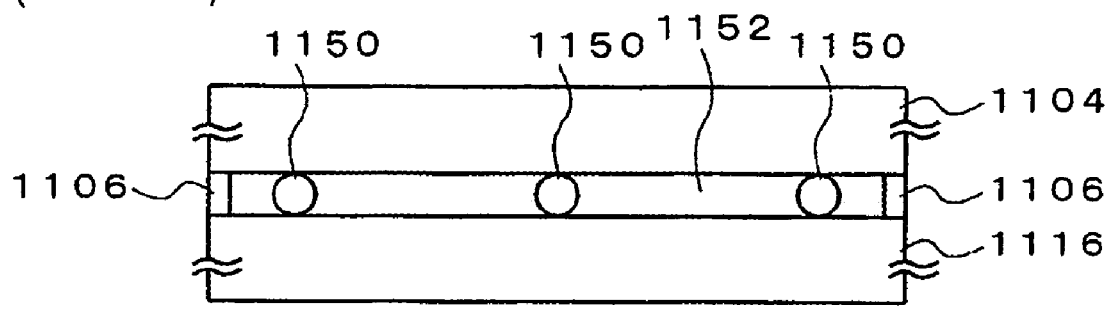
FIGS. 107a to 107c are diagrams showing irregularities of a cell gap in the conventional liquid crystal panel.
Figure 107B:
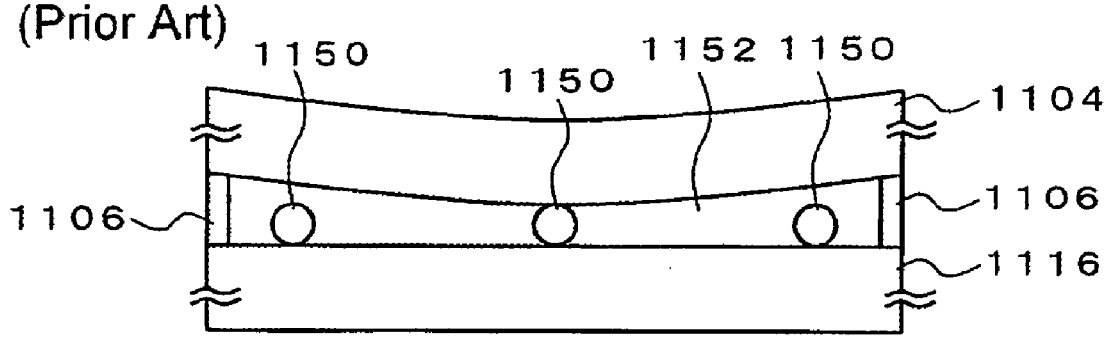
Figure 107C:
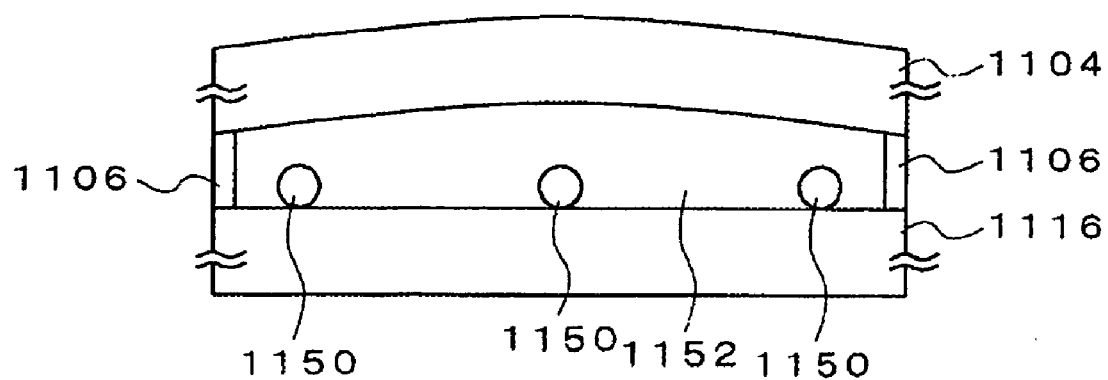

FIG. 103 is a graph showing the variation of transmissivity according to a difference in cell gap. In FIG. 103, the lateral axis indicates the drain voltage Vd and the vertical axis indicates transmissivity. Further, a solid curved line in the diagram shows a case when a cell gap is equal to 4.2 µm and a dotted curved line shows a case when a cell gap is equal to 3.8 µm. Therefore, as clear in FIG. 103, by performing the panel inspection described with reference to FIG. 102, a display irregularity in which brightness varies depending on the distribution of a cell gap in the panel display area can be detected.

When irregularities in liquid crystal instillation or gap creation are found from the panel inspection on described above, the array substrate 16 and the CF substrate 4 can be peeled off and recommitted to a previous process. In a fabrication process of a liquid crystal display using liquid crystal instillation, since cutting of a gang printing mother glass and the like are performed at the end of the process, the array substrate 16 and the CF substrate 4 which are peeled off respectively keeps the same glass size as that in the previous process. In a reproducing treatment, liquid crystal is washed by a solvent such as alcohol, acetone or the like, an alignment film and sealing material are removed from a substrate with a use of ashing, solvent and the like, thereby resuming again from the alignment film printing process.

As described above, according to the present invention, curing defects of a sealing material in the cell process can be reduced. Further, according to the present invention, peeling of a sealing material in the cell process can be prevented. Furthermore, according to the present invention, substrate deformations and display irregularities in the cell process can be reduced. Also, according to the present invention, variations of a cell gap which may be generated in the cell process can be reduced. Finally, according to the present invention, liquid crystal instillation in the cell process can be steadily performed.

As described above, according to the present invention, even if UV irradiation for curing a sealing material is performed, liquid crystal is not degraded, thereby realizing a liquid crystal display having a display quality with excellent picture using the instilling method.

Further, according to the present invention, a sealing material made of a photo-curing-type material can be cured with certainty. Furthermore, according to the present invention, displacements of attached substrates occurred when curing a sealing material can be reduced. Also, according to the present invention, press defects of the substrate at the time of instillation can be improved. Furthermore, according to the present invention, an enlargement of the external dimensions of a panel at the time of instillation can be suppressed.

Therefore, according to the present invention, a liquid crystal panel with improved yield can be fabricated by using the instilling method, thereby further reducing the fabrication cost of a liquid crystal display.

As described above, according to the present invention, in a liquid crystal display in which a frame-shape structure and a black matrix picture frame are formed in an area between a main seal and display area, peeling of a sealing material can be prevented, thereby realizing a liquid crystal display in which contamination of liquid crystal due to uncured sealing material can be prevented.

Further, according to the present invention, the instilling method of liquid crystal in a fabrication process of an MVA-mode liquid crystal display can be improved, thereby reducing display irregularities. Furthermore, according to the present invention, an inspection of display irregularities can be easily performed.

Also, according to the present invention, even if an instilling method of liquid crystal is used, an excellent cell gap can be formed.

Further, according to the present invention, even if an instilling method is used, generation of displacements of two attached substrates and displacements due to distortions in a substrate and gap irregularities can be prevented.

What is claimed:

1. A method of fabricating a liquid crystal display having processes of sealing liquid crystal by attaching two substrates with a sealing material made of a photo-curing type material, and curing the sealing material by irradiating light to the sealing material comprising:

using a photo-curing type resin having a light-reactive area to light of a wavelength of blue color band as the photo-curing material; and forming only a colored layer transmitting light of a blue color band at a shading film area contacted by the sealing material when attaching the two substrates.

2. A method of fabricating a liquid crystal display as set forth in claim 1, wherein the forming step comprises simultaneously forming the colored layer at a formation time of a blue color filter formed on a pixel.

3. A method of fabricating a liquid crystal display having processes of dropping liquid crystal at a plurality of positions on one of multiple substrates, attaching the one of the substrates with the other substrate via a sealing material made of a photo-curing type material, and curing the sealing material by irradiating light thereon comprising:

forming at least a part of a contacting area to the other substrate of the sealing material so as to overlay with a shading film formed on the other substrate; and curing the sealing material by irradiating light on an area containing a color filter formed on the other substrate.

* * * * *